(12) United States Patent
Burkholder et al.

(10) Patent No.: US 12,441,385 B2
(45) Date of Patent: Oct. 14, 2025

(54) WINCH SYSTEMS FOR CHILD CONTAINMENT DEVICES

(71) Applicant: Graco Children's Products, Inc., Atlanta, GA (US)

(72) Inventors: Brandon Michael Burkholder, Atlanta, GA (US); Brandon Seth Cross, Atlanta, GA (US); David Thomas Hotard, Peachtree Corners, GA (US); Karl Hewson, Cambridgeshire (GB); Claire Georgina Radha Wilkinson, Cambridgeshire (GB); Andrew Wynne, Cambridgeshire (GB); Neil Lester Campbell, Cambridgeshire (GB); Paul Edward Hopkinson, Cambridgeshire (GB); Conor Mark Devine, Cambridgeshire (GB)

(73) Assignee: Graco Children's Products, Inc., Atlanta, GA (US)

( * ) Notice: Subject to any disclaimer, the term of this patent is extended or adjusted under 35 U.S.C. 154(b) by 409 days.

(21) Appl. No.: 17/926,954

(22) PCT Filed: May 20, 2021

(86) PCT No.: PCT/US2021/033438
§ 371 (c)(1),
(2) Date: Nov. 21, 2022

(87) PCT Pub. No.: WO2021/236946
PCT Pub. Date: Nov. 25, 2021

(65) Prior Publication Data
US 2023/0202550 A1 Jun. 29, 2023

Related U.S. Application Data

(60) Provisional application No. 63/028,289, filed on May 21, 2020.

(51) Int. Cl.
*B62B 9/24* (2006.01)
*B60N 2/28* (2006.01)
(Continued)

(52) U.S. Cl.
CPC ............ *B62B 9/245* (2013.01); *B60N 2/2809* (2013.01); *B60N 2/2812* (2013.01); *B62B 9/104* (2013.01); *B62B 9/12* (2013.01); *B62B 2206/003* (2013.01)

(58) Field of Classification Search
None
See application file for complete search history.

(56) References Cited

U.S. PATENT DOCUMENTS 5,269,392 A * 12/1993 Perrotti ................... B60R 99/00
180/271
8,773,267 B2 * 7/2014 Conti .................. E05B 73/0017
340/568.1
(Continued)

FOREIGN PATENT DOCUMENTS

CN 108706040 A 10/2018
JP 2012-121355 A 6/2012
(Continued)

OTHER PUBLICATIONS

PCT, "International Search Report and Written Opinion" Application No. PCT/US2021/033438, mailed Sep. 27, 2021, 10 pages.
(Continued)

*Primary Examiner* — David M Upchurch
(74) *Attorney, Agent, or Firm* — Eversheds Sutherland (US) LLP

(57) ABSTRACT

A winch reel system is provided for use in child containment devices. The winch reel systems can include a one-way winch reel, a two-way winch reel, a multi-cord winch reel, and/or a drawstring winch reel. The winch reel systems can
(Continued)

be included in various child containment devices, including strollers, infant rockers, children's car seats, playards, infant swings, baby carriers, bouncers, jumpers, high chairs, play mats, baby gates, children's booster seats, and/or other types of infant carrier or containment systems and devices. Each winch reel system can include one or more wires that are engaged with a winch reel in order to adjust at least one feature of a child containment device. In other embodiments, the one or more wires can be replaced with one or more lines, cables, or straps. In some embodiments, each winch reel system can include at least one toothed pawl to engage the winch reel.

19 Claims, 79 Drawing Sheets

(51) Int. Cl.
    *B62B 9/10*    (2006.01)
    *B62B 9/12*    (2006.01)

(56) References Cited

U.S. PATENT DOCUMENTS

| | | | |
|---|---|---|---|
| 9,889,776 B1* | 2/2018 | Turnbo | B60N 2/28 |
| 10,343,705 B1* | 7/2019 | Farrar | B62B 9/142 |
| 2003/0067198 A1 | 4/2003 | Treen et al. | |
| 2003/0071511 A1 | 4/2003 | Stafford et al. | |
| 2003/0151284 A1* | 8/2003 | Dukes | B60N 2/02246 297/256.13 |
| 2003/0160486 A1* | 8/2003 | Dukes | B60N 2/02246 297/256.13 |
| 2005/0247813 A1 | 11/2005 | Kovacevich et al. | |
| 2010/0123341 A1* | 5/2010 | Furman | B60N 2/2845 297/217.4 |
| 2010/0224843 A1* | 9/2010 | Christensen | B63B 34/67 254/270 |
| 2013/0001991 A1 | 1/2013 | Hartenstine et al. | |
| 2014/0000322 A1* | 1/2014 | Williams | B62H 5/003 70/18 |
| 2015/0020558 A1* | 1/2015 | Williams | E05B 73/0011 70/18 |
| 2020/0069074 A1 | 3/2020 | Oh | |
| 2020/0196712 A1* | 6/2020 | Skidmore | B60N 2/2812 |

FOREIGN PATENT DOCUMENTS

| | | |
|---|---|---|
| JP | 2013-14320 A | 1/2013 |
| WO | 03024282 A | 3/2003 |
| WO | 2017031784 A | 3/2017 |

OTHER PUBLICATIONS

JPO, "Office Action" in Japanese Patent Application No. 2022-570749, dated Nov. 16, 2023, 10 pages.

* cited by examiner

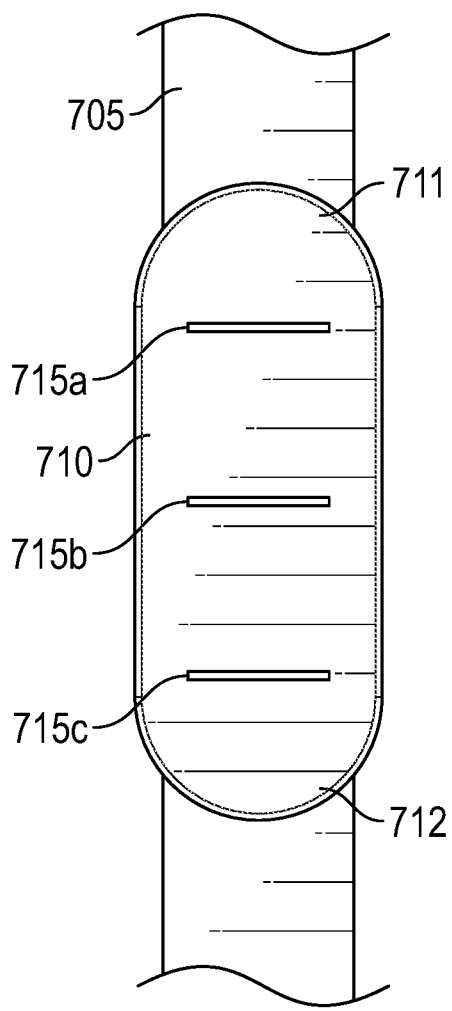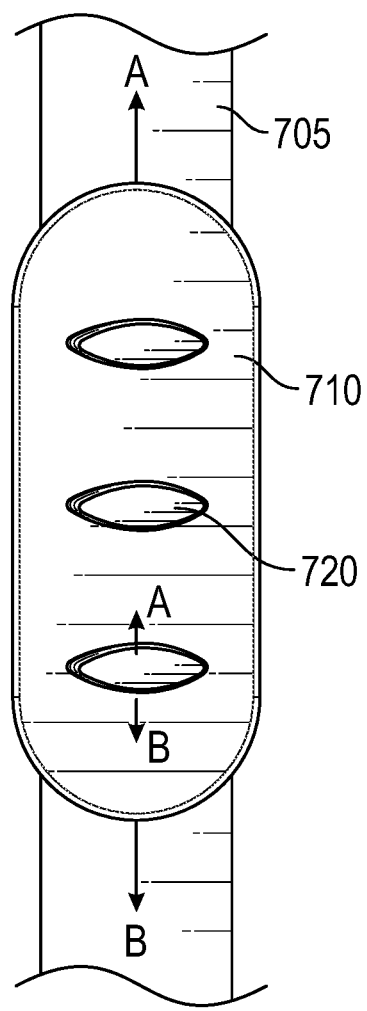
FIG. 7A    FIG. 7B
FIG. 7

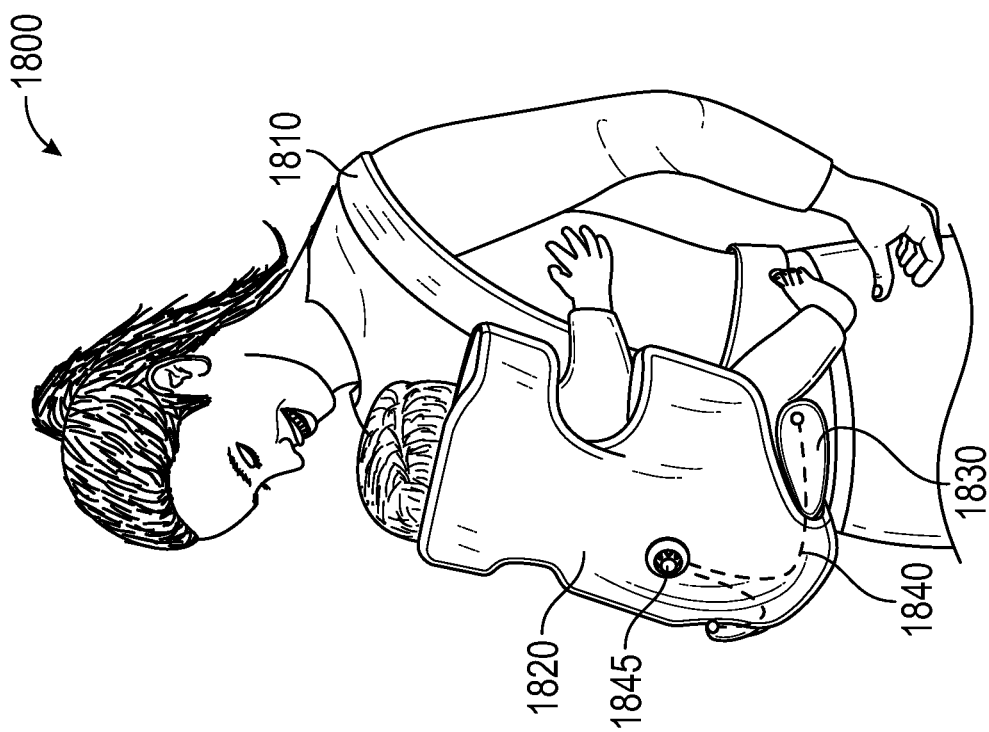
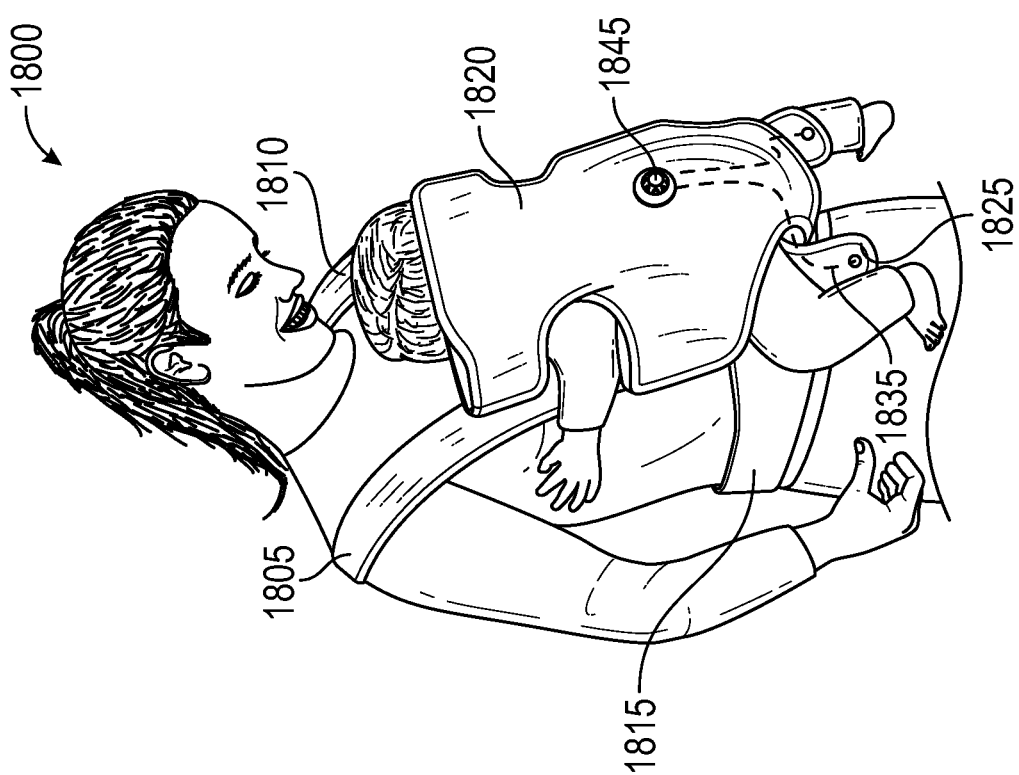
FIG. 18B
FIG. 18A

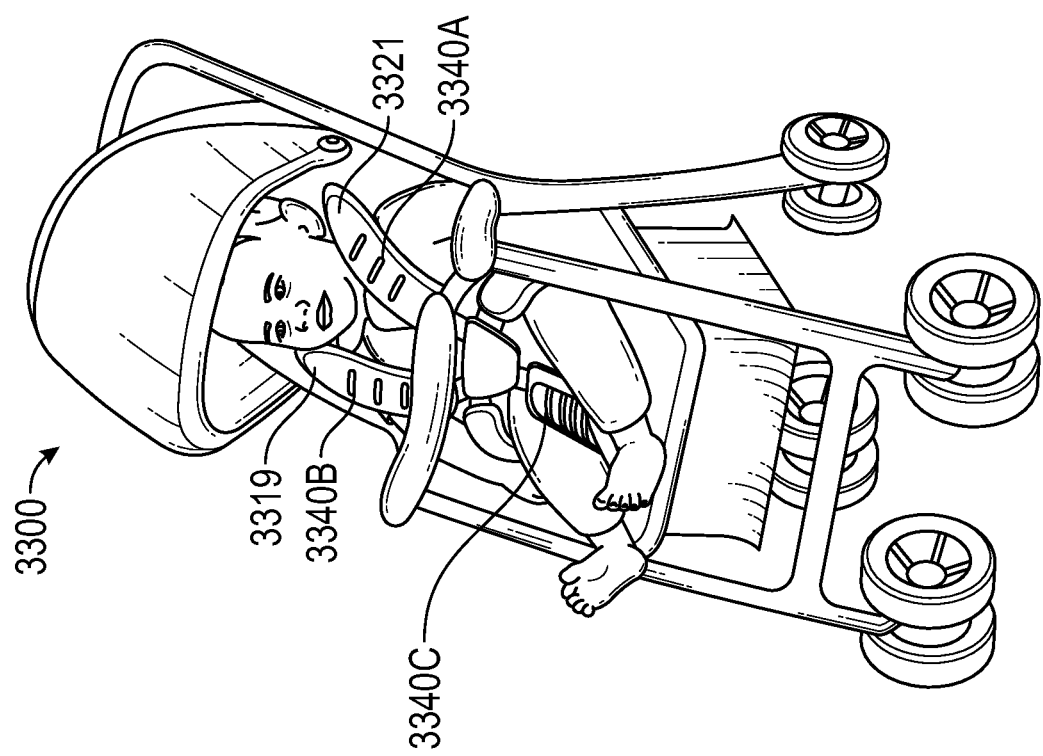

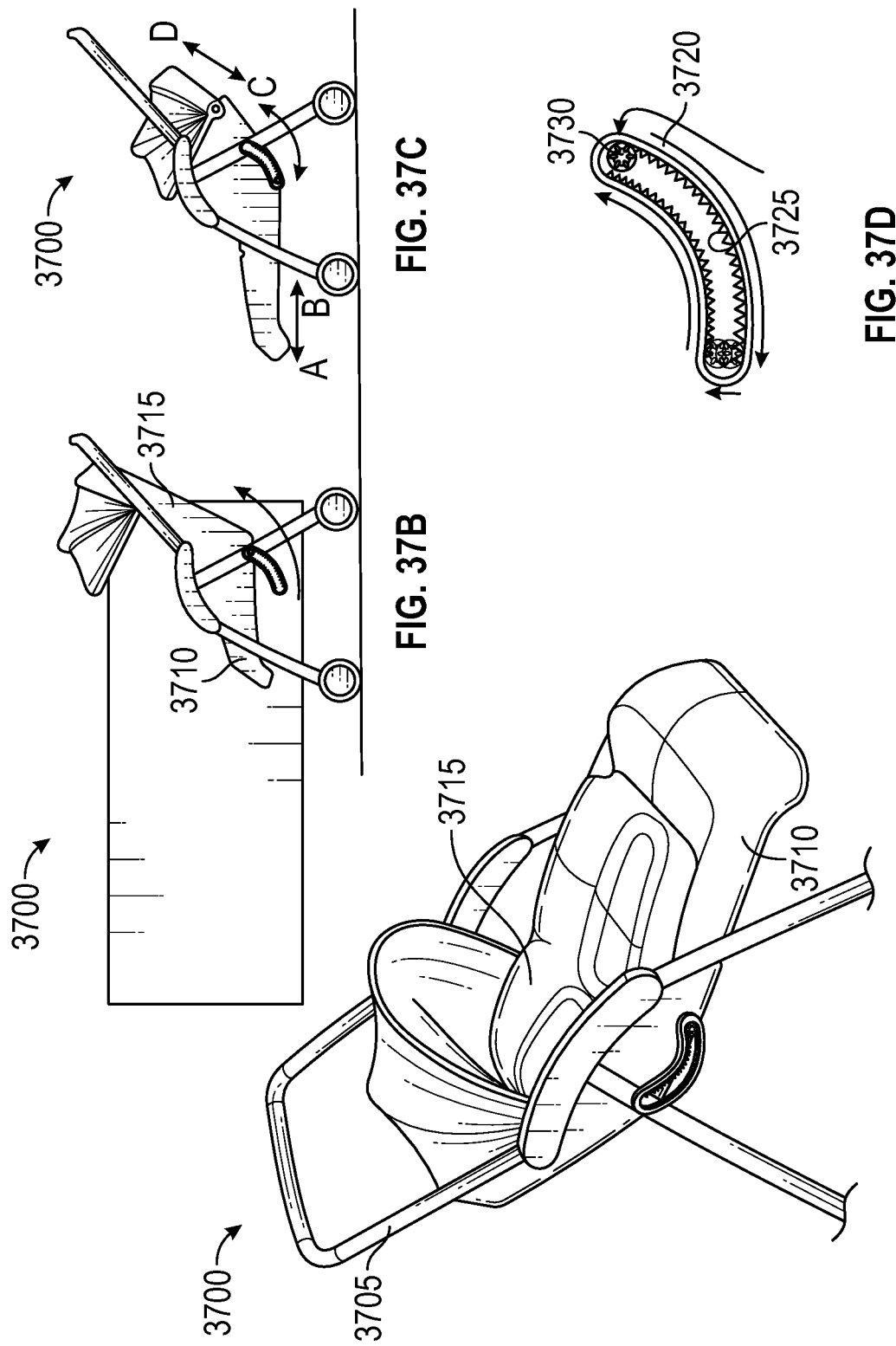

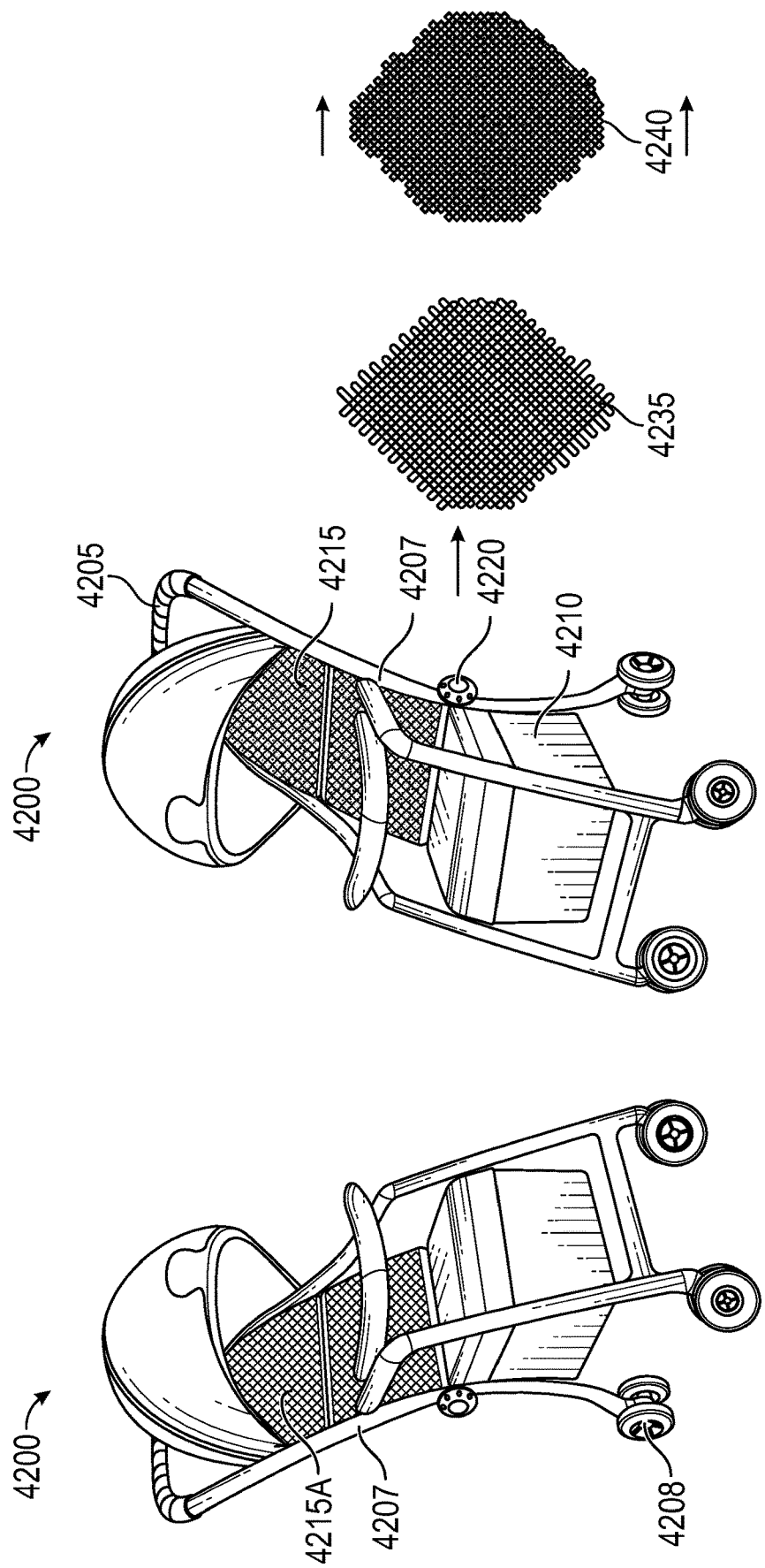

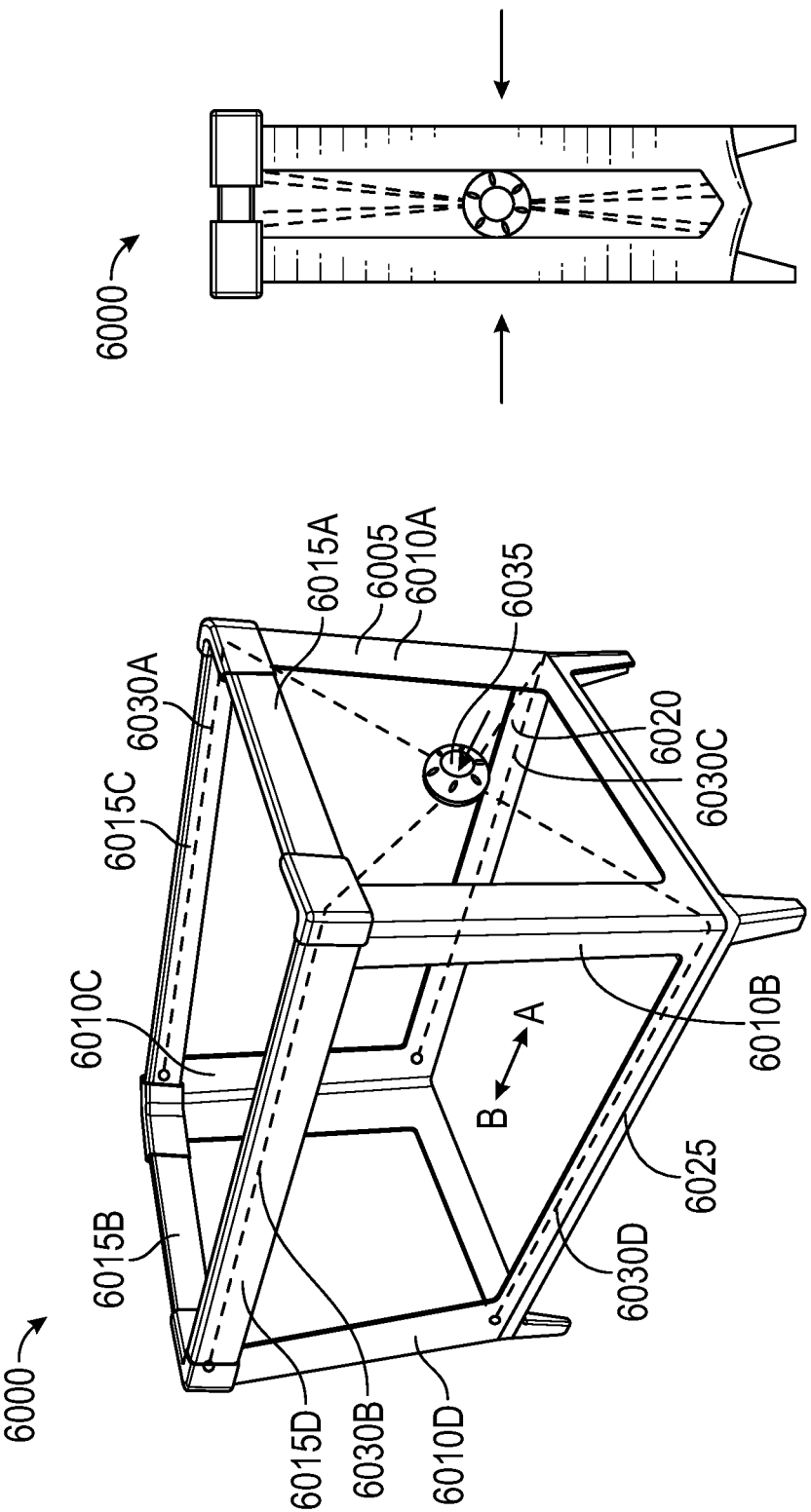

WINCH SYSTEMS FOR CHILD CONTAINMENT DEVICES

CROSS-REFERENCE TO RELATED APPLICATION

This application is a 371 National Stage Entry of PCT Application No. PCT/US2021/033438, filed May 20, 2021, which claims priority benefit of U.S. Provisional Application No. 63/028,289, filed May 21, 2020, which are incorporated in their entirety by reference.

TECHNICAL FIELD

The present disclosure generally relates to child containment devices, such as, for example, strollers, rockers, child car seats, playards, swings, baby carriers, bouncers, jumpers, high chairs, play mats, infant carrier systems (ICS), baby gates, and children's booster seats, and more particularly to systems, apparatuses, and methods for providing a winching system that adjusts certain features of a child containment device.

BACKGROUND

Child containment devices, such as, for example, strollers, rockers, child car seats, playards, swings, baby carriers, bouncers, jumpers, high chairs, play mats, infant carrier systems (ICS), baby gates, and children's booster seats, are well-known in the art. Each type of child containment device can include a variety of ways to secure, couple, and/or tighten certain elements of the child containment device. However, in many cases, these conventional methods may need or otherwise require multiple hands to complete and/or require that the child be removed from the child containment device to achieve the adjustment. Making adjustability easier can improve the use and safety of these conventional child containment devices.

BRIEF DESCRIPTION OF THE DRAWINGS

Referring now to the drawings, which are meant to be exemplary and not limiting, and wherein like elements are numbered alike. The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 7A and 7B are front elevation views of tension indicating systems that can be incorporated into any of winch reel systems of FIGS. 1A-4 for use with the child containment devices in accordance with one example embodiment of the disclosure.

FIGS. 18A and 18B are perspective views of a baby carrier with a winch reel system for adjusting the vertical position of leg padding for the backrest in accordance with one example embodiment of the disclosure.

FIGS. 33A to 33C are perspective views of a stroller with a winch reel system for adjusting the tension in the harness system for the stroller seat in accordance with one example embodiment of the disclosure.

FIGS. 37A to 37D are various views of a stroller with a winch reel system for adjusting the seat bottom and seat back of the stroller seat from an upright position to a substantially flat position in accordance with one example embodiment of the disclosure.

FIGS. 42A and 42B are perspective views of a stroller with a winch reel system for adjusting ventilation from open to closed in one or more soft goods cushions of the stroller seat in accordance with one example embodiment of the disclosure.

FIGS. 60A and 60B are respectively a perspective view and a side elevation view of a playard with a winch reel system for adjusting the tension in the upper and lower rail members of the playard in accordance with one example embodiment of the disclosure.

DETAILED DESCRIPTION OF THE EXAMPLE EMBODIMENTS

The embodiments are described in detail herein to enable one of ordinary skill in the art to practice the winch reel systems and/or child containment devices, although it is understood that other embodiments may be utilized and that logical changes may be made without departing from the scope of the disclosure. Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical, elements throughout. Throughout the disclosure, depending on the context, singular and plural terminology may be used interchangeably.

Certain relationships between features of the winch reel systems and/or child containment devices are described herein using the term "substantially" or "substantially equal." As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially parallel" indicates that the parallel relationship is not a strict relationship and does not exclude functionally similar variations therefrom. As used herein, the term "substantially orthogonal" or "substantially perpendicular" indicates that the orthogonal relationship is not a strict relationship and does not exclude functionally similar variations therefrom.

The winch reel systems described herein allow for easy and safe adjustment of certain features of a child containment device.

While these winch reel systems are generally described herein with respect to child containment devices, it should be understood that the winch reel systems described herein may be used in products other than child containment devices. For example, the winch reel systems described herein may be applied to disposal bins, mats, and other products.

Figure 1B:
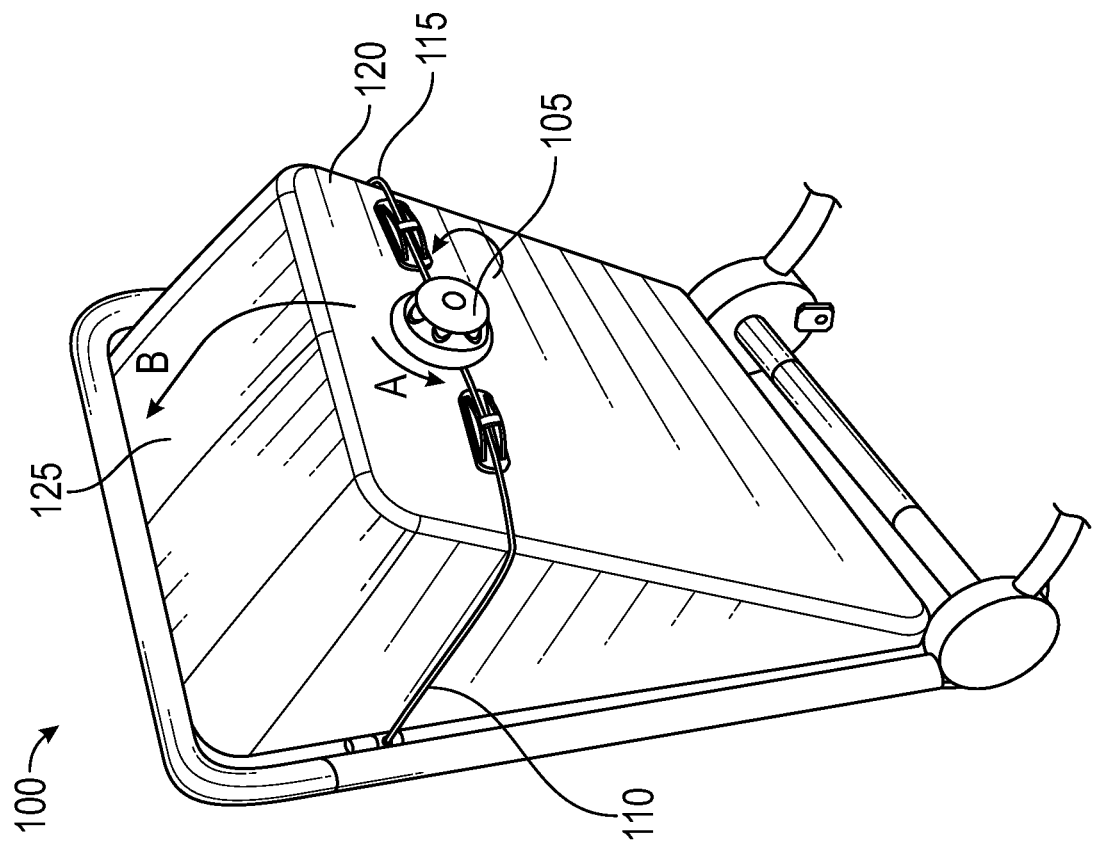
FIGS. 1A and 1B are perspective views of a one-way winch reel system for use with child containment devices in accordance with one example embodiment of the disclosure.
Figure 1A:
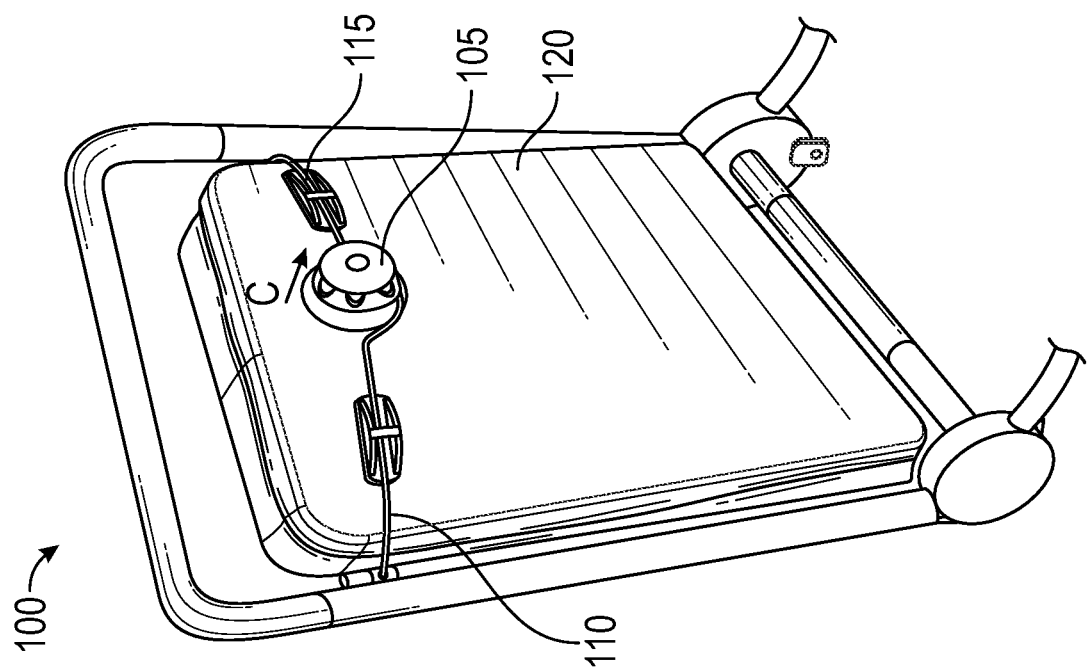

FIGS. 1A and 1B are perspective views of a one-way winch reel system for use with child containment devices in accordance with one example embodiment of the disclosure. Referring now to FIGS. 1A and 1B, the one-way winch reel system 100 can include a winch reel 105 movably coupled to a winch housing. The one-way winch reel system 100 can also include a first line, wire, cable, cord, rope, monofilament, elastic, spring, braid, strand, string, hawser, tape, thread, ribbon, twine, yarn, ligature, fillis, creance, or strap 110 (hereinafter collectively referred to as a wire). The first wire 110 can include a first end coupled to the winch reel 105 and a distal second end that can be configured to be coupled directly or indirectly to a portion of a child containment device. In certain embodiments, the one-way winch reel system 100 can also include a second wire 115 that can have a first end coupled to the winch reel 105 and a distal second end that can be configured to be coupled directly or indirectly to another portion of a child containment device. In one embodiment, the child containment device can include a first element 120 and a second distal element 125. In one embodiment, the winch reel 105 and the winch housing can be coupled to or disposed along the first element 120. In other embodiments, the winch reel 105 and the winch housing can be placed anywhere on the child containment device.

In some embodiments of the one-way winch reel system 100, rotation of the winch reel 105 in Direction A will cause a take-up (e.g., a shaft or one or more channels along a shaft) on the winch reel 105 to wind up portions of the first wire 110 and the second wire 115, which causes the first element 120 to move in Direction B towards the second distal element 125. Thus, the one-way winch reel system 100 allows for adjustment of an element of the child containment device through rotation of the winch reel 105 in a first direction. To release the first wire 110 and the second wire 115, the winch reel 105 can be popped or pulled axially outward in Direction C. The weight of the first element 120 or a spring-biasing element (e.g., a torsion spring) can then cause the winch reel 105 to rotate in the opposite direction from Direction A to allow the first element 120 to move in the opposite direction from Direction B with respect to the second distal element 125. In some embodiments, the winch reel 105 can include a pop-out element, which may also be spring-biased with a spring or other element. When the pop-out element is spring-biased, it can be disposed in the popped-in or inward position.

Figure 2:
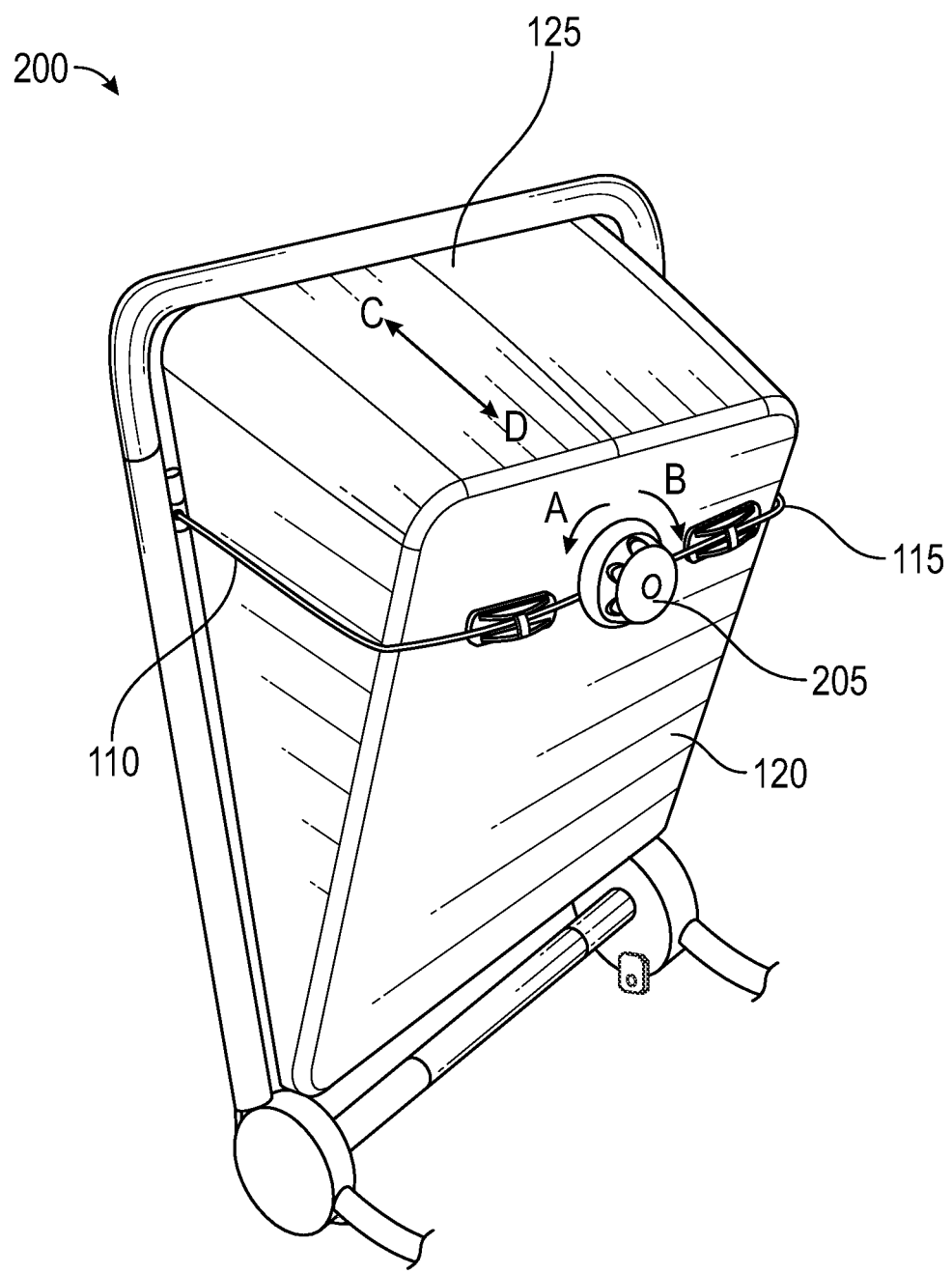
FIG. 2 is a perspective view of a two-way winch reel system for use with child containment devices in accordance with one example embodiment of the disclosure.

FIG. 2 is a perspective view of a two-way winch reel system for use with child containment devices in accordance with one example embodiment of the disclosure. Referring now to FIG. 2, the two-way winch reel system 200 can include a winch reel 205 movably coupled to a winch housing. The two-way winch reel 200 system can also include a first wire 110. The first wire 110 can include a first end coupled to the winch reel 205 and a distal second end that can be configured to be coupled directly or indirectly to a portion of a child containment device. In certain embodiments, the two-way winch reel system 200 can also include a second wire 115 that can have a first end coupled to the winch reel 205 and a distal second end that can be configured to be coupled directly or indirectly to another portion of a child containment device. In one embodiment, the child containment device can include a first element 120 and a second distal element 125, and the distal second end of the first wire 110 can be configured to be coupled directly or indirectly to a first portion of the second distal element 125, and the distal second end of the second wire 115 can be configured to be coupled directly or indirectly to a second portion of the second distal element 125. In some embodiments, the winch reel 205 and the winch housing can be coupled to or disposed along the first element 120. In other embodiments, the winch reel 205 and the winch housing can be placed anywhere along the child containment device.

In some embodiments of the two-way winch reel system 200, rotation of the winch reel 205 in Direction A will cause a take-up (e.g., a shaft or one or more channels along a shaft coupled to the winch reel 205) on the winch reel 205 to wind up portions of the first wire 110 and the second wire 115, which causes the first element 120 to move in Direction C towards the second distal element 125. Thus, the two-way winch reel system allows for adjustment of an element of the child containment device through rotation of the winch reel 205 in a first direction. In some embodiments of the two-way winch reel system, rotation of the winch reel 205 in Direction B will cause a take-up (e.g., a shaft or one or more channels along a shaft coupled to the winch reel 205) on the winch reel 205 to unwind portions of the first wire 110 and the second wire 115, which causes the first element 120 to move in Direction D away from the second distal element 125. Thus, the two-way winch reel system also allows for adjustment of an element of the child containment device through rotation of the winch reel 205 in a second direction.

Figure 3:
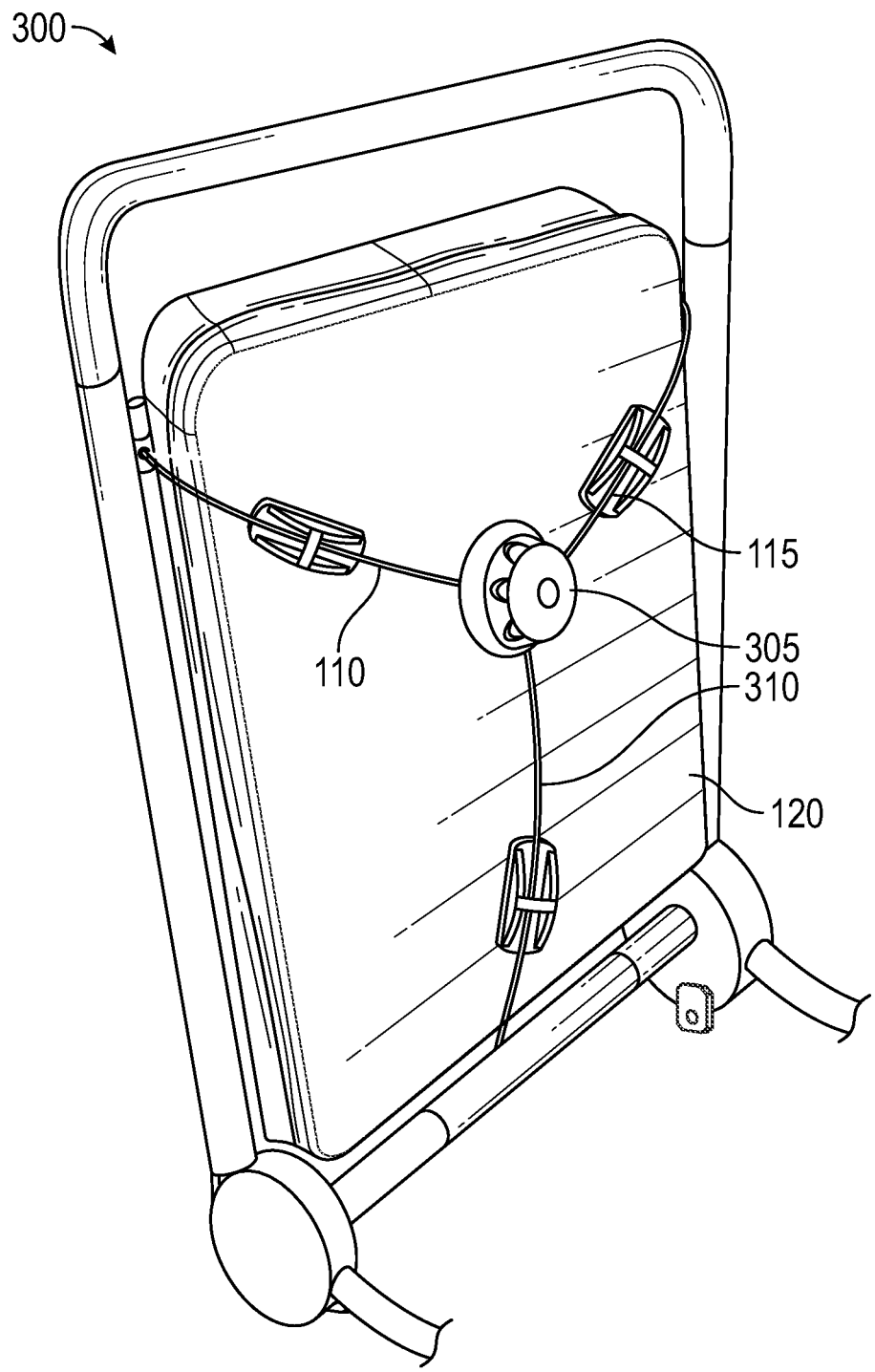
FIG. 3 is perspective view of a multi-cord winch reel system for use with child containment devices in accordance with one example embodiment of the disclosure.

FIG. 3 is perspective view of a multi-cord winch reel system for use with child containment devices in accordance with one example embodiment of the disclosure. Referring now to FIG. 3, the multi-cord winch reel system 300 can include a winch reel 305 movably coupled to a winch housing. The winch reel 305 can be a one-way winch reel 105 as illustrated in FIGS. 1A-1B or a two-way winch reel 205 as illustrated in FIG. 2. The system can also include a first wire 110. The first wire 110 can include a first end coupled to the winch reel 305 and a distal second end that can be configured to be coupled directly or indirectly to a portion of a child containment device. In certain examples, the multi-cord winch reel system 300 can also include a second wire 115 that can include a first end coupled to the winch reel 305 and a distal second end that can be configured to be coupled directly or indirectly to another portion of a child containment device. The multi-cord winch reel system 300 can also include a third wire 310 that can include a first end coupled to the winch reel 305 and a distal second end that can be configured to be coupled directly or indirectly to yet another portion of the child containment device. In one example the child containment device can include a first element 120 and other elements (not shown).

In one example, adjusting the length and/or tension of the first wire 110 and/or the second wire 115 moves the first element 120 in a first direction. In one example, adjusting the length and/or tension of the third wire 310 moves the first element 120 in a second direction that is different from the first direction. In another example, adjusting the length and/or tension of the third wire 310 moves a different portion of the first element 120. Thus, a single winch reel 305 can be configured to move a single element in multiple directions at one time and/or move multiple elements of a child containment device at one time. In one example, the winch reel 305 and the winch housing can be coupled to or disposed along the first element 120, although, in other examples, the winch reel 305 and the winch housing can be placed anywhere along the child containment device.

In some embodiments of the multi-cord winch reel system 300, rotation of the winch reel 305 in a first direction will cause a take-up (e.g., a shaft or one or more channels along a shaft coupled to the winch reel 305) on the winch reel 305 to wind up portions of the first wire 110, the second wire 115, and the third wire 310. In some embodiments of the multi-cord winch reel system 300, rotation of the winch reel 305 in a second direction (which is opposite the first direction) (or pulling the winch reel 305 axially outward to pop it out and release the take-up) will cause a take-up (e.g., a shaft or one or more channels along a shaft coupled to the winch reel 305) on the winch reel 305 to unwind portions of the first wire 110, the second wire 115, and the third wire 310. In other embodiments, pulling winch reel 305 in an axially outward direction can pop the winch reel 305 out and release the take-up, which can then unwind portions of the first wire 110, the second wire 115, and the third wire 310.

In other embodiments, the multi-cord winch reel system 300 may comprise more than three wires.

Figure 4:
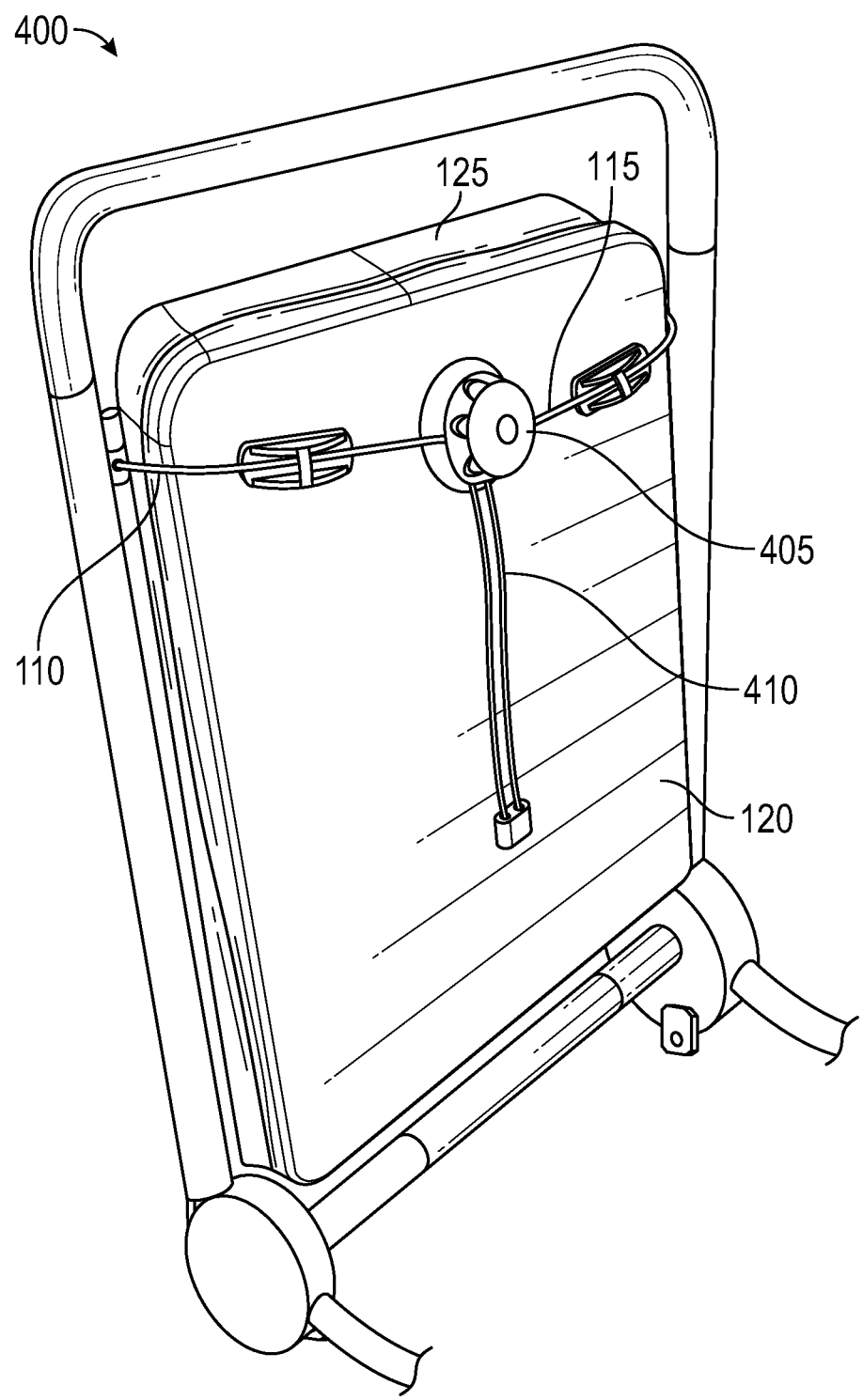
FIG. 4 is a perspective view of a drawstring winch reel system for use with child containment devices in accordance with one example embodiment of the disclosure.

FIG. 4 is a perspective view of a drawstring winch reel system for use with child containment devices in accordance with one example embodiment of the disclosure. Referring now to FIG. 4, the drawstring winch reel system 400 can include a winch reel 405 movably coupled to a winch housing. The drawstring winch reel system 400 can also include a first wire 110. The first wire 110 can include a first end coupled to the winch reel 405 and a distal second end that can be configured to be coupled directly or indirectly to a portion of a child containment device. In certain embodiments, the drawstring winch reel system 400 can also include a second wire 115 that can have a first end coupled to the winch reel 405 and a distal second end that can be configured to be coupled directly or indirectly to another portion of a child containment device. In one example, the child containment device can include a first element 120 and a second distal element 125. In some embodiments, the distal second end of the first wire 110 can be configured to be coupled directly or indirectly to a first portion of the second distal element 125, and the distal second end of the second wire 115 can be configured to be coupled directly or indirectly to a second portion of the second distal element 125. In one example, the winch reel 405 and the winch housing can be coupled to or disposed along the first element 120, although, in other examples, the winch reel 405 and the winch housing can be placed anywhere along the child containment device. In other embodiments, additional wires may be used in the drawstring winch reel system 400.

The drawstring winch reel 405 can include a locked and an unlocked position. In the locked position, the first wire 110 and the second wire 115 cannot move through the drawstring winch reel 405. In the unlocked position, a user can pull the first wire 110 and the second wire 115 using drawstring ends 410, which are attached to the first wire 110 and the second wire 115, through the drawstring winch reel 405. The drawstring winch reel 405 can be adjusted from the locked position to the unlocked position by rotating the drawstring winch reel 405 in a first direction, and the drawstring winch reel 405 can be adjusted from the unlocked position to the locked position by rotating the drawstring winch reel 405 in a second direction that is opposite the first direction. In one example, pulling the drawstring ends 410 pulls portions of the first wire 110 and the second wire 115 through the drawstring winch reel 405, which moves the first element 120 towards the second distal element 125. Unlocking the drawstring winch reel 405 without pulling on the drawstring ends 410 thus allows the first wire 110 and the second wire 115 to move back through the drawstring winch reel 405, which then allows the first element 120 to be moved away from the second distal element 125 of the child containment device.

Figure 5:
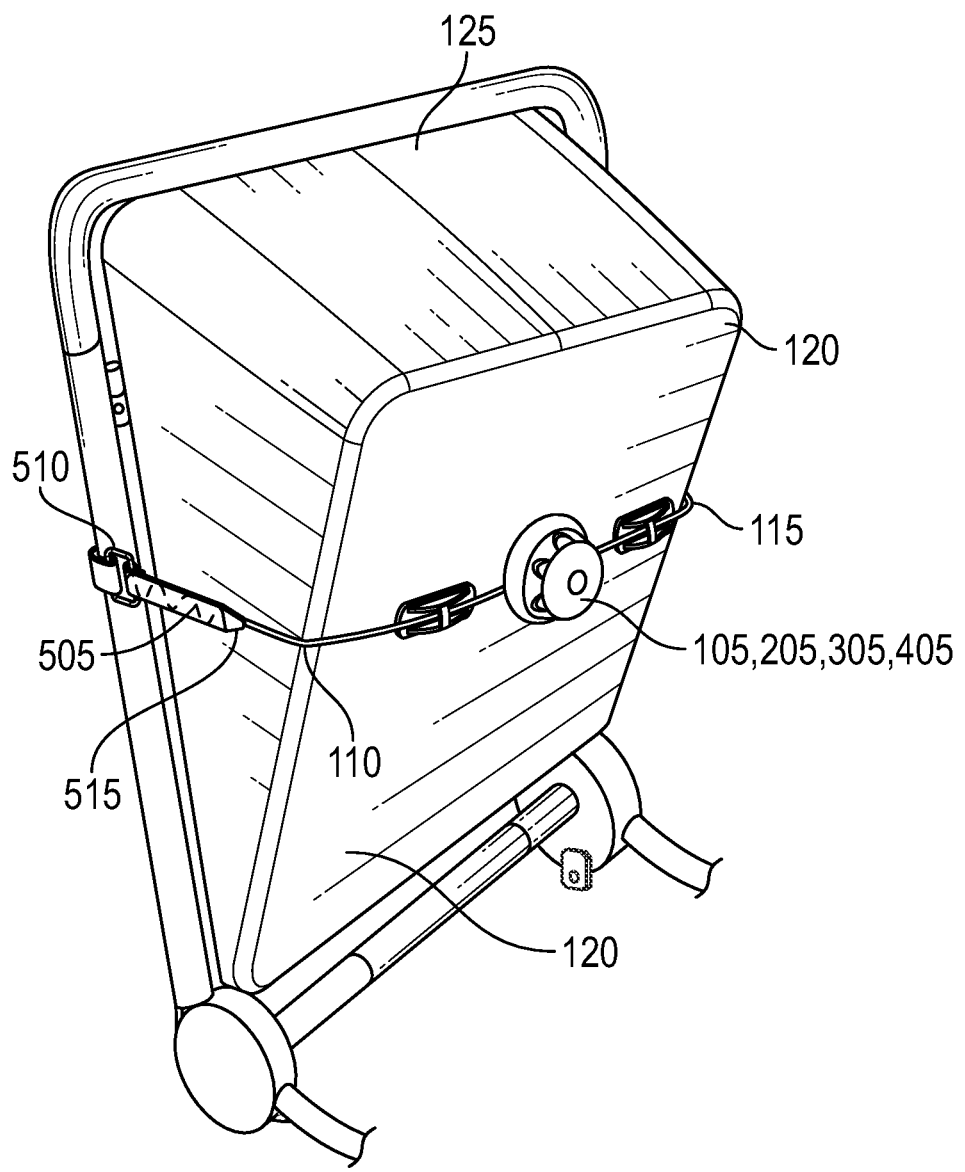
FIG. 5 is a perspective view of an elastic section that can be incorporated into any of the winch reel systems of FIGS. 1A-4 for use with the child containment devices in accordance with one example embodiment of the disclosure.

FIG. 5 is a perspective view of an elastic section that can be incorporated into any of the winch reel systems of FIGS. 1A-4 for use with the child containment devices in accordance with one example embodiment of the disclosure. Referring now to FIG. 5, any of the one or more wires, such as the first wire 110, the second wire 115, the third wire 310 (although not depicted in FIG. 5), and/or any additional wires as described in FIGS. 1A-4 can also include an elastic member 505. The elastic member 505 can have a first end 510 coupled directly or indirectly to the second distal element 125 or a mounting hook and a distal second end 515 coupled to the second end of the first wire 110. In other embodiments, the second distal end 515 can be coupled to the distal second end of the second wire 115 or any other wire. The elastic member 505 can be made of any type of elastic material known to those of ordinary skill in the art. Providing an elastic member 505 to the first wire 110, the second wire 115, and/or any other additional wires can provide for a small range of movement and flexibility in the winch reel system and provide additional comfort to the child in the child containment device. While the elastic member 505 has been shown in FIG. 5 to be positioned at the distal second end for the first wire 110 and the second wire 115, this is for example purposes only. In other example embodiments, the elastic member 505 can be positioned between two separate portions of the first wire 110 and/or the second wire 115.

Figure 6:
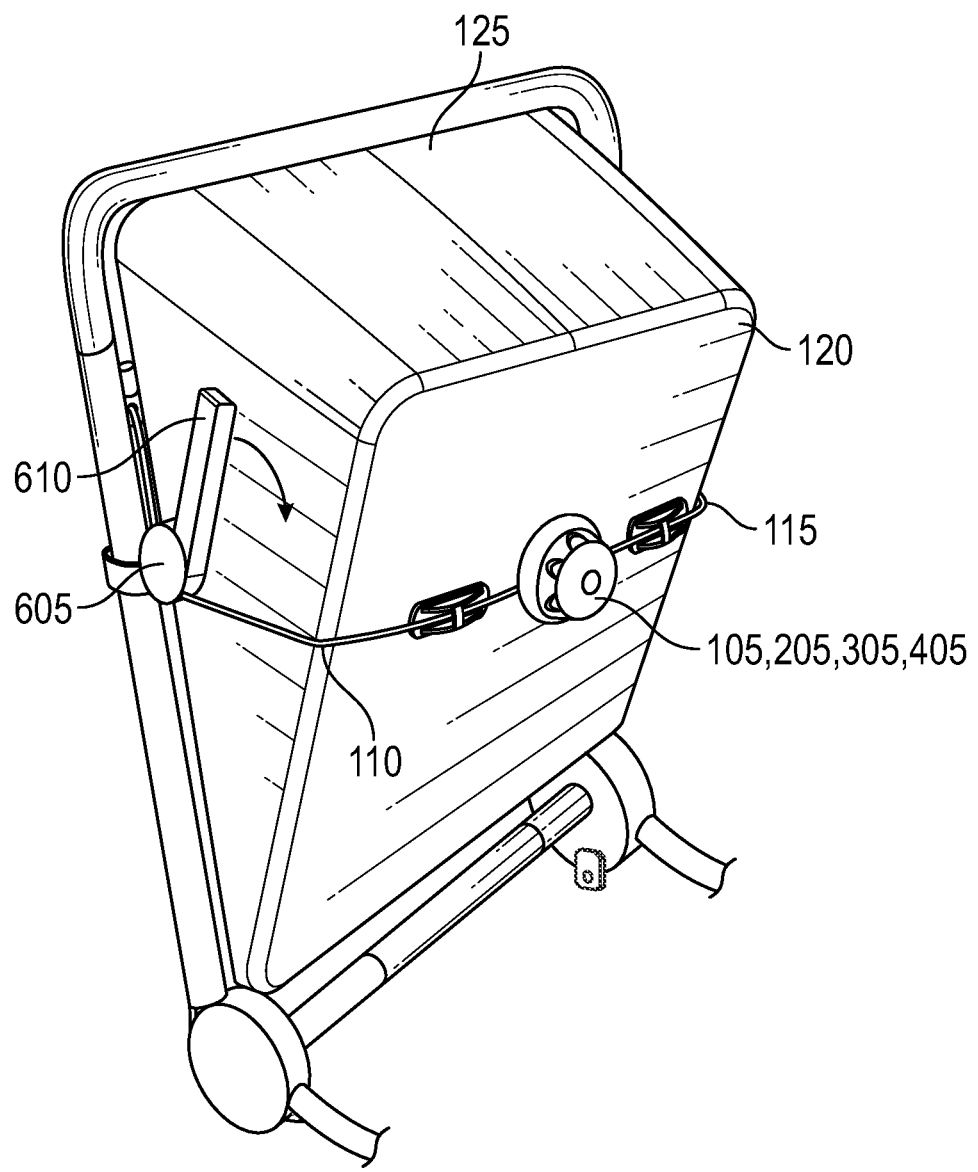
FIG. 6 is a perspective view of a quick-release lever that can be incorporated into any of the winch reel systems of FIGS. 1A-4 for use with the child containment devices in accordance with one example embodiment of the disclosure.

FIG. 6 is a perspective view of a quick-release lever that can be incorporated into any of the winch reel systems of FIGS. 1A-4 for use with the child containment devices in accordance with one example embodiment of the disclosure. Referring to FIG. 6, the winch reel system can also include a quick release mechanism 605. In certain example embodiments, the quick release mechanism 605 can be coupled to one wire (e.g., the first wire 110). In other embodiments, multiple quick release mechanisms can be provided so that there is one quick release mechanism connected to each of the first wire 110, the second wire 115, and any additional wires. As illustrated in FIG. 6, the quick release mechanism 605 can include a lever 610 in certain example embodiments. The lever 610 can be manually adjusted by a user to rotate the quick release mechanism 605 from a locked position to an unlocked position. In the locked position, the first wire 110 will not be able to move through the quick release mechanism 605. In the unlocked position, the first wire 110 can be quickly pulled through the quick release mechanism 605 to move the first element 120 towards the second distal element 125.

FIGS. 7A and 7B are front elevation views of tension indicating systems that can be incorporated into any of the winch reel systems of FIGS. 1A-4 for use with the child containment devices in accordance with one example embodiment of the disclosure. Referring now to FIGS. 7A and 7B. one or more wires or tethers 705 can include a tension indicating system 710. Each tension indicating system 710 can be made of a first material. As illustrated in FIG. 7A, the first material can include one or more slits or openings 715a-715c. The tension indicating system 710 can have a first end 711 coupled to a first portion of the wire or tether 705 and a distal second end 712 coupled to a second portion of the wire or tether 705. As illustrated in FIG. 7B, the tension indicating system 710 can be positioned over a second material 720. The first material can be elastic and designed to stretch in the longitudinal direction. The elastic material for the first material can be any elastic material known to those of ordinary skill in the art. As tension is applied in the wire or tether 705, the first material is elongated in the longitudinal direction, which causes each of the slits or openings 715a-715c to open in Directions A and B, thus exposing the second material 720 to external view. The tension indicating system 710 may further include additional slits or openings. Exposing the second material 720 to external view can provide a visual indication to a user that sufficient tension has been reached for that particular wire or tether 705. As tension is reduced in the wire or tether 705, the first material is no longer elongated in the longitudinal direction, which causes each of the slits or openings 715a-715c to close or substantially close, thus covering the second material 720 from external view by a user of the child containment device.

Figure 8:
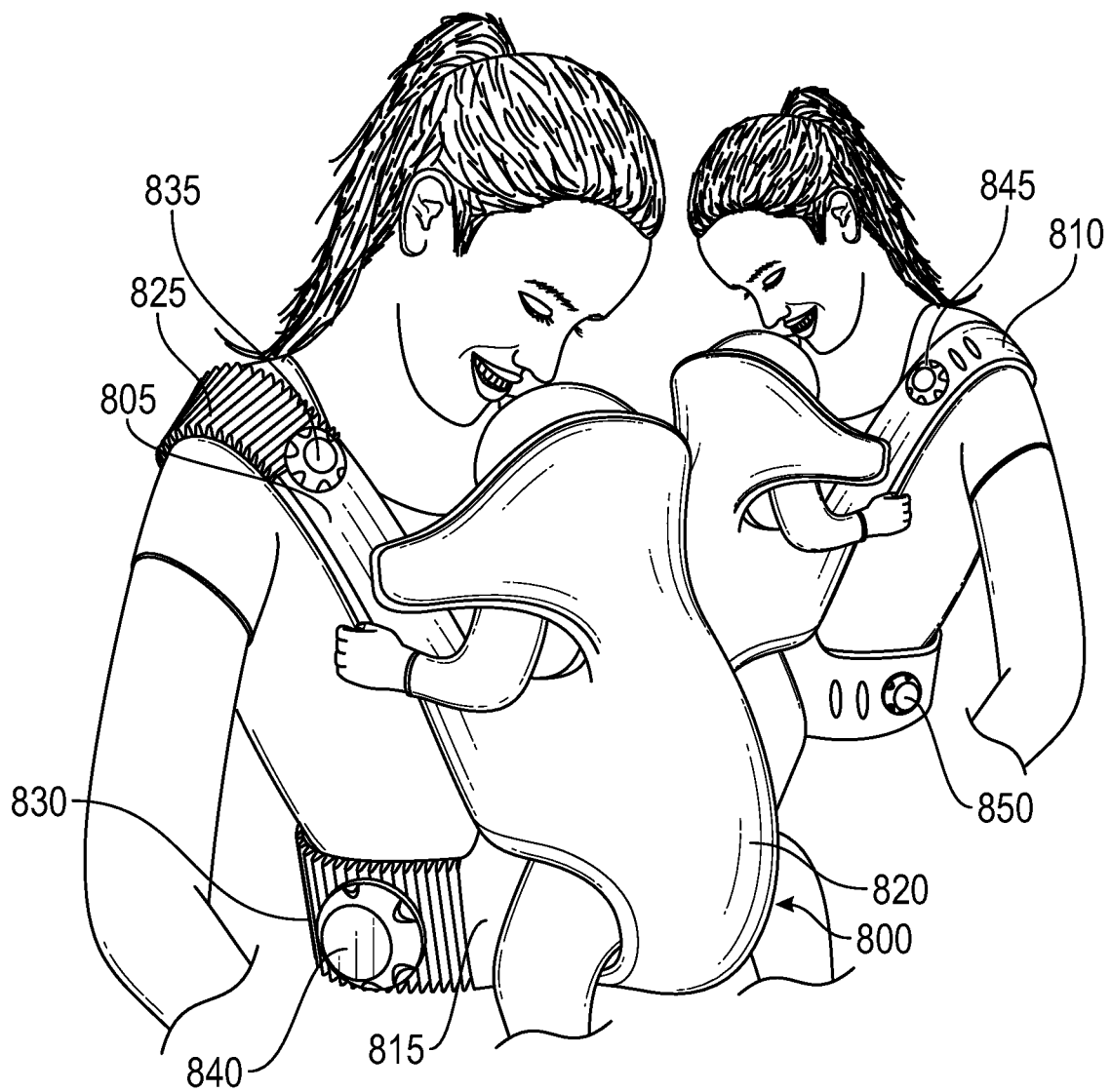
FIG. 8 is a perspective view of a baby carrier with a winch reel system in accordance with one example embodiment of the disclosure.

FIG. 8 is a perspective view of a baby carrier 800 with winch reel system in accordance with one example embodiment of the disclosure. Any one or more of the winch reel systems and features of FIGS. 1A-7 can be used as the winch reel systems described herein. Referring to FIG. 8, the baby carrier 800 can include a first shoulder harness 805, a second shoulder harness 810, a waist harness 815, and a carrier backrest 820. The first shoulder harness 805 can be configured to go over a first shoulder of a caregiver and the second shoulder harness 810 can be configured to go over the second shoulder of the caregiver. In one example, the first shoulder harness 805 and the second shoulder harness 810 can include a collapsible fabric material 825 along at least a portion of the first shoulder harness 805 and the second shoulder harness 810.

A first winch reel 835 and a second winch reel 845 can be positioned along the first shoulder harness 805 and the second shoulder harness 810, respectively, and can include a wire that extends through the collapsible fabric material 825. Adjustment of the first winch reel 835 through rotation can shorten or lengthen the length of the collapsible material 825 and thereby alter the overall length of the first shoulder harness 805. Similarly, adjustment of the second winch reel 845 through rotation can shorten or lengthen the length of the collapsible material 825 and thereby alter the overall length of the second shoulder harness 810. In addition to this example embodiment or in another example embodiment, the first shoulder harness 805 and the second shoulder harness 810 can include tension indicators disposed along the first shoulder harness 805 and the second shoulder harness 810, such as those described in FIG. 7. Tightening the first shoulder harness 805 and the second shoulder harness 810, using the first winch reel 835 and the second winch reel 845 respectively, can increase the tension in each of the first shoulder harness 805 and the second shoulder harness 810, thereby causing the slits, such as slits 715a-715c, in the first material of the tension indicating system 710 to open and expose the second material 720 to external view. Exposing the second material 720 to external view can provide a caregiver with an indication of when sufficient tension is provided in the first shoulder harness 805 and the second shoulder harness 810.

In this example embodiment or another example embodiment, the waist harness 815 can include a collapsible fabric material 830 disposed along at least a portion of the waist harness 815. A third winch reel 840 and a fourth winch reel 850 can be positioned along the waist harness 815 and can include a wire that extends through a collapsible fabric material 830. Adjustment of the third winch reel 840 and the fourth winch reel 850 through rotation can shorten or lengthen the length of the collapsible fabric material 830, and thereby the shorten or lengthen the overall length of the waist harness 815. In addition to this example embodiment or in another example embodiment, the waist harness 815 can include tension indicating systems 710 disposed along the waist harness 815, such as those described in FIG. 7. Tightening the waist harness 815 using the third winch reel 840 and the fourth winch reel 850 can increase the tension in the waist harness 815, thereby causing the slits, such as slits 715a-715c, in the first material of the tension indicating system 710 to open and expose the second material 720 to external view. Exposing the second material 720 to external view can provide a caregiver with an indication of when sufficient tension is provided in the waist harness 815.

Figure 9:
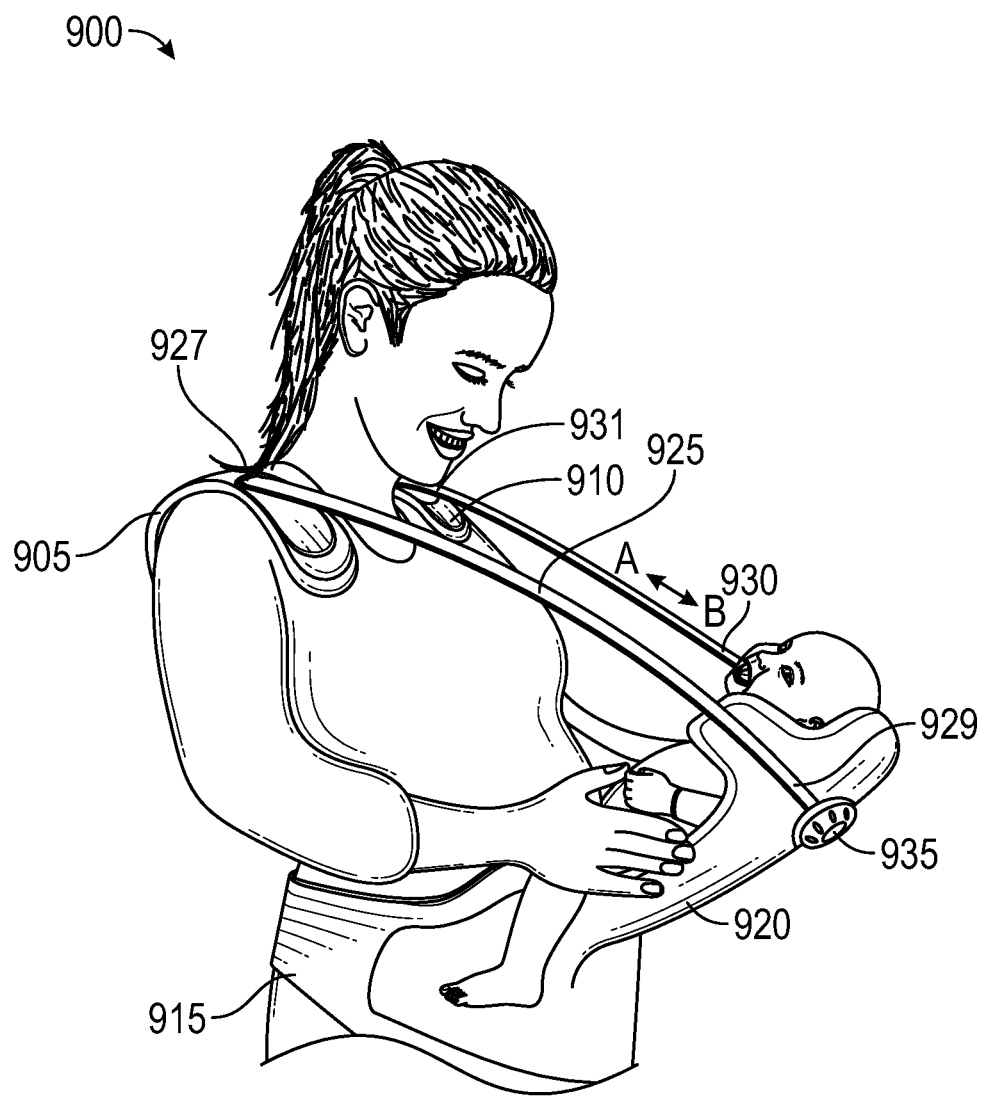
FIG. 9 is a perspective view of a baby carrier with a winch reel system for adjusting tension of the backrest to the shoulder harnesses in accordance with one example embodiment of the disclosure.

FIG. 9 is a perspective view of a baby carrier with a winch reel system for adjusting tension of the backrest to the shoulder harnesses in accordance with one example embodiment of the disclosure. Any one or more of the winch reel systems and features of FIGS. 1A-7 can be used as the winch reel systems described herein. In addition, the features described in FIG. 9 may be provided separately or in addition to any of the features described in FIG. 8. Referring to FIG. 9, the baby carrier 900 can include a first shoulder harness 905, a second shoulder harness 910, a waist harness 915, and a carrier backrest 920. The first shoulder harness 905 can be configured to go over a first shoulder of a caregiver and the second shoulder harness 910 can be configured to go over the second shoulder of the caregiver. In certain examples, the baby carrier 900 can include a winch reel system for tightening the carrier backrest 920 towards the first shoulder harness 905 and the second shoulder harness 910. For example, a winch reel 935 can be coupled to the outer facing side of the carrier backrest 920.

The baby carrier 900 can also include a first wire 925 having a first end 927 coupled to the first shoulder harness 905 and a distal second end 929 coupled to the winch reel 935. The baby carrier 900 can also include a second wire 930 having a first end 931 coupled to the second shoulder harness 910 and a distal second end coupled to the winch reel 935. In one example, the winch reel 935 is a one-way or two-way reel. As the winch reel 935 is rotated in a first direction, the first wire 925 and the second wire 930 are wound up on the take-up of the winch reel 935 and the carrier backrest 920 is moved in Direction A towards the first shoulder harness 905 and the second shoulder harness 910. As the winch reel 935 is rotated in a second direction or popped out to release the take-up, the carrier backrest 920 moves in Direction B away from the first shoulder harness 905 and the second shoulder harness 910. In certain example embodiments, the winch reel 935 can also include one or more position settings to allow for the adjustment of the first wire 925 and the second wire 927, thus enabling different lengths between the top end of the carrier backrest 920 and the first shoulder harness 905 and the second shoulder harness 910.

Figure 10:
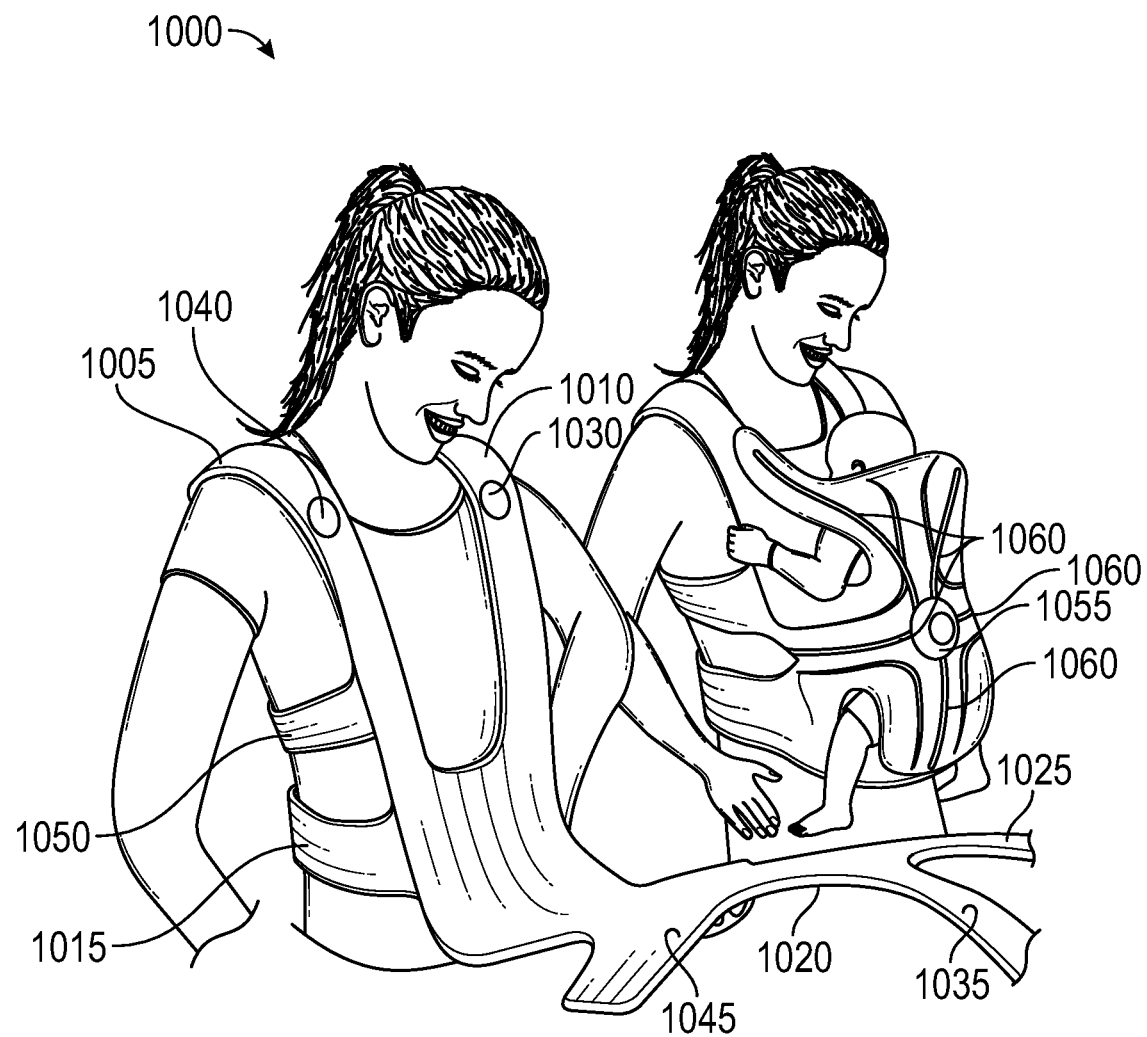
FIG. 10 is a perspective view of a baby carrier with a winch reel system for adjusting tension of the backrest in accordance with one example embodiment of the disclosure.

FIG. 10 is a perspective view of a baby carrier with a winch reel system for adjusting tension of the backrest in accordance with one example embodiment of the disclosure. Any one or more of the winch reel systems and features of FIGS. 1A-7 can be used as the winch reel systems described herein. In addition, the features described in FIG. 10 may be provided separately or in addition to any of the features described in FIGS. 8 and/or 9. Referring to FIG. 10, the baby carrier 1000 can include a first shoulder harness 1005, a second shoulder harness 1010, a waist harness 1015, a chest harness 1050, and a carrier backrest 1020. The first shoulder harness 1005 can be configured to go over a first shoulder of a caregiver and the second shoulder harness 1010 can be configured to go over the second shoulder of the caregiver.

In certain examples, the baby carrier 1000 can include a winch reel system for tightening the carrier backrest 1020 towards the first shoulder harness 1005, and the second shoulder harness 1010, the waist harness 1015, and the chest harness 1050. For example, a winch reel 1055 can be coupled to an outer facing side of the carrier backrest 1020. The carrier backrest 1020 can include a first shoulder strap mounting arm 1025, a second shoulder strap mounting arm 1035, and a first chest harness mounting arm 1045. The carrier backrest 1020 can include a second chest harness mounting arm, although it is not shown in FIG. 10. The first shoulder strap mounting arm 1025 can be attached to the second shoulder harness 1010 at a first connection point 1030, while the second shoulder strap mounting arm 1035 can be attached to the first shoulder harness 1005 at a second connection point 1040. The baby carrier 1000 can also include multiple wires 1060 coupled to the winch reel 1055. One wire 1060 can extend through or be coupled to a portion of the first shoulder strap mounting arm 1025 and a portion of the second shoulder harness 1010. Another wire 1060 can extend through or be coupled to a portion of the second shoulder strap mounting arm 1035 and a portion of the first shoulder harness 1005. Another wire 1060 can extend through or be coupled to a portion of the first chest harness mounting arm 1045 and a portion of the chest harness 1050. Another wire 1060 can extend through or be coupled to a portion of the second chest mounting arm, which is not depicted in FIG. 10, and a portion of the chest harness 1050. Another wire 1060 can extend through or be coupled to a first portion of the waist harness 1015, while another wire 1060 can extend through or be coupled to a second portion of the waist harness 1015.

In one example, the winch reel 1055 is a multi-cord reel. As the winch reel 1055 is rotated in a first direction, the multiple wires 1060 are wound up on the take-up of the winch reel 1055, and the carrier backrest 1020 is moved towards the first shoulder harness 1005, the second shoulder harness 1010, the chest harness 1050, and the waist harness 1015. Thus, the rotation of the winch reel 1055 in the first direction tightens the carrier backrest 1020 to the first shoulder harness 1005, the second shoulder harness 1010, the chest harness 1050, and the waist harness 1015 at the same time. As the winch reel 1055 is rotated in a second direction or popped out to release the take-up, the carrier backrest 1020 moves in the opposite direction away from the first shoulder harness 1005, the second shoulder harness 1010, the chest harness 1050, and the waist harness 1015 at the same time.

Figure 11B:
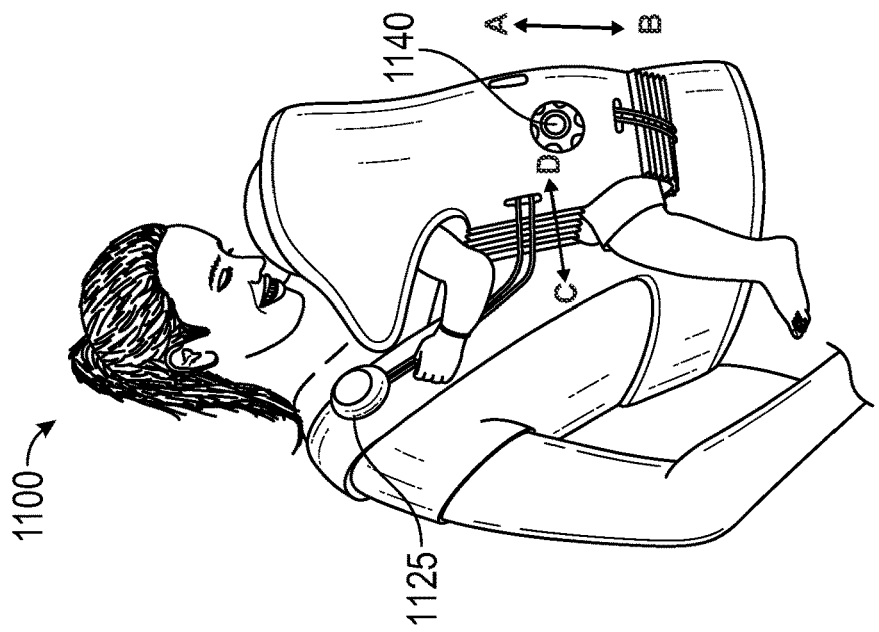
FIGS. 11A and 11B are perspective views of a baby carrier with a winch reel system for adjusting the vertical position of the backrest in accordance with one example embodiment of the disclosure.
Figure 11A:
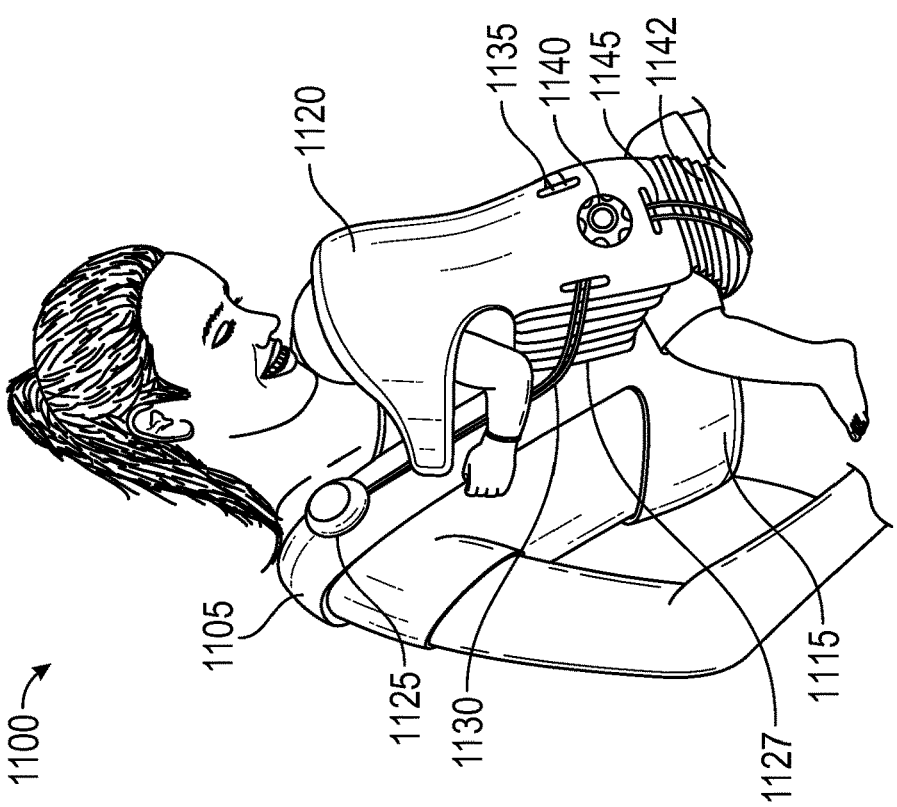

FIGS. 11A and 11B are perspective views of a baby carrier with a winch reel system for adjusting the vertical position of the backrest in accordance with one example embodiment of the disclosure. Any one or more of the winch reel systems and features of FIGS. 1A-7 can be used as the winch reels described herein. In addition, the features described in FIGS. 11A and 11B may be provided separately or in addition to any of the features described in FIGS. 8-10. Referring now to FIGS. 11A and 11B, a baby carrier 1100 can include a first shoulder harness 1105, a second shoulder harness, which is not depicted in FIG. 11, a waist harness 1115, and a carrier backrest 1120. The first shoulder harness 1105 can be configured to go over a first shoulder of a caregiver and the second shoulder harness can be configured to go over a second shoulder of the caregiver.

In certain examples, the baby carrier 1100 can include a winch reel system for tightening the carrier backrest 1120 towards the first shoulder harness 1105, the second shoulder harness, and the waist harness 1115, and also for raising or lowering the carrier backrest 1120 with respect to the waist harness 1115. For example, a winch reel 1140 can be coupled to an outer facing side of the carrier backrest 1120. In some examples, additional winch reels may be disposed on the baby carrier 1000, such as an additional winch reel 1125 disposed on the first shoulder harness 1105. In addition, collapsible fabric material 1142 can extend from a bottom end of the carrier backrest 1120 to the waist harness 1115. Additional collapsible fabric material 1127 can extend from each lateral edge of the carrier backrest 1120 to the respective first shoulder harness 1105 and second shoulder harness. A first wire 1130 can extend from the winch reel 1140, through the collapsible fabric material 1127, and to the first shoulder harness 1105. A second wire 1135, which is not shown, can extend from the winch reel 1140, through the collapsible fabric material 1127 and to the second shoulder harness. A third wire 1145 can extend from the winch reel 1140, through the collapsible fabric material 1142, and to the waist harness 1115.

In one example, the winch reel 1140 is a multi-cord reel. As the winch reel 1140 is rotated in a first direction, the first wire 1130, the second wire 1135, and the third wire 1145 are wound up on the take-up of the winch reel 1140. As a result, the carrier backrest 1120 is moved in Direction C towards the first shoulder harness 1105 and the second shoulder harness 1110, and the carrier backrest 1120 is raised vertically upward in Direction A with respect to the waist harness 1115. Moving the carrier backrest 1120 in Directions A and C thus tightens the carrier backrest 1120 to the first shoulder harness 1105, the second shoulder harness, and the waist harness 1115 at the same time. This adjustment of the backrest 1120 upwards and towards the caregiver shifts the center of mass of the child within the baby carrier 1100, thereby reducing the amount of fatigue created in the caregiver. As the winch reel 1140 is rotated in a second direction or popped out to release the take-up, the carrier backrest 1120 is moved in Direction D away from the first shoulder harness 1105 and the second shoulder harness 1110, and the carrier backseat 1120 is lowered vertically downward in Direction B with respect to the waist harness 1115 at the same time. Moving the carrier backrest 1120 in Directions B and D thus loosens the carrier backseat 1120 to the first shoulder harness 1105, the second shoulder harness, and the waist harness 1125 at the same time.

Figure 12B:
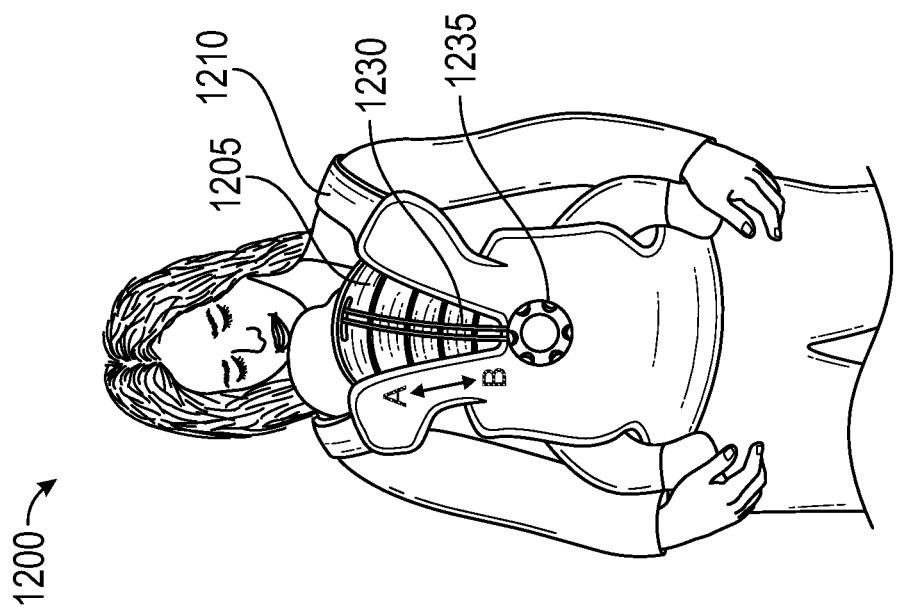
FIGS. 12A and 12B are front elevation views of a baby carrier with a winch reel system for adjusting the vertical position of a blind in accordance with one example embodiment of the disclosure.
Figure 12A:
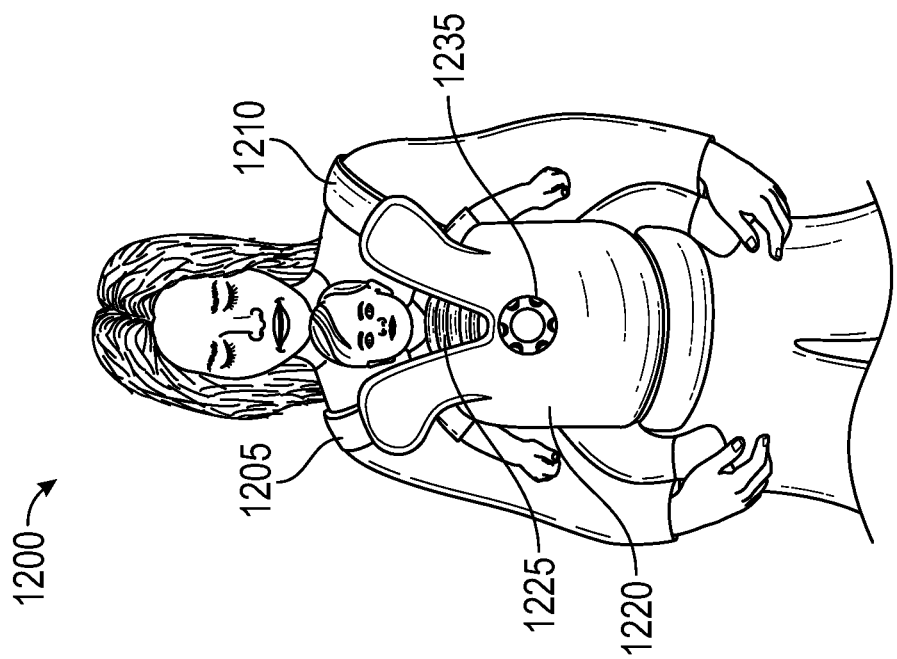

FIGS. 12A and 12B are front elevation views of a baby carrier with a winch reel system for adjusting the vertical position of a blind in accordance with one example embodiment of the disclosure. Any one or more of the winch reel systems and features of FIGS. 1A-7 can be used as the winch reels described herein. In addition, the features described in FIGS. 12A and 12B may be provided separately or in addition to any of the features described in FIGS. 8-11. Now referring to FIGS. 12A and 12B, the baby carrier 1200 can include a first shoulder harness 1205, a second shoulder harness 1210, a waist harness, and a carrier backrest 1220. The first shoulder harness 1205 can be configured to go over a first shoulder of a caregiver and the second shoulder harness 1210 can be configured to go over a second shoulder of the caregiver. In certain examples, the carrier backrest 1220 can include a window area along a top edge of the carrier backrest 1220 and an adjustable blind 1225, coupled to a winch reel system for raising and lowering the adjustable blind 1225. For example, a winch reel 1235 can be coupled to an outer facing side of the carrier backrest 1220.

A wire 1230 can have a first end coupled to the winch reel 1235 and a distal second end coupled to a top end of the adjustable blind 1225.

In one example, the winch reel 1235 is a two-way reel. As the winch reel 1235 is rotated in a first direction, the wire 1230 is wound up on the take-up of the winch reel 1235, and the adjustable blind 1225 is moved downward in Direction B with respect to the carrier backrest 1220, thereby opening the window area for a child to see through when the child is placed into the baby carrier 1200 in a forward-facing position. As the winch reel 1235 is rotated in a second direction, the wire 1230 is unwound from the take-up of the winch reel 1235, and the adjustable blind 1225 is moved vertically upward in Direction A with respect to the carrier backrest 1220, thereby closing the window area and providing a headrest when the child is placed into the baby carrier 1200 in a rearward-facing position. In some embodiments, the adjustable blind 1225 can be made of a flexible or cushioned material.

Figure 13B:
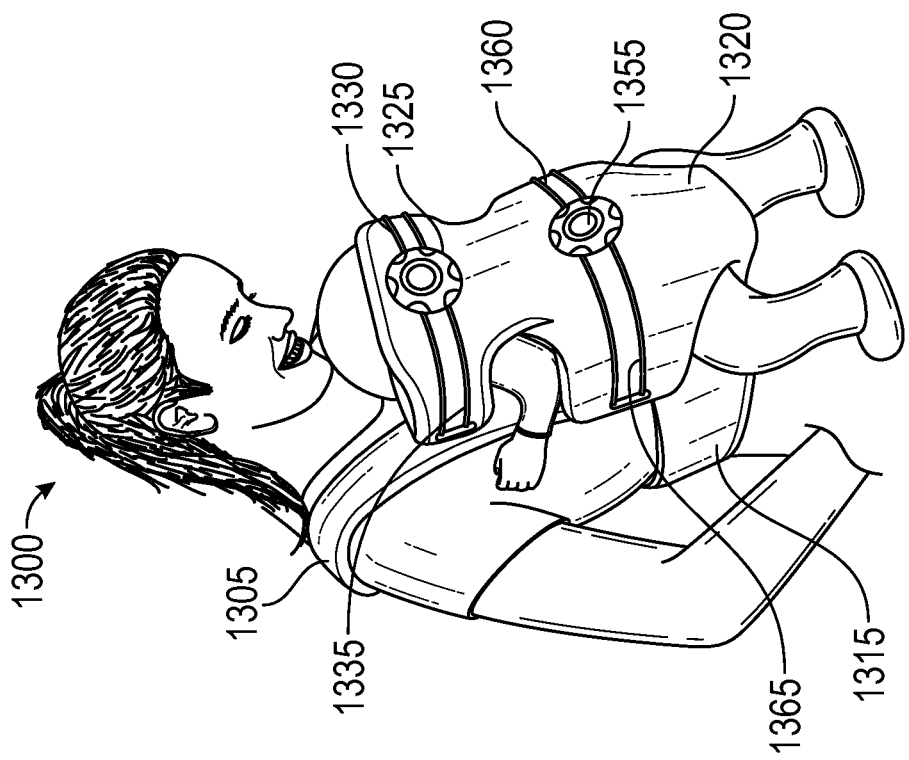
FIGS. 13A and 13B are respectively a perspective view and a top plan views of a baby carrier with a winch reel system for adjusting the curvature of the cushioning for the backrest in accordance with one example embodiment of the disclosure.
Figure 13A:
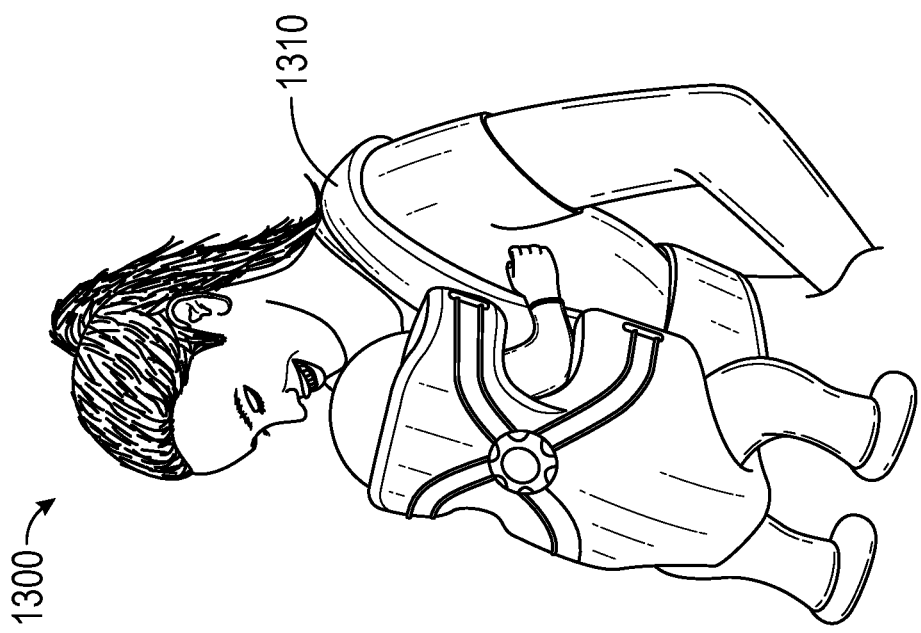
Figure 13C:
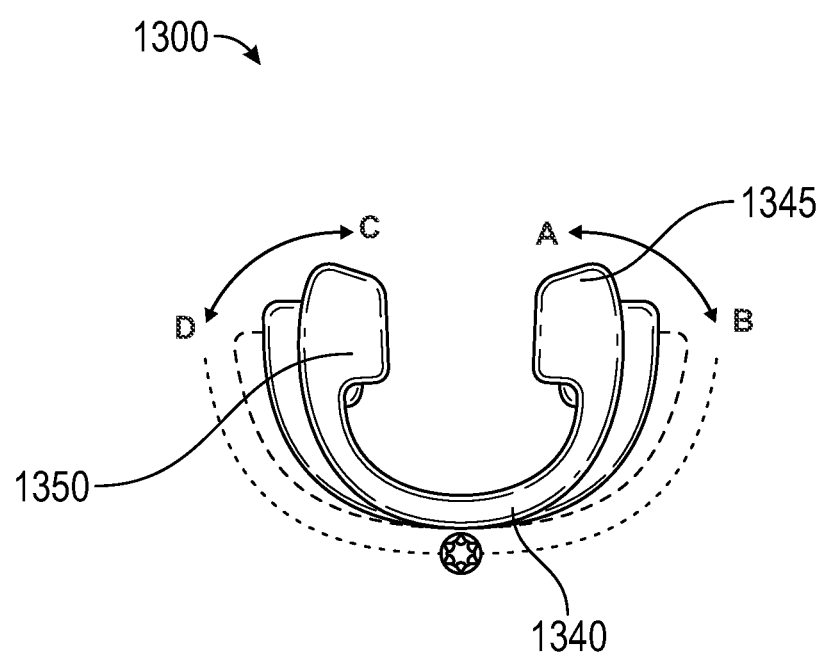
FIG. 13C is a top view of an adjustable cushion in a baby carrier with a winch reel system for adjusting the position of cushions for the backseat in accordance with one example embodiment of the disclosure.

FIGS. 13A-13C are perspective and top plan views of a baby carrier with a winch reel system for adjusting the curvature of the cushioning for the backrest in accordance with one example embodiment of the disclosure. Any one or more of the winch reel systems and features of FIGS. 1A-7 can be used as the winch reels described herein. In addition, the features described in FIGS. 13A-13C may be provided separately or in addition to any of the features described in FIGS. 8-12. Now referring to FIGS. 13A-13C, the baby carrier 1300 can include a first shoulder harness 1305, a second shoulder harness 1310, a waist harness 1315, and a carrier backrest 1320. The first shoulder harness 1305 can be configured to go over a first shoulder of a caregiver and the second shoulder harness 1310 can be configured to go over a second shoulder of the caregiver. In certain examples, the carrier backrest 1320 can include at least one adjustable cushion 1340 coupled to a winch reel system for increasing and reducing the spacing between the edges of each of the adjustable cushions. In some embodiments, the carrier backrest 1320 can include a top adjustable cushion and a bottom adjustable cushion. In other embodiments, the carrier backrest 1320 can include only one adjustable cushion.

As depicted in FIG. 13C, each adjustable cushion can include a first end 1345 positioned adjacent to a first lateral side of the carrier backrest 1320 and a second end 1350 positioned adjacent to a second lateral side of the carrier backrest 1320. A first winch reel 1325 can be coupled to an outer facing side of the carrier backrest 1320. A first wire 1330 can have a first end coupled to the first winch reel 1325 and a distal second end coupled to the first end 1345 of the top adjustable cushion. A second wire 1335 can have a first end coupled to the first winch reel 1325 and a distal second end coupled to the second end 1350 of the top adjustable cushion. A second winch reel 1355 can be coupled to the outer facing side of the carrier backrest 1320 at a vertical position below the first winch reel 1325. A third wire 1360 can have a first end coupled to the second winch reel 1355 and a distal second end coupled to the first end 1345 of the bottom adjustable cushion. A fourth wire 1365 can have a first end coupled to the second winch reel 1355 and a distal second end coupled to the second end 1350 of the bottom adjustable cushion.

As the first winch reel 1325 is rotated in a first direction, the first wire 1330 and the second wire 1335 are wound up on the take-up of the first winch reel 1325, thus moving the first end 1345 of the top adjustable cushion in Direction A and the second end 1350 of the top adjustable cushion in Direction C. As a result, the first end 1345 of the top adjustable cushion and the second end 1350 of the bottom adjustable cushion are moved towards each other. As the first winch reel 1325 is rotated in a second direction, the first wire 1330 and the second wire 1335 are unwound from the take-up of the first winch reel 1325, thus moving the first end 1345 of the top adjustable cushion in Direction B and the second end 1350 of the top adjustable cushion in Direction D. As a result, the first end 1345 of the top adjustable cushion and the second end 1350 of the bottom adjustable cushion are moved away from each other.

As the second winch reel 1355 is rotated in a first direction, the third wire 1360 and the fourth wire 1365 are wound up on the take-up of the second winch reel 1355, thus moving the first end 1345 of the bottom adjustable cushion in Direction A and the second end 1350 of the bottom cushion in Direction C. As a result, the first end 1345 of the bottom adjustable cushion and the second end 1350 of the bottom adjustable cushion are moved towards each other. As the second winch reel 1355 is rotated in a second direction, the third wire 1360 and the fourth wire 1365 are unwound from the take-up of the second winch reel 1355, thus moving the first end 1345 of the bottom adjustable cushion in Direction B and the second end 1350 of the bottom adjustable cushion in Direction D. As a result, the first end 1345 of the top adjustable cushion and the second end 1350 of the bottom adjustable cushion are moved away from each other.

Providing both the first winch reel 1325 and the second winch reel 1355 allows for more refined adjustment to the cushioning of the head and body areas of the child within the baby carrier 1300, thus creating a better fit for the child. However, as shown in FIG. 13A, a single winch reel can replace the two winch reels with all wires being coupled to the single winch reel, thus allowing adjustment of the top adjustable cushion and the bottom adjustable cushion at the same time through the use of a single reel winch.

Figure 14B:
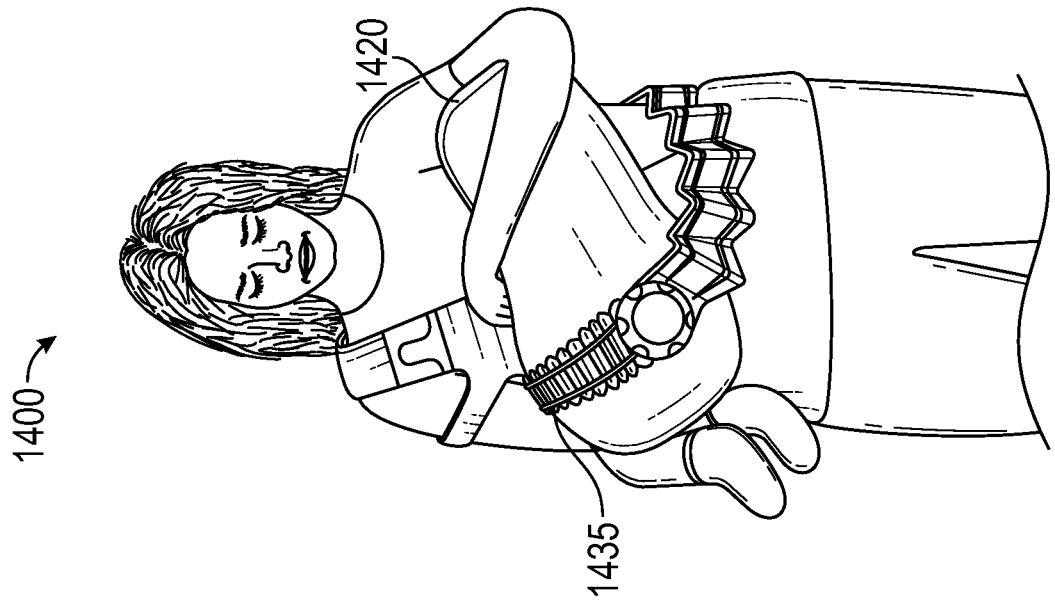
FIGS. 14A and 14B are front elevation views of a baby carrier with a winch reel system for adjusting the rotational position of the backrest in accordance with one example embodiment of the disclosure.
Figure 14A:
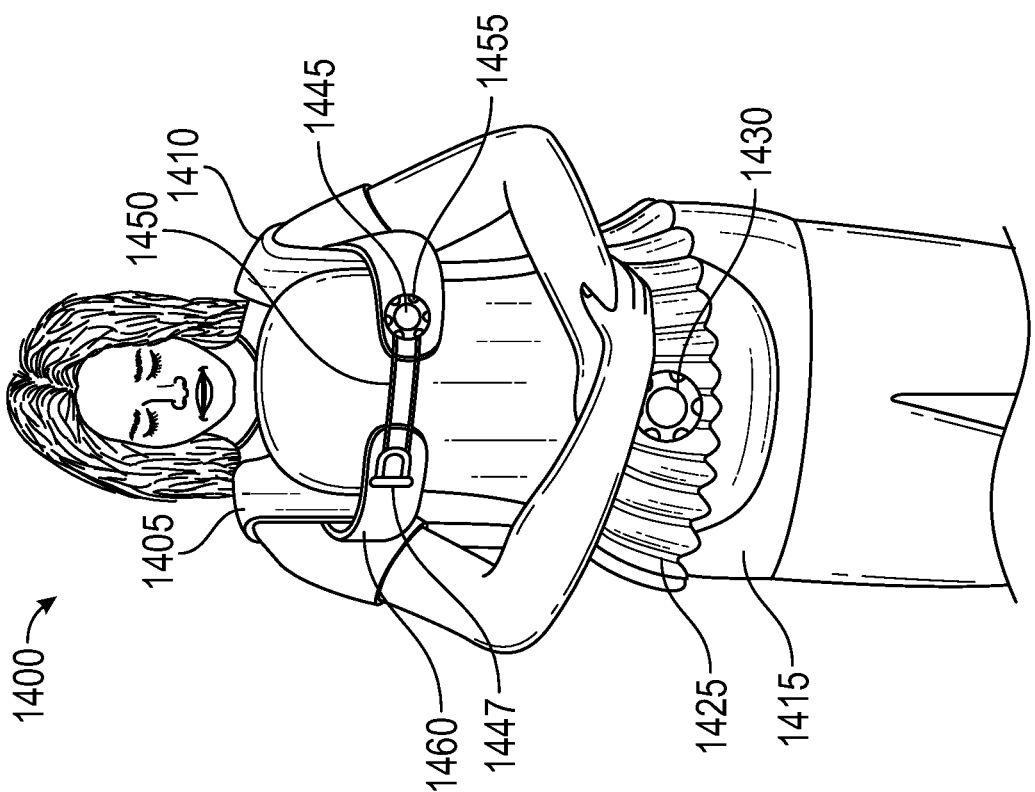

FIGS. 14A and 14B are front elevation views of a baby carrier with a winch reel system for adjusting the rotational position of the backrest in accordance with one example embodiment of the disclosure. Any one or more of the winch reel systems and features of FIGS. 1A-7 can be used as the winch reels described herein. In addition, the features described in FIGS. 14A and 14B may be provided separately or in addition to any of the features described in FIGS. 8-13. Now referring to FIGS. 14A and 14B, the baby carrier 1400 can include a first shoulder harness 1405, a second shoulder harness 1410, a waist harness 1415, and a carrier backrest 1420. The first shoulder harness 1405 can be configured to go over a first shoulder of a caregiver and the second shoulder harness 1410 can be configured to go over a second shoulder of the caregiver. The baby carrier 1400 can also include a first upper support arm 1455 disposed along the second shoulder harness 1410 and a second upper support arm 1460 disposed along the first shoulder harness 1405.

In one example, the first upper support arm 1455 and the second upper support arm 1460 can be removably coupled to and decoupled from one another. For example, the first upper support arm 1455 can include a first winch reel 1445 and the second upper support arm 1460 can include a hook or other retaining member 1447. A first wire 1450 can have a first end coupled to the first winch reel 1445 and a distal second end. The distal second end of the first wire 1450 can be removably coupled to and decoupled from the hook or other retaining member 1447. As the first winch reel 1445 is rotated in a first direction, the first wire 1450 is wound up on the take-up of the first winch reel 1445, thus reducing the distance between the ends of the first upper support arm 1455 and the second upper support arm 1460. As the first winch reel 1445 is rotated in a second direction, the first wire 1450 is unwound from the take-up of the first winch reel 1445. Rotation of the first winch reel 1445 in the second direction thus creates slack in the first wire 1450 and increases the distance between the ends of the first upper support arm 1455 and the second upper support arm 1460. The first wire 1450 can then be removed or otherwise decoupled from the hook or other retaining member 1447.

The baby carrier 1400 can also include a feeding strap 1425 that extends around the outer facing side of the carrier backrest 1420 from one portion of the waist harness 1415 to another portion of the waist harness 1415. In one example embodiment, the feeding strap 1425 can be made of a collapsible material, such as a collapsible fabric material. The baby carrier 1400 can also include a second winch reel 1430. One or more second wires 1435 can extend through the feeding strap 1425 from one portion of the waist harness 1415 to another portion of the waist harness 1415. When a child is not being breastfed while in the baby carrier 1400, the second winch reel 1430 is rotated in a first direction, and the second wire 1435 is wound up on the take-up of the second winch reel 1430, thus tightening the feeding strap 1425 to pull the bottom of the carrier backrest 1420 tighter to the caregiver. As the second winch reel 1430 is rotated in a second direction, the second wire 1435 is unwound from the take-up of the second winch reel 1430, thus creating slack in the carrier backrest 1420 and loosening the carrier backrest 1420 from the body of the caregiver. When the feeding strap 1425 is loosened and when the first upper support arm 1455 is decoupled from the second upper support arm 1460, the carrier backrest 1420 can be rotated with respect to the first shoulder harness 1405 and the second shoulder harness 1410 to breastfeed the child.

Figure 15B:
FIGS. 15A and 15B are perspective views of a baby carrier with a winch reel system for adjusting the rotational position of a shade for the backrest in accordance with one example embodiment of the disclosure.
Figure 15A:
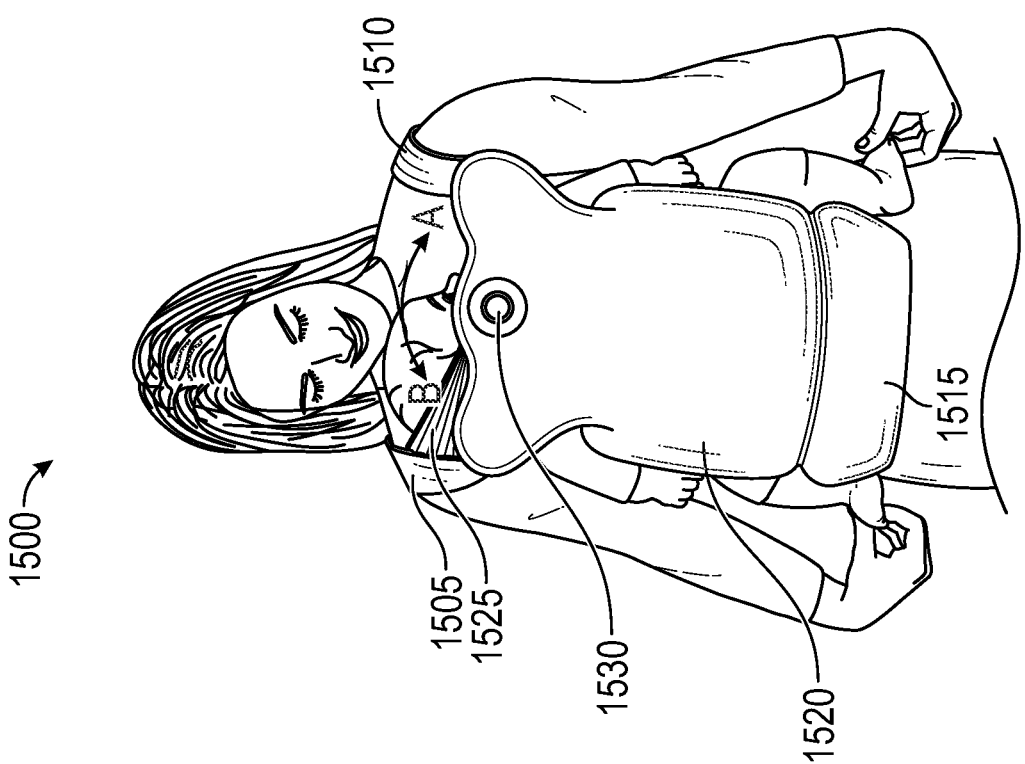

FIGS. 15A and 15B are perspective views of a baby carrier with a winch reel system for adjusting the rotational position of a shade for the backrest in accordance with one example embodiment of the disclosure. Any one or more of the winch reel systems and features of FIGS. 1A-7 can be used as the winch reels described herein. In addition, the features described in FIGS. 15A and 15B may be provided separately or in addition to any of the features described in FIGS. 8-14B. Now referring to FIGS. 15A and 15B, the baby carrier 1500 can include a first shoulder harness 1505, a second shoulder harness 1510, a waist harness 1515, and a carrier backrest 1520. The first shoulder harness 1505 can be configured to go over a first shoulder of a caregiver and the second shoulder harness 1510 can be configured to go over a second shoulder of the caregiver.

In certain examples, the carrier backrest 1520 can include a shade panel 1525 coupled along the top edge of the carrier backrest 1520, where the shade panel 1525 can be adjustable from an open configuration to a closed configuration. For example, a winch reel 1530 can be coupled to the outer facing side of the carrier backrest 1520. A wire or member can have a first end coupled to the winch reel 1530 and a distal second end coupled to a first end of the shade panel 1525. In one example, the winch reel 1530 is a two-way reel. As the winch reel 1530 is rotated in a first direction, the wire is wound up on the take-up of the winch reel 1530, and the shade panel 1525 is extended in Direction A across the top end of the carrier backrest 1520, thus adjusting the shade panel 1525 from a closed configuration to an open configuration and providing shade protection for a child within the baby carrier 1500. As the winch reel 1530 is rotated in a second direction, the wire is unwound from the take-up of the winch reel 1530, and the shade panel 1525 is collapsed in Direction B across the top end of the carrier backrest 1520, thereby closing the shade panel 1525. The shade panel 1525 can be made of a flexible or cushioned material. In one example, the opening and closing of the shade panel 1525 is accomplished by rotation of a portion of the shade panel 1525, which is directly coupled to the winch reel 1530 by a member, rather than through the use of a wire and the winch reel 1530.

Figure 16:
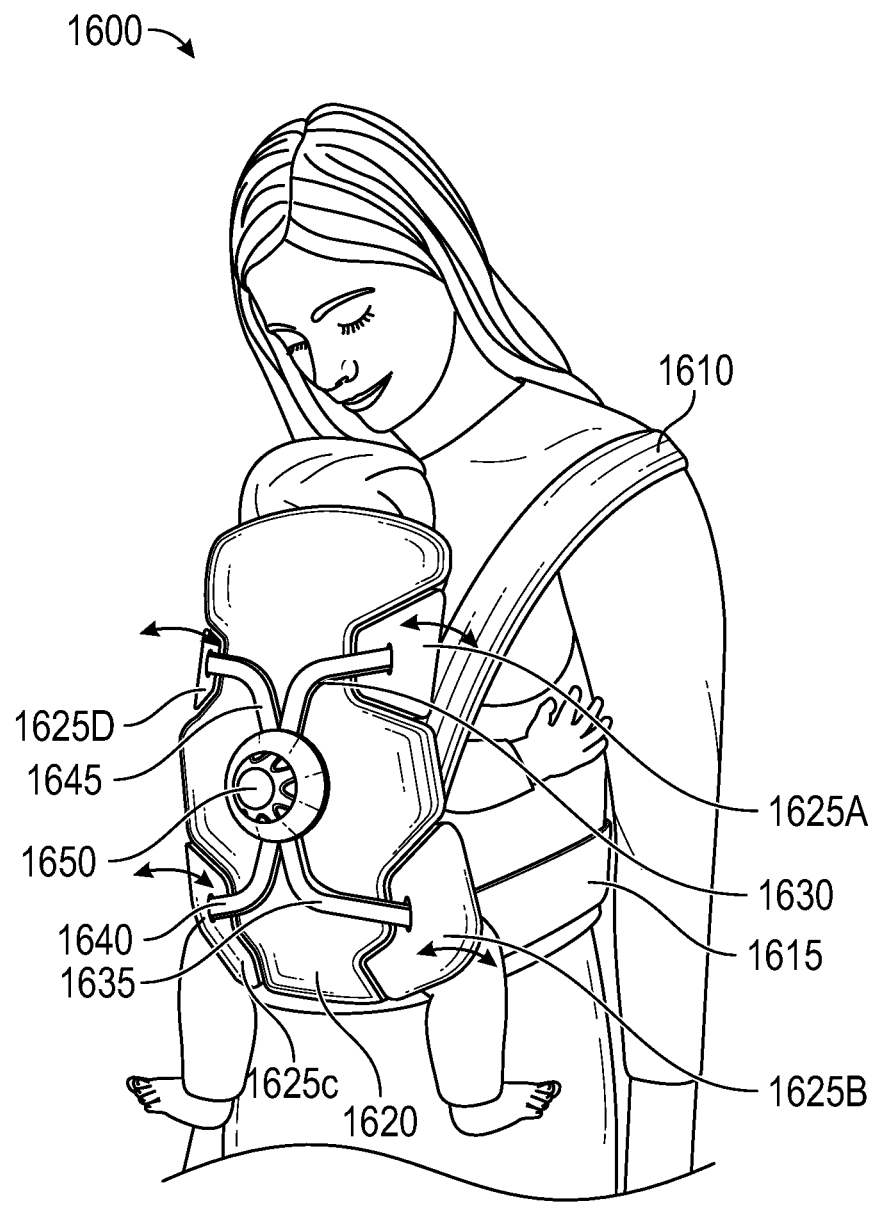
FIG. 16 is a perspective view of a baby carrier with a winch reel system for adjusting the position of side cushions for the backrest in accordance with one example embodiment of the disclosure.

FIG. 16 is a perspective view of a baby carrier with a winch reel system for adjusting the position of side cushions for the backrest in accordance with one example embodiment of the disclosure. Any one or more of the winch reel systems and features of FIGS. 1A-7 can be used as the winch reels described herein. In addition, the features described in FIG. 16 may be provided separately or in addition to any of the features described in FIGS. 8-15B. Now referring to FIG. 16, the baby carrier 1600 can include a first shoulder harness, which is not shown, a second shoulder harness 1610, a waist harness 1615, and a carrier backrest 1620. The first shoulder harness can be configured to go over a first shoulder of a caregiver and the second shoulder harness 1610 can be configured to go over a second shoulder of the caregiver. In certain examples, the carrier backrest 1620 can include a first top adjustable cushion 1625A, a second top adjustable cushion 1625D, a first bottom adjustable cushion 1625B, and a second bottom adjustable cushion 1625C, all of which are coupled to a winch reel system for increasing and reducing the amount that each of the top and bottom adjustable cushions 1625A, 1625B, 1625C, and 1625D extend out from the carrier backrest 1620. The first top adjustable cushion 1625A and the first bottom adjustable cushion 1625B can be positioned adjacent a first lateral side of the carrier backrest 1620, and the second top adjustable cushion 1625C and the second bottom adjustable cushion 1625D can be positioned adjacent a second lateral side of the carrier backrest 1620.

A winch reel 1650 can be coupled to the outer facing side of the carrier backrest 1620. A first wire 1630 can have a first end coupled to the winch reel 1650 and a distal second end coupled to the first top adjustable cushion 1625A. A second wire 1645 can have a first end coupled to the winch reel 1650 and a distal second end coupled to the second top adjustable cushion 1625D. A third wire 1635 can have a first end coupled to the winch reel 1650 and a distal second end coupled to the first bottom adjustable cushion 1625B. A fourth wire 1640 can have a first end coupled to the winch reel 1650 and a distal second end coupled to the second bottom adjustable cushion 1625C. In certain examples, instead of two separate top cushions and two separate bottom cushions, there is only a single top cushion and a single bottom cushion. However, in this embodiment, the adjustable cushions would still operate in substantially the same manner.

As the winch reel 1650 is rotated in a first direction, the first wire 1630, the second wire 1645, the third wire 1635, and the fourth wire 1640 are wound up on the take-up of the winch reel 1650. As a result, the first top adjustable cushion 1625A and the second top adjustable cushion 1625D move towards one another, and the first bottom adjustable cushion 1625B and the second bottom adjustable cushion 1625C move towards one another, thereby reducing the amount of contact that the child has with any of the top and bottom adjustable cushions 1625A-D. As the winch reel 1650 is rotated in a second direction, the first wire 1630, the second wire 1645, the third wire 1635, and the fourth wire 1640 are unwound from the take-up of the winch reel 1650. As a result, the first top adjustable cushion 1625A and the second top adjustable cushion 1625D move away from one another, and the first bottom adjustable cushion 1625B and the second bottom adjustable cushion 1625C move away from one another, thereby extending each of the top and bottom adjustable cushions 1625A-D further out laterally along the side edges of the carrier backrest 1620 and increasing the amount of contact that the child within the baby carrier 1600 has with any of the top and bottom adjustable cushions 1625A-D.

Figure 17B:
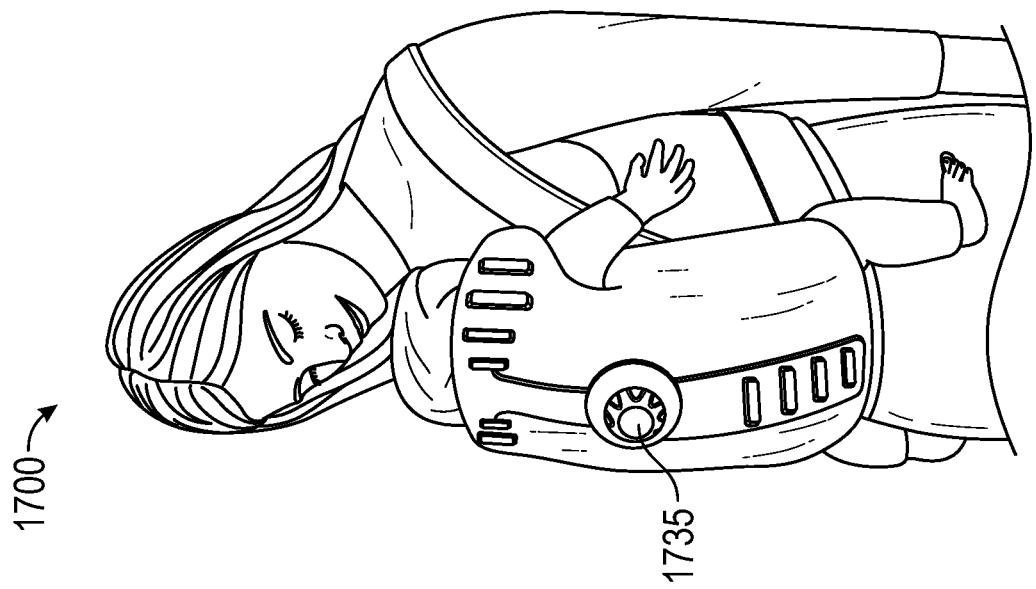
FIGS. 17A and 17B are respectively a front elevation view and a perspective view of a baby carrier with a winch reel system for adjusting the opening and closing of air vents in the backrest in accordance with one example embodiment of the disclosure.
Figure 17A:
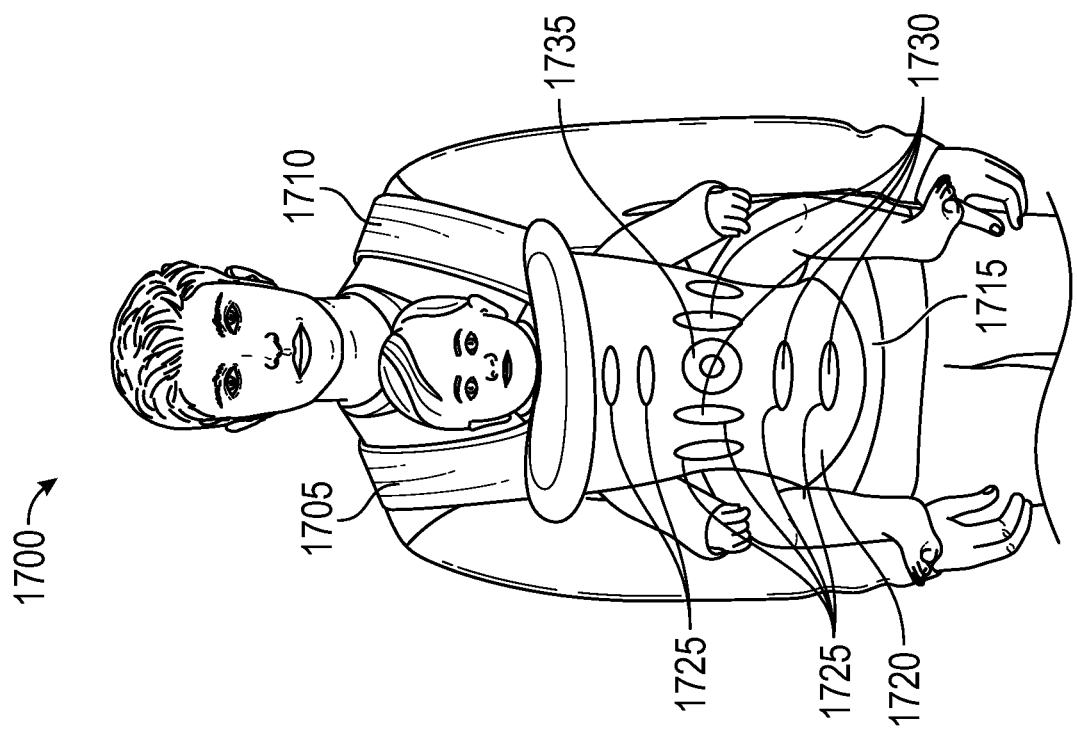

FIGS. 17A and 17B are front elevation and perspective views of a baby carrier with a winch reel system for adjusting the opening and closing of air vents in the backrest in accordance with one example embodiment of the disclosure. Any one or more of the winch reel systems and features of FIGS. 1A-7 can be used as the winch reels described herein. In addition, the features described in FIGS. 17A and 17B may be provided separately or in addition to any of the features described in FIGS. 8-16. Now referring to FIGS. 17A and 17B, the baby carrier 1700 can include a first shoulder harness 1705, a second shoulder harness 1710, a waist harness 1715, and a carrier backrest 1720. The first shoulder harness 1705 can be configured to go over a first shoulder of a caregiver and the second shoulder harness 1710 can be configured to go over a second shoulder of the caregiver. In certain examples, the carrier backrest 1720 can include one or more apertures 1725 that extend from an outward facing side to an inward facing side of the carrier backrest 1720. Each of the apertures 1725 can act as a ventilation port, thus allowing air to pass through the carrier backrest 1720. Each of the apertures 1725 can include an adjustable vent cover 1730 positioned between the outward and inward facing sides of the carrier backrest 1720. Each adjustable vent cover 1730 can be sized and shaped to cover its respective aperture 1725.

A winch reel 1735 can be coupled to the outer facing side of the carrier backrest 1720. One or more wires can each have a first end coupled to the winch reel 1735 and can each have a distal second end coupled to a member, which is further coupled to a portion of the adjustable vent covers 1730, or to each respective adjustable vent cover 1730. In one example, the winch reel 1735 is a two-way reel. As the winch reel 1735 is rotated in a first direction, the wires are wound up on the take-up of the winch reel 1735, thus moving the adjustable vent covers 1730 are moved with respect to their respective apertures 1725 from a closed configuration to an open configuration. In the open configuration, air can pass through each aperture 1725. As the winch reel 1735 is rotated in a second direction, the wires are unwound from the take-up of the winch reel 1735, thus moving each adjustable vent cover 1730 with respect to their respective apertures 1725 from an open configuration to a closed configuration. In the closed configuration, the respective apertures 1725 are closed, thus preventing air from passing through each aperture 1725.

FIGS. 18A and 18B are perspective views of a baby carrier with a winch reel system for adjusting the vertical position of leg padding for the backrest in accordance with one example embodiment of the disclosure. Any one or more of the winch reel systems and features of FIGS. 1A-7 can be used as the winch reels described herein. In addition, the features described in FIGS. 18A and 18B may be provided separately or in addition to any of the features described in FIGS. 8-17B. Now referring to FIGS. 18A and 18B, the baby carrier 1800 can include a first shoulder harness 1805, a second shoulder harness 1810, a waist harness 1815, and a carrier backrest 1820. The first shoulder harness 1805 can be configured to go over a first shoulder of a caregiver and the second shoulder harness 1810 can be configured to go over a second shoulder of the caregiver. In certain examples, the carrier backrest 1820 can include a first adjustable leg pad 1825 and a second adjustable leg pad 1830.

A winch reel 1845 can be coupled to the outer facing side of the carrier backrest 1820. A first wire 1835 can have a first end coupled to the winch reel 1845 and a distal second end coupled to the first adjustable leg pad 1825. A second wire 1840 can have a first end coupled to the winch reel 1845 and a distal second end coupled to the second adjustable leg pad 1830. In one example, the winch reel 1845 is a two-way reel. As the winch reel 1845 is rotated in a first direction, the first wire 1835 and the second wire 1840 are wound up on the take-up of the winch reel 1845, thus raising the first adjustable leg pad 1825 and the second adjustable leg pad 1830 to a substantially horizontal position as shown in FIG. 18B. As the winch reel 1845 is rotated in a second direction, the first wire 1835 and the second wire 1840 are unwound from the take-up of the winch reel 1845, thus lowering the first adjustable leg pad 1825 and the second adjustable leg pad 1830 to a substantially vertical position, as shown in FIG. 18A, due to reduction in tension in the first wire 1835 and the second wire 1840.

Figure 19A:
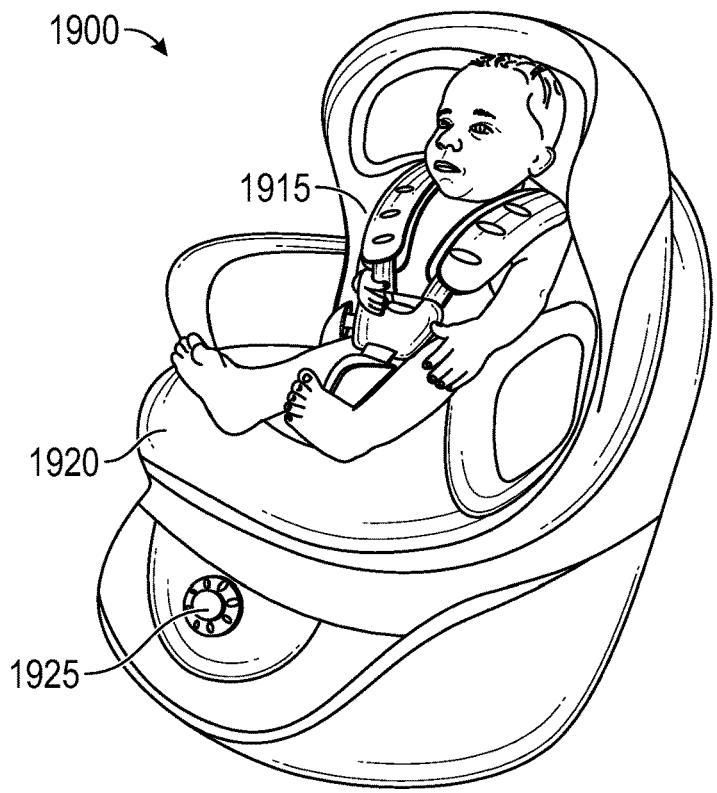
FIGS. 19A and 19B are perspective views of a children's car seat with a winch reel system for adjusting tension in the harness system in accordance with one example embodiment of the disclosure.
Figure 19B:
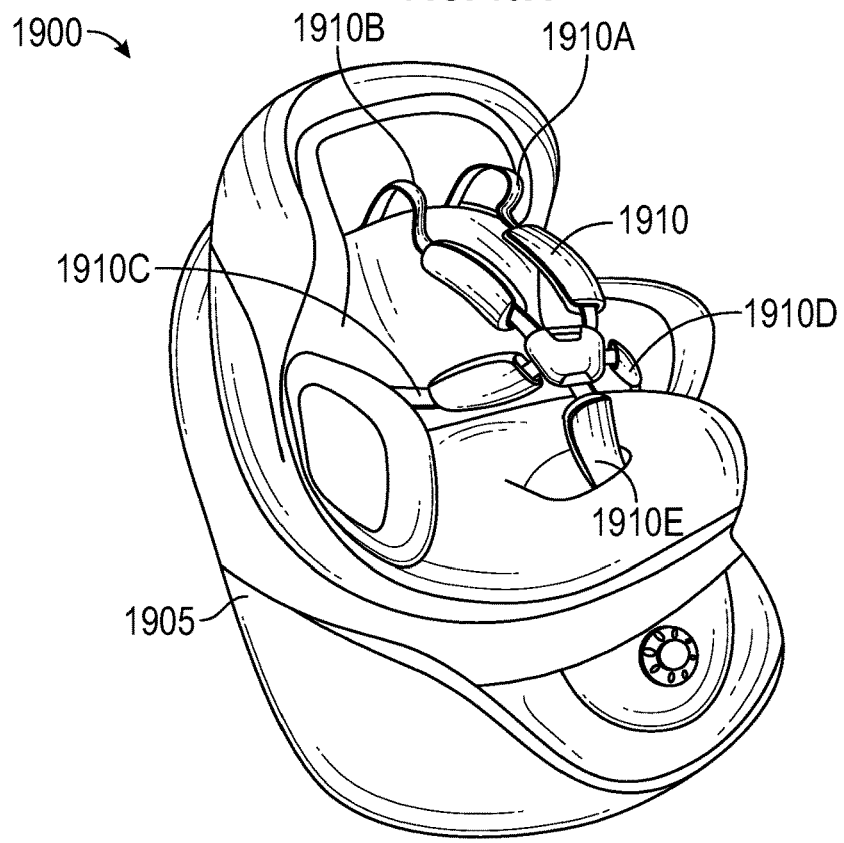

FIGS. 19A and 19B are perspective views of a children's car seat with a winch reel system for adjusting tension in the harness system in accordance with one example embodiment of the disclosure. A car seat 1900 can be configured to be placed onto an automobile seat. Any one or more of the winch reel systems and features of FIGS. 1A-7 can be used as the winch reels described herein. The car seat 1900 can include a seat shell 1905 having a seat bottom 1920 and a seat back 1915. The car seat 1900 can also include soft goods that cover all or a portion of the seat bottom 1920 and the seat back 1915. The car seat 1900 can also include one or more harness straps 1910A-1910E. While five harness straps 1910A-1910E are shown in FIGS. 19A and 19B, greater or fewer harness straps may be alternatively used.

The car seat 1900 can also include a winch reel 1925 positioned along a front side of the seat bottom 1920. In other embodiments, the winch reel 1925 can be positioned anywhere else along the car seat 1900. The winch reel 1925 can be directly or indirectly coupled to each of the harness straps 1910A-1910E. For example, although not depicted in FIGS. 19A and 19B, multiple wires may be provided, each wire having a first end coupled to the winch reel 1925 and a distal second end directly or indirectly coupled to one of the respective harness straps 1910A-1910E. In one example, the winch reel 1925 is a one-way winch reel. As the winch reel 1925 is rotated in a first direction, the multiple wires are wound up on the take-up of the winch reel 1925, thus tightening each harness strap 1910A-1910E at the same time. As the winch reel 1925 is rotated in a second direction or popped out to release the take-up, a user can pull on each of the harness straps 1910A-1910E to unwind each wire from the take-up, or each wire can be automatically unwound from the take-up of the winch reel 1925, in order to loosen the harness straps 1910A-1910E.

Figure 20A:
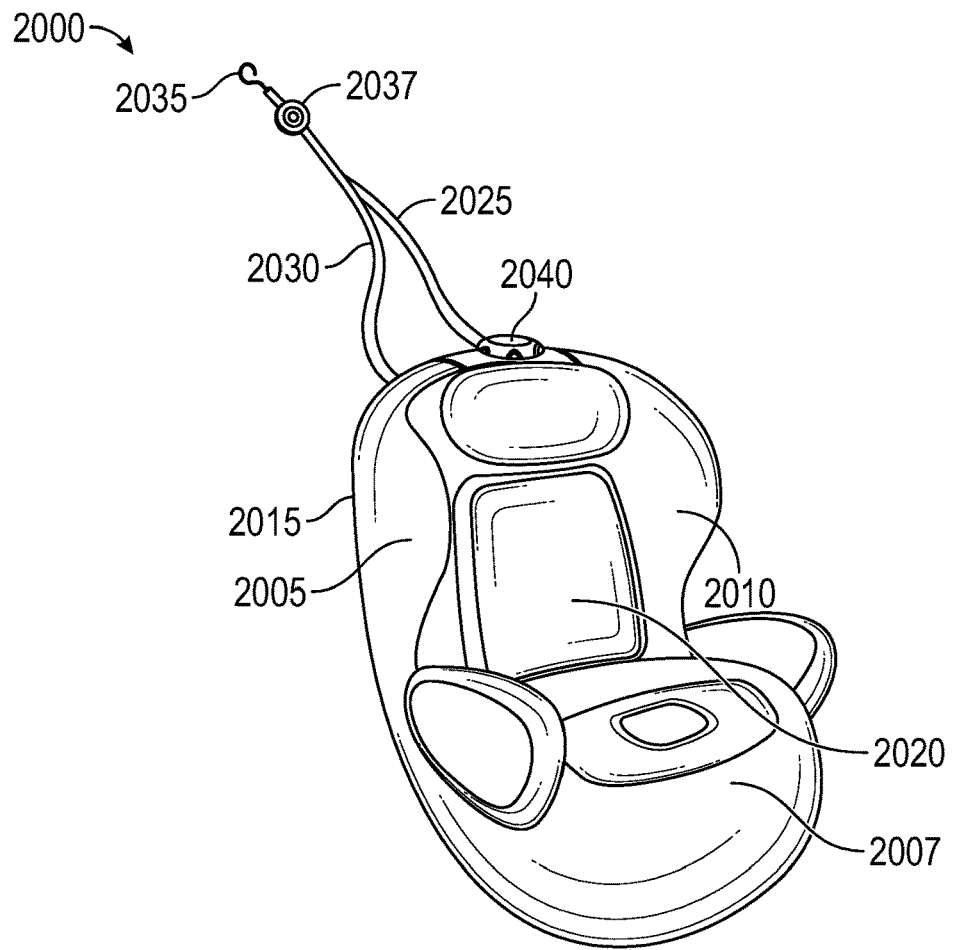
FIGS. 20A and 20B are respectively a perspective view and a rear elevation view of a children's car seat with a winch reel system for adjusting tension in the top tether connection to the automobile seat in accordance with one example embodiment of the disclosure.
Figure 20B:
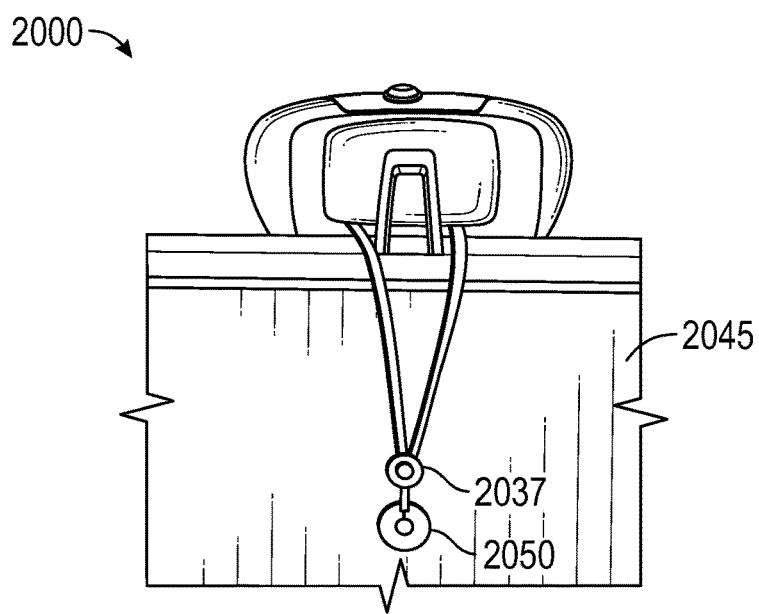

FIGS. 20A and 20B are perspective and rear elevation views of a children's car seat with a winch reel system for adjusting tension in the top tether connection to the automobile seat in accordance with one example embodiment of the disclosure. Any one or more of the winch reel systems and features of FIGS. 1A-7 can be used as the winch reels described herein. In addition, the features described in FIGS. 20A and 20B may be provided separately or in addition to any of the features described in FIGS. 19A-19B. A car seat 2000 can include a seat shell 2005 having a seat bottom 2007 and a seat back 2010. The car seat 2000 can also include soft goods that cover all or a portion of the seat bottom 2007 and the seat back 2010. The seat back 2010 can have a front side 2020 and an opposing rear side 2015. A first winch reel 2040 can be disposed along a top edge of the seat back 2010.

The car seat 2000 can also include a top tether restraint. The top tether restraint can include a first tether 2025 having a first end coupled directly or indirectly to the first winch reel 2040 and a distal second end. The top tether restraint can also include a second tether 2030 having a first end coupled directly or indirectly to the first winch reel 2040 and a distal second end coupled to the second end of the first tether 2025. The top tether restraint can also include a hook or other coupling device 2035 and a second winch reel 2037 disposed adjacent to the hook 2035. The distal second end of the first tether 2025 and the distal second end of the second tether 2030 may thus be coupled directly or indirectly to the second winch reel 2037.

The hook or other coupling device 2035 can be configured to be removably coupled to an anchor 2050 along a back side of an automobile seat 2045 upon which the car seat 2000 is positioned. Depending on the position of a caregiver, once the hook 2035 is coupled to the anchor 2050, either the first winch reel 2040 or the second winch reel 2037 may be used to create tension in the top tether restraint. For example. as the first winch reel 2040 is rotated in a first direction, either and/or both of the first tether 2025 or the second tether 2030 are wound up on the take-up of the winch reel 2040, thus tightening the first tether 2025 and the second tether 2030 at the same time. As the winch reel 2040 is rotated in a second direction or popped out to release the take-up, the caregiver can pull on the first tether 2025 and/or the second tether 2030 to unwind the take-up, or the first tether 2025 and/or the second tether 2030 can be automatically unwound from the take-up of the first winch reel 2040 to loosen the first tether 2025 and the second tether 2030. The second winch reel 2037 can be used in substantially the same manner to tighten and loosen the first tether 2025 and/or the second tether 2030.

Figure 21A:
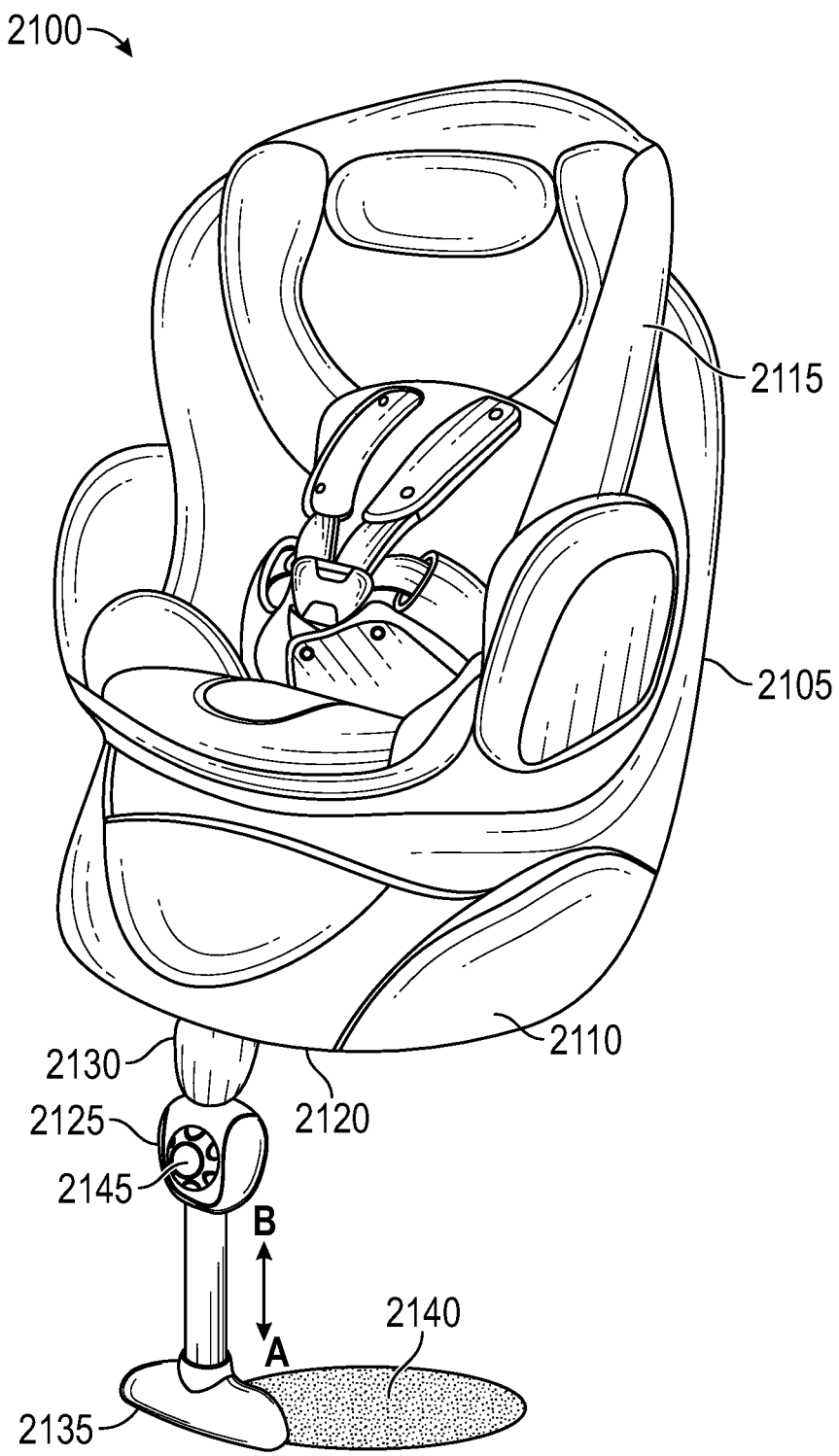
FIGS. 21A to 21C are various views of a children's car seat with a winch reel system for adjusting the length of a stabilizer leg in accordance with one example embodiment of the disclosure.
Figure 21B:
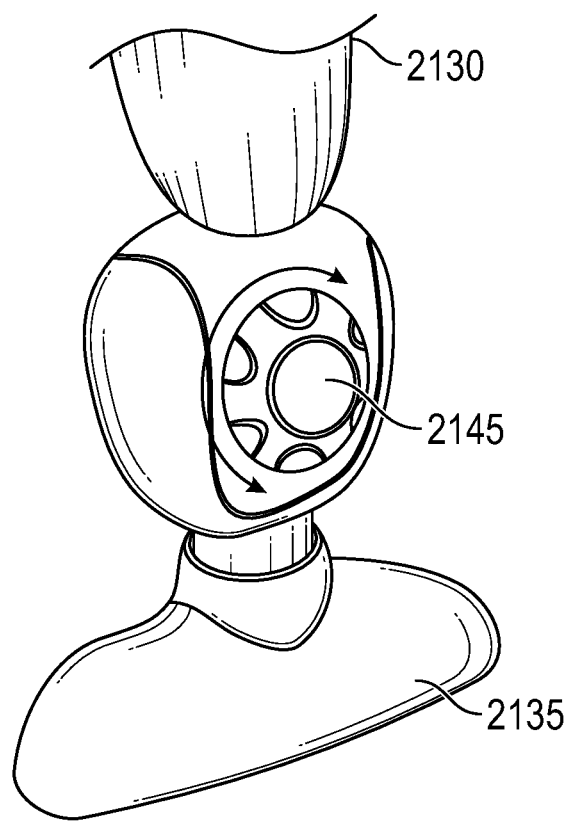
Figure 21C:
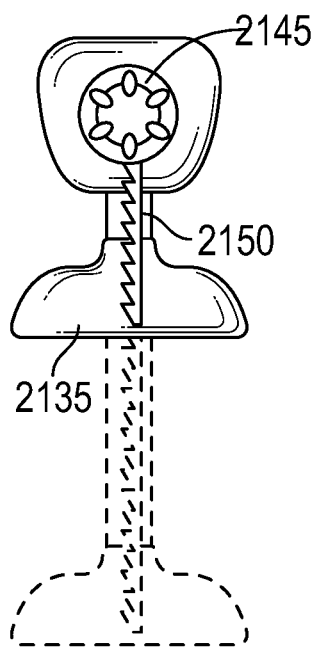

FIGS. 21A-21C are various views of a children's car seat with a winch reel system for adjusting the length of a stabilizer leg in accordance with one example embodiment of the disclosure. Any one or more of the winch reel systems and features of FIGS. 1A-7 can be used as the winch reels described herein. In addition, the features described in FIGS. 21A-21C may be provided separately or in addition to any of the features described in FIGS. 19A-20B. The car seat 2100 can include a seat shell 2105 having a seat bottom 2110 and a seat back 2115. The car seat 2100 can also include soft goods that cover all or a portion of the seat bottom 2110 and the seat back 2115.

An adjustable height leg 2125 can be coupled along a bottom edge 2120 of the car seat 2100. The adjustable height leg 2125 can include a top end 2130 that abuts the car seat 2100 and a distal bottom end 2135 configured to abut a floor surface 2140 of an automobile. The adjustable height leg 2125 can also include a ratcheting one-way winch reel 2145 and a toothed pawl 2150 that extends downward from the winch reel 2145 and engages with the winch reel 2145 in order to provide the functionality of extending the height of the adjustable height leg 2125. The toothed pawl 2150 may alternatively be a ratchet, a catch, a cog, a sprocket, pinions, fangs, tusks, a tine, a gear, or a cam (hereinafter collectively referred to as a toothed pawl). For example, as the winch reel 2145 is rotated in a first direction, the toothed pawl 2150 is moved by the winch reel 2145 in a first direction to extend the length, and thereby the height, of the adjustable height leg 2125 until the distal bottom end 2135 of the adjustable height leg 2125 contacts the floor surface 2140. Turning the winch reel 2145 in a second direction or popping out the winch reel 2145 further causes the toothed pawl 2150 to move in a second direction to reduce the length, and thereby the height, of the adjustable height leg 2125.

Figure 22A:
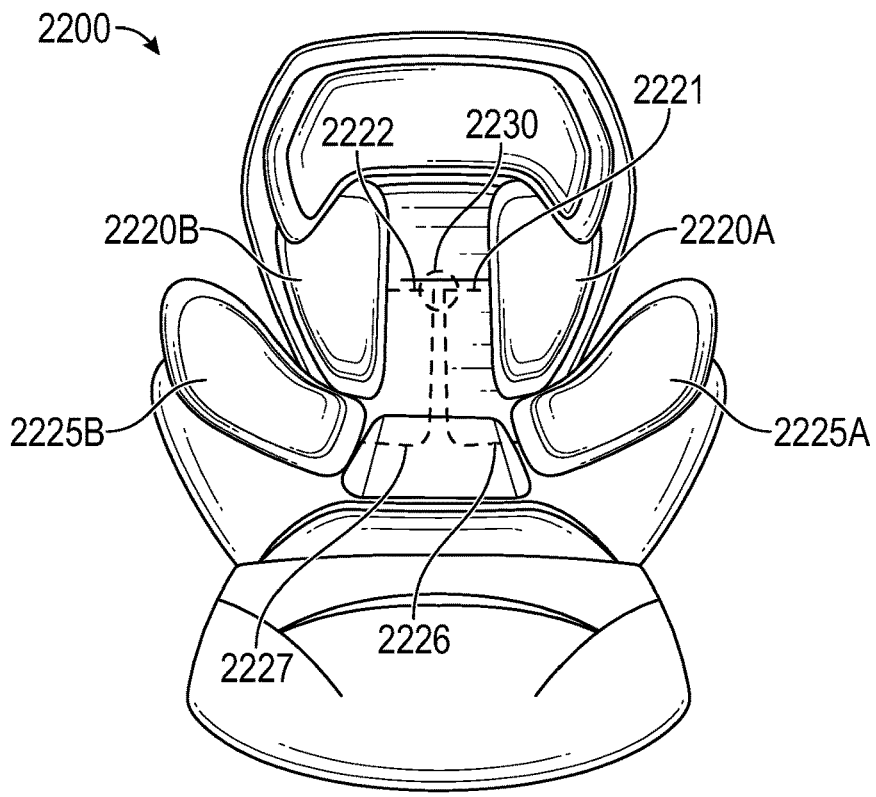
FIGS. 22A and 22B are front elevation views of a children's car seat with a winch reel system for adjusting the spacing of soft goods cushioning in the seat bottom and seat back of the car seat in accordance with one example embodiment of the disclosure.
Figure 22B:
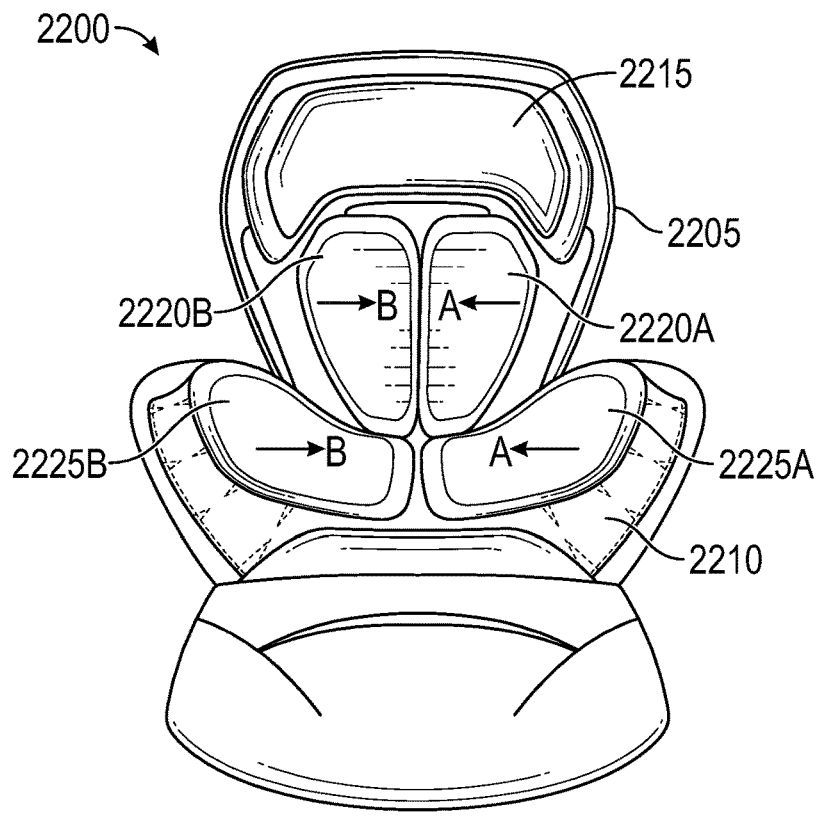

FIGS. 22A and 22B are front elevation views of a children's car seat with a winch reel system for adjusting the spacing of soft goods cushioning in the seat bottom and seat back of the car seat in accordance with one example embodiment of the disclosure. Any one or more of the winch reel systems and features of FIGS. 1A-7 can be used as the winch reels described herein. In addition, the features described in FIGS. 22A and 22B may be provided separately or in addition to any of the features described in FIGS. 19A-21C. The car seat 2200 can include a seat shell 2205 having a seat bottom 2210 and a seat back 2215. The car seat 2200 can also include soft goods that cover all or a portion of the seat bottom 2210 and the seat back 2215. The soft goods can include a first back cushion 2220A, a second back cushion 2220B, a first bottom cushion 2225A, and a second bottom cushion 2225B. Each of the first back cushion 2220A, the second back cushion 2220B, the first bottom cushion 2225A, and the second bottom cushion 2225B can be coupled to an elastic border that is spring-biased to pull each cushion toward the lateral edges of the seat shell 2205.

The car seat 2200 can also include a winch reel 2230. In one example, the winch reel is a one-way winch reel and is positioned along a back side of the seat back 2215. A first wire 2221 can have a first end coupled to the winch reel 2230 and a distal second end coupled to the first back cushion 2220A. A second wire 2222 can have a first end coupled to the winch reel 2230 and a distal second end coupled to the second back cushion 2220B. A third wire 2226 can have a first end coupled to the winch reel 2230 and a distal second end coupled to the first bottom cushion 2225A. A fourth wire 2227 can have a first end coupled to the winch reel 2230 and a distal second end coupled to the second bottom cushion 2225B. As the winch reel 2230 is rotated in a first direction, the first wire 2221, the second wire 2222, the third wire 2226, and the fourth wire 2227 are all wound up on the take-up of the winch reel 2230, thus causing the first top cushion 2220A and the first bottom cushion 2225A to move in Direction A, and the second top cushion 2220B and the second bottom cushion 2225B to move in Direction B. Such a movement causes the first top cushion 2220A and the second top cushion 2220B, and the first bottom cushion 2225A and the second bottom cushion 2225B, to move towards one another, thus reducing the spacing between the two top cushions and the two bottom cushions to increase comfort for a smaller child. As the winch reel 2340 is rotated in a second direction or popped out to release the take-up of the winch reel 2230, the elastic border pulls the first top cushion 2220A and the first bottom cushion 2225A in Direction B, and the second top cushion 2220B and the second bottom cushion 2225B in Direction A. Such a movement causes the first top cushion 2220A and the second top cushion 2220B, and the first bottom cushion 2225A and the second bottom cushion 2225B, to move away from each other, thus increasing the spacing between the two top cushions and the two bottom cushions to increase comfort for a larger child.

Figure 23B:
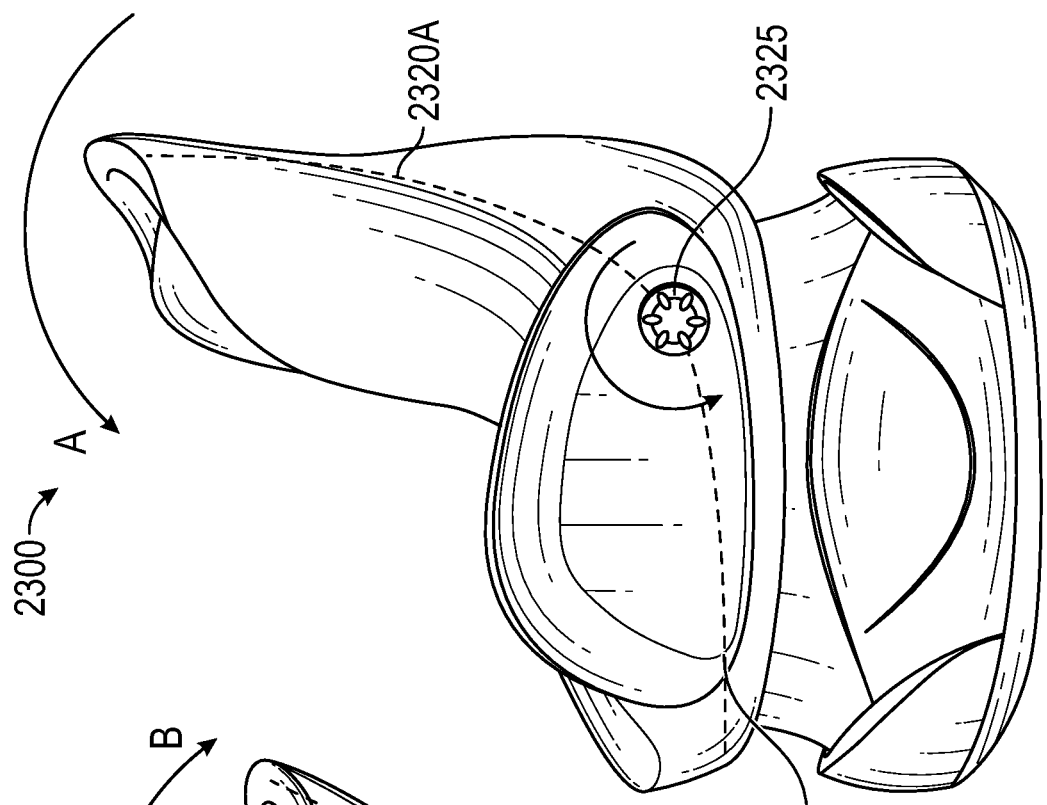
FIGS. 23A and 23B are perspective views of a children's car seat with a winch reel system for adjusting the recline of the seat back with respect to the seat bottom of the car seat in accordance with one example embodiment of the disclosure.
Figure 23A:
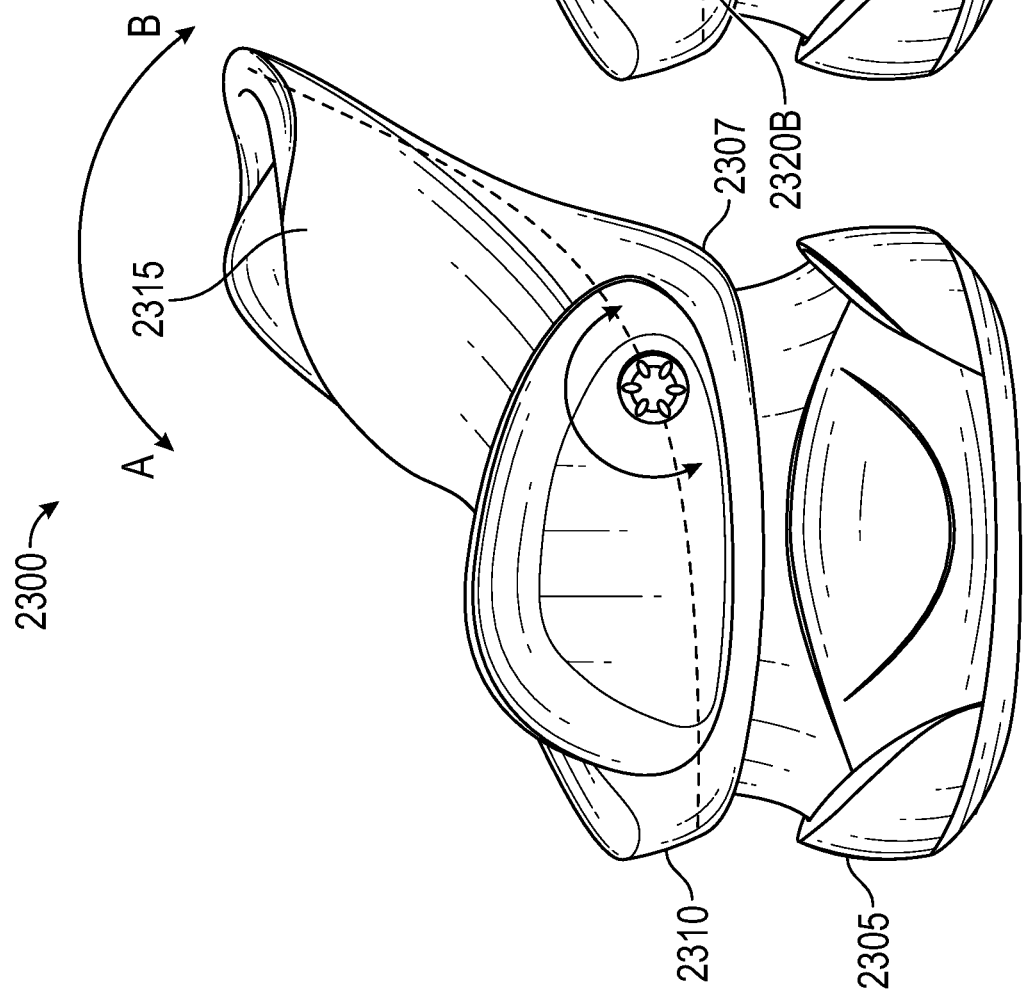

FIGS. 23A and 23B are perspective views of a children's car seat with a winch reel system for adjusting the recline of the seat back with respect to the seat bottom of the car seat in accordance with one example embodiment of the disclosure. Any one or more of the winch reel systems and features of FIGS. 1A-7 can be used as the winch reels described herein. In addition, the features described in FIGS. 23A and 23B may be provided separately or in addition to any of the features described in FIGS. 19A-22B. The car seat 2300 can include a seat base 2305 and a seat shell 2307 coupled to the seat base 2305. The seat shell 2307 can include a seat bottom 2310 and a seat back 2315. The car seat 2300 can also include soft goods that cover all or a portion of the seat bottom 2310 and the seat back 2315.

The car seat 2300 can also include a winch reel 2325. The car seat 2300 can also include one or more wires 2320. In one example, a first wire 2320A has a first end coupled to the winch reel 2325 and a distal second end coupled to the seat back 2315. A second wire 2320B has a first end coupled to the winch reel 2325 and a distal second end coupled to the seat bottom 2310. In one example, the winch reel 2325 is a two-way winch reel. As the winch reel 2325 is rotated in a first direction, the first wire 2320A and the second wire 2320B are wound up on the take-up of the winch reel 2325, thus reclining the seat back 2315 in Direction B with respect to the seat bottom 2310 and moving the seat bottom 2310 away from the seat back 2315. In one example, the seat back 2315 can recline to be flat or substantially flat with respect to the seat bottom 2310. As the winch reel 2325 is rotated in a second direction, the first wire 2320A and the second wire 2320B are unwound from the take-up of the winch reel 2325, and the seat back 2315 is moved in Direction A towards an upright position with respect to the seat bottom 2310 and towards the seat back 2315.

Figure 24A:
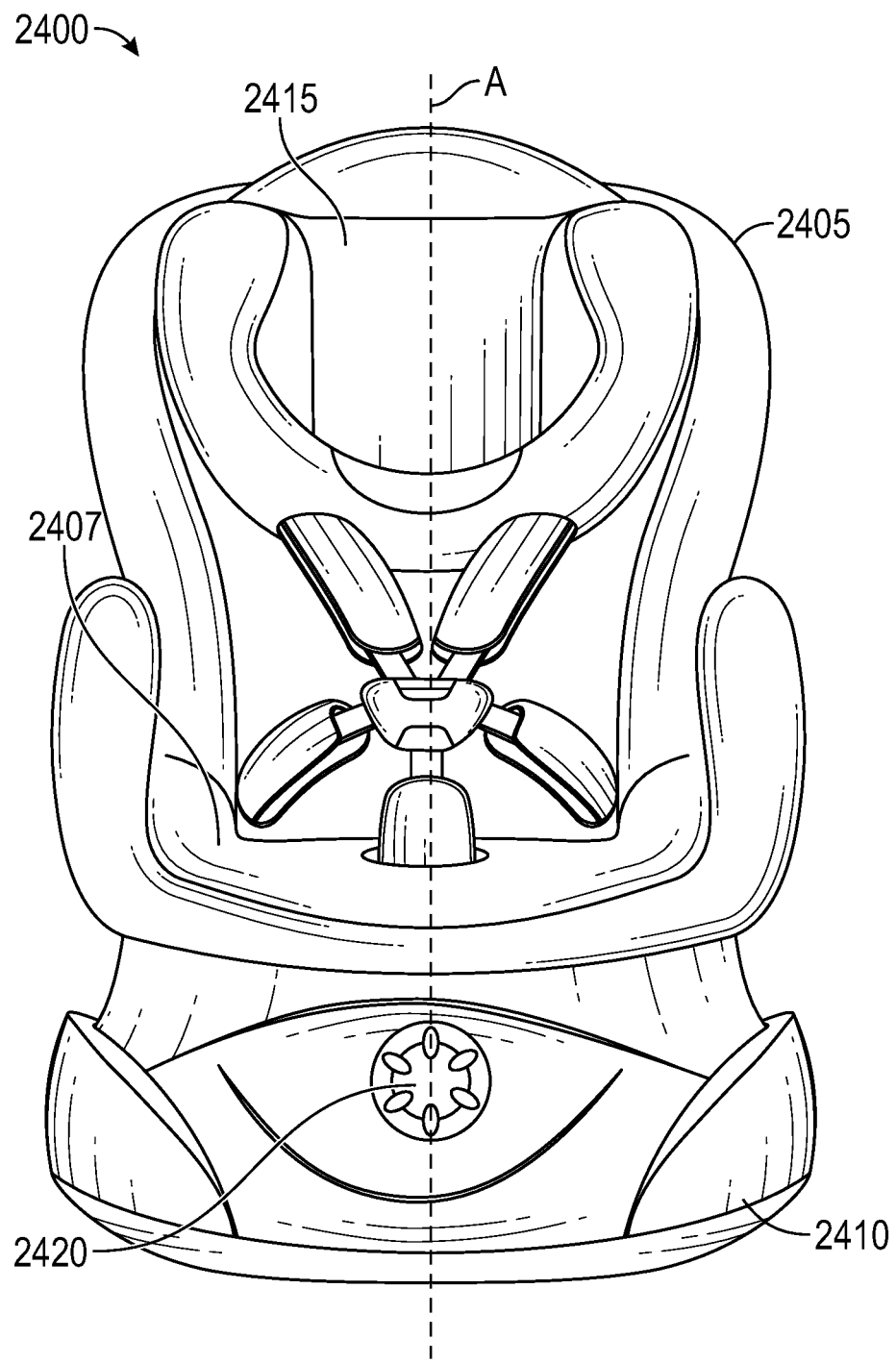
FIGS. 24A to 24C are various views of a children's car seat with a winch reel system for adjusting the rotation of the seat shell with respect to the seat base in accordance with one example embodiment of the disclosure.
Figure 24C:
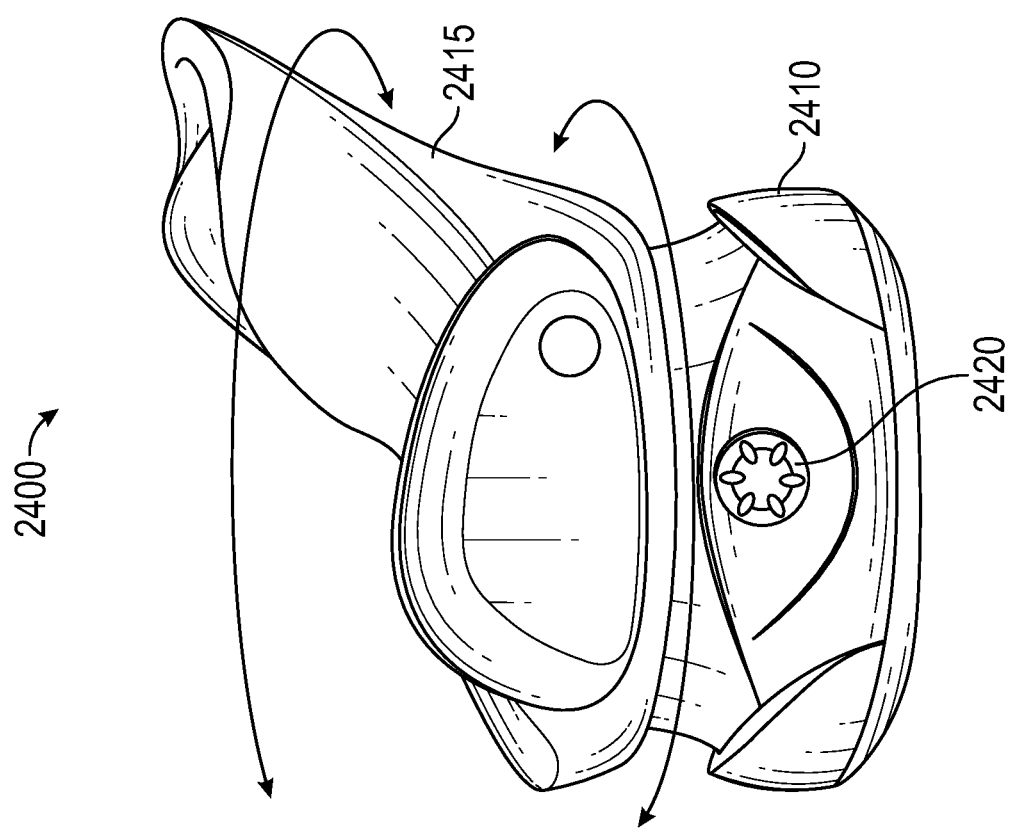
Figure 24B:
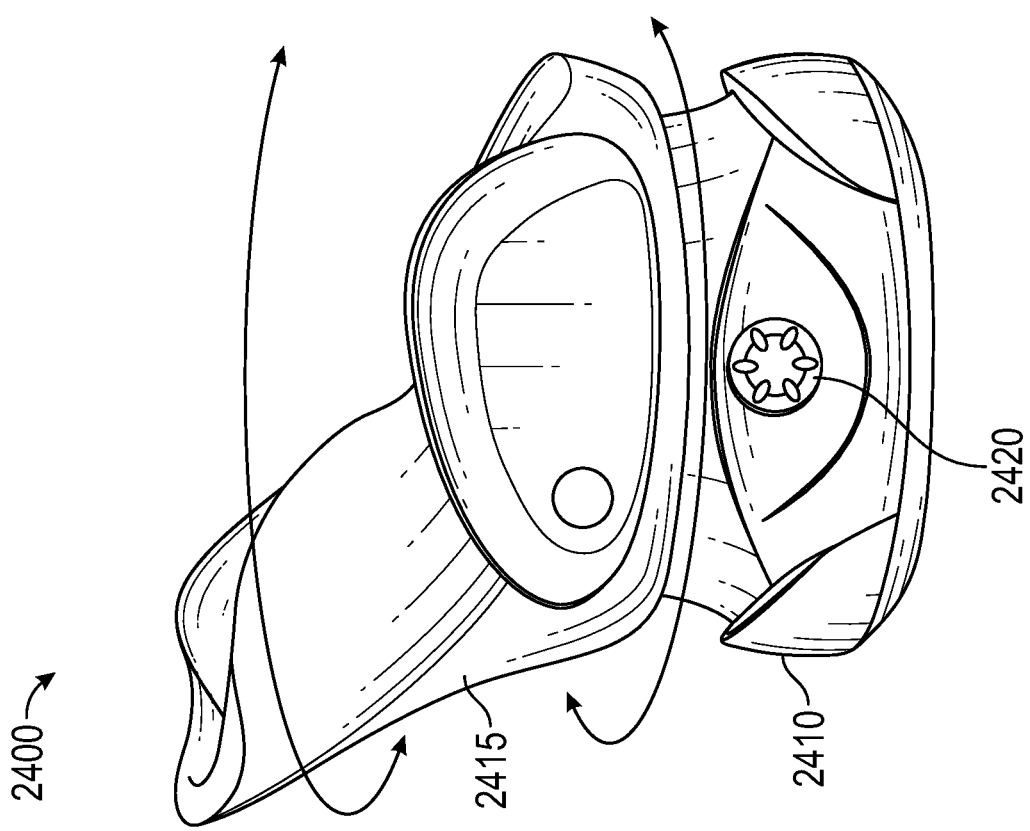

FIGS. 24A-24C are various views of a children's car seat with a winch reel system for adjusting the rotation of the seat shell with respect to the seat base in accordance with one example embodiment of the disclosure. Any one or more of the winch reel systems and features of FIGS. 1A-7 can be used as the winch reels described herein. In addition, the features described in FIGS. 24A-24C may be provided separately or in addition to any of the features described in FIGS. 19A-23B. The car seat 2400 can include a seat base 2410 and a seat shell 2405 coupled to and rotatable with respect to the seat base 2410 about Vertical Axis A. The seat shell 2405 can include a seat bottom 2407 and a seat back 2415. The car seat 2400 can also include soft goods that cover all or a portion of the seat bottom 2407 and the seat back 2415.

Figure 25A:
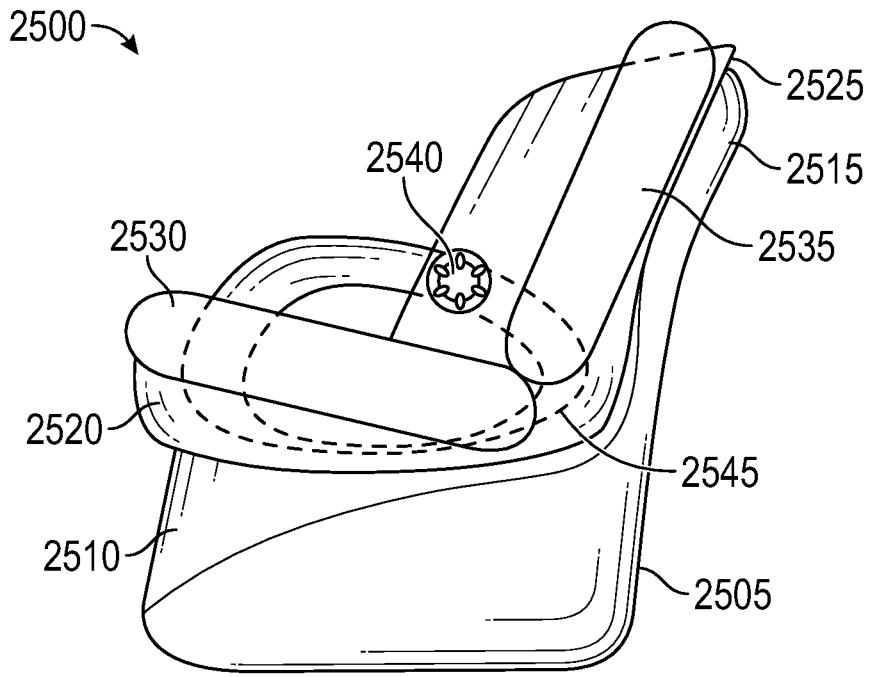
FIGS. 25A to 25D are various side elevation and perspective views of a children's car seat with a winch reel system for adjusting the vertical positioning of the seat bottom and seat back cushion in accordance with one example embodiment of the disclosure.
Figure 25B:
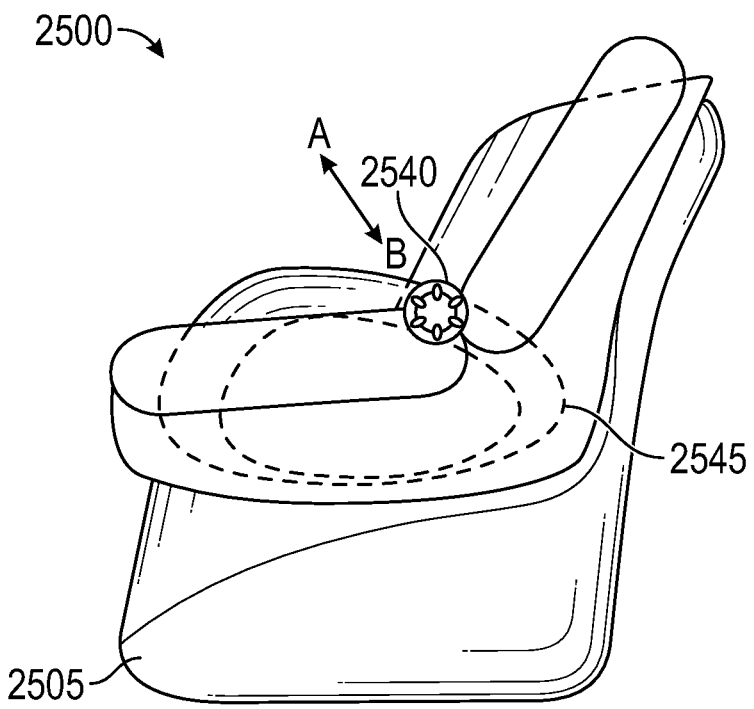
Figure 25C:
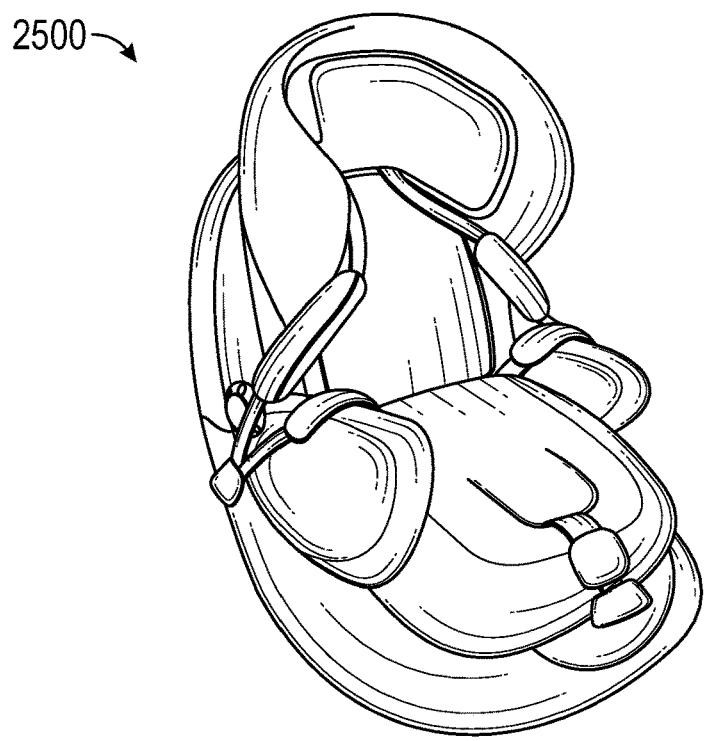
Figure 25D:
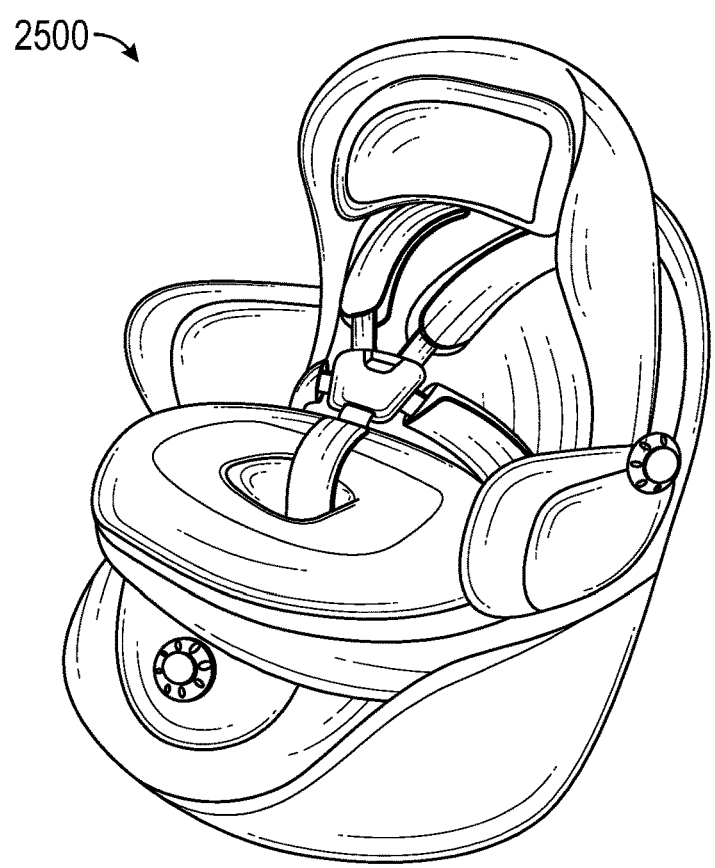

The car seat 2400 can also include a winch reel 2420. In one example, the winch reel 2420 can be disposed along a front side of the seat base 2410. Although not depicted in FIGS. 25A through 24C, the car seat 2400 can also include one or more wires and/or a toothed pawl coupled to the seat shell 2405 and engageable with the winch reel 2420. In one example, the winch reel 2420 is a two-way winch reel. As the winch reel 2420 is rotated in a first direction, the winch reel 2420 engages the toothed pawl and/or the wires, thus rotating the seat shell 2405 in a first direction about Vertical Axis A. As the winch reel 2420 is rotated in a second direction, the winch reel 2420 engages the toothed pawl and/or the wires, thus rotating the seat shell 2405 in a second direction opposite the first direction about Vertical Axis A. In some embodiments, the seat shell 2405 can be rotated to face a side door of an automobile.

FIGS. 25A-25D are side elevation and perspective views of a children's car seat with a winch reel system for adjusting the vertical positioning of the seat bottom cushion and the seat back cushion in accordance with one example embodiment of the disclosure. Any one or more of the winch reel systems and features of FIGS. 1A-7 can be used as the winch reels described herein. In addition, the features described in FIGS. 25A-25D may be provided separately or in addition to any of the features described in FIGS. 19A-24C. The car seat 2500 can include a seat base 2505 and a seat shell 2510 that includes a seat bottom 2520 and a seat back 2515. The car seat 2500 can also include soft goods that cover all or a portion of the seat bottom 2520 and the seat back 2515. In one example, the soft goods include a seat bottom cushion 2530 configured to rest upon the seat bottom 2520 and a seat back cushion 2535 that is configured to abut a front side 2525 of the seat back 2515. The seat bottom cushion 2530 and the seat back cushion 2535 can be configured to move with respect to one another.

The car seat 2500 can also include a winch reel 2540 and one or more wires 2545. The one or more wires 2545 can each have a first end coupled to the winch reel 2540 and a distal second end coupled to the seat back cushion 2535 and/or the seat bottom cushion 2530. In one example, the winch reel 2540 is a one-way winch reel. As the winch reel 2540 is rotated in a first direction, the one or more wires 2545 are wound up on the take-up of the winch reel 2540, thus pulling a bottom of the seat back cushion 2535 and a back of the seat bottom cushion 2530 in Direction A away from the seat bottom 2520 and the seat back 2515. Moving the seat back cushion 2535 and the seat bottom cushion 2530 out in this manner can assist with placing and/or removing a child from the car seat 2500. As the winch reel 2540 is rotated in a second direction or popped out to release the take-up of the winch reel 2540, a caregiver can push on the seat back cushion 2535 and the seat bottom cushion 2530 to unwind the wire from the take-up of the winch reel 2540, or the wire can be automatically unwound from the take-up of the winch reel 2540 to allow the seat back cushion 2535 and the seat bottom cushion 2530 to move in Direction B towards the seat bottom 2520 and seat back 2515.

Figure 26:
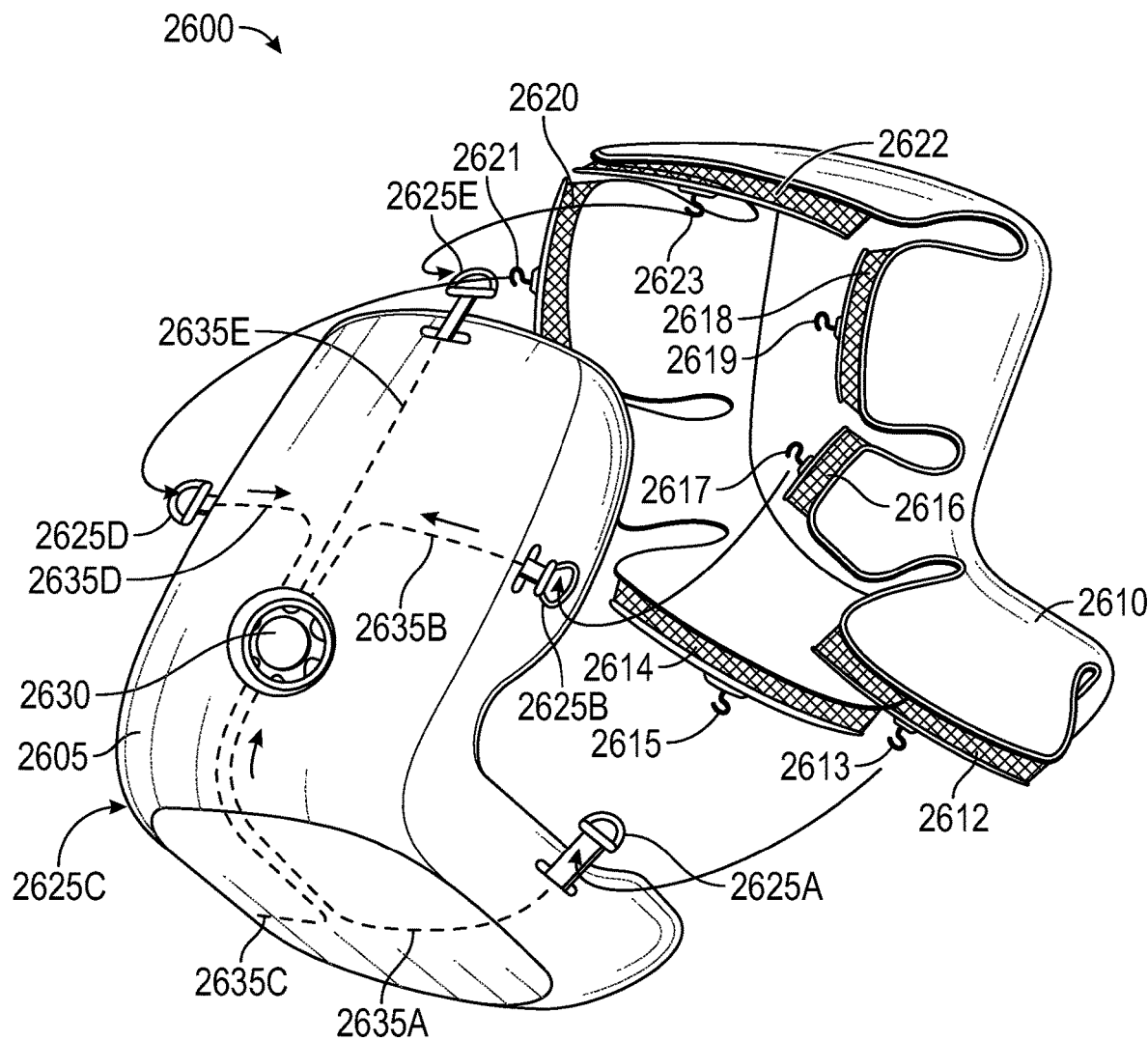
FIG. 26 is a perspective view of a children's car seat with a winch reel system for adjusting tension in the seat cover to the seat shell in accordance with one example embodiment of the disclosure.

FIG. 26 is a perspective view of a children's car seat with a winch reel system for adjusting tension in the seat cover to the seat shell in accordance with one example embodiment of the disclosure. Any one or more of the winch reel systems and features of FIGS. 1A-7 can be used as the winch reels described herein. In addition, the features described in FIG. 26 may be provided separately or in addition to any of the features described in FIGS. 19A-25D. The car seat 2600 can include a seat shell 2605 that includes a seat bottom and a seat back. The car seat 2600 can also include soft goods 2610 that are removably coupled to the seat shell 2605 and cover all or a portion of the seat bottom and the seat back. The soft goods 2610 can include multiple hooks 2613, 2615, 2617, 2619, 2621, 2623 for coupling the soft goods 2610 to the seat shell 2605. In one example, the hooks are directly coupled to the soft goods 2610.

In another example, elastic material 2612, 2614, 2616, 2618, 2620, 2622 extends between the soft goods 2610 and each respective hook 2613, 2615, 2617, 2619, 2621, 2623. The seat shell 2605 can include corresponding loops 2625A-2625E for coupling to the hooks 2613, 2615, 2617, 2619, 2621, 2623. Each of the loops 2625A-2625E can be coupled to a corresponding wire 2635A-2635E, each having a first end coupled to a winch reel 2630 and a distal second end coupled to the corresponding loop 2625A-2625E. In one example, the winch reel 2630 is a one-way winch reel. As the winch reel 2630 is rotated in a first direction, the wires 2635A-2635E are wound up on the take-up of the winch reel 2630, and the increased tension in the wires 2635A-2635E pulls the soft goods 2610 tightly onto the seat shell 2605. As the winch reel 2630 is rotated in a second direction or popped out to release the take-up of the winch reel 2630, the reduced tension in the wires 2635A-2635E allows a user to pull the soft goods 2610 away from the seat shell 2605 and remove the hooks 2613, 2615, 2617, 2619, 2621, 2623 from the corresponding loops 2625A-2625E.

Figure 27:
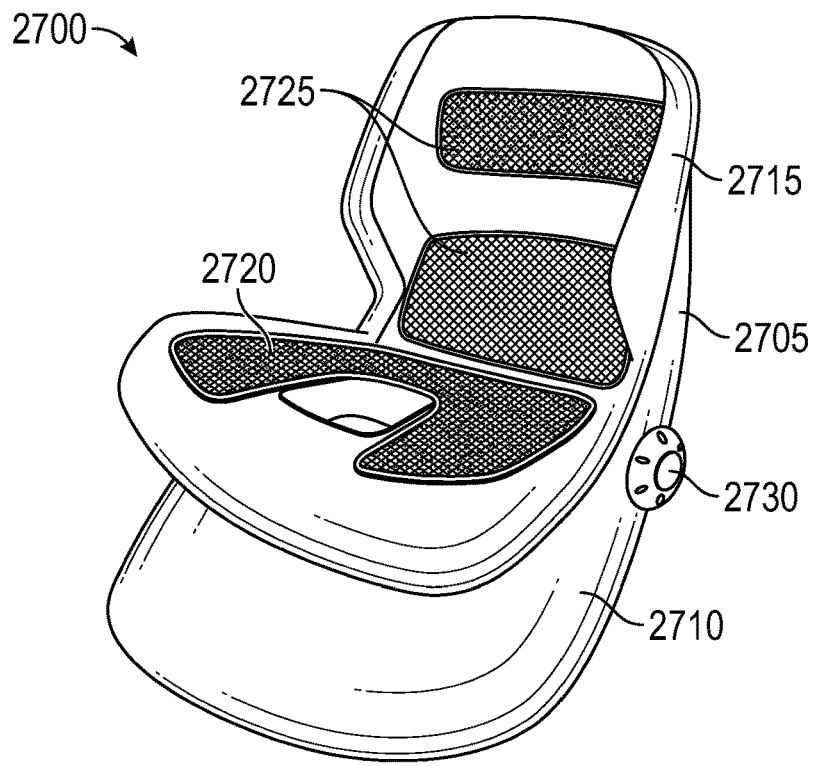
FIG. 27 is a perspective view of a children's car seat with a winch reel system for adjusting ventilation openings to open and close along the seat bottom and seat back of the seat shell in accordance with one example embodiment of the disclosure.

FIG. 27 is a perspective view of a children's car seat with a winch reel system for adjusting ventilation openings to open and close along the seat bottom and seat back of the seat shell in accordance with one example embodiment of the disclosure. Any one or more of the winch reel systems and features of FIGS. 1A-7 can be used as the winch reels described herein. In addition, the features described in FIG. 27 may be provided separately or in addition to any of the features described in FIG. 19A-26. The car seat 2700 can include a seat shell 2705 that includes a seat bottom 2710 and a seat back 2715. The car seat 2700 can also include soft goods that cover all or a portion of the seat bottom 2710 and the seat back 2715. In one example, the soft goods include slidable seat bottom mesh panels 2720 and slidable seat back mesh panels 2725 respectively disposed over apertures through the seat bottom 2710 and seat back 2715.

In a first position, the slidable seat bottom mesh panels 2720 and the slidable seat back mesh panels 2725 cover the apertures to prevent air flow respectively through the seat bottom 2710 and seat back 2715. In a second position, openings in the slidable seat bottom mesh panels 2720 and the slidable seat back mesh panels 2725 align or substantially align with the apertures to allow air to flow respectively through the seat bottom 2710 and seat back 2715. A winch reel 2730 can be coupled to a lateral side or other portion of the seat shell 2705. Although not depicted in FIG. 27, one or more wires can be coupled at a first end to the winch reel 2730 and at a distal second end to one or more of the slidable seat bottom mesh panel 2720 and/or the slidable seat back mesh panel 2725.

In one example, the winch reel 2730 is a two-way reel. As the winch reel 2730 is rotated in a first direction, the wires are wound up on the take-up of the winch reel 2730, and the slidable seat bottom mesh panel 2720 and the slidable seat back mesh panel 2725 are moved with respect to their respective apertures from a closed configuration to an open configuration, allowing air to pass through each aperture, in order to provide additional ventilation and cooling capability for the car seat 2700. As the winch reel 2730 is rotated in a second direction, the wires are unwound from the take-up of the winch reel 2730, and the slidable seat bottom mesh panel 2720 and the slidable seat back mesh panel 2725 is moved with respect to their respective apertures from an open configuration to a closed configuration, thus blocking the respective apertures and preventing air from passing through the apertures in the slidable seat bottom mesh panel 2710 and the slidable seat back mesh panel 2715.

Figure 28:
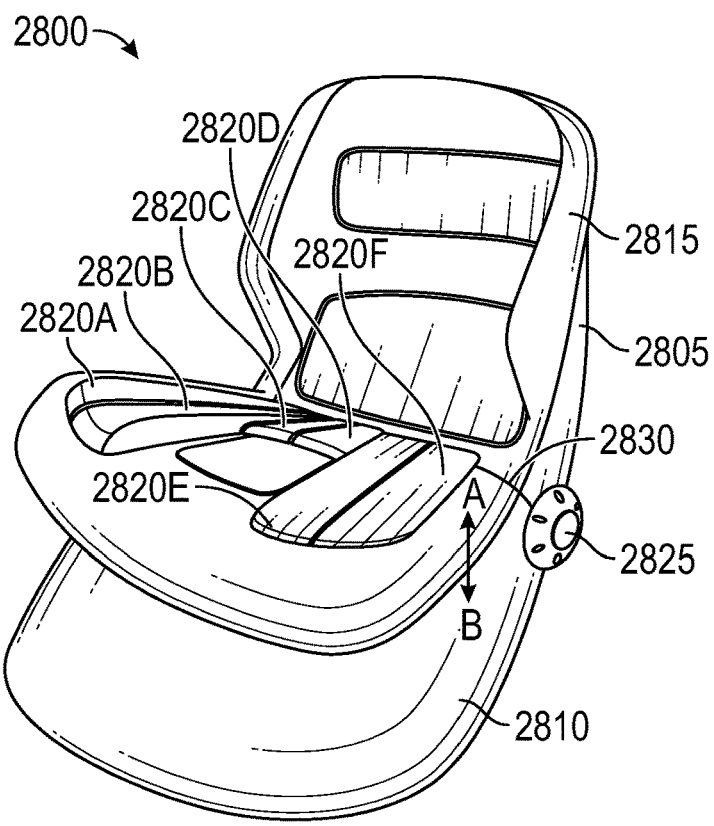
FIG. 28 is a perspective view of a children's car seat with a winch reel system for adjusting the vertical position of the cushion along the seat bottom of the seat shell in accordance with one example embodiment of the disclosure.

FIG. 28 is a perspective view of a children's car seat with a winch reel system for adjusting the vertical position of the cushion along the seat bottom of the seat shell in accordance with one example embodiment of the disclosure. Any one or more of the winch reel systems and features of FIGS. 1A-7 can be used as the winch reels described herein. In addition, the features described in FIG. 28 may be provided separately or in addition to any of the features described in FIGS. 19A-27. The car seat 2800 can include a seat shell 2805 that includes a seat bottom 2810 and a seat back 2815. The car seat 2800 can also include soft goods that cover all or a portion of the seat bottom 2810 and the seat back 2815. In one example, the soft goods include a plurality of cushion members 2820A-F that extend along the longitudinal axis of the seat bottom 2810. In certain example embodiments, each of the cushion members 2820A-F can be vertically adjustable with respect to the seat bottom 2810.

The car seat 2800 can also include a winch reel 2825 coupled to a lateral side or other portion of the seat shell 2805. One or more wires 2830 can each have a first end coupled directly or indirectly to the winch reel 2825 and a distal second end coupled directly or indirectly to one or more of the cushion members 2820A-F. In one example, the winch reel 2825 is a two-way reel. As the winch reel 2825 is rotated in a first direction, the one or more wires 2830 are wound up on the take-up of the winch reel 2825, thus moving one or more of the cushion members 2820A-F downward in Direction B. In one example, the cushion members 2820A-F can be moved all at once. In another example, the cushion members 2820A-F can be moved one at a time such that a first cushion member 2820A is moved downwards as far as possible before a second cushion member can be moved downwards, and so on. As the winch reel 2825 is rotated in a second direction, the one or more wires 2830 are unwound from the take-up of the winch reel 2825 and one or more of the cushion members 2820A-F moves vertically upward in Direction A. The ability to change the vertical position of the plurality of cushion members 2820A-F allows for a user to adjust the seat bottom 2810 to the way the child sits in the car seat 2800, and to better balance the child's weight.

Figure 29:
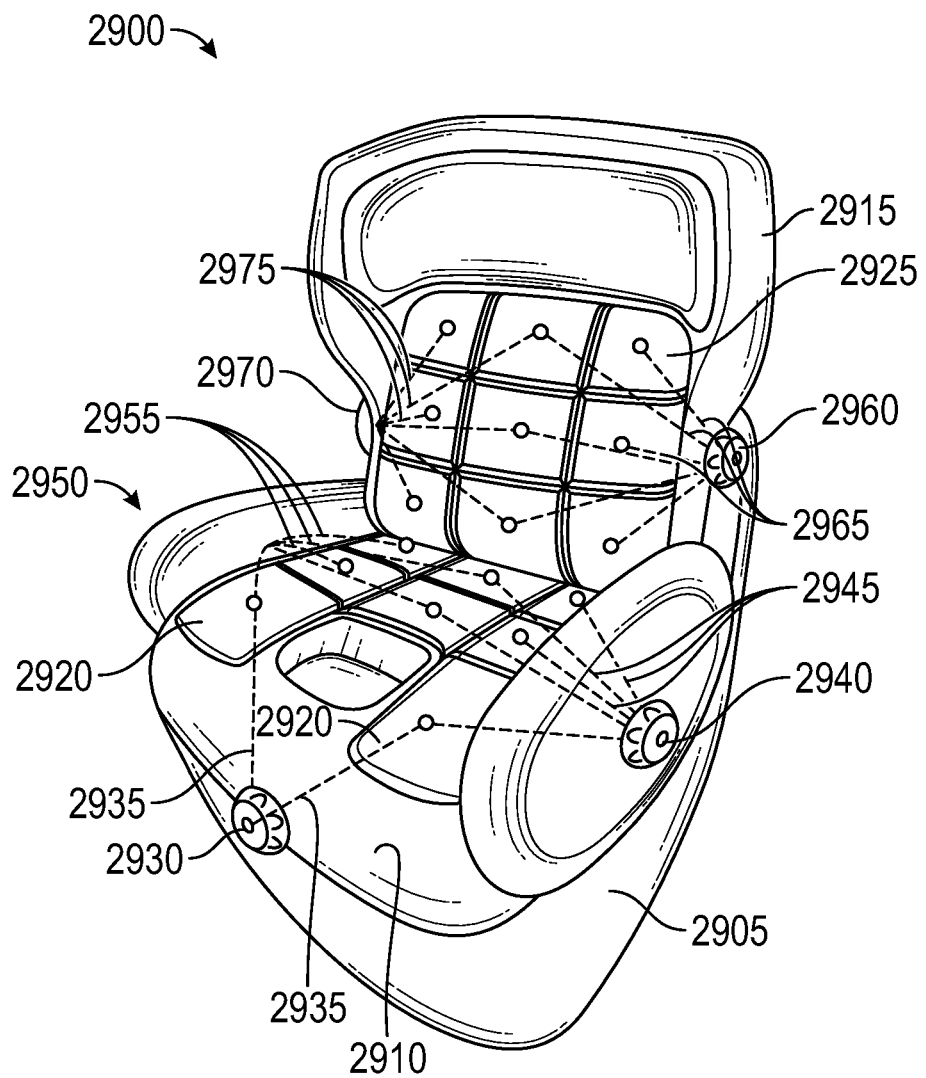
FIG. 29 is a perspective view of a children's car seat with a winch reel system for adjusting the shape of the mesh cushion in the seat shell in accordance with one example embodiment of the disclosure.

FIG. 29 is a perspective view of a children's car seat with a winch reel system for adjusting the shape of the mesh cushion in the seat shell in accordance with one example embodiment of the disclosure. Any one or more of the winch reel systems and features of FIGS. 1A-7 can be used as the winch reels described herein. In addition, the features described in FIG. 29 may be provided separately or in addition to any of the features described in FIG. 19A-28. The car seat 2900 can include a seat shell 2905 that includes a seat bottom 2910 and a seat back 2915. The car seat 2900 can also include soft goods, such as horizontal cushion members 2920 and vertical cushion members 2925 that are removably coupled to the seat shell 2905 and cover all or a portion of the seat bottom 2910 and the seat back 2915. The horizontal cushion members 2920 and the vertical cushion members 2925 can include multiple sectioned panels for individualized adjustment. The car seat 2900 can also include multiple winch reels 2930, 2940, 2950, 2960, and 2970. Each winch reel 2930, 2940, 2950, 2960, and 2970 can be coupled to a first end of each of corresponding wires 2935, 2945, 2955, 2965, and 2975. Each of the corresponding wires 2935, 2945, 2955, 2965, and 2975 can further have a distal second end that is coupled to a particular panel of the horizontal cushion members 2920 and/or the vertical cushion members 2925. Each winch reel 2930, 2940, 2950, 2960, and 2970 can be configured to adjust any panels that it is coupled to via the corresponding wires 2935, 2945, 2955, 2965, and 2975 in a direction or manner to change the overall form and shape of the horizontal cushion members 2920 and the vertical cushion members 2925.

Figure 30:
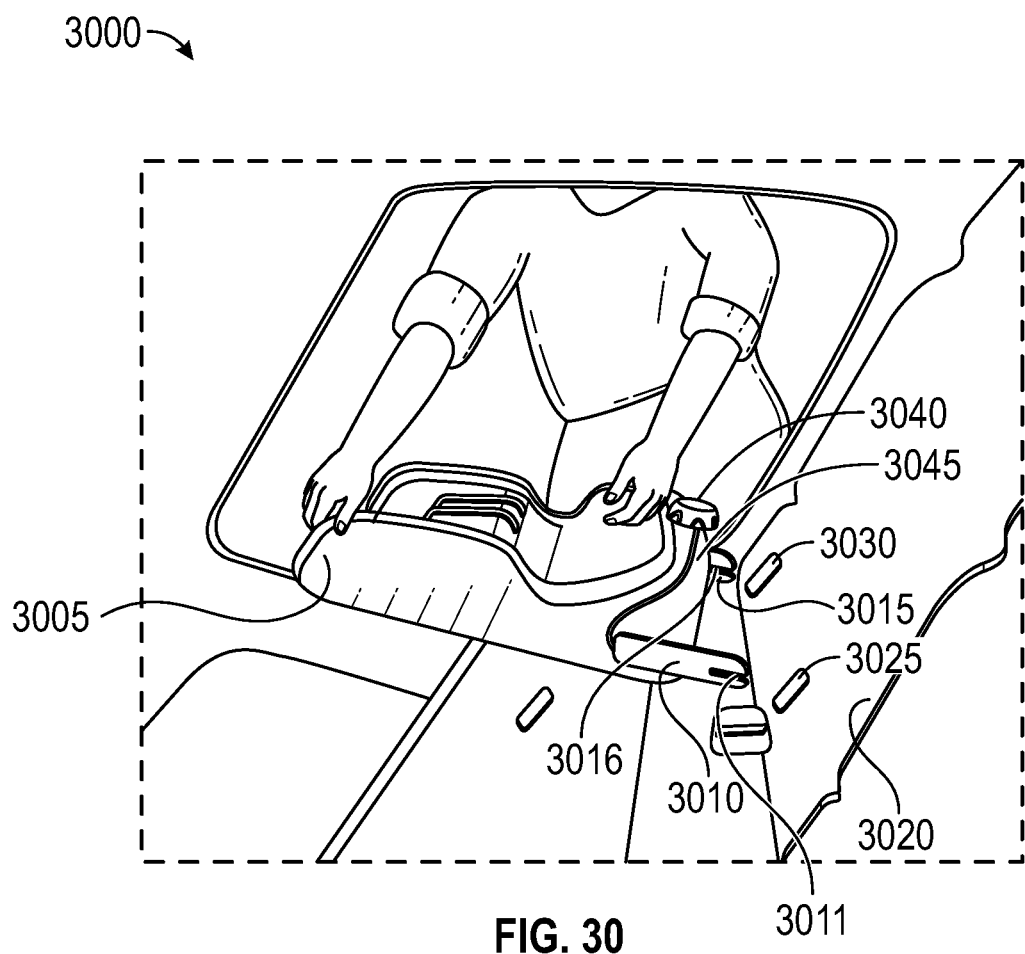
FIG. 30 is a perspective view of a children's car seat with a winch reel system for adjusting the tension in the isofix members attached to the automobile seat in accordance with one example embodiment of the disclosure.

FIG. 30 is a perspective view of a children's car seat with a winch reel system for adjusting the tension in the isofix members attached to an automobile seat in accordance with one example embodiment of the disclosure. Any one or more of the winch reel systems and features of FIGS. 1A-7 can be used as the winch reels described herein. In addition, the features described in FIG. 30 may be provided separately or in addition to any of the features described in FIGS. 19A-29. The children's car seat 3000 can include a seat base 3005. In some embodiments, although not depicted in FIG. 30, the children's car seat 3000 can be configured to be removably coupled to an infant carrier system (ICS) and/or a seat shell. The seat base 3005 can include a first isofix connector 3010 and a second isofix connector 3015 that each extend out towards the back of the seat base 3005. The first isofix connector 3010 and the second isofix connector 3015 can respectively include a corresponding first hook element 3011 and a second hook element 3016. The first hook element 3011 and the second hook element 3016 can each be configured to be removably coupled respectively to a corresponding first anchor 3025 and a corresponding second anchor 3030 along an automobile seat 3020.

The seat base 3005 can also include a winch reel 3040. In one example, the winch reel 3040 can be positioned along a top surface of the seat base 3005 for easy access. The seat base can also include one or more wires 3045, each having a first end coupled to the winch reel 3040 and a distal second end coupled to either of the corresponding first isofix connector 3010 or the corresponding second isofix connector 3015. The winch reel 3040 can be a one-way winch reel. As the winch reel 3040 is rotated in a first direction, the one or more wires 3045 are wound up on the take-up of the winch reel 3040, and the increased tension in the one or more wires 3045 pulls the first isofix connector 3010 and the second isofix connector 3015 into the body of the seat base 3005, thus tightening the seat base 3005 to the first anchor 3025 and the second anchor 3030. In certain example embodiments, the winch reel 3040 can include a torque limiter that creates an audible sound when sufficient tension is created. As the winch reel 3040 is rotated in a second direction or popped out to release the take-up of the winch reel 3040, a user can pull the seat base 3005 away from the automobile seat 3020 to pull the first isofix connector 3010 and the second isofix connector 3015 away from the seat base 3005 and loosen the tension in the one or more wires 2045, so that the first isofix connector 3010 and the second isofix connector 3015 can be respectively decoupled from the first anchor 3025 and the second anchor 3030.

Figure 31A:
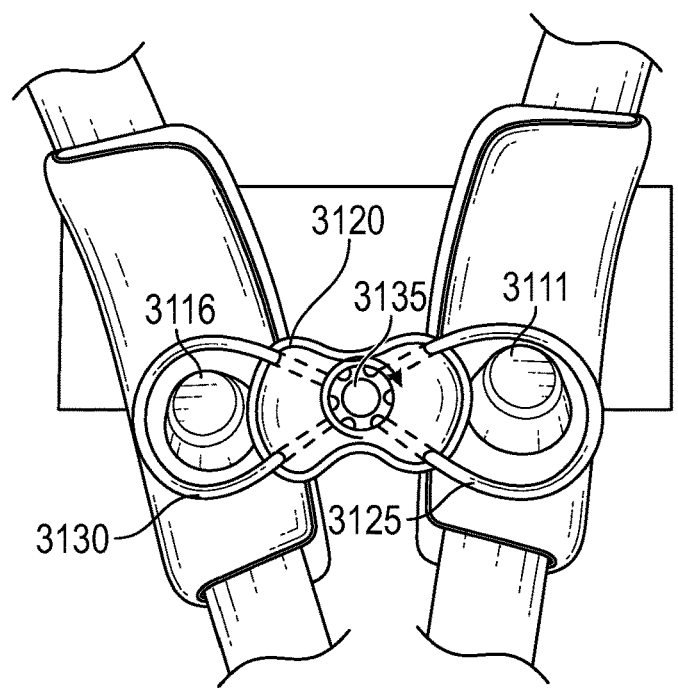
FIGS. 31A and 31B are perspective views of a children's car seat with a winch reel system for adjusting the length of a clasp coupled to the harness system in accordance with one example embodiment of the disclosure.
Figure 31B:
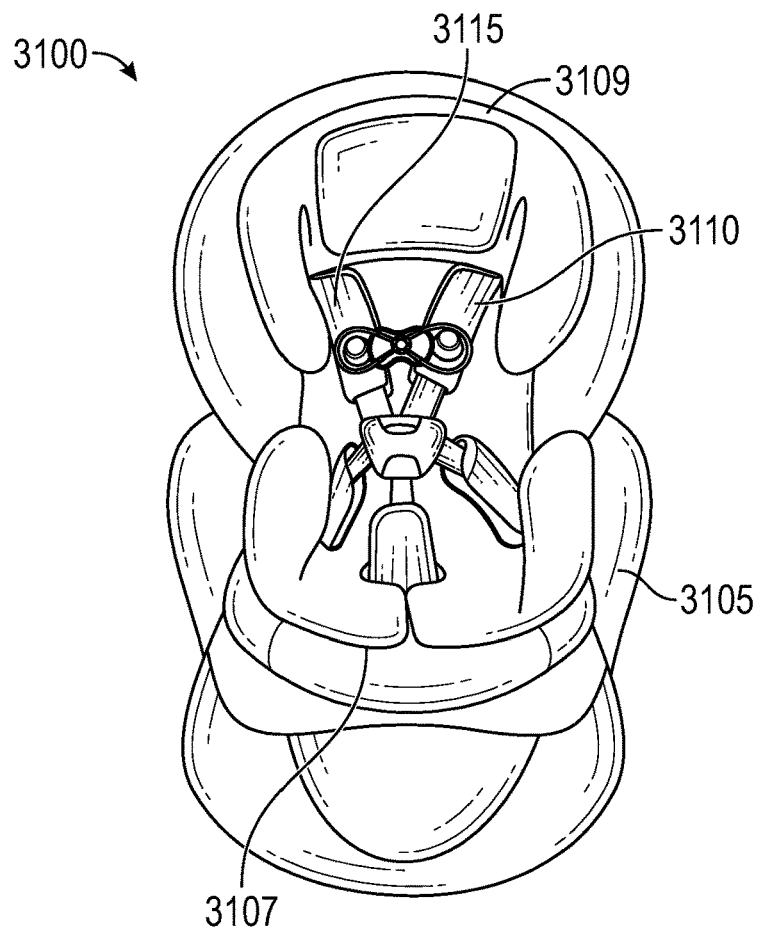

FIGS. 31A and 31B are perspective views of a children's car seat with a winch reel system for adjusting the length of a clasp coupled to the harness system in accordance with one example embodiment of the disclosure. Any one or more of the winch reel systems and features of FIGS. 1A-7 can be used as the winch reels described herein. In addition, the features described in FIG. 28 may be provided separately or in addition to any of the features described in FIGS. 19A-30. The car seat 3100 can include a seat shell 3105 that includes a seat bottom 3107 and a seat back 3109. The car seat 3100 can also include soft goods that cover all or a portion of the seat bottom 3107 and the seat back 3109. The car seat 3100 can also include a first shoulder harness strap 3110 and a second shoulder harness strap 3115. Each of the first shoulder harness strap 3110 and the second shoulder harness strap 3115 can include a corresponding first attachment post 3111 and a corresponding second attachment post 3116 that extends outward.

The car seat 3100 can also include a clasp 3120 configured to be removably coupled to both the first attachment post 3111 and the second attachment post 3116. The clasp 3120 can include a winch reel 3135, a first wire loop 3125 and a second wire loop 3130. The winch reel 3135 can be a one-way winch reel. and the first wire loop 3125 and the second wire loop 3130 can be configured to be respectively placed around the first attachment post 3111 and the second attachment post 3116. As the winch reel 3135 is rotated in a first direction, the first wire loop 3125 and the second wire loop 3130 are wound up on the take-up of the winch reel 3135, thus reducing the size of the first wire loop 3125 and the second wire loops 3130 so as to respectively close around the first attachment post 3111 and the second attachment post 3116. Such a motion pulls the first shoulder harness 3110 towards the second shoulder harness 3115. As the winch reel 3135 is rotated in a second direction or popped out to release the take-up of the winch reel 3135, a user can pull on the first wire loop 3125 and the second wire loop 3130 to increase their loop sizes, so as to enable the user to remove the clasp from the first attachment post 3111 and the second attachment post 3116.

Figure 32:
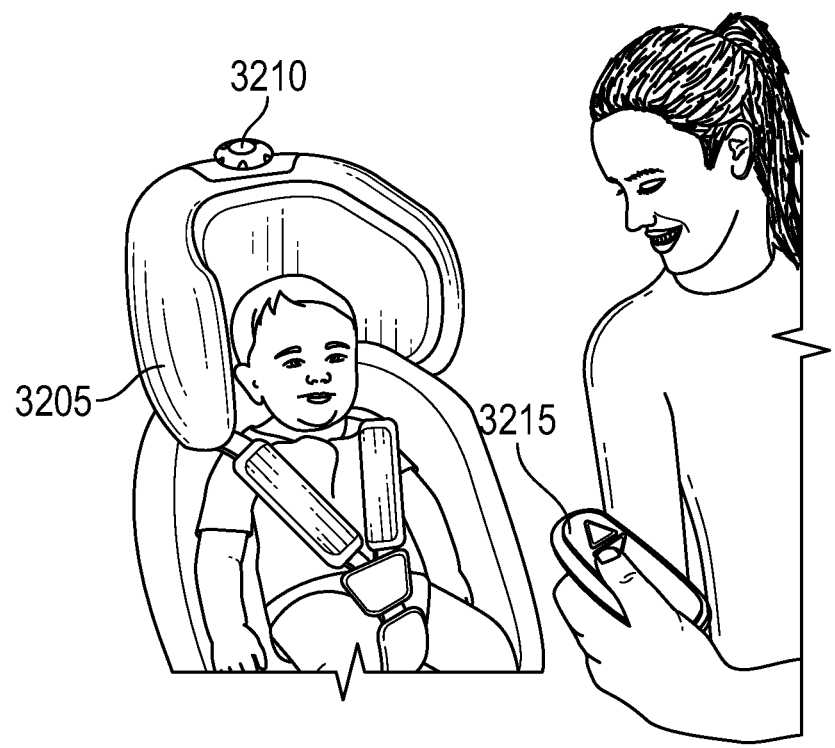
FIG. 32 is a perspective view of a children's car seat with a remote-controlled winch reel system for adjusting any of the features discussed in FIGS. 19A-31B in accordance with one example embodiment of the disclosure.

FIG. 32 is a perspective view of a children's car seat with a remote-controlled winch reel system for adjusting any of the features discussed in FIGS. 19A-31B in accordance with one example embodiment of the disclosure. Any one of the winch reels described in FIGS. 19A-31B can additionally include a receiver or transceiver and a motor to automatically turn a winch reel 3210 in either or both of a first direction and a second direction to change any of the described aspects of a car seat 3205. The receiver or transceiver can be communicably coupled with a remote control 3215 that can include one or more buttons that can be manually pressed by a caregiver to change the desired aspect of the car seat 3205. In certain example embodiments, the remote control 3215 can control the operation of more than one winch reel 3210 and can optionally be programmable to add addition winch reel control features.

Figure 33B:
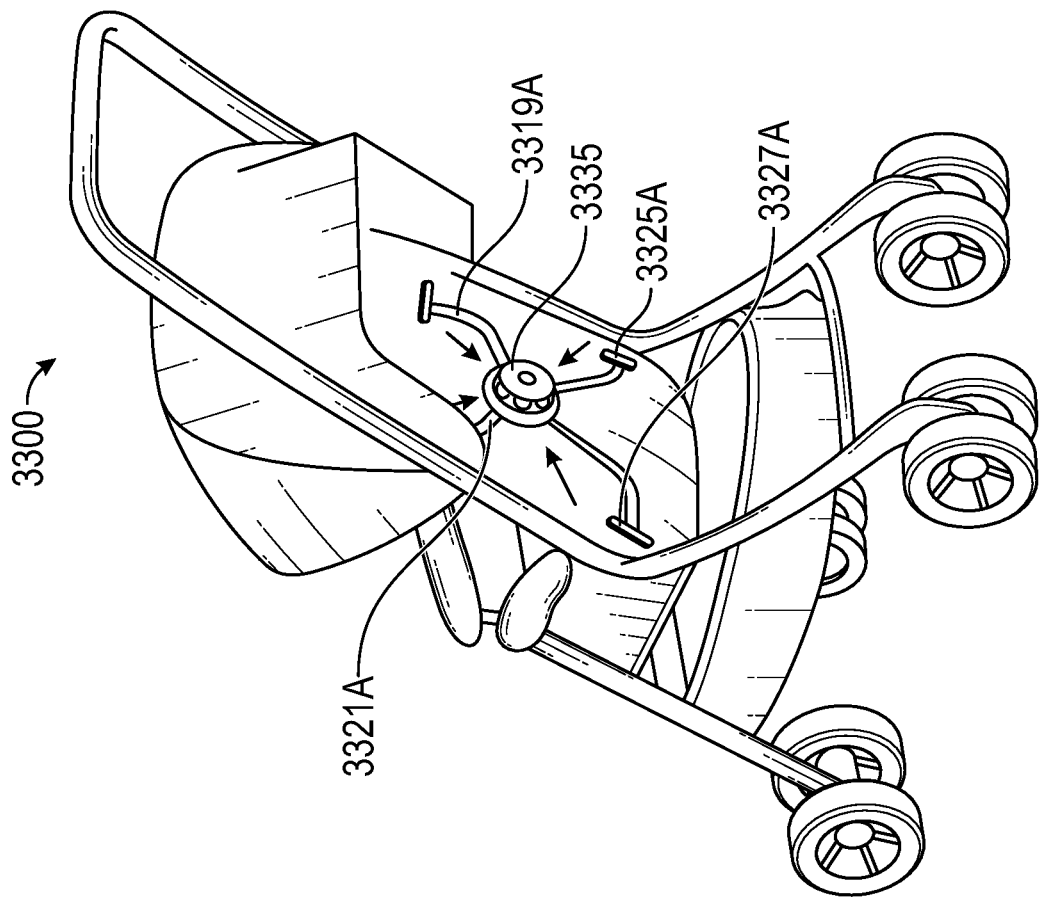
Figure 33A:
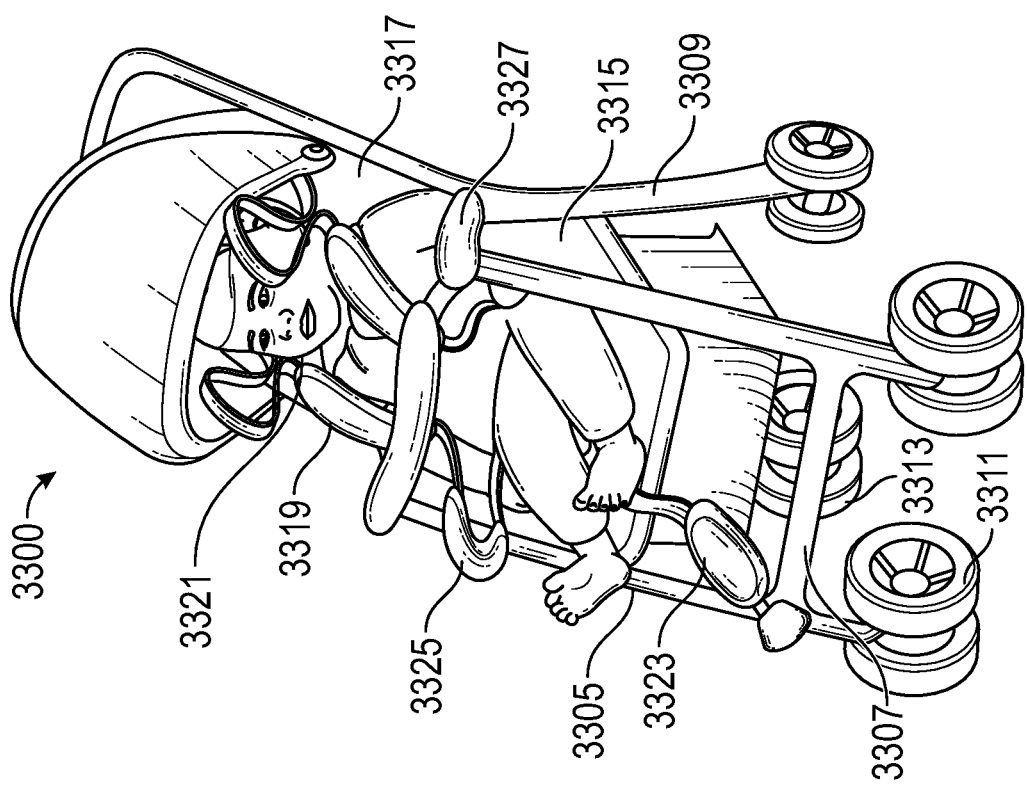

FIGS. 33A-33C are perspective views of a stroller with a winch reel system for adjusting the tension in the harness system for the stroller seat in accordance with one example embodiment of the disclosure. Any one or more of the winch reel systems and features of FIGS. 1A-7 can be used as the winch reels described herein. Adjustable features of a stroller 3300 may be adjusted with a child's present needs (such as sleep, play, protection from rain, protection from insects, protection from other environmental factors, a child's growth, and/or other potential reasons for preferring adjustment. The stroller 3300 can include a stroller frame 3305. The stroller frame 3305 can include a front stroller frame 3307, a rear stroller frame 3309, and a handle. Each of the front stroller frame 3307 and rear stroller frame 3309 can respectively include one or more front wheels 3311 and one or more back wheels 3313. The stroller 3300 can also include a seat bottom 3315 and a seat back 3317 for receiving a child thereon. In certain examples, the stroller 3300 can also include soft goods that cover all or a portion of the seat bottom 3315 and seat back 3317. The stroller 3300 can also include one or more harness straps 3319, 3321, 3323, 3325, and 3327 to hold the child into the stroller 3300. While five harness straps 3319, 3321, 3323, 3325, and 3327 are shown in FIGS. 33A to 33C, greater or fewer harness straps may be alternatively used.

The stroller 3300 can also include a winch reel 3335 positioned along a rear side of the seat back 3317. In other embodiments, the winch reel 3335 can be positioned anywhere else along the stroller 3300. The winch reel 3335 can be directly or indirectly coupled to each of the harness straps 3319, 3321, 3323, 3325, and 3327. For example, multiple wires 3319A, 3321A, 3323A (not depicted), 3325A, and 3327A may be provided, each having a first end coupled to the winch reel 3335 and a distal second end directly or indirectly coupled to one of the respective harness straps 3319, 3321, 3323, 3325, and 3327. In one example, the winch reel 3335 is a one-way winch reel. As the winch reel 3335 is rotated in a first direction, the wires 3319A, 3321A, 3323A, 3325A, and 3327A are wound up on the take-up of the winch reel 3335, and each harness strap 3319, 3321, 3323, 3325, 3327 is tightened at the same time. As the winch reel 3335 is rotated in a second direction or popped out to release the take-up of the winch reel 3335, the user can pull on one or more of the harness straps 3319, 3321, 3323, 3325, and 3327 to unwind each of the wires 3319A, 3321A, 3323A, 3325A, and 3327A from the take-up of the winch reel 3335, or the wires 3319A, 3321A, 3323A, 3325A, and 3327A can be automatically unwound from the take-up of the winch reel 3335, to loosen the respective harness straps 3319, 3321, 3323, 3325, and 3327. In certain examples, one or more of the harness straps 3319, 3321, 3323, 3325, and 3327 can include tension indicators 3340A, 3340B, and 3340C. The tension indicators 3340A, 3340B, and 3340C can operate as described in FIG. 7 and can provide a visual indication to a caregiver when sufficient tension is in each of the harness straps 3319, 3321, 3323, 3325, and 3327.

Figure 34:
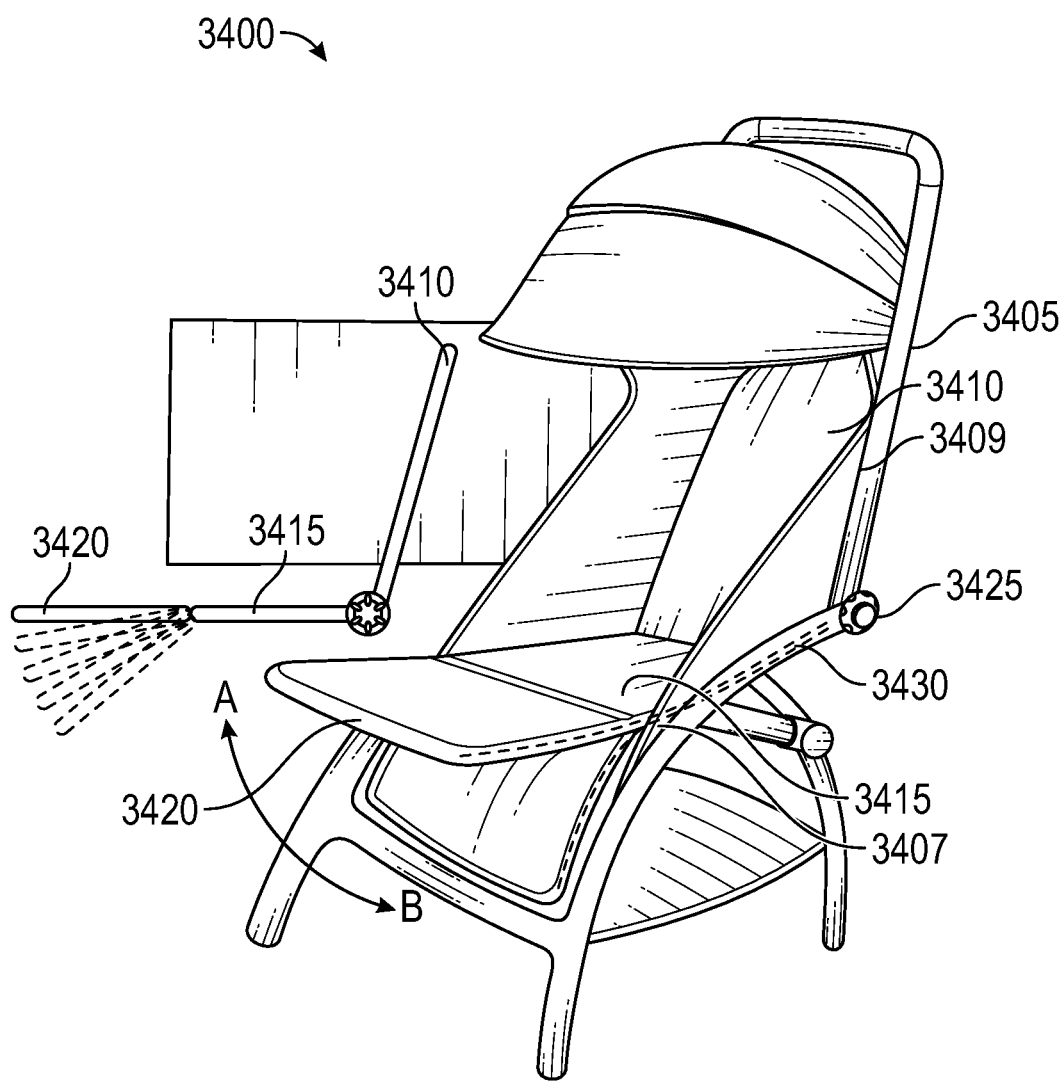
FIG. 34 is a perspective view of a stroller with a winch reel system for adjusting the position of the footrest of the stroller seat in accordance with one example embodiment of the disclosure.

FIG. 34 is a perspective view of a stroller with a winch reel system for adjusting the position of the footrest of the stroller seat in accordance with one example embodiment of the disclosure. Any one or more of the winch reel systems and features of FIGS. 1A-7 can be used as the winch reels described herein. In addition, the features described in FIG. 34 may be provided separately or in addition to any of the features described in FIGS. 33A-33C. The stroller 3400 can include a stroller frame 3405. The stroller frame 3405 can include a front stroller frame, a rear stroller frame, and a handle 3409. Each of the front stroller frame and rear stroller frame can include one or more wheels. The stroller 3400 can also include a seat bottom 3415 and a seat back 3410 for receiving a child thereon, and an adjustable leg panel 3420 that is rotatable with respect to the seat bottom 3415 about a hinge 3407. In certain examples, the stroller 3400 can also include soft goods that cover all or a portion of the seat bottom 3415 and seat back 3410.

The stroller 3400 can also include a winch reel 3425. In one example, the winch reel 3425 is a one-way winch reel. The stroller 3400 can also include one or more wires 3430, each having a first end coupled to the winch reel 3425 and a distal second end coupled to the adjustable leg panel 3420. As the winch reel 3425 is rotated in a first direction, the wires 3430 are wound up on the take-up of the winch reel 3425 and tension is created in the one or more wires 3430 to pull the adjustable leg panel 3420 in Direction A. In one example, the adjustable leg panel 3420 can be rotated to be flat or substantially flat or even with the seat bottom 3415. As the winch reel 3425 is rotated in a second direction or popped out to release the take-up of the winch reel 3426, a user can push the adjustable leg panel 3420 in Direction B, or the weight of the adjustable leg panel 3420 itself can cause it to rotate in Direction B.

Figure 35:
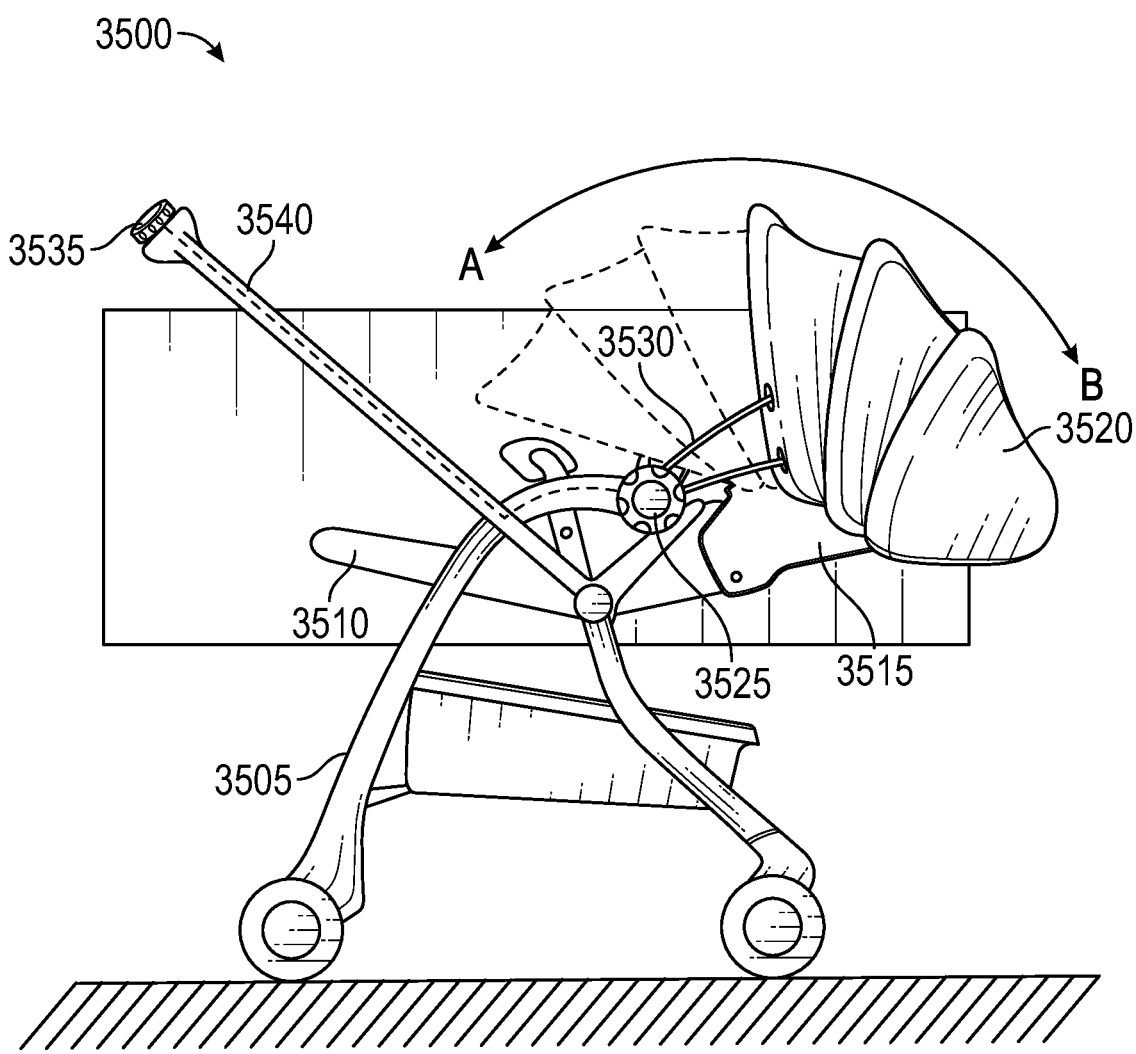
FIG. 35 is a side elevation view of a stroller with a winch reel system for extending and retracting a canopy on the stroller seat in accordance with one example embodiment of the disclosure.

FIG. 35 is a side elevation view of a stroller with winch reel system for extending and retracting a canopy on the stroller seat in accordance with one example embodiment of the disclosure. Any one or more of the winch reel systems and features of FIGS. 1A-7 can be used as the winch reels described herein. In addition, the features described in FIG. 35 may be provided separately or in addition to any of the features described in FIGS. 33A-34. A stroller 3500 can include a stroller frame 3505. The stroller frame 3505 can include a front stroller frame, a rear stroller frame, and a handle. Each of the front stroller frame and rear stroller frame can include one or more wheels. The stroller 3500 can also include a seat bottom 3510 and a seat back 3515 for receiving a child thereon, and an adjustable canopy 3520 that is rotatable with respect to the seat back 3515. In certain examples, the stroller 3500 can also include soft goods that cover all or a portion of the seat bottom 3510 and seat back 3515.

The stroller 3500 can also include a first winch reel 3525. In one example, the first winch reel 3525 is a one-way winch reel. The stroller 3500 can also include one or more first wires 3530, each having a first end coupled to the first winch reel 3525 and a distal second end coupled to the adjustable canopy 3520. In addition, or in the alternative, the stroller 3500 can also include a second winch reel 3535 positioned on the handle of the stroller 3500, and a second wire 3540 having a first end coupled to the second winch reel 3535 and a distal second end coupled to the adjustable canopy 3520. As either or both of the first winch reel 3525 and the second winch reel 3535 is rotated in a first direction, the one or more first wires 3530 and/or the second wire 3540 are wound up on the respective take-ups of the first winch reel 3525 and/or the second winch reel 3535. This movement creates tension in the one or more first wires 3530 and/or the second wire 3540 to pull the adjustable canopy 3520 in Direction A from an open position to a closed position that covers a substantial portion of the seat back 3515. As the first winch reel 3525 or the second winch reel 3535 is rotated in a second direction or popped out to release the take-up of the respective first winch reel 3525 or second winch reel 3535, a user can push the adjustable canopy 3520 in Direction B from a closed position to an open position, and the one or more first wires 3530 or the second wire 3540 can unwind from the take-up of the first winch reel 3525 or the second winch reel 3535.

Figure 36:
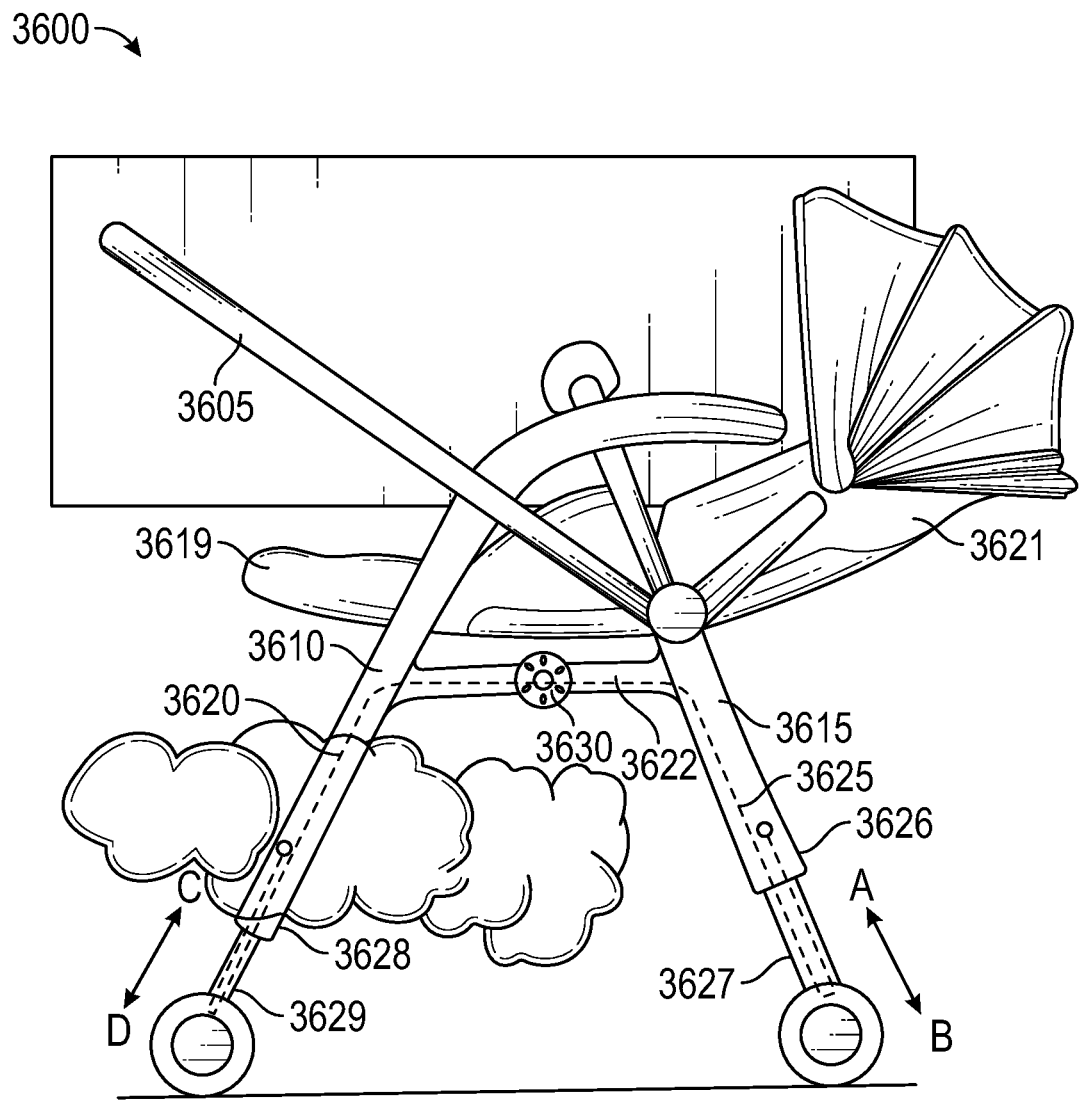
FIG. 36 is a side elevation view of a stroller with a winch reel system for adjusting the height of the stroller in accordance with one example embodiment of the disclosure.

FIG. 36 is a side elevation view of a stroller with a winch reel system for adjusting the height of the stroller in accordance with one example embodiment of the disclosure. Any one or more of the winch reel systems and features of FIGS. 1A-7 can be used as the winch reels described herein. In addition, the features described in FIG. 36 may be provided separately or in addition to any of the features described in FIGS. 33A-35. The stroller 3600 can include a stroller frame 3605. The stroller frame 3605 can include a front stroller frame 3615, a rear stroller frame 3610, and a handle. Each of the front stroller frame 3615 and rear stroller frame 3610 can include one or more wheels. The stroller 3600 can also include a seat bottom 3619 and a seat back 3621 for receiving a child thereon. In certain examples, the stroller 3600 can also include soft goods that cover all or a portion of the seat bottom 3619 and seat back 3621.

The stroller 3600 can also include a winch reel 3630. In one example, the winch reel 3630 is a one-way winch reel. The winch reel 3630 can be positioned on a cross-member 3622 extending from the front stroller frame 3615 to the rear stroller frame 3610 in certain example embodiments. Each of the front stroller frame 3615 and rear stroller frame 3610 can respectively include a front outer frame member 3626 and a front inner frame member 3627, and a rear outer frame member 3628 and a rear inner frame member 3629, that is slidably adjustable with respect to the corresponding front outer frame member 3626 or rear outer frame member 3628. The stroller 3600 can also include a first wire 3620 having a first end coupled to the winch reel 3630 and a distal second end coupled to the rear outer frame member 3628 of the rear stroller frame 3610. The stroller 3600 can also include a second wire 3625 having a first end coupled to the winch reel 3630 and a distal second end coupled to the front outer frame member 3626 of the front stroller frame 3625.

As the winch reel 3630 is rotated in a first direction, the first wire 3620 and the second wire 3625 are wound up on the take-up of the winch reel 3630, which creates tension in the first wire 3620 and the second wire 362, thus pulling the rear outer frame member 3628 of the rear stroller frame 3610 in Direction C and the front outer frame member 3626 of the front wheel frame 3615 in Direction A to raise the overall height of the stroller 3600. As the winch reel 3630 is rotated in a second direction or popped out to release the take-up of the winch reel 3630, a user can push the stroller 3600 downward, thus pushing the front outer frame member 3626 in Direction B and the rear outer frame member 3628 in Direction D. or the weight of the stroller 3600 itself can cause the first wire 3620 and the second wire 3625 to unwind from the take-up of the winch reel 3630, thus allowing the rear outer frame member 3628 to move in Direction D and the front outer frame member 3626 to move in Direction B.

FIGS. 37A-37D are various views of a stroller with a winch reel system for adjusting the seat bottom and seat back of the stroller seat from an upright position to a substantially flat position in accordance with one example embodiment of the disclosure. Any one or more of the winch reel systems and features of FIGS. 1A-7 can be used as the winch reels described herein. In addition, the features described in FIGS. 37A-37D may be provided separately or in addition to any of the features described in FIGS. 33A-36. The stroller 3700 can include a stroller frame 3705. The stroller frame 3705 can include a front stroller frame, a rear stroller frame, and a handle. Each of the front stroller frame and rear stroller frame can include one or more wheels. The stroller 3700 can also include a seat bottom 3710 and a seat back 3715 for receiving a child thereon. In certain examples, the stroller 3700 can also include soft goods that cover all or a portion of the seat bottom 3710 and seat back 3715. The seat bottom 3710 and seat back 3715 can be adjustable from a substantially upright position, as depicted in FIG. 37B, to a reclined position, as depicted in FIG. 37A.

To effect the recline operation, the stroller 3700 can also include a recline mechanism 3720 that includes an arcuate toothed pawl 3725 and a winch reel 3730 that is coupled to the seat bottom 3710 and/or the seat back 3715 and that engages the toothed pawl 3725. In one example, the winch reel 3730 is a two-way winch reel. As the winch reel 3730 is rotated in a first direction, the winch reel 3730 moves along the arcuate toothed pawl 3725 and causes the seat bottom 3710 to move in Direction A outwards from the stroller 3700 and the seat back 3715 to move in Direction C from an upright to a reclined position. As the winch reel 3730 is rotated in a second direction, the winch reel 3730 moves along the arcuate toothed pawl 3725 and causes the seat bottom 3710 to move in Direction B inwards towards the stroller 3700 and the seat back 3715 to move in Direction D from a reclined to an upright position. Although not depicted in FIGS. 37A-D, the recline mechanism 3720 may include at least one wire and a winch reel 3730 that is coupled to the seat bottom 3710 and/or the seat back 3715. In such an embodiment, the at least one wire has a first end coupled to the winch reel 3720 and a distal second end connected to the seat bottom 3710 and/or the seat back 3715 at an axis of rotation. The connection of the at least one wire to the axis of rotation of the seat bottom 3710 and/or the seat back 3715 provides additional inclination resistance in an upwards direction, which prevents the continued forward momentum of a child disposed within the stroller 3700 when the stroller 3700 hits a curb or other heightened surface and pitches forward.

FIGS. 38A-38E are perspective views of a stroller with winch reel system for adjusting the radius of the wheels of the stroller in accordance with one example embodiment of the disclosure. Any one or more of the winch reel systems and features of FIGS. 1A-7 can be used as the winch reels described herein. In addition, the features described in FIGS. 38A-38E may be provided separately or in addition to any of the features described in FIGS. 33A-37D. The stroller 3800 can include a stroller frame 3805. The stroller frame 3805 can include a front stroller frame 3810, a rear stroller frame 3815, and a handle. Each of the front stroller frame 3810 and the rear stroller frame 3815 can include one or more front wheels 3820A-B and one or more rear wheels 3825A-B respectively. The stroller 3800 can also include a seat bottom and a seat back for receiving a child thereon. In certain examples, the stroller 3800 can also include soft goods that cover all or a portion of the seat bottom and seat back.

Figure 38B:
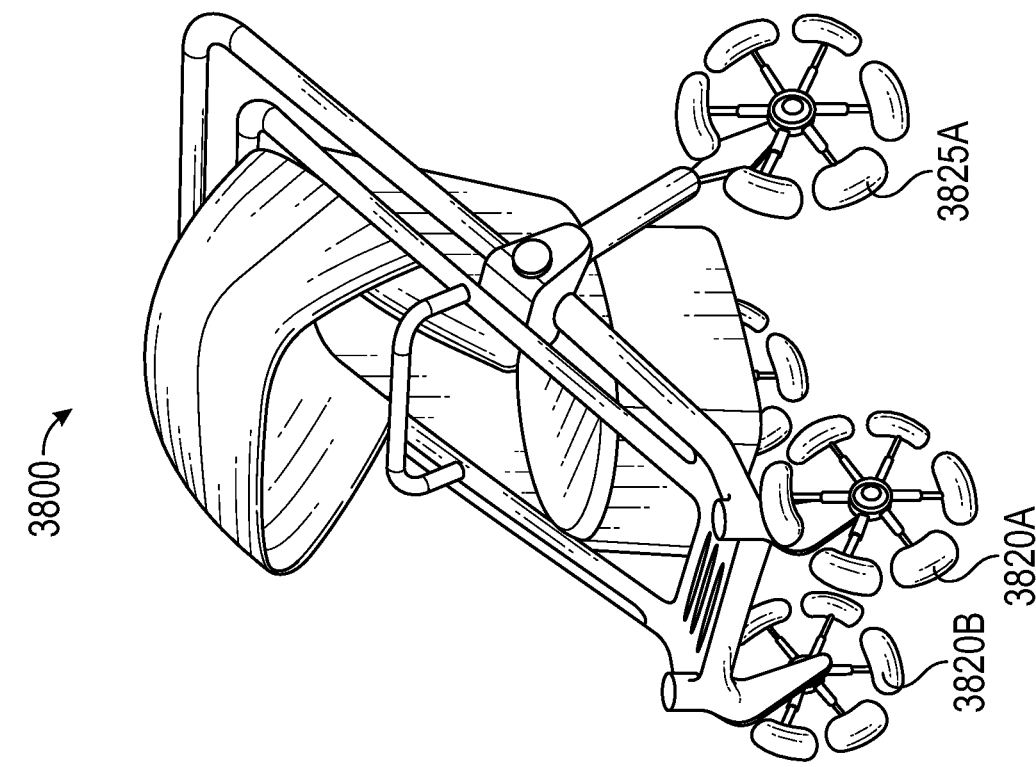
FIGS. 38A to 38E are perspective views of a stroller with a winch reel system for adjusting the radius of the wheels of the stroller in accordance with one example embodiment of the disclosure.
Figure 38A:
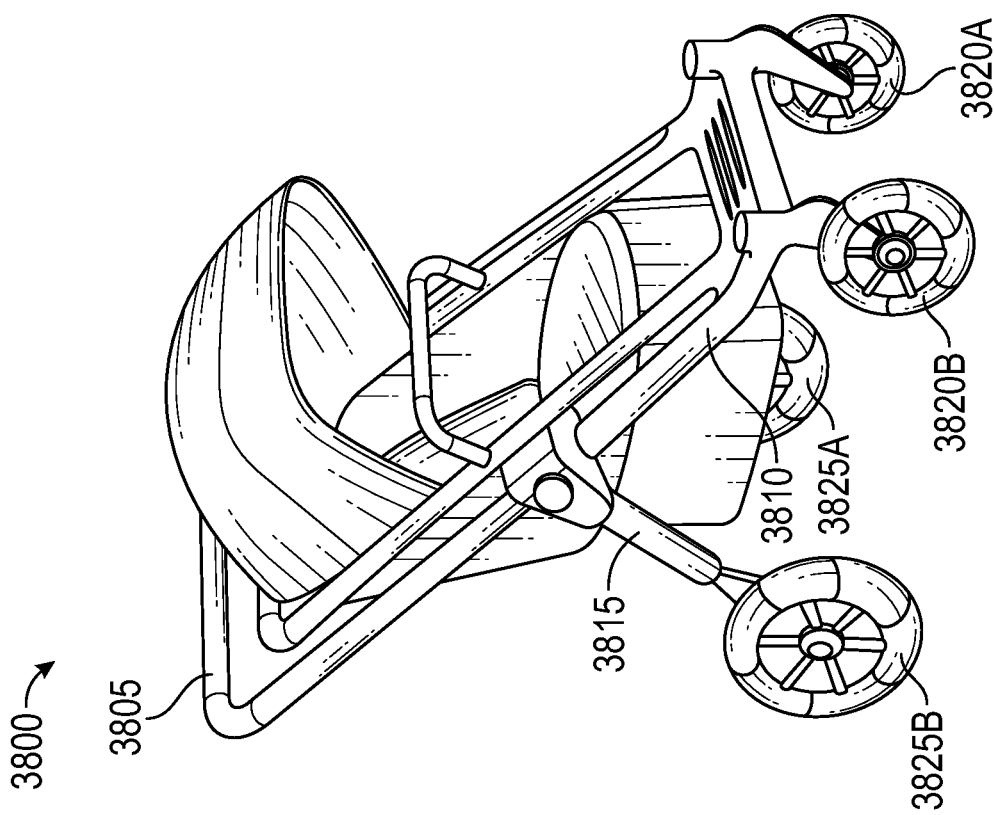
Figure 38E:
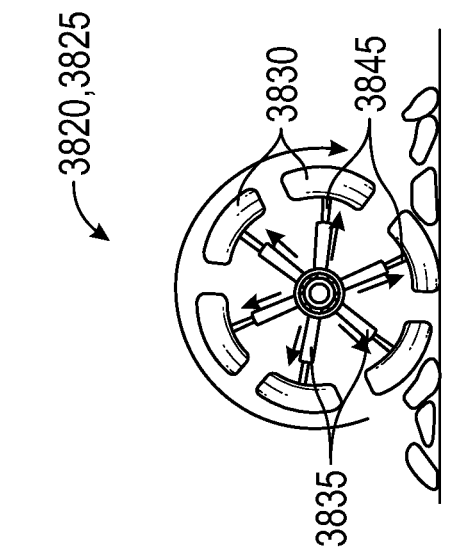
Figure 38D:
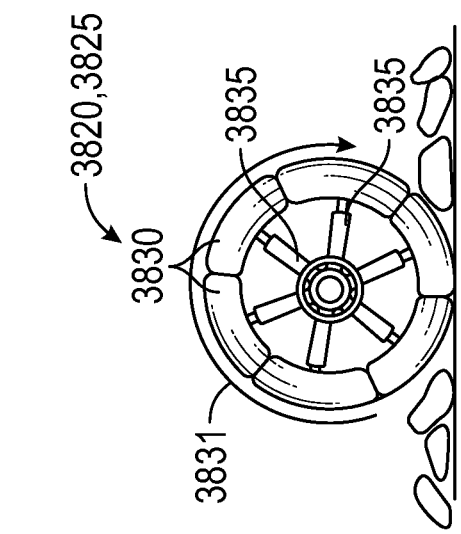
Figure 38C:
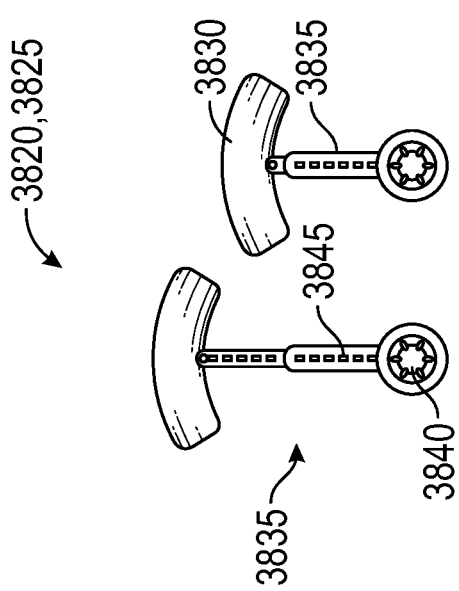

Each of the front wheels 3820A-B and the rear wheels 3825A-B can have an adjustable radius to change the overall circumference of each wheel based on the terrain that the stroller 3800 is being used on. To effect the change in the radius, each front wheel 3820A-B and each rear wheel 3825A-B can include multiple hub members 3830 coupled to respective adjustable spokes 3835 that extend to a center of the respective front wheel 3820A-B or the respective rear wheel 3825A-B. A flexible membrane 3831 can be disposed about the multiple hub members 3830 and can be configured to contact a ground surface. Each adjustable spoke 3835 can include a wire 3845 having a first end coupled to a central winch reel 3840 and a distal second end coupled to a respective one of the multiple hub members 3830. In one example, the central winch reel 3840 is a two-way winch reel. As the winch reel 3840 is rotated in a first direction, each of the wires 3845 for each hub member 3830 of one of the front wheels 3820A-B or one of the rear wheels 3825A-B are wound up on the take-up of the winch reel 3630, thus creating tension in each of the wires 3845 that extends radially outward from a first portion of the spoke 3835 with respect to a second portion of the spoke 3835. This tension serves to increase the overall length of each spoke 3835 and thus the radius of the overall front wheels 3820A-B or rear wheels 3825A-B as shown in FIG. 38E. As the winch reel 3840 is rotated in a second direction, each of the wires 3845 of each hub member 3830 are unwound from the take-up of the winch reel 3840, and the first portion of the spoke 3835 withdraws into a portion of the second portion of the spoke 3835, thus reducing the overall length of each spoke 3835 and the radius of the overall front wheels 3820A-B or rear wheels 3825A-B. In certain examples, each of the spokes 3835 can further include a spring to spring-bias the hub member 3830 radially outward to provide added suspension.

Figure 39B:
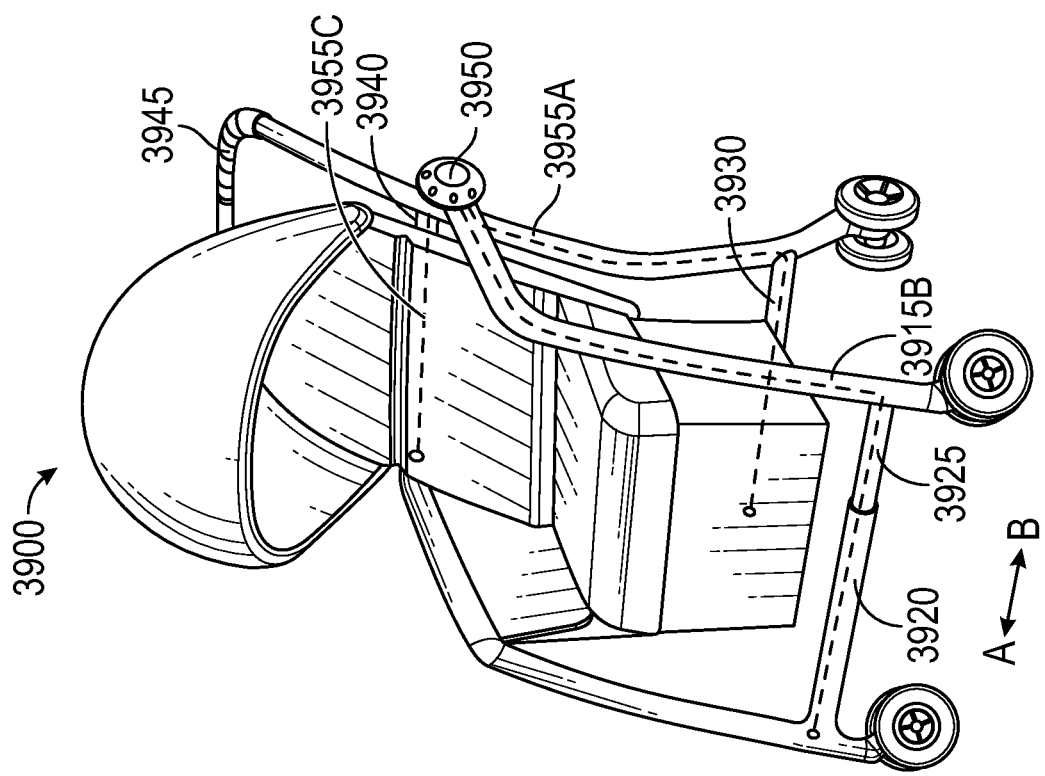
FIGS. 39A and 39B are perspective views of a stroller with a winch reel system for adjusting the width of the stroller frame in accordance with one example embodiment of the disclosure.
Figure 39A:
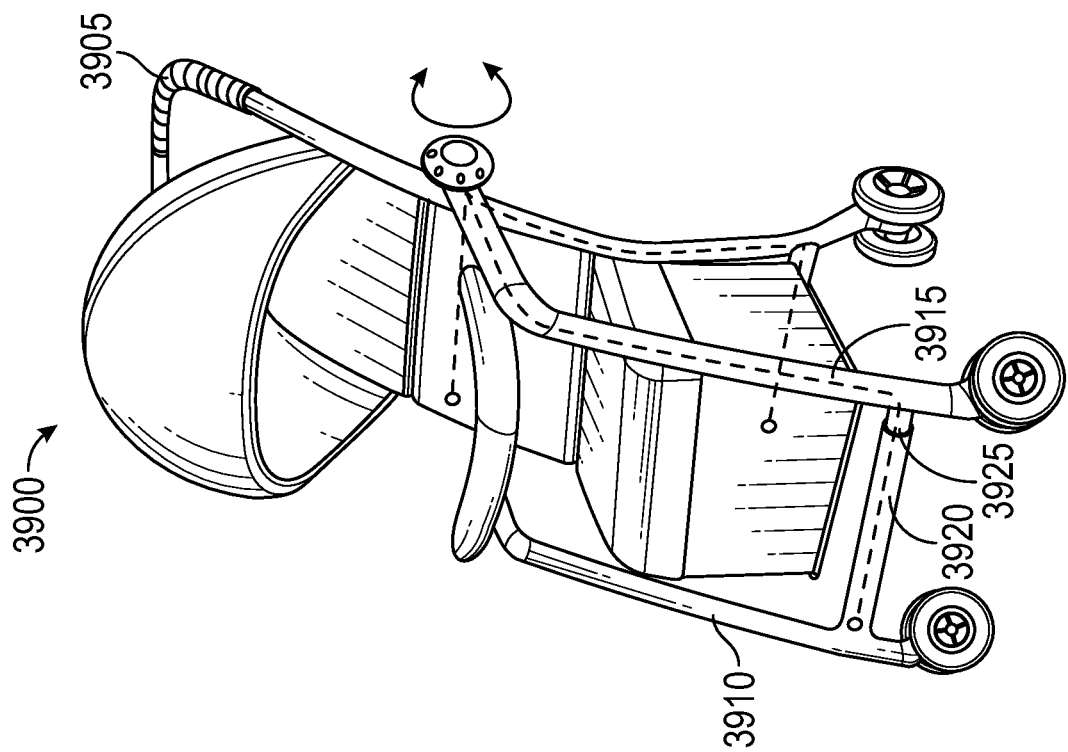

FIGS. 39A and 39B are perspective views of a stroller with a winch reel system for adjusting the width of the stroller frame in accordance with one example embodiment of the disclosure. Any one or more of the winch reel systems and features of FIGS. 1A-7 can be used as the winch reels described herein. In addition, the features described in FIGS. 39A and 39B may be provided separately or in addition to any of the features described in FIGS. 33A-38E. The stroller 3900 can include a stroller frame 3905. The stroller frame 3905 can include a front stroller frame, a rear stroller frame, and a handle 3945. Each of the front stroller frame and rear stroller frame can include one or more wheels. The stroller 3900 can also include a seat bottom and a seat back for receiving a child thereon. In certain examples, the stroller 3900 can also include soft goods that cover all or a portion of the seat bottom and seat back. In certain examples, the stroller frame 3905 includes a left side frame portion 3910 and a right side frame portion 3915. The right side frame portion 3915 includes a right rear cross member 3920 and a right front cross member 3925. The left side frame portion 3910 includes a left front cross member 3920 and a left rear cross member (not depicted), which are respectively slidably insertable into the right front cross member 3925 and the right rear cross member 3930, thus permitting the width of the stroller frame 3905 to be adjustable. In one example, each of the right rear cross member 3930, the right front cross member 3925, the left rear cross member, and the left front cross member 3920 are made of a mesh material. In certain examples, an upper cross member 3940 connects a right portion of the rear stroller frame to a left portion of the rear stroller frame, such that the upper cross member 3940 is substantially parallel to the handle 3945.

The stroller 3600 can also include a winch reel 3950. In one example, the winch reel 3650 is a two-way winch reel. The winch reel 3950 can be positioned on a lateral side of the right frame portion 3915, although alternatively it can be positioned along any other portion of the stroller 3900. The stroller 3900 can also include a first wire 3955A having a first end coupled to the winch reel 3950 and a distal second end coupled to the right rear cross member 3930 of the right side frame portion 3915. The stroller 3900 can also include a second wire 3955B having a first end coupled to the winch reel 3950 and a distal second end coupled to the right front cross member 3925 of the right side frame portion 3915. The stroller 3900 can also include a third wire 3955C having a first end coupled to the winch reel 3950 and a distal second end coupled to the upper cross member 3940. As the winch reel 3950 is rotated in a first direction, the first wire 3955A, the second wire 3955B, and the second wire 3955C are wound up on the take-up of the winch reel 3950, and tension is created in each of the first, second, and third wires 3955A-C to pull the left side frame portion 3910 in Direction B towards the right side frame portion 3915, thus reducing the overall width of the stroller 3900. As the winch reel 3950 is rotated in a second direction, each of the first, second, and third wires 3955A-C are unwound from the take-up of the winch reel 3950, thus causing the left side frame portion 3910 to move in Direction A away from the right side frame portion 3915 and increasing the overall width of the stroller 3900.

Figure 40:
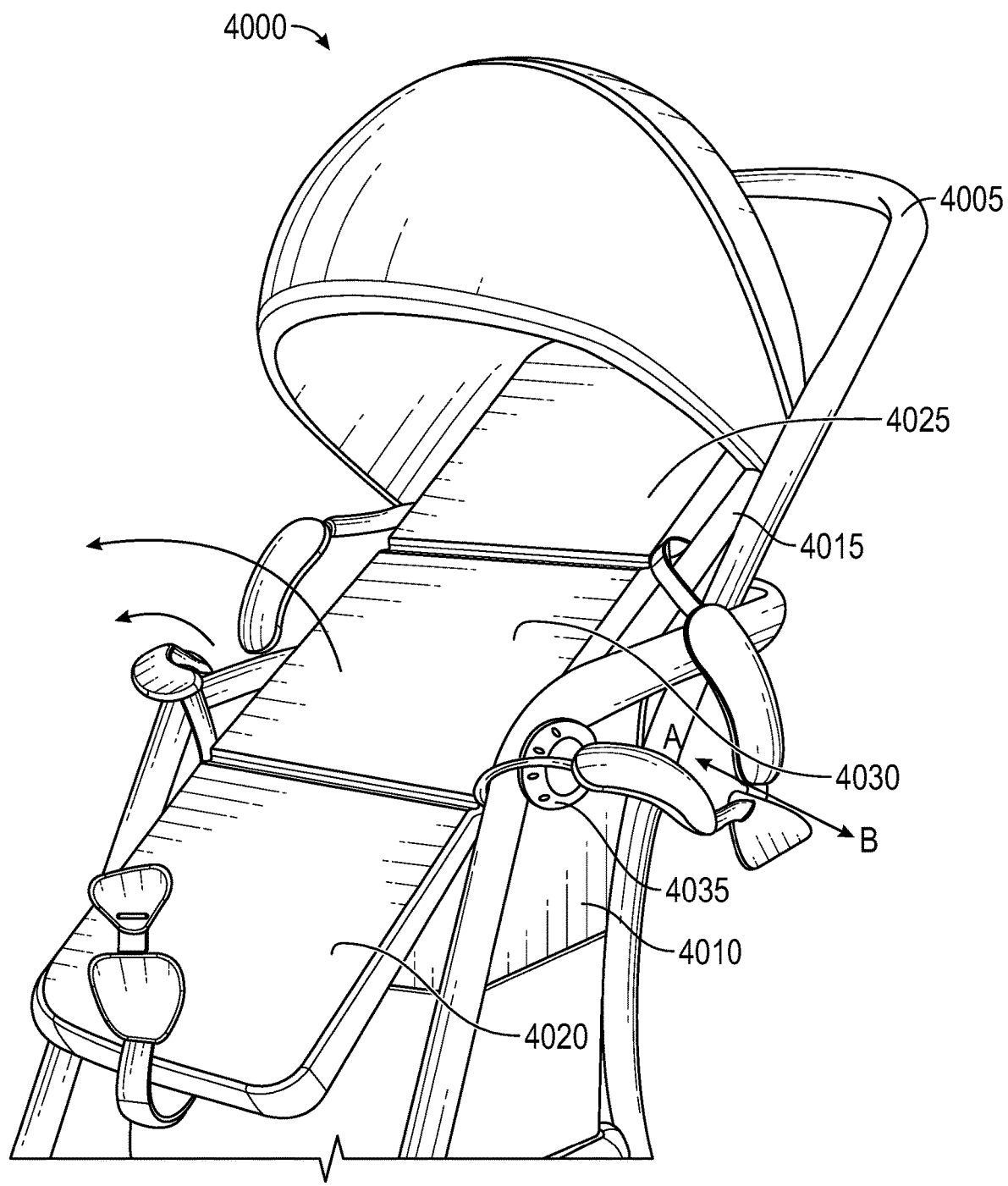
FIG. 40 is a perspective view of a stroller with a winch reel system for lifting the seat bottom of the stroller in accordance with one example embodiment of the disclosure.

FIG. 40 is a perspective view of a stroller with a winch reel system for lifting the seat bottom of the stroller in accordance with one example embodiment of the disclosure. Any one or more of the winch reel systems and features of FIGS. 1A-7 can be used as the winch reels described herein. In addition, the features described in FIG. 40 may be provided separately or in addition to any of the features described in FIGS. 33A-39B. The stroller 4000 can include a stroller frame 4005. The stroller frame 4005 can include a front stroller frame, a rear stroller frame, and a handle. Each of the front stroller frame and rear stroller frame can include one or more wheels. The stroller 4000 can also include a seat bottom 4010 and a seat back 4015 for receiving a child thereon. In certain examples, the stroller 4000 can also include soft goods that cover all or a portion of the seat bottom 4010 and seat back 4015. For example, the soft goods can include a seat bottom cushion panel 4030, a seat back cushion panel 4025, and a leg cushion panel 4020. The seat bottom cushion panel 4030 and the seat back cushion panel 4025 are configured to move with respect to one another.

The stroller 4000 can also include a winch reel 4035 and one or more wires. Each of the one or more wires can have a first end coupled to the winch reel 4035 and a distal second end coupled to the seat bottom cushion panel 4030. In one example, the winch reel 4035 is a one-way winch reel. As the winch reel 4035 is rotated in a first direction, each of the one or more wires are wound up on the take-up of the winch reel 4035, thus pulling the seat bottom cushion panel 4030 upward and away from the seat bottom 4010 in Direction A. This motion of the seat bottom cushion panel 4030 in Direction A also pulls a portion of the seat back cushion panel 4025 away from the seat back 4015. Moving the cushions out in this manner can assist with placing and/or removing a child from the stroller 4000. As the winch reel 4035 is rotated in a second direction or popped out to release the take-up of the winch reel 4035, a user can push on the seat back cushion panel 4025 and the seat bottom cushion panel 4030 to unwind each of the wires from the take-up of the winch reel 4035, or each of the wires can be automatically unwound from the take-up of the winch reel 4035, to allow the seat bottom cushion panel 4030 to move in Direction B towards the seat bottom 4010 and seat back 4015. This motion of the seat bottom cushion panel 4030 in Direction B also pushes a portion of the seat back cushion panel 4025 towards the seat back 4015.

Figure 41:
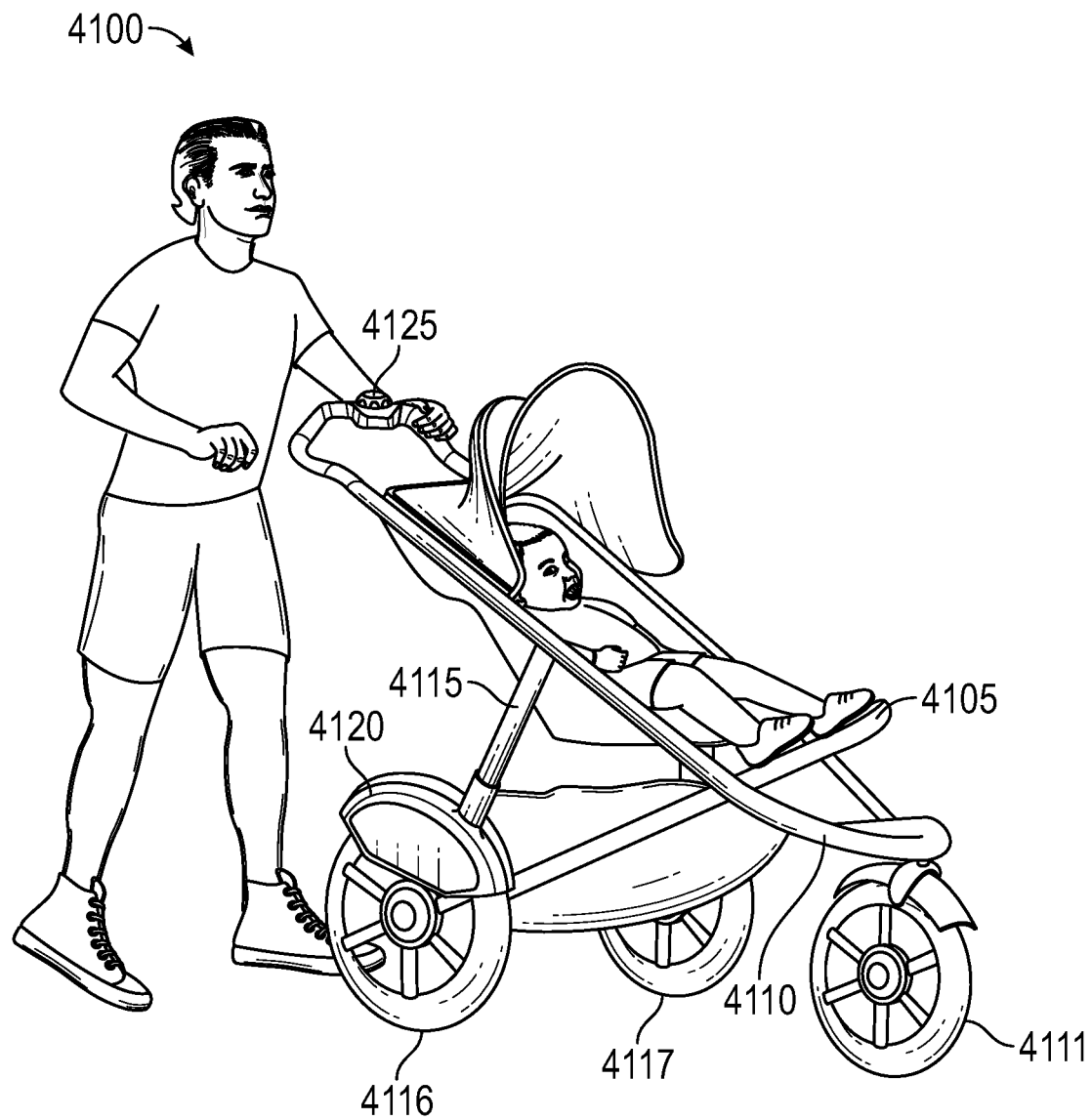
FIG. 41 is a perspective view of a stroller with a winch reel system for adjusting the resistance on one or more wheels of the stroller in accordance with one example embodiment of the disclosure.

FIG. 41 is a perspective view of a stroller with a winch reel system for adjusting the resistance on one or more wheels of the stroller in accordance with one example embodiment of the disclosure. Any one or more of the winch reel systems and features of FIGS. 1A-7 can be used as the winch reels described herein. In addition, the features described in FIG. 41 may be provided separately or in addition to any of the features described in FIGS. 33A-40. The stroller 4100 can include a stroller frame 4105. The stroller frame 4105 can include a front stroller frame 4110, a rear stroller frame 4115, and a handle. The front stroller frame 4110 can include a front wheel 4111. In some embodiments, the front stroller frame 4110 can include more than one front wheel. The rear stroller frame 4115 can include a first rear wheel 4116 and a second rear wheel 4117. The stroller 4100 can also include a seat bottom and a seat back for receiving a child thereon. In certain examples, the stroller 4100 can also include soft goods that cover all or a portion of the seat bottom and seat back.

The stroller 4100 can also include one or more tension brakes 4120 coupled to the front stroller frame 4110 or the rear stroller frame 4115, and each of the one or more tension brakes 4120 is configured to engage at least one of the front wheel 4111, the first rear wheel 4116, and the second rear wheel 4117. Each of the one or more tension brakes 4120 can be adjustable to provide a variety of tensions on each of the front wheel 4111, the first rear wheel 4116, and/or the second rear wheel 4117 as the stroller 4100 is being pushed by a caregiver. The stroller can also include a winch reel 4125. In one example, the winch reel 4125 is a two-way winch reel and can be positioned on the handle of the stroller 4100. The stroller 4100 can also include a wire having a first end coupled to the winch reel 4125 and a distal second end coupled to the tension brake 4120 engaged with the first rear wheel 4116. As the winch reel 4125 is rotated in a first direction, the wire is wound up on the take-up of the winch reel 4125, thus creating tension in the wire to increase the braking on the first rear wheel 4116 by the tension brake 4120. As the winch reel 4125 is rotated in a second direction, the wire is unwound from the take-up of the winch reel 4125, thus reducing the tension in the wire and reducing the braking on the first rear wheel 4116 by the tension brake. As such, a caregiver exercising with the stroller 4100 can quickly and easily adjust the brake tension on the stroller 4100 to fit their desired workout.

FIGS. 42A and 42B are perspective views of a stroller with a winch reel system for adjusting ventilation from open to closed in one or more soft goods cushions of the stroller seat in accordance with one example embodiment of the disclosure. Any one or more of the winch reel systems and features of FIGS. 1A-7 can be used as the winch reels described herein. In addition, the features described in FIGS.

42A and 42B may be provided separately or in addition to any of the features described in FIGS. 33A-41. The stroller 4200 can include a stroller frame 4205. The stroller frame 4205 can include a front stroller frame, a rear stroller frame, and a handle. Each of the front stroller frame and rear stroller frame can include one or more wheels 4208. The stroller 4200 can also include a seat bottom 4210 and a seat back 4207 for receiving a child thereon. In certain examples, the stroller 4200 can also include soft goods 4215 that cover all or a portion of the seat bottom 4210 and seat back 4207. In one example, the soft goods include slidable mesh panels over apertures through the seat bottom 4210 and seat back 4207.

In a first position 4235, the slidable mesh panels cover the apertures to prevent air flow through the seat bottom 4210 and seat back 4207. In a second position 4240, the openings in the slidable mesh panels align or substantially align with the apertures to allow air to flow through the seat bottom 4210 and seat back 4207. A winch reel 4220 can be coupled to a lateral side or other portion of the stroller 4200. Although not depicted in FIGS. 42A-42B, one or more wires can be coupled at a first end to the winch reel 4220 and at a distal second end to one or more of the slidable mesh panels. In one example, the winch reel 4220 is a two-way reel. As the winch reel 4220 is rotated in a first direction, the wires are wound up on the take-up of the winch reel 4220, and the mesh panels are moved with respect to their respective apertures from a closed configuration 4235 to an open configuration 4240, allowing air to pass through each aperture to provide additional ventilation and cooling capability for the stroller 4200. Slidable mesh panels 4215A in such an open configuration are depicted in FIG. 42B. As the winch reel 4220 is rotated in a second direction, the wires are unwound from the take-up of the winch reel 4220, and each slidable mesh panel is moved with respect to their respective apertures from an open configuration 4240 to a closed configuration 4235, thus blocking the respective apertures and preventing air from passing through the apertures in the seat bottom 4210 and seat back 4207.

Figure 43B:
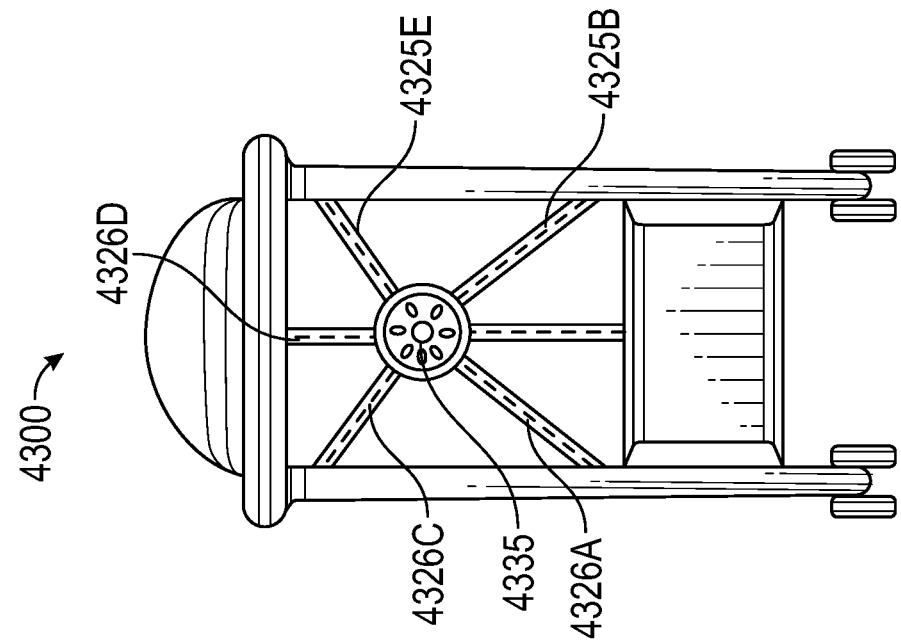
FIGS. 43A and 43B are respectively a perspective view and a rear elevation view of a stroller with a winch reel system for adjusting the tension of the soft goods of the stroller seat in accordance with one example embodiment of the disclosure.
Figure 43A:
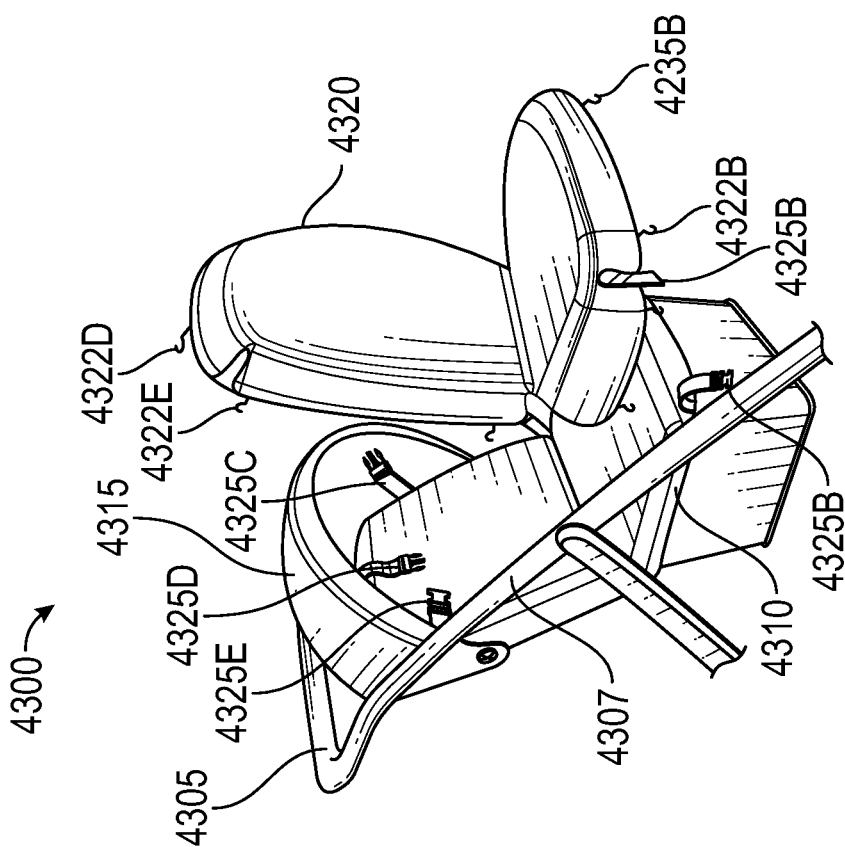

FIGS. 43A and 43B are perspective and rear elevation views of a stroller with winch reel system for adjusting the tension of the soft goods of the stroller seat in accordance with one example embodiment of the disclosure. Any one or more of the winch reel systems and features of FIGS. 1A-7 can be used as the winch reels described herein. In addition, the features described in FIGS. 43A and 43B may be provided separately or in addition to any of the features described in FIGS. 33A-42B. The stroller 4300 can include a stroller frame 4307. The stroller frame 4307 can include a front stroller frame, a rear stroller frame, and a handle 4305. Each of the front stroller frame and rear stroller frame can include one or more wheels. The stroller 4300 can also include a seat bottom 4310 and a seat back 4315 for receiving a child thereon. In certain examples, the stroller 4300 can also include soft goods 4320 that cover all or a portion of the seat bottom 4310 and seat back 4315. In one example, the soft goods 4320 are removably coupled to the seat bottom 4310 and the seat back 4315. The soft goods 4320 can include multiple hooks 4322A-E for coupling the soft goods 4320 to the seat bottom 4310 and seat back 4315. In one example, the hooks 4322A-E are directly coupled to the soft goods 4320. In another example, elastic material extends between the soft goods 4320 and each respective hook 4322A-E.

The seat bottom 4310 and seat back 4315 can include corresponding loops 4325A-E for coupling to the hooks 4322A-E. Each of the loops 4325A-E can be coupled to a corresponding wire 4326A-E, each wire 4326A-E having a first end coupled to a winch reel 4335 and a distal second end coupled to the corresponding loop 4325A-E. In one example, the winch reel 4335 is a one-way winch reel. As the winch reel 4335 is rotated in a first direction, the wires 4326A-E are wound up on the take-up of the winch reel 4335, and the tension in the wires 4326A-E pulls the soft goods 4320 tightly onto the seat bottom 4310 and seat back 4315 at the same time. As the winch reel 4335 is rotated in a second direction or popped out to release the take-up of the winch reel 4335, a user can pull the soft goods 4320 away from the seat bottom 4310 and seat back 4315 and remove the hooks 4322A-E from the corresponding loops 4325A-E.

Figure 44:
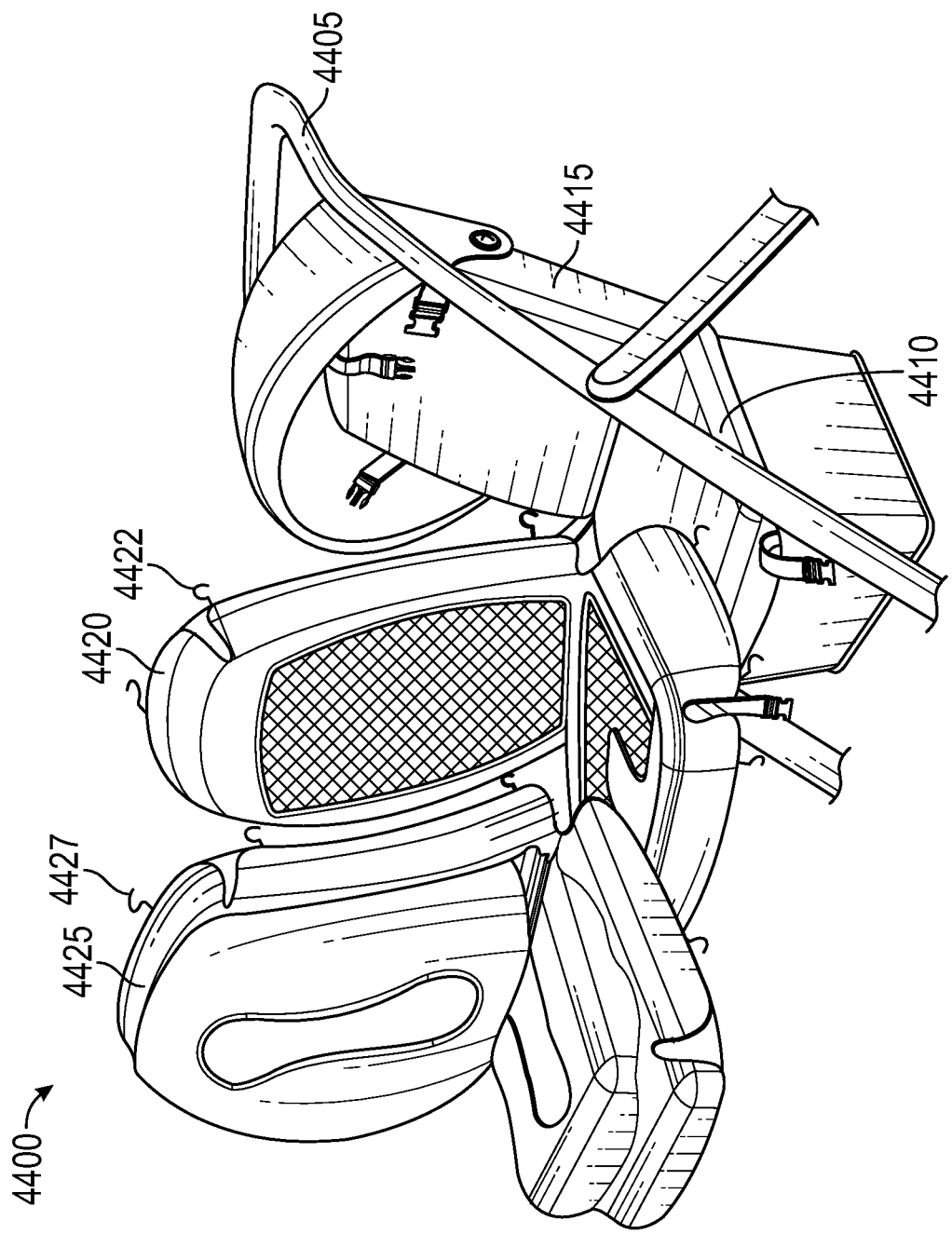
FIG. 44 is a perspective view of a stroller with a winch reel system for adjusting tension in additional padding optionally coupled to the stroller seat in accordance with one example embodiment of the disclosure.

FIG. 44 is a perspective view of a stroller with a winch reel system for adjusting tension in additional padding optionally coupled to the stroller seat in accordance with one example embodiment of the disclosure. Any one or more of the winch reel systems and features of FIGS. 1A-7 can be used as the winch reels described herein. In addition, the features described in FIG. 44 may be provided separately or in addition to any of the features described in FIGS. 33A-43B. The stroller 4400 can include a stroller frame 4405. The stroller frame 4405 can include a front stroller frame, a rear stroller frame, and a handle. Each of the front stroller frame and rear stroller frame can include one or more wheels. The stroller 4400 can also include a seat bottom 4410 and a seat back 4415 for receiving a child thereon. In certain examples, the stroller 4400 can also include first soft goods 4420 and second soft goods 4425 that cover all or a portion of the seat bottom 4410 and seat back 4415. In certain examples, the first soft goods 4420 may be configured to include types of padding for winter, while the second soft goods 4425 may be configured to include types of padding for summer. Each of the first soft goods 4420 and the second soft goods 4425 can include a first hook 4422 and a second hook 4427 respectively. In some embodiments, the first soft goods 4420 and the second soft goods 4425 can include more than one hook for each of the soft goods. The stroller 4400 can include one or more corresponding loops for receiving the hooks and a winch reel that can operate in substantially the same manner as that described in FIGS. 43A and 43B to couple and decouple the soft goods from the stroller.

Figure 45B:
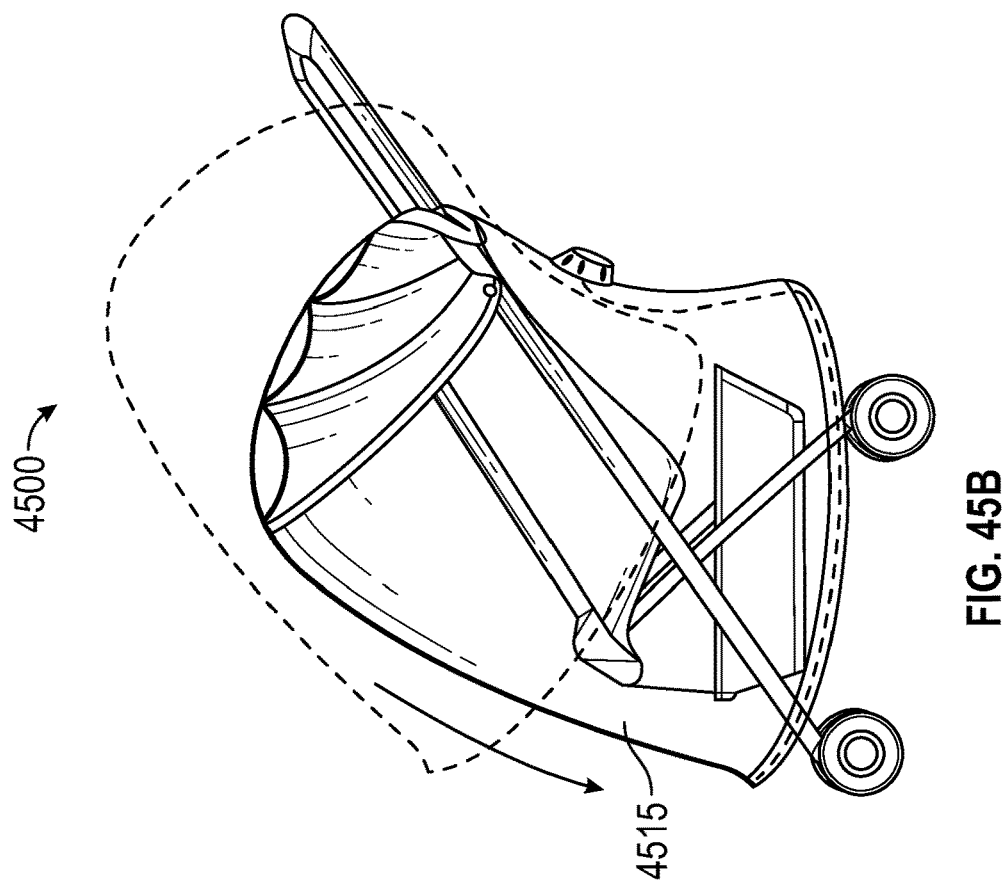
FIGS. 45A and 45B are perspective views of a stroller with rain cover that includes a winch reel system for adjusting the tension on an open end of the cover to tighten it to the stroller frame of the stroller in accordance with one example embodiment of the disclosure.
Figure 45A:
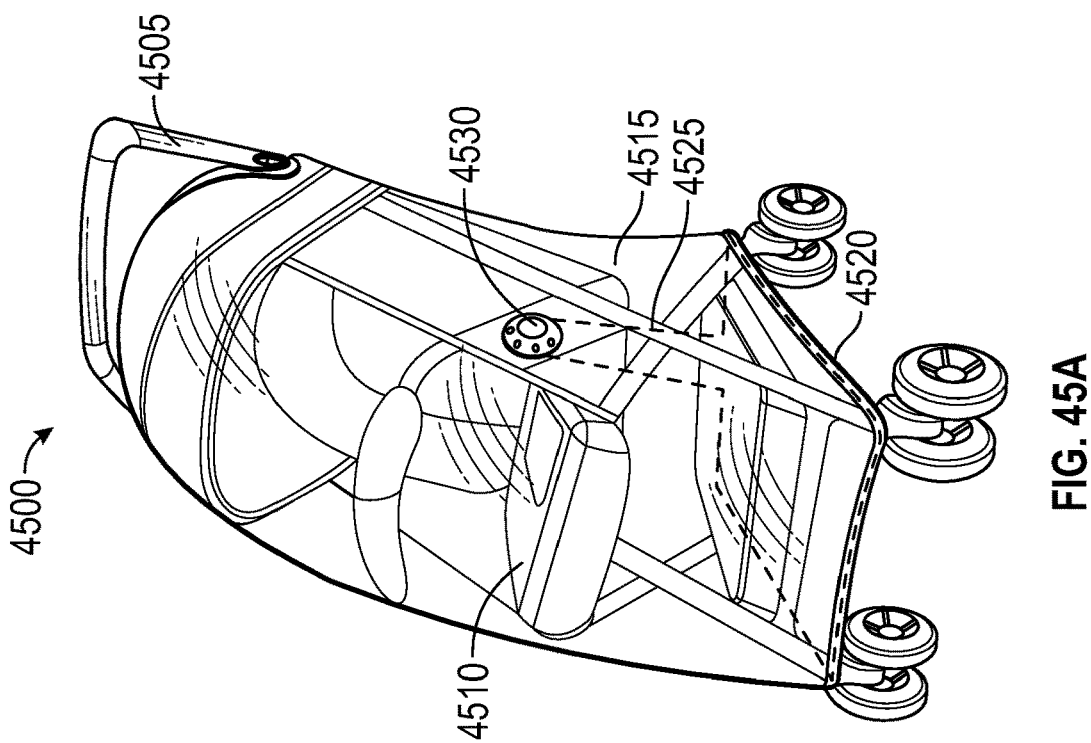

FIGS. 45A and 45B are perspective views of a stroller with a rain cover that includes a winch reel system for adjusting the tension on an open end of the cover to tighten it to the stroller frame of the stroller in accordance with one example embodiment of the disclosure. Any one or more of the winch reel systems and features of FIGS. 1A-7 can be used as the winch reels described herein. In addition, the features described in FIGS. 45A and 45B may be provided separately or in addition to any of the features described in FIGS. 33A-44. The stroller 4500 can include a stroller frame 4505. The stroller frame 4505 can include a front stroller frame, a rear stroller frame, and a handle. Each of the front stroller frame and rear stroller frame can include one or more wheels. The stroller 4500 can also include a seating section 4510 for receiving a child thereon. In certain examples, the stroller 4500 can also include soft goods that cover all or a portion of the seating area 4510. A rain cover 4515 may be sized and shaped to fit over the stroller frame 4505. The rain cover 4515 can include an open bottom end 4520 and a closed top end. The body of the rain cover 4515 can be made of plastic or another material that does not let water penetrate through the material.

A wire 4525 can extend along a channel along the perimeter of the open bottom end 4520 of the rain cover 4515 and can have a distal end coupled to a winch reel 4530. In one example, the winch reel 4530 is a one-way winch reel. As the winch reel 4530 is rotated in a first direction, the wire 4525 is wound up on the take-up of the winch reel 4530, and the tension in the wire 4525 pulls the perimeter of the open bottom end 4520 of the rain cover 4515 closed around the bottom end of the stroller frame 4505. As the winch reel 4530 is rotated in a second direction or popped out to release the take-up, a user can pull the perimeter of the open bottom end 4520 of the rain cover 4515 to loosen the rain cover 4515 from the stroller frame 4505 and remove the rain cover 4515 from the stroller 4500.

Figure 46B:
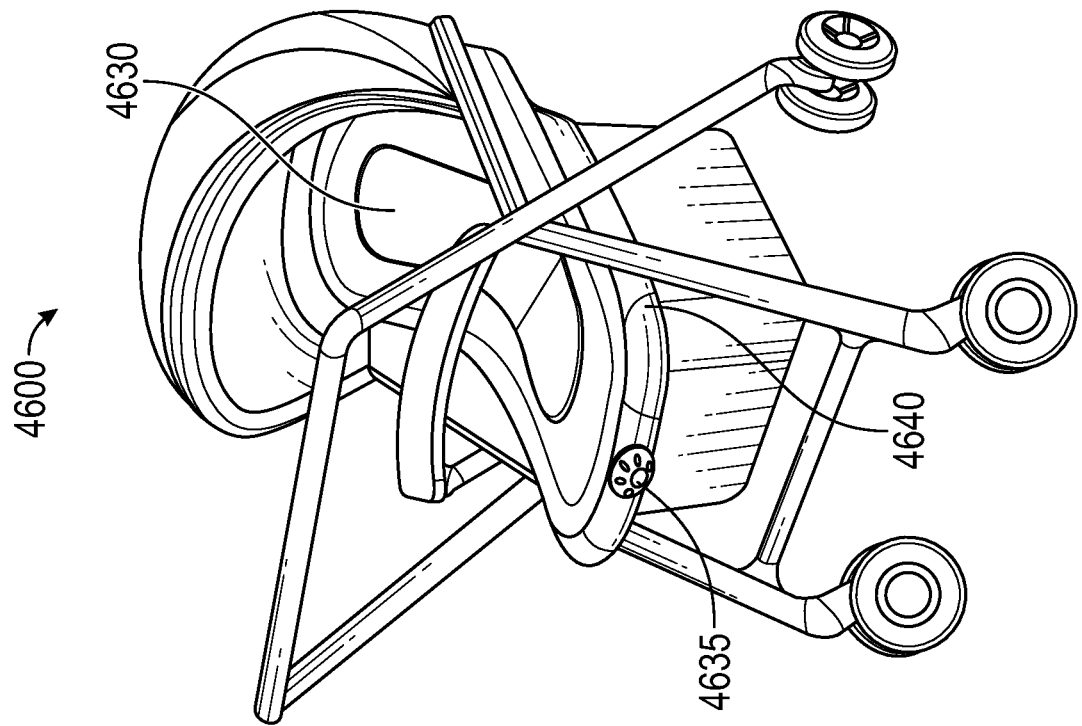
FIGS. 46A and 46B are perspective views of a stroller with a winch reel system for adjusting the tension of mosquito netting along the stroller frame of the stroller in accordance with one example embodiment of the disclosure.
Figure 46A:
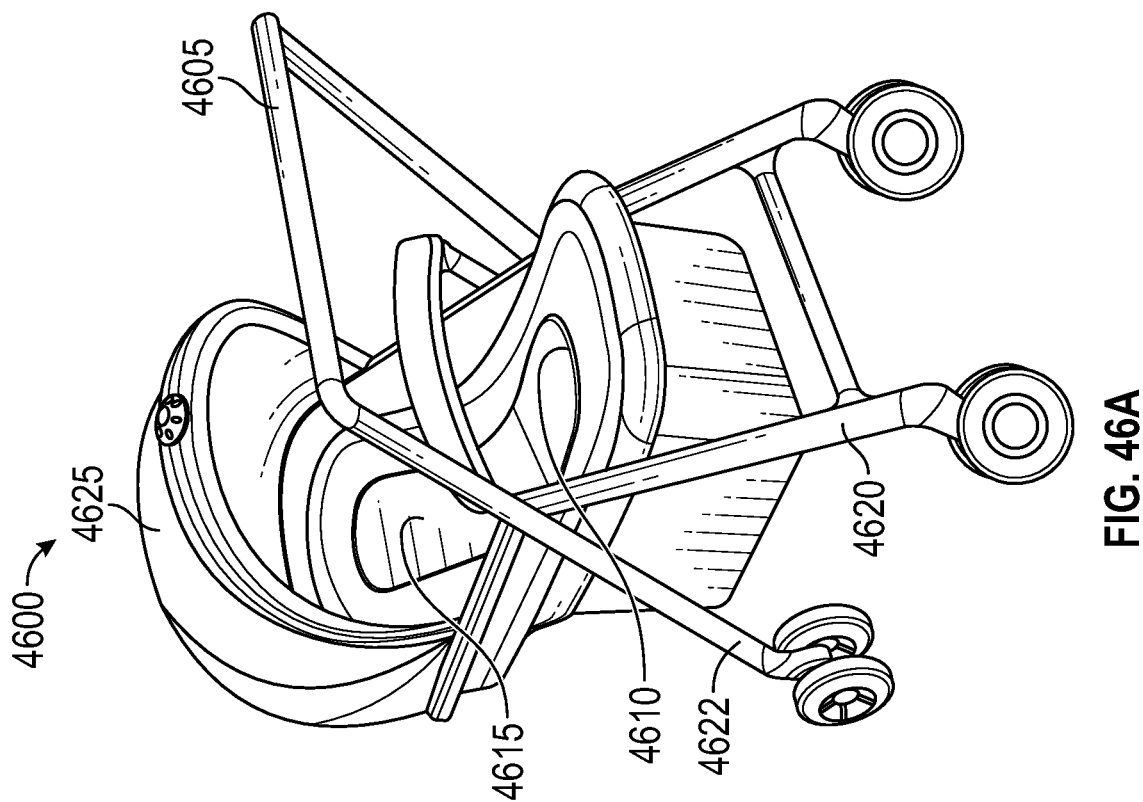

FIGS. 46A and 46B are perspective views of a stroller with a winch reel system for adjusting the tension of mosquito netting along the stroller frame of the stroller in accordance with one example embodiment of the disclosure. Any one or more of the winch reel systems and features of FIGS. 1A-7 can be used as the winch reels described herein. In addition, the features described in FIGS. 46A and 46B may be provided separately or in addition to any of the features described in FIGS. 33A-45B. The stroller 4600 can include a stroller frame 4605. The stroller frame 4605 can include a front stroller frame 4622, a rear stroller frame 4620, and a handle. Each of the front stroller frame 4622 and the rear stroller frame 4620 can include one or more wheels. The stroller 4600 can also include a seat bottom 4610 and a seat back 4615 for receiving a child thereon. In certain examples, the stroller 4600 can also include soft goods that cover all or a portion of the seat bottom 4610 and the seat back 4615.

The stroller 4600 can also include a canopy 4625 and a mosquito net 4630 movably coupled to the canopy 4625. The mosquito net 4630 can include a bottom perimeter edge and a wire 4640 disposed in a channel along the bottom perimeter edge. The body of the mosquito net 4630 can be made of mesh to allow air to flow through. A distal end of the wire 4640 can be coupled to a winch reel 4635. In one example, the winch reel 4635 is a one-way winch reel. When the mosquito net 4630 is rotated down to cover the seat bottom 4610 and the seat back 4615, the winch reel 4635 can be rotated in a first direction, thus causing the wire 4640 to be wound up on the take-up of the winch reel 4635. The tension in the wire 4640 pulls the bottom perimeter edge of the mosquito net 4630 closed around the exterior of the seat bottom 4610. As the winch reel 4635 is rotated in a second direction or popped out to release the take-up of the winch reel 4635, a user can pull the bottom perimeter edge of the mosquito net 4630 to loosen the mosquito net 4630 from the seat bottom 4610 and rotate the mosquito net 4630 back up towards the canopy 4625.

Figure 47B:
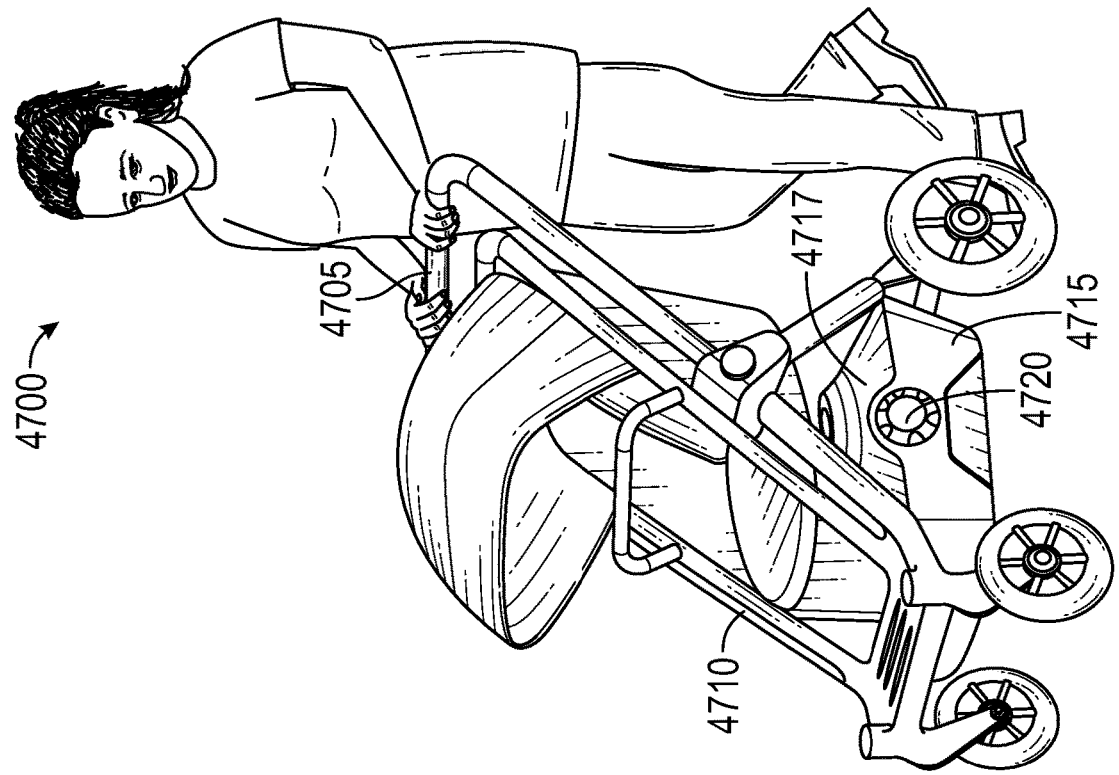
FIGS. 47A and 47B are perspective views of a stroller with a winch reel system for adjusting tension around an opening of a shopping container from open to closed in accordance with one example embodiment of the disclosure.
Figure 47A:
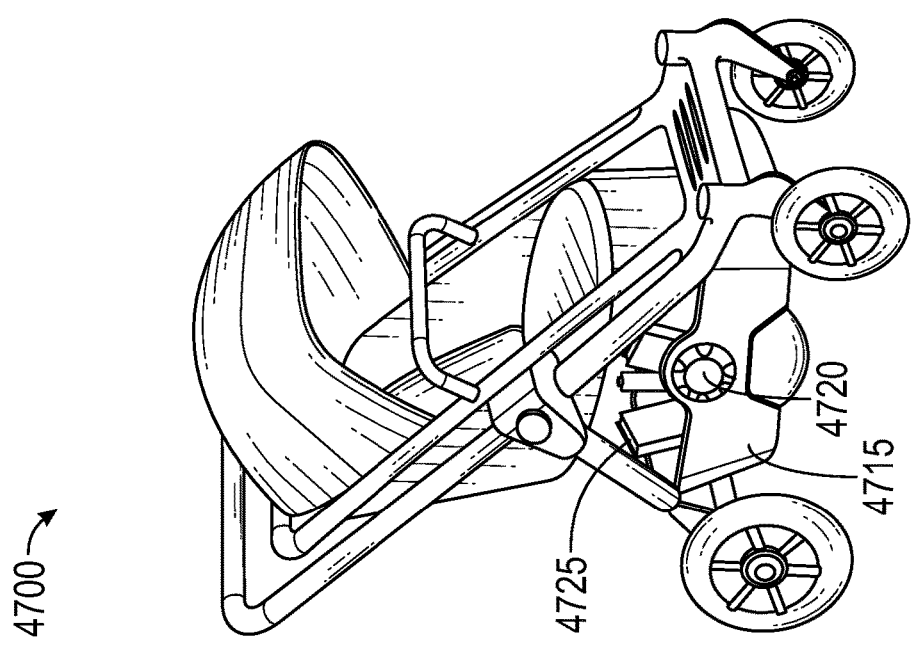

FIGS. 47A and 47B are perspective views of a stroller with winch reel system for adjusting tension around an opening of a shopping container from open to closed in accordance with one example embodiment of the disclosure. Any one or more of the winch reel systems and features of FIGS. 1A-7 can be used as the winch reels described herein. In addition, the features described in FIGS. 47A and 47B may be provided separately or in addition to any of the features described in FIGS. 33A-46B. The stroller 4700 can include a stroller frame 4705. The stroller frame 4705 can include a front stroller frame, a rear stroller frame, and a handle. Each of the front stroller frame and rear stroller frame can include one or more wheels. The stroller 4700 can also include a seating section 4710 for receiving a child thereon. The seating section 4710 can include a seat bottom and a seat back. In certain examples, the stroller 4700 can also include soft goods that cover all or a portion of the seating area 4710. A shopping container 4715 may be sized and shaped to fit below the seating section 4710 of the stroller 4700. In one example, the shopping container 4715 can be made of a flexible material. In another example, the shopping container 4715 can be made of plastic or another material. The shopping container 4715 can include an open top end 4717 and a closed bottom end.

A wire 4725 can extend along a channel along the perimeter of the open top end 4717 of the shopping container 4715 and can have a distal end coupled to a winch reel 4720. In one example, the winch reel 4720 is a one-way winch reel. As the winch reel 4720 is rotated in a first direction, the wire 4725 is wound up on the take-up of the winch reel 4530, and the tension in the wire 4525 pulls the perimeter of the open top end 4717 closed to prevent items within the shopping container from falling out. As the winch reel 4720 is rotated in a second direction or popped out to release the take-up of the winch reel 4720, a user can pull the perimeter of the open top end 4717 of the shopping container 4715 to loosen the open top end 4717 of the shopping container 4715 and open it up to access the interior of the shopping container 4715.

Figure 48B:
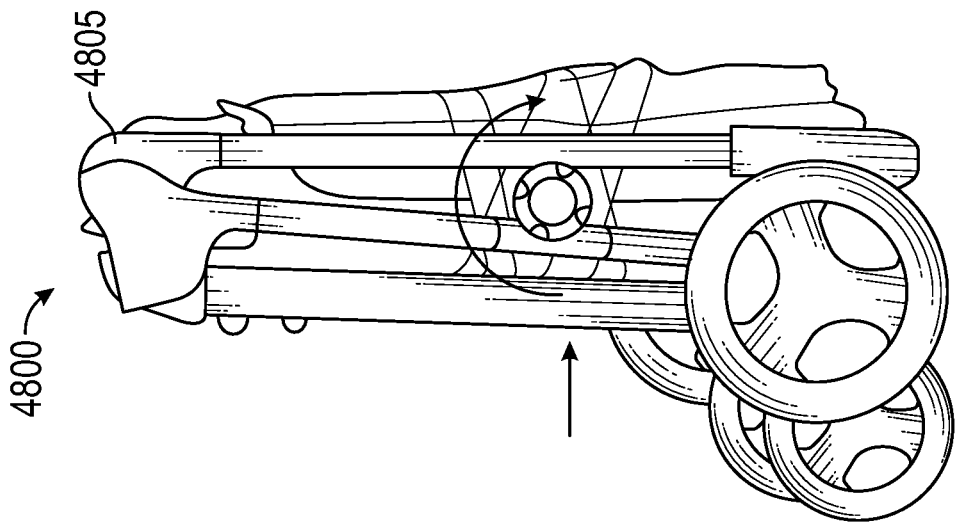
FIGS. 48A and 48B are side elevation views of a stroller with a winch reel system for adjusting the stroller into a fully collapsed position in accordance with one example embodiment of the disclosure.
Figure 48A:
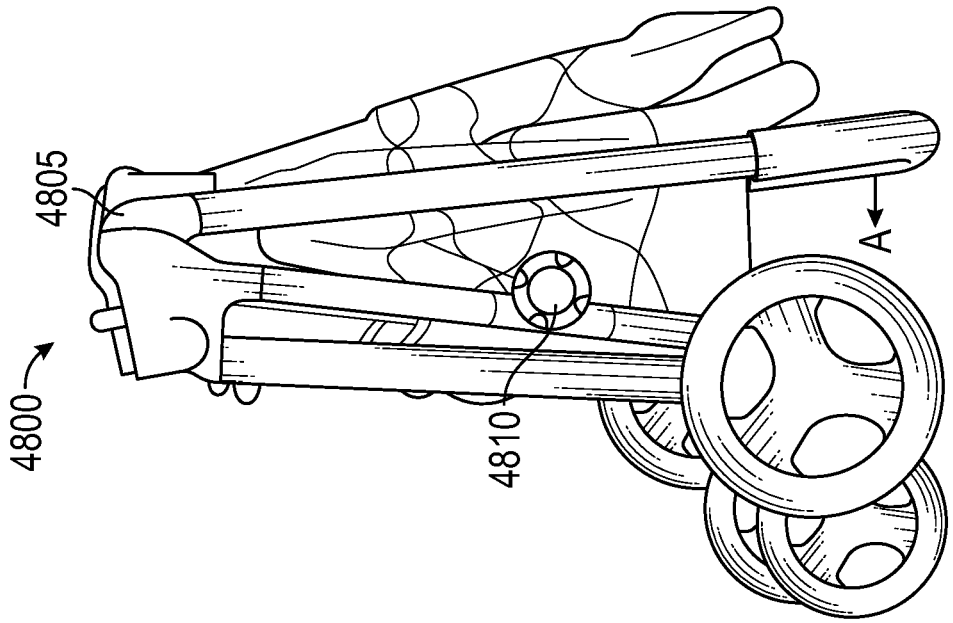

FIGS. 48A and 48B are side elevation views of a stroller with a winch reel system for adjusting the stroller into a fully collapsed position in accordance with one example embodiment of the disclosure. Any one or more of the winch reel systems and features of FIGS. 1A-7 can be used as the winch reels described herein. In addition, the features described in FIGS. 48A and 48B may be provided separately or in addition to any of the features described in FIGS. 33A-47B. The stroller 4800 can include a stroller frame 4805 and a winch reel 4810. The stroller 4800 can also include one or more wires coupled to frame members of the stroller frame 4805. When the stroller 4800 is folded for travel, such that a front portion of the stroller frame 4805 is moved in closer proximity with a back portion of the stroller frame 4805, the winch reel 4810 can be rotated in a first direction, as depicted in FIG. 48B, to further tighten the frame members of the stroller frame 4805 together.

Figure 49B:
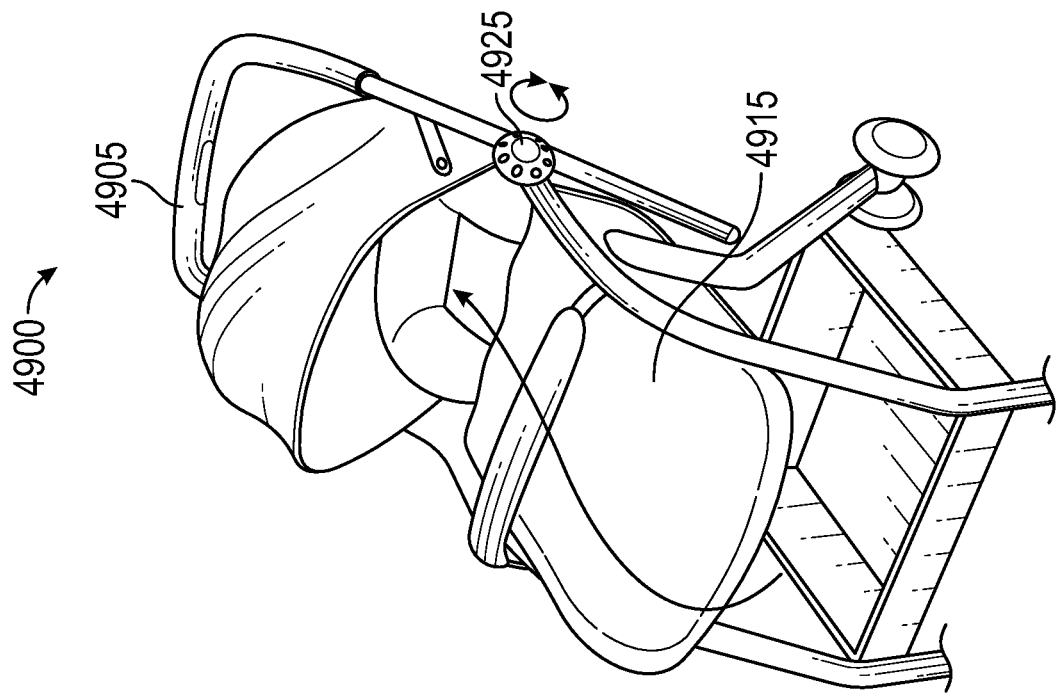
FIGS. 49A and 49B are perspective views of a stroller with a winch reel system for adjusting the position of a blanket or cover along the stroller seat in accordance with one example embodiment of the disclosure.
Figure 49A:
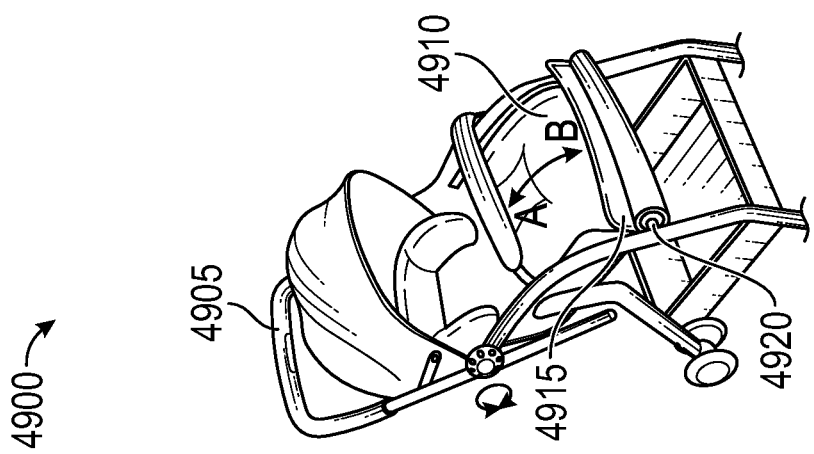

FIGS. 49A and 49B are perspective views of a stroller with a winch reel system for adjusting the position of a blanket or cover along the stroller seat in accordance with one example embodiment of the disclosure. Any one or more of the winch reel systems and features of FIGS. 1A-7 can be used as the winch reels described herein. In addition, features described in FIGS. 49A and 49B may be provided separately or in addition to any of the features described in FIGS. 33A-48B. The stroller 4900 can include a stroller frame 4905. The stroller frame 4905 can include a front stroller frame, a rear stroller frame, and a handle. Each of the front stroller frame and rear stroller frame can include one or more wheels. The stroller 4900 can also include a seat bottom 4910 and a seat back for receiving a child thereon. In certain examples, the stroller 4900 can also include soft goods that cover all or a portion of the seat bottom 4910 and the seat back.

In one example, the stroller 4900 can also include an adjustable blanket 4915 and a winch reel 4920 for rolling up and unrolling the adjustable blanket 4915 thereon. The adjustable blanket 4915 can be adjustable from a first position, in which the adjustable blanket 4915 is rolled up on the winch reel 4920, to a second position, in which the adjustable blanket 4915 covers all or a portion of a child along the seat bottom 4910 of the stroller 4900. A winch reel 4925 can be coupled to a lateral side or other portion of the stroller 4900. Although not depicted in FIGS. 49A-49B, one or more wires can each be coupled at one end to the winch reel 4925 and at a distal second end to the adjustable blanket 4915. In one example, the winch reel 4925 is a two-way reel. As the winch reel 4925 is rotated in a first direction, the one or more wires are wound up on the take-up of the winch reel 4925, and the adjustable blanket 4915 is moved in Direction A from the first position, as shown in FIG. 49A, to the second position, as shown in FIG. 49B. As the winch reel 4925 is rotated in a second direction, the one or more wires are unwound from the take-up of the winch reel 4925, and the adjustable blanket 4915 is moved in Direction B from the second position, as shown in FIG. 49B, to the first position, as shown in FIG. 49A.

Figure 50:
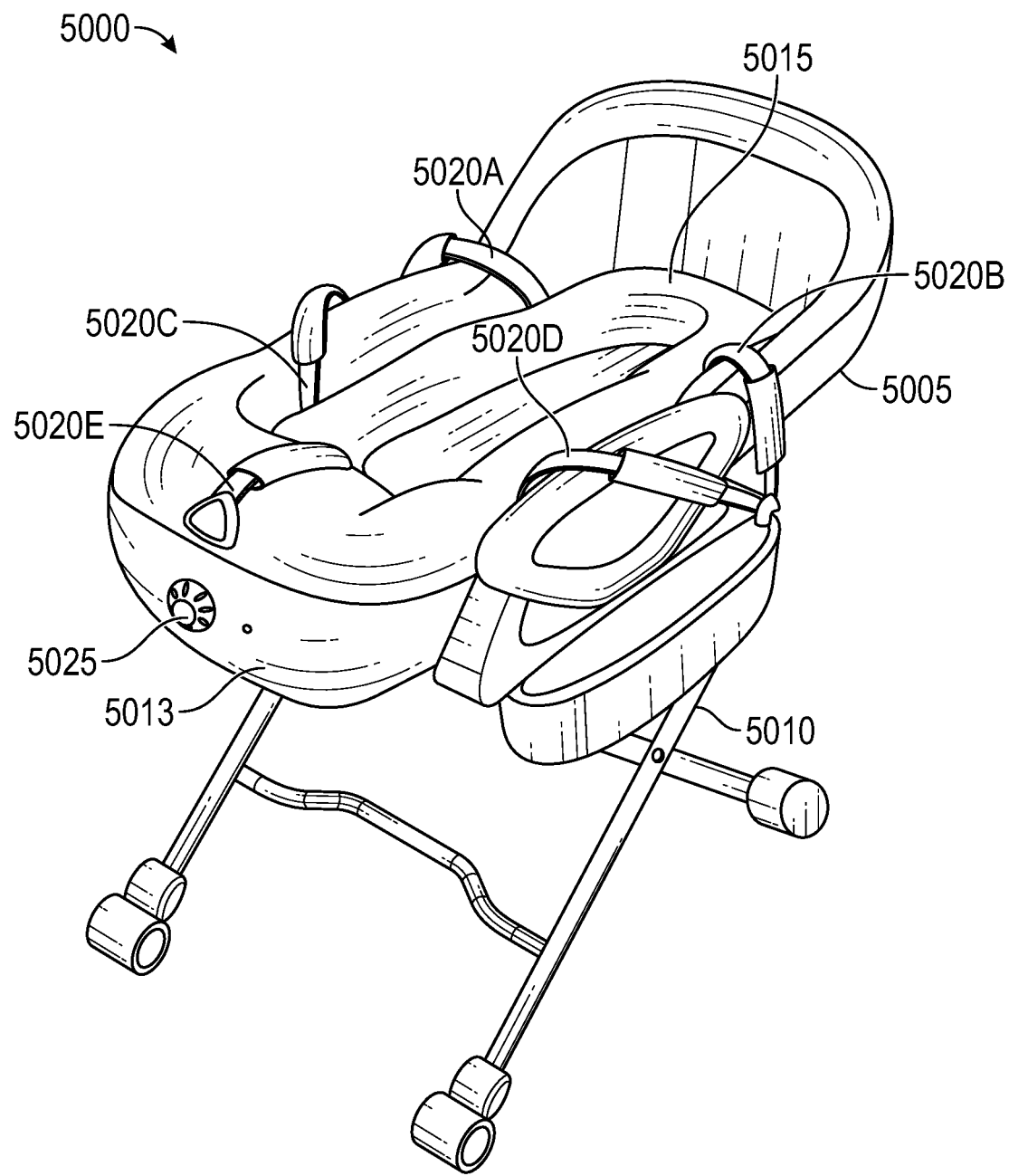
FIG. 50 is a perspective view of an infant rocker with a winch reel system for adjusting tension in a harness system of the rocker in accordance with one example embodiment of the disclosure.

FIG. 50 is a perspective view of an infant rocker with a winch reel system for adjusting tension in a harness system of the rocker in accordance with one example embodiment of the disclosure. Any one or more of the winch reel systems and features of FIGS. 1A-7 can be used as the winch reels described herein. A rocker 5000 can alternatively be a crib or a pedestal (hereinafter collectively referred to as a rocker). The rocker 5000 can include a rocker frame 5010 that supports a crib 5005. The crib 5005 can include an outer shell 5013 that surrounds or substantially surrounds a sleeping surface 5015. In one example, the outer shell 5013 can be made of plastic. The sleeping surface 5015 can include soft goods for providing a comfortable sleeping surface 5015 in the crib 5005. In certain examples, although not depicted in FIG. 50, the rocker 5000 can include a pedestal support that extends vertically or substantially vertically upward from the rocker frame 5010 to the crib 5005. The rocker 5000 can also include one or more harness straps 5020A-E to hold the child into the crib 5005. While five harness straps 5020A-E are shown, greater or fewer harness straps may be alternatively used.

The rocker 5000 can also include a winch reel 5025 positioned along a front end of the rocker 5000. In other embodiments, the winch reel 5025 can be positioned anywhere else along the rocker 5000. The winch reel 5025 can be directly or indirectly coupled to each of the harness straps 5020A-E. For example, although not depicted in FIG. 50, multiple wires may be provided, each having a first end coupled to the winch reel 5025 and a distal second end directly or indirectly coupled to one of the respective harness straps 5020A-E. In one example, the winch reel 5025 is a one-way winch reel. As the winch reel 5025 is rotated in a first direction, the multiple wires are wound up on the take-up of the winch reel 5025, and each harness strap 5020A-E is tightened at the same time. As the winch reel 5025 is rotated in a second direction or popped out to release the take-up of the winch reel 5025, a user can pull on one or more of the harness straps 5020A-E to unwind the wire from the take-up of the winch reel 5025, or the wire can be automatically unwound from the take-up of the winch reel 5025 to loosen the harness straps 5020A-E. In certain examples, although not depicted in FIG. 50, one or more of the harness straps 5020A-E can include tension indicators. The tension indicators can operate as described in FIG. 7 above and can provide a visual indication to the user when sufficient tension is in each of the harness straps 5020A-E.

Figure 51A:
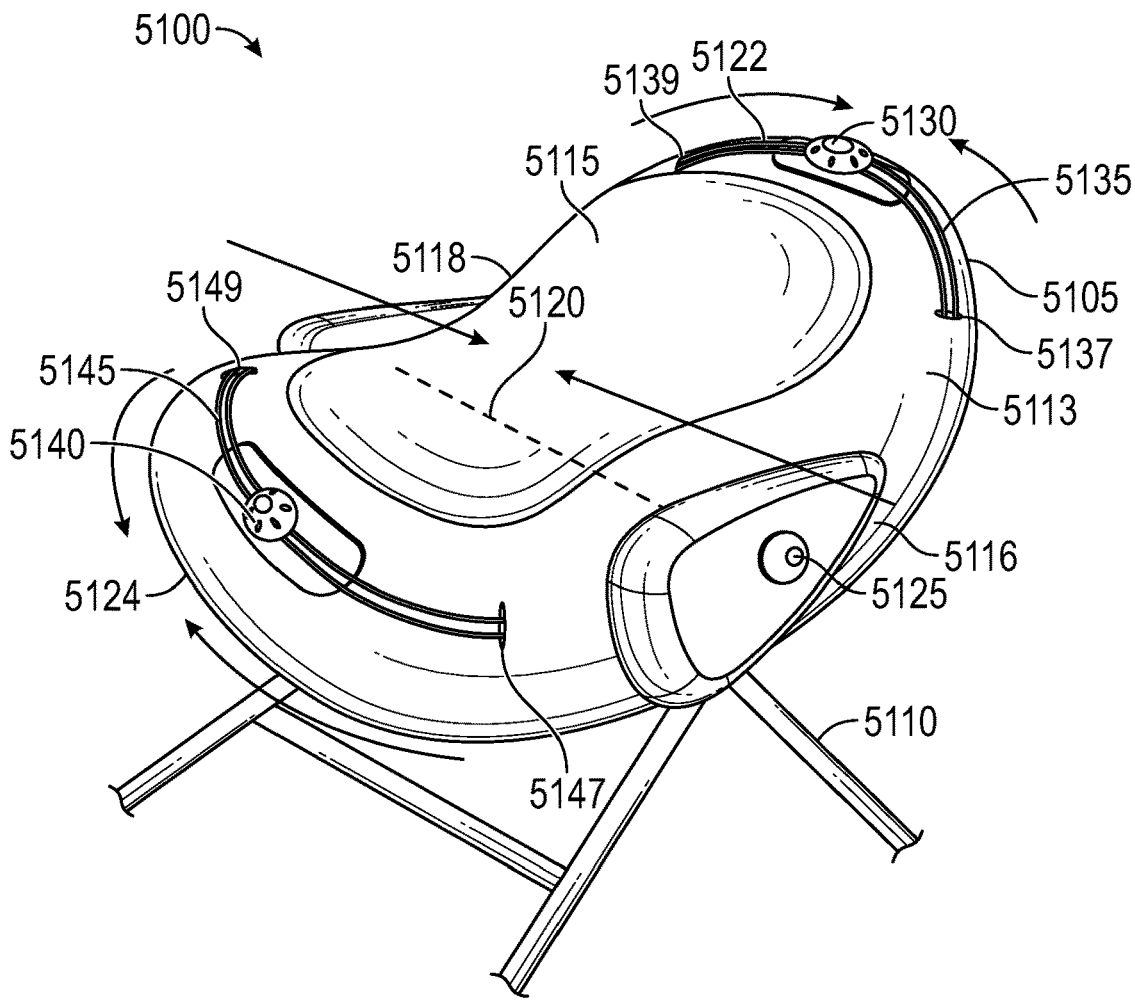
FIGS. 51A and 51B are respectively a perspective view and a top plan view of an infant rocker with a winch reel system for adjusting the width and length of the rocker seat in accordance with one example embodiment of the disclosure.
Figure 51B:
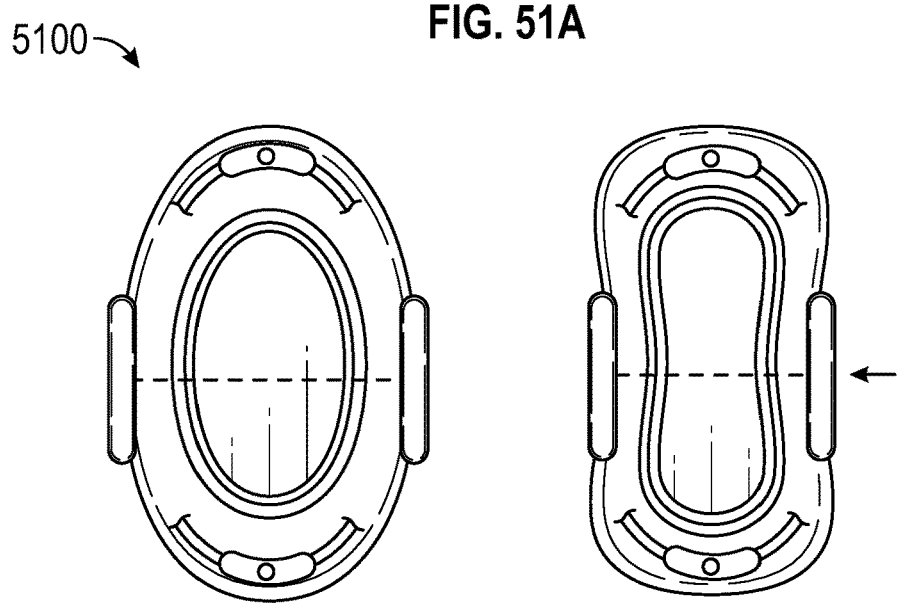

FIGS. 51A and 51B are perspective and top plan views of an infant rocker with a winch reel system for adjusting the width and length of the rocker seat in accordance with one example embodiment of the disclosure. Any one or more of the winch reel systems and features of FIGS. 1A-7 can be used as the winch reels described herein. In addition, the features described in FIGS. 51A and 51B may be provided separately or in addition to any of the features described in FIGS. 50A and 50B. The rocker 5100 can include a rocker frame 5110 that supports a crib 5105. The crib 5105 can include an outer shell 5113 that surrounds or substantially surrounds a sleeping surface 5115. In one example, the outer shell 5113 can be made of a pliable plastic that allows its dimensions to be adjusted and can include a head end 5122, a foot end 5124, a first lateral side 5116 and a second lateral side 5118. In one example, each of the first lateral side 5116 and the second lateral side 5118 can extend from the head end 5122 to the foot end 5124. The sleeping surface 5115 can include soft goods for providing a comfortable sleeping surface 5115 in the crib 5105. In certain examples, although not depicted in FIGS. 51A-B, the rocker 5100 can include a pedestal support that extends vertically or substantially vertically upward from the rocker frame 5110 to the crib 5105.

The rocker 5100 can also include multiple winch reels for adjusting the outer dimensions of the crib 5105. In one example, the rocker 5100 can include a first winch reel 5125 positioned along the first lateral side 5116 of the crib 5105. In other embodiments, the first winch reel 5125 can be positioned anywhere else along the rocker 5100. A first wire 5120 can have a first end coupled to the first winch reel 5125 and a distal second end directly or indirectly coupled to the second lateral side 5118 of the outer shell 5118. The first winch reel 5125 can thus be configured to adjust the overall width of the center section of the outer shell 5113 between the first lateral side 5116 and the second lateral side 5118, as shown in FIG. 51B. A second winch reel 5130 can be positioned along the head end 5122 of the outer shell 5113 in one example embodiment. A second wire 5135 can have a first end 5137 that extends from the head end 5122 towards the first lateral side 5116. The second wire 5135, or another wire, can also have a distal second end 5139 that extends from the head end 5122 towards the second lateral side 5118. The second winch reel 5130 can be configured to adjust the overall width and/or curvature of the head end 5122 of the outer shell 5113, as shown in FIG. 51B. A third winch reel 5140 can be positioned along the foot end 5124 of the outer shell 5113 in one example embodiment. A third wire 5145 can have a first end 5147 that extends from the foot end 5124 towards the first lateral side 5116. The third wire 5145, or another wire, can also have a distal second end 5149 that extends from the foot end 5124 towards the second lateral side 5118. The third winch reel 5140 can be configured to adjust the overall width and/or curvature of the foot end 5124 of the outer shell 5113 as shown in FIG. 51B. In one example, each of the first winch reel 5125, the second winch reel 5130, and the third winch reel 5140 are two-way winch reels. As each respective winch reel 5125, 5130, and 5140 is rotated in a first direction, each respective wire 5120, 5135, and 5145 is wound up on the take-up of each respective winch reel 5125, 5130, 5140 and the width of the portion of the outer shell 5113 that is adjacent to that respective winch reel 5125, 5130, 5140 is reduced. As each respective winch reel 5125, 5130, and 5140 is rotated in a second direction, each respective wire 5120, 5135, and 5145 is unwound from the take-up of each respective winch reel 5125, 5130, and 5140, and the width of the portion of the outer shell 5113 that is adjacent to that respective winch reel 5125, 5130, and 5140 is increased.

Figure 52A:
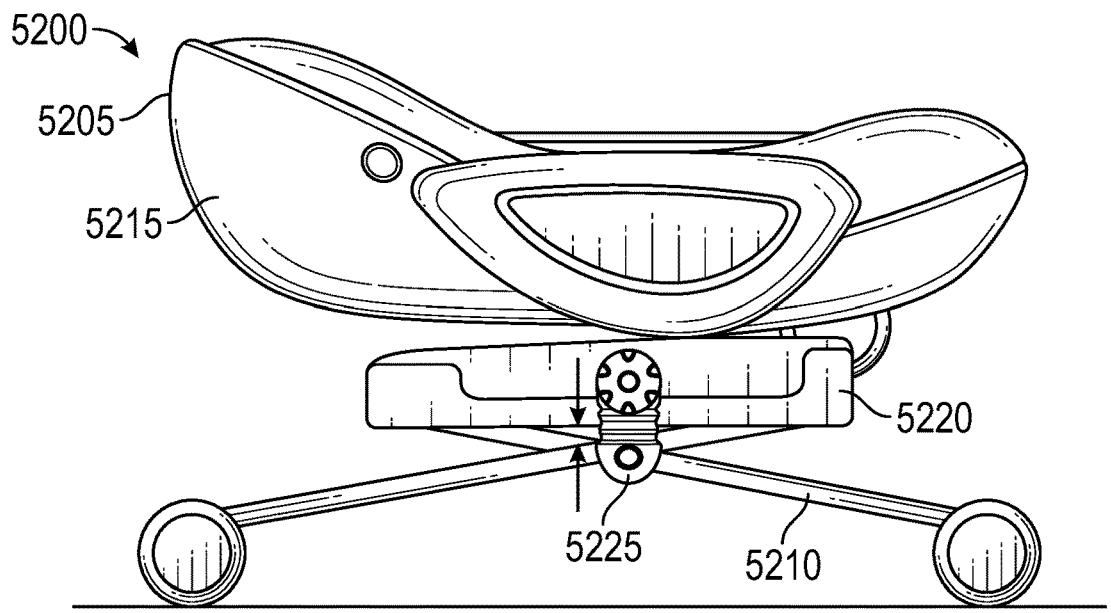
FIGS. 52A and 52B are side elevation views of an infant rocker with a winch reel system for adjusting the height of the rocker seat in accordance with one example embodiment of the disclosure.
Figure 52B:
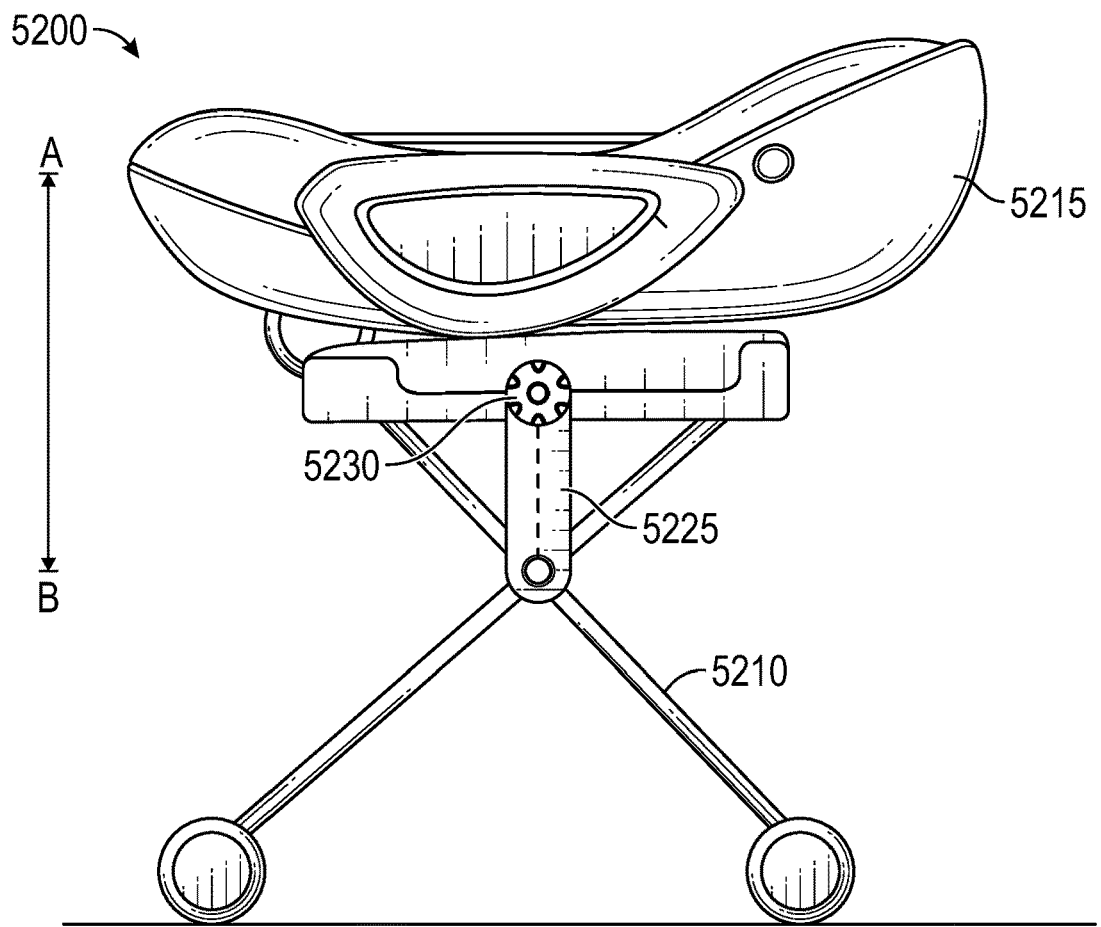

FIGS. 52A and 52B are side elevation views of an infant rocker with a winch reel system for adjusting the height of the rocker seat in accordance with one example embodiment of the disclosure. Any one or more of the winch reel systems and features of FIGS. 1A-7 can be used as the winch reels described herein. In addition, the features described in FIGS. 52A and 52B may be provided separately or in addition to any of the features described in FIGS. 50A-51B. The rocker 5200 can include a rocker frame 5210 that supports a crib 5205. The crib 5205 can include an outer shell 5215 that surrounds or substantially surrounds a sleeping surface. In one example, the outer shell 5215 can be made of plastic. The rocker 5200 can also include soft goods that cover all or a portion of the sleeping surface. In certain examples, although not depicted in FIGS. 51A-B, the rocker 5000 can include a pedestal support that extends vertically or substantially vertically upward from the rocker frame 5210 to the crib 5205.

The rocker 5200 can also include an adjustable extension member 5225. In one example, the adjustable extension member 5225 can have a first end coupled to a crib base 5220 and a second end coupled to the frame 5210. In other examples, the adjustable extension member 5225 can have the first end coupled directly to the outer shell 5215 of the crib 5205. In certain examples, the adjustable extension member 5225 is a toothed pawl 5225. The rocker 5200 can also include a ratcheting two-way winch reel 5230 that engages the toothed pawl 5225 to adjust the height of the crib 5205 from a floor surface. For example, as the winch reel 5230 is rotated in a first direction, the toothed pawl 5225 is moved in Direction B by the winch reel 5230 to extend the length of the toothed pawl 5225 between the winch reel 5230 and the rocker frame 5210, thereby increasing the overall height of the crib 5205, as shown in FIG. 52B. Turning the winch reel 5230 in a second direction causes the toothed pawl 5225 to move in Direction A to reduce the length of the toothed pawl 5225 between the winch reel 5230 and the rocker frame 5210, thereby reducing the height of the crib 5205, as shown in FIG. 52A.

Figure 53A:
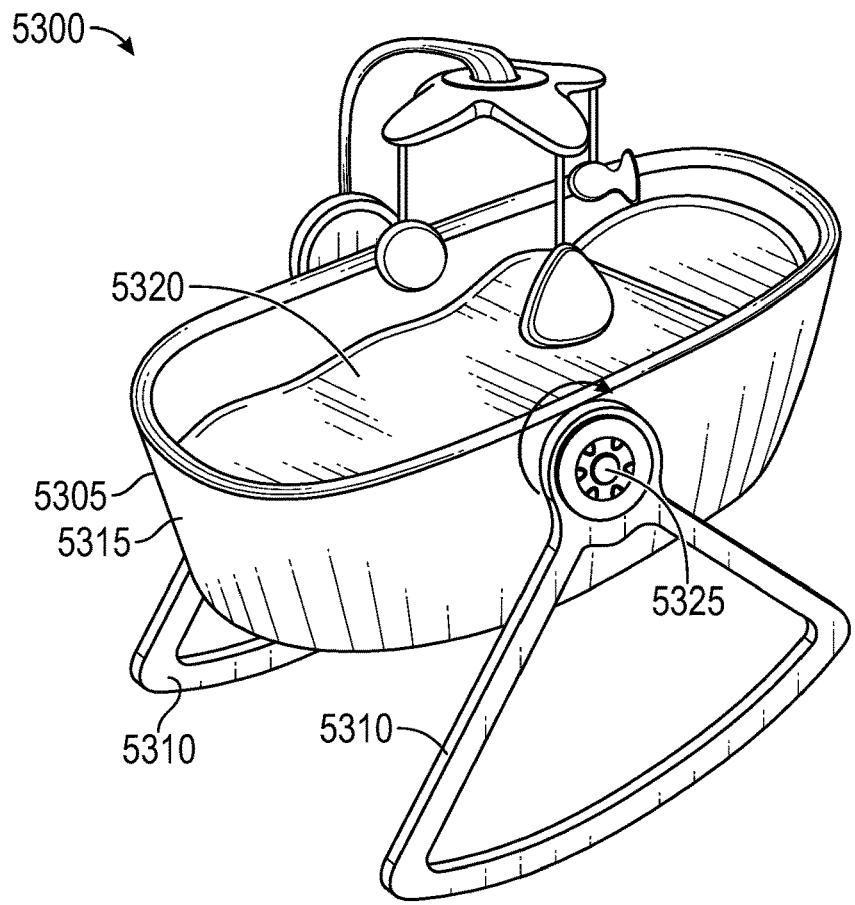
FIGS. 53A and 53B are respectively a perspective view and a side elevation view of an infant rocker with a winch reel system for adjusting the tilt of the rocker seat in accordance with one example embodiment of the disclosure.
Figure 53B:
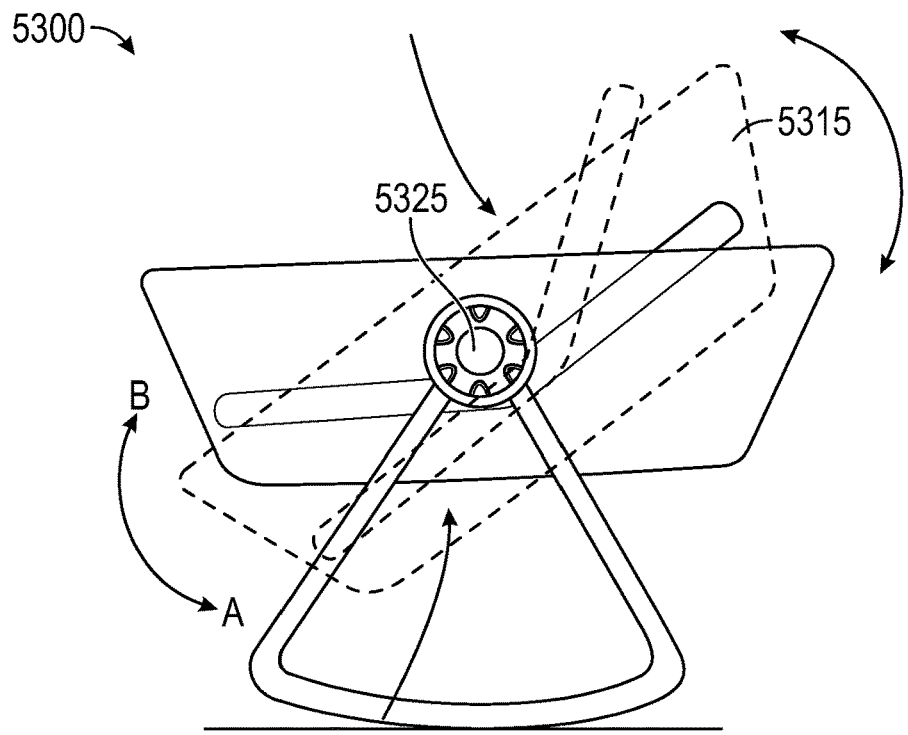

FIGS. 53A and 53B are perspective and side elevation views of an infant rocker with a winch reel system for adjusting the tilt of the rocker seat in accordance with one example embodiment of the disclosure. Any one or more of the winch reel systems and features of FIGS. 1A-7 can be used as the winch reels described herein. In addition, the features described in FIGS. 53A and 53B may be provided separately or in addition to any of the features described in FIGS. 50A-52B. The rocker 5300 can include a rocker frame 5310 that supports a crib 5305. The crib 5305 can include an outer shell 5315 that surrounds or substantially surrounds a sleeping surface 5320. In one example, the outer shell 5315 can be made of plastic. In certain examples, although not shown in FIGS. 53A-B, the rocker 5300 can include a pedestal support that extends vertically or substantially vertically upward from the rocker frame 5310 to the crib 5305. The rocker 5300 can also include soft goods that cover all or a portion of the sleeping surface 5320. The sleeping surface 5320 can include a seat bottom and a seat back. Each of the seat bottom and seat back, along with the outer shell 5315 of the crib 5305, can be rotatable with respect to the rocker frame 5310 in Directions A and B.

The rocker 5300 can also include a winch reel 5325 coupled to the outer shell 5315 and/or another portion of the crib 5305 to rotatably adjust the angle of the crib 5305 with respect to the rocker frame 5310. In one example, the winch reel 5325 is a two-way winch reel. As the winch reel 5325 is rotated in a first direction, the crib 5305, including the outer shell 5315 and the sleeping surface 5320, are rotated in Direction A with respect to the rocker frame 5310, as shown in FIG. 53B, to an inclined seat position, where the seat bottom is substantially horizontal and the seat back is angled upward, such as between 20 to 50 degrees, to place a child in a substantially upright position. As the winch reel 5325 is rotated in a second direction, the crib 5305, including the outer shell 5315 and the sleeping surface 5320, are rotated in Direction B with respect to the rocker frame 5310, as shown in FIG. 53B, to a flat seat position where both the seat bottom and the seat back are substantially horizontal.

Figure 54:
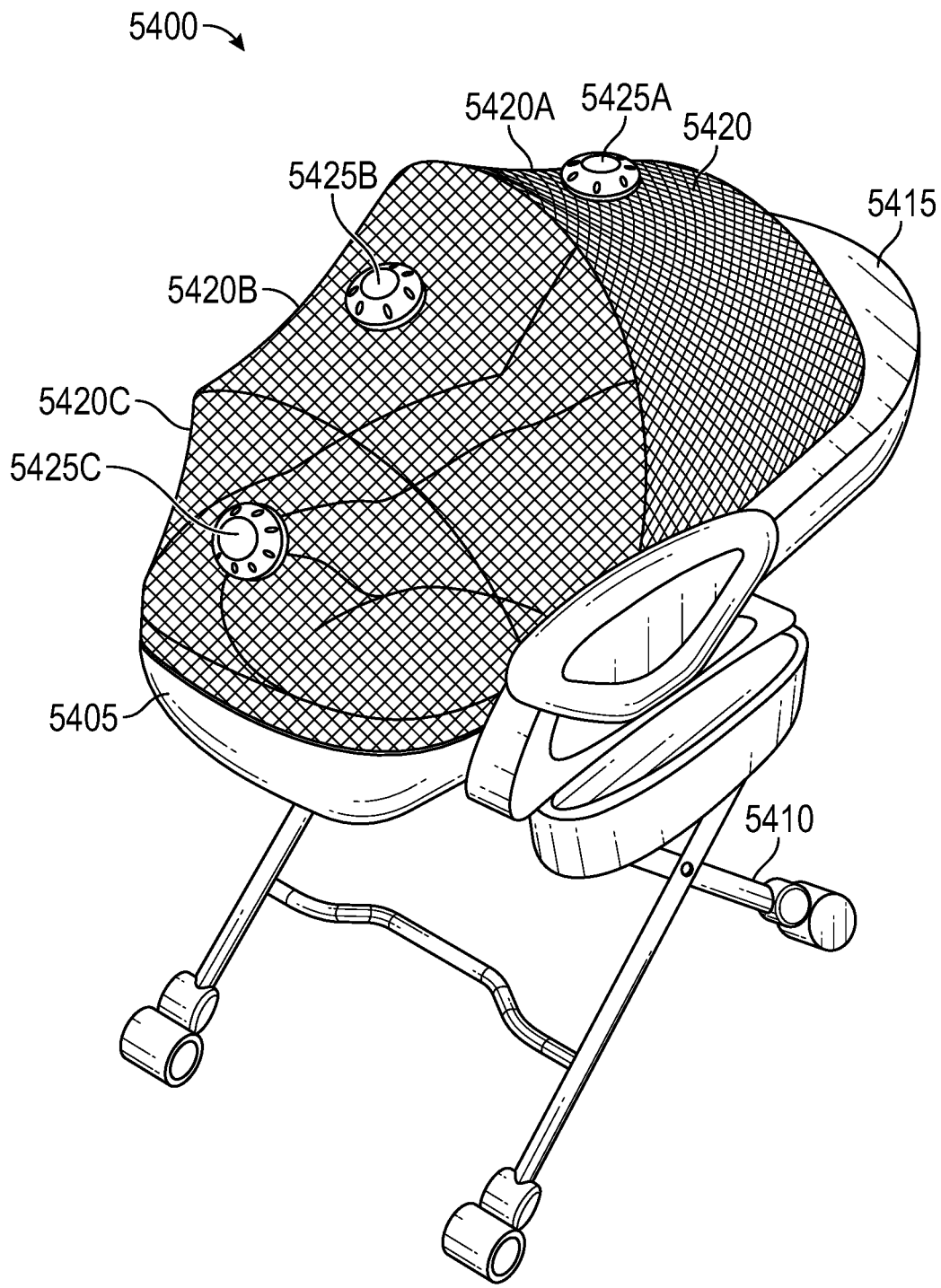
FIG. 54 is a perspective view of an infant rocker with a winch reel system for adjusting the opacity of a canopy for the rocker seat in accordance with one example embodiment of the disclosure.

FIG. 54 is a perspective view of an infant rocker with a winch reel system for adjusting the opacity of a canopy for the rocker seat in accordance with one example embodiment of the disclosure. Any one or more of the winch reel systems and features of FIGS. 1A-7 can be used as the winch reels described herein. In addition, the features described in FIG. 54 may be provided separately or in addition to any of the features described in FIGS. 50A-53B. The rocker 5400 can include a rocker frame 5410 that supports a crib 5405. The crib 5405 can include an outer shell 5415 that surrounds or substantially surrounds a sleeping surface. In one example, the outer shell 5415 can be made of plastic. In certain examples, although not depicted in FIG. 54, the rocker 5400 can include a pedestal support that extends vertically or substantially vertically upward from the rocker frame 5410 to the crib 5405. The rocker 5400 can also include soft goods that cover all or a portion of the sleeping surface. The rocker 5400 can also include an adjustable canopy 5420. In certain embodiments, the canopy 5420 can include multiple panels 5420A-C, each being made of a multi-layer mesh material, such that the canopy 5420 can be adjusted to adjust the position of each of the multiple panels 5420A-C with respect to another of the multiple panels 5420A-C to adjust the opacity of, or ability to see through, each of the multiple panels 5420A-C.

In a first position, the openings in each of the multiple panels 5420A-C are offset from one another to prevent light from passing through the canopy panel 5420. The first position offers the most opacity and is depicted in panel 5420A. The first position would be useful when the child is sleeping or the rocker 5400 is in a sunny area that might hurt the child's eyes. In a second position, the openings in each of the multiple panels 5420A-C are aligned with one another to allow light to pass through and allow the caregiver to see through the canopy 5420. The second position offers less opacity and is depicted in panels 5420B-C. This would be useful when the child is awake or when a caregiver wants to check on the status of the child.

Winch reels 5425A-C can be respectively coupled to each panel 5420A-C. Although not depicted in FIG. 54, one or more wires can be provided, and each of the one or more wires can be coupled at one end to the respective winch reel 5425A-C and at a distal second end to one or more of the multiple panels 5420A-C. In one example, each winch reel 5425A-C is a two-way winch reel. As each winch reel 5425A-C is rotated in a first direction, the one or more wires are wound up on the take-up of the respective winch reel 5425A-C, and one or more of the multiple panels 5420A-C moves with respect to another of the multiple panels 5420A-C from a second position to a first position (as shown in panel 5420A), thus preventing someone from seeing through the panel 5420A. As each winch reel 5425A-C is rotated in a second direction, the wires are unwound from the take-up of the respective winch reel 5425A-C, and one of the multiple panels 5420A-C moves with respect to another of the multiple panels 5420A-C from a first position to a second position (as shown in panels 5420B and 5420C), thus reducing the opacity and allowing the caregiver to see through the respective panel 5420A-C. While the opacity of each panel 5420A-C is shown in FIG. 54 as being controlled by its own respective winch reel 5425A-C, in other example embodiments, a single winch reel can adjust the opacity of all of the multiple panels 5420A-C of the canopy 5420 at the same time.

Figure 55A:
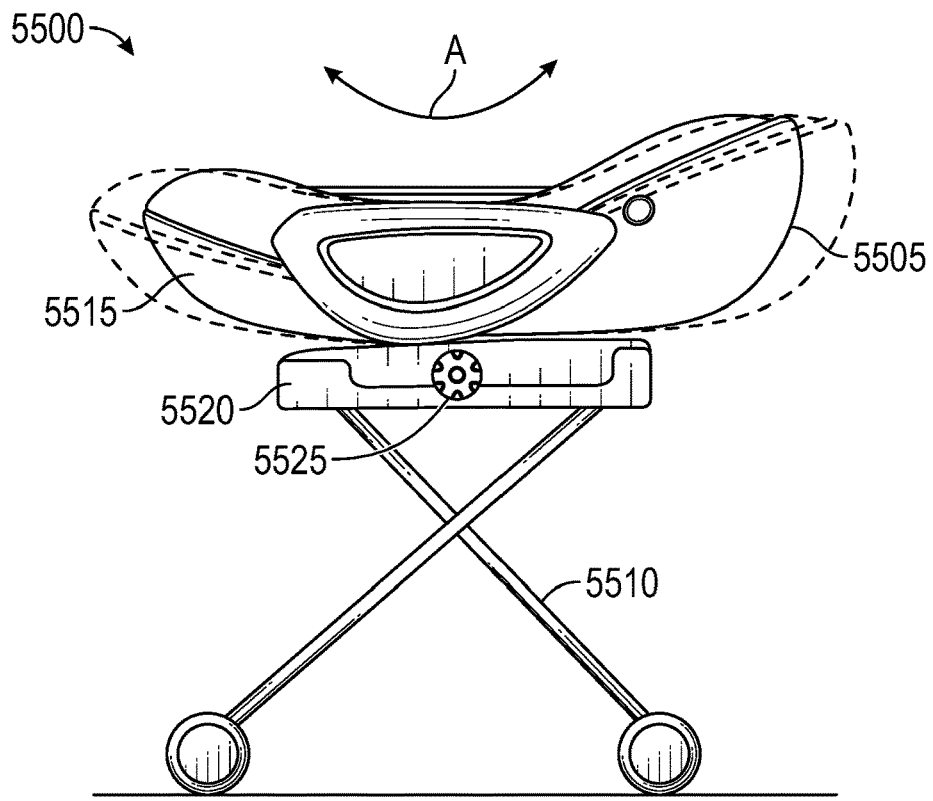
FIGS. 55A to 55C are various views of an infant rocker with a winch reel system for adjusting the tension in the elastic for the rocker mechanism for the rocker seat in accordance with one example embodiment of the disclosure.
Figure 55B:
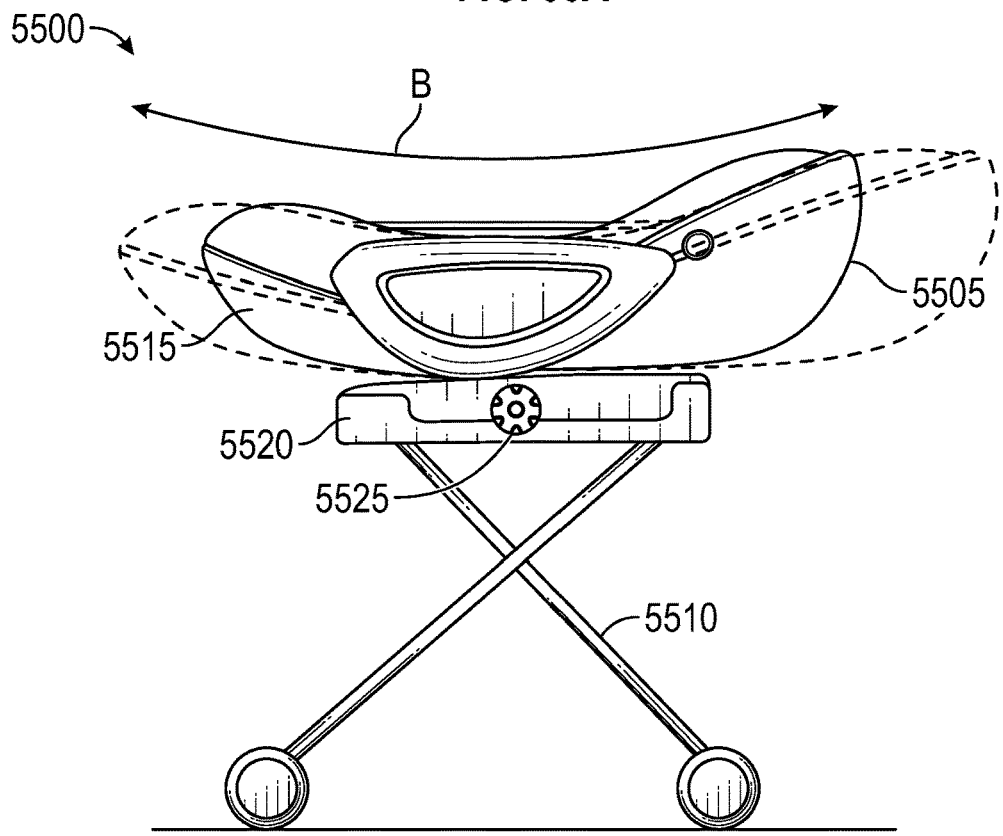
Figure 55C:
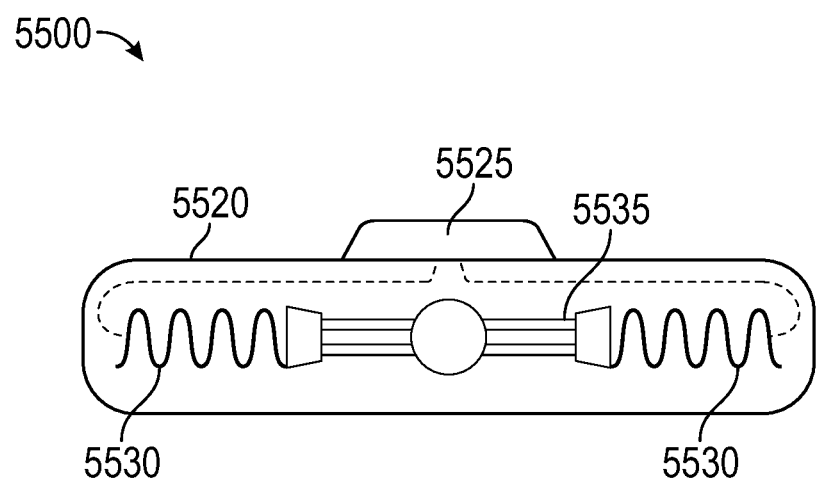

FIGS. 55A-55C are various views of an infant rocker with a winch reel system for adjusting the tension in the elastic for the rocker mechanism for the rocker seat in accordance with one example embodiment of the disclosure. Any one or more of the winch reel systems and features of FIGS. 1A-7 can be used as the winch reels described herein. In addition, the features described in FIGS. 55A-55C may be provided separately or in addition to any of the features described in FIGS. 50A-54. The rocker 5500 can include a rocker frame 5510 that supports a crib 5505. The crib 5505 can include an outer shell 5515 that surrounds or substantially surrounds a sleeping surface. In one example, the outer shell 5515 can be made of plastic. In certain examples, although not depicted in FIGS. 55A-55C, the rocker 5500 can include a pedestal support that extends vertically or substantially vertically upward from the rocker frame 5510 to the crib 5505. The rocker 5500 can also include soft goods that cover all or a portion of the sleeping surface. In addition, the rocker 5500 can include a base panel 5520 disposed between the crib 5505 and the rocker frame 5510. In one example, the base panel 5520 can include a rocking mechanism 5535 that generates the rocking of the crib 5505. In certain examples, the rocking mechanism 5535 includes elastic members 5530 along each end of the rocking mechanism. Adjusting the tightness in these elastic members 5530 can change the type of rocking effectuated on the crib 5505. For example, tightening the elastic members 5530 can change the rocking motion for the crib 5505 from a long, slow rocking motion, as represented by Arrow B in FIG. 55B, to a short, fast rocking motion, as represented by Arrow A in FIG. 55A.

The rocker 5500 can also include a winch reel 5525 that can be coupled to the base panel 5520. Although not depicted in FIGS. 55A-55C, one or more wires can be provided, and each of the one or more wires can be coupled at one end to the winch reel 5525 and at a distal second end to one of the elastic members 5530. In one example, the winch reel 5525 is a two-way winch reel. As the winch reel 5525 is rotated in a first direction, the wires are wound up on the take-up of the winch reel 5525, and the elastic members 5530 are stretched towards each other and tightened, thus creating a faster and shorter rocking motion, as depicted by Arrow A in FIG. 55A. As the winch reel 5525 is rotated in a second direction, the wires are unwound from the take-up of the winch reel 5525, and the elastic members 5530 are moved comparatively away from each other and relaxed comparatively, thus creating a longer and slower rocking motion, as depicted by Arrow B in FIG. 55B.

Figure 56A:
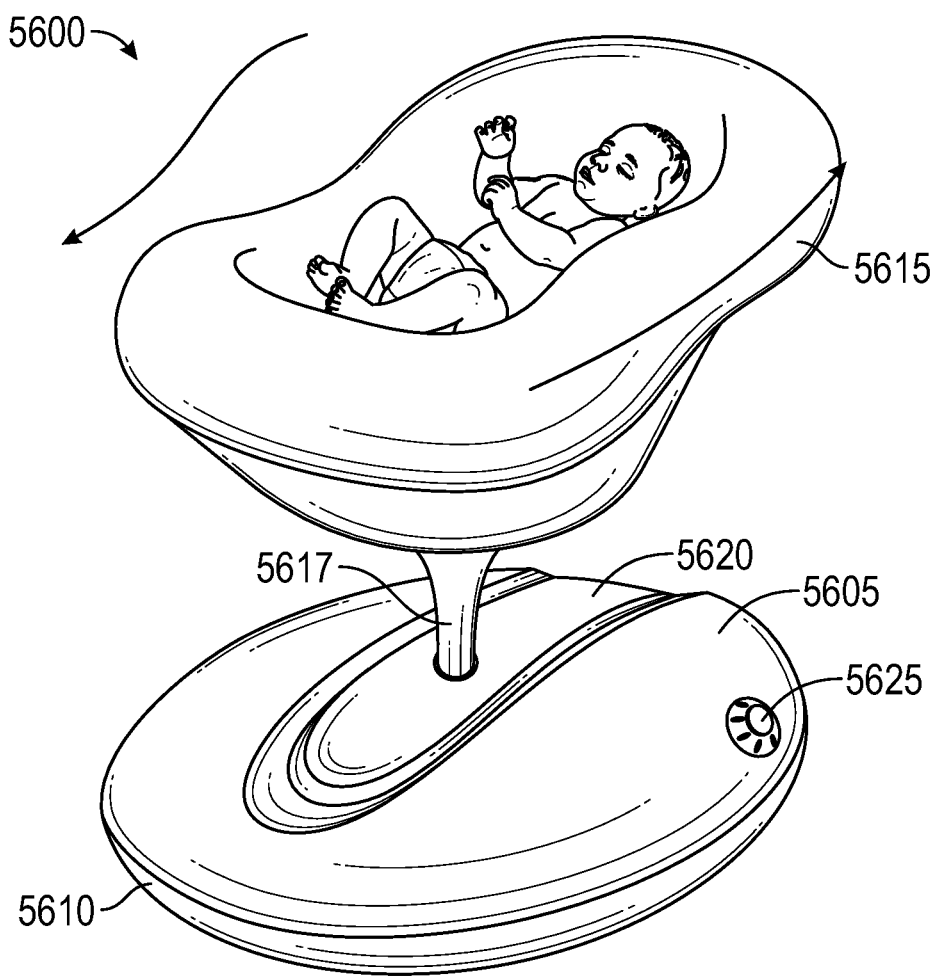
FIGS. 56A and 56B are respectively a perspective view and a side elevation view of an infant rocker with a winch reel system for adjusting the position of the rocker cam for the rocker seat in accordance with one example embodiment of the disclosure.
Figure 56B:
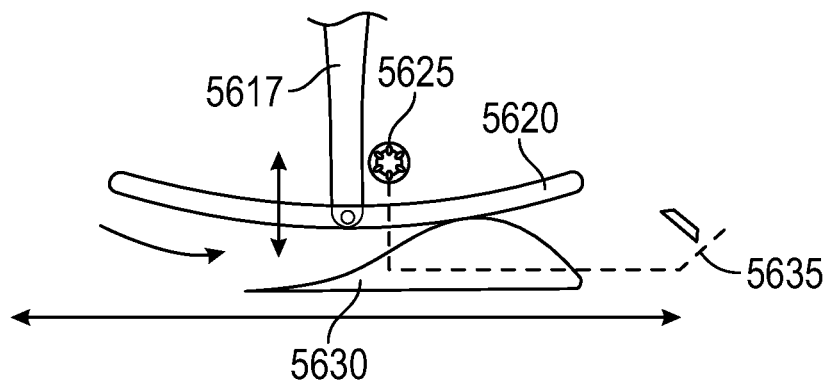

FIGS. 56A and 56B are perspective and side elevation views of an infant rocker with a winch reel system for adjusting the position of the rocker cam for the rocker seat in accordance with one example embodiment of the disclosure. Any one or more of the winch reel systems and features of FIGS. 1A-7 can be used as the winch reels described herein. In addition, the features described in FIGS. 56A and 56B may be provided separately or in addition to any of the features described in FIGS. 50A-55C. The rocker 5600 can include a rocker frame 5610 that supports a crib 5615. The crib 5615 can include an outer shell that surrounds or substantially surrounds a sleeping surface. In one example, the outer shell can be made of plastic. In certain examples, the rocker 5600 can include a pedestal support 5617 that extends vertically or substantially vertically upward from an upper portion 5605 of the rocker frame 5610 to the crib 5615. The rocker 5600 can also include soft goods that cover all or a portion of the sleeping surface.

In addition, the rocker 5600 can include a rocker arm 5620 that engages a cam 5630 to generate the rocking motion of the crib 5615. In certain examples, the position of the cam 5630 with respect to the rocker arm 5620 can be adjusted laterally to change the type of rocking motion effectuated on the crib 5612. The rocker 5600 can also include a winch reel 5625 that can be coupled to the rocker frame 5610. Although not depicted in FIGS. 56A-B, one or more wires can be each coupled at one end to the winch reel 5625 and along a distal second end to the cam 5630. In one example, the winch reel 5625 is a two-way winch reel. As the winch reel 5625 is rotated in a first direction, the one or more wires are wound up on the take-up of the winch reel 5625, and the cam 5630 is moved in a first direction 5635 to change the rocking motion generated on the crib 5612. As the winch reel 5625 is rotated in a second direction, the wires are unwound from the take-up of the winch reel 5625, and the cam 5630 moves in the direction opposite the first direction 5635, to change the motion of the rocker arm 5620 along the cam 5630.

Figure 57A:
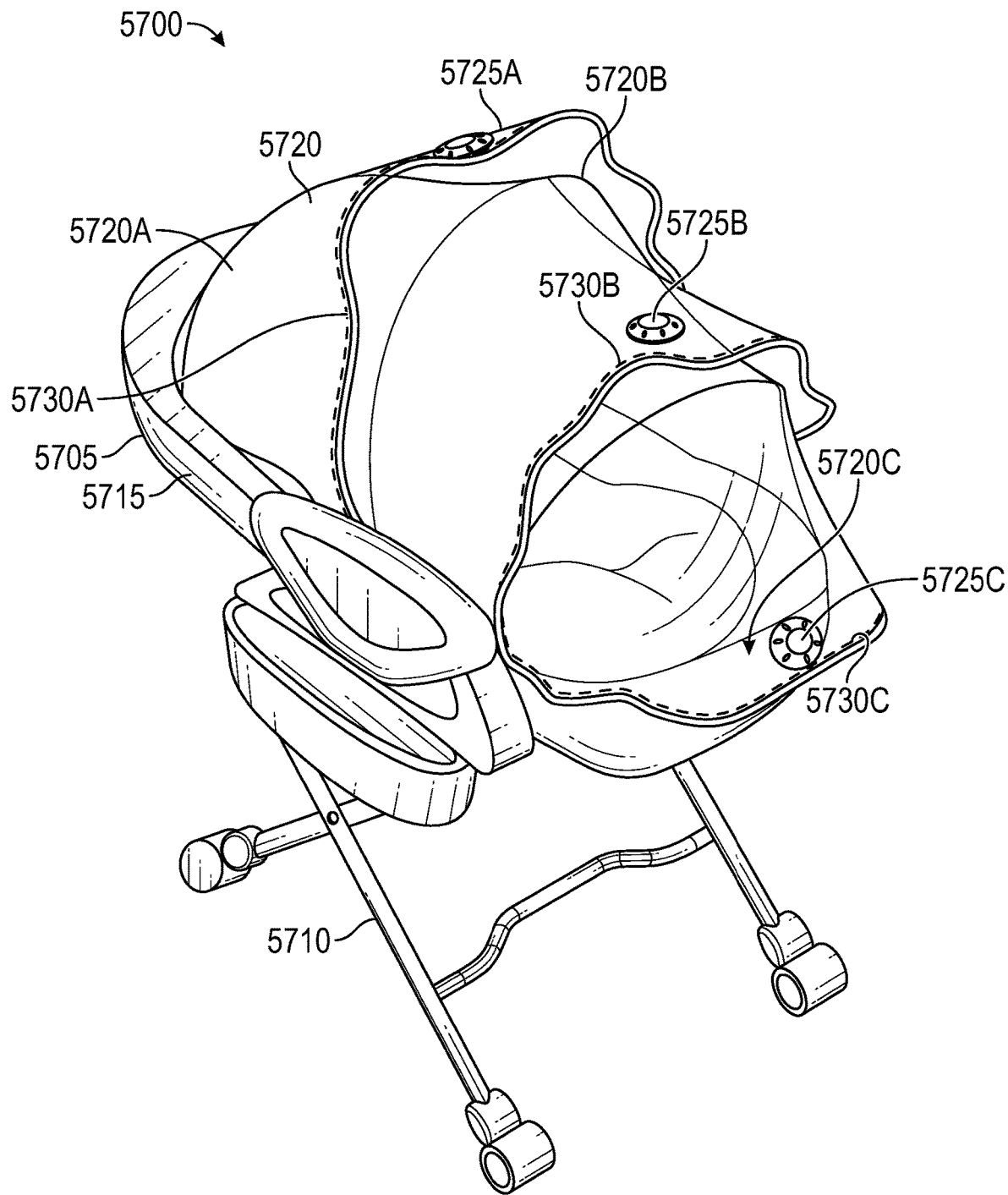
FIGS. 57A and 57B are respectively a perspective view and a side elevation view of an infant rocker with a winch reel system for adjusting the tension in mosquito netting for the rocker seat in accordance with one example embodiment of the disclosure.
Figure 57B:
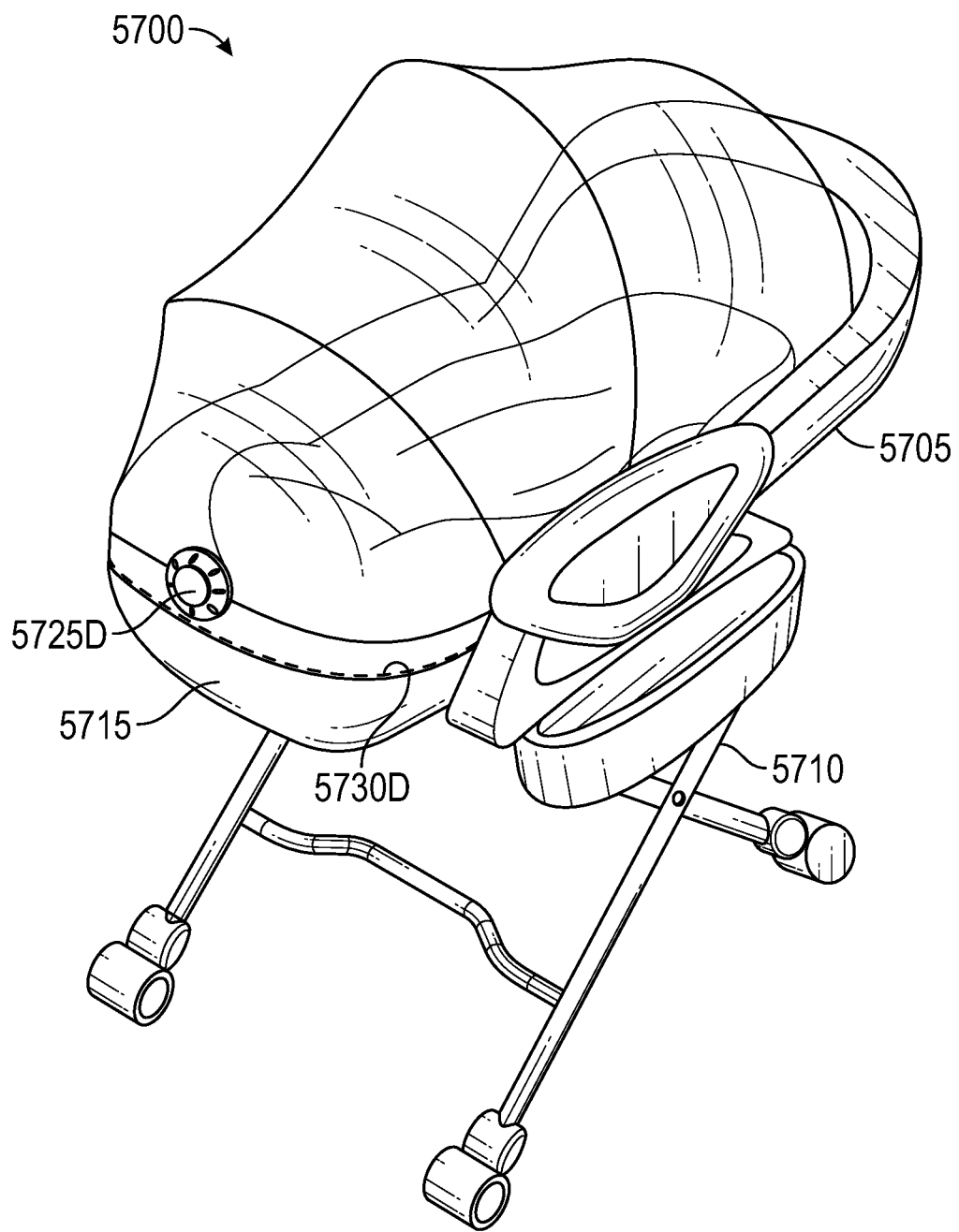

FIGS. 57A and 57B are perspective and side elevation views of an infant rocker with a winch reel system for adjusting the tension in mosquito netting for the rocker seat in accordance with one example embodiment of the disclosure. Any one or more of the winch reel systems and features of FIGS. 1A-7 can be used as the winch reels described herein. In addition, the features described in FIGS. 57A and 57B may be provided separately or in addition to any of the features described in FIGS. 50A-56B. The rocker 5700 can include a rocker frame 5710 that supports a crib 5705. The crib 5705 can include an outer shell 5715 that surrounds or substantially surrounds a sleeping surface. In one example, the outer shell 5715 can be made of plastic. In certain examples, although not depicted in FIGS. 57A-B, the rocker 5700 can include a pedestal support that extends vertically or substantially vertically upward from the rocker frame 5710 to the crib 5705. The rocker 5700 can also include soft goods that cover all or a portion of the sleeping surface.

The rocker 5700 can also include an adjustable mosquito net 5720 movably coupled to the crib 5705. The mosquito net 5720 can also include a winch reel 5725, where 5725A-C depicts the various possible positions of the winch reel 5725 when the adjustable mosquito net is in different configurations. In one example, the adjustable mosquito net 5720 can be movable from an open position to a closed position by expanding panels 5720A-C over the outer shell 5715 with the winch reel moving along the path 5725A-C. The adjustable mosquito net 5720 can include a bottom perimeter edge and one or more wires 5730C-D disposed in a channel along the bottom perimeter edge. The body of the adjustable mosquito net 5720 can be made of mesh to allow air to flow through the adjustable mosquito net 5720. The distal end of each of the wires 5730C-D can be coupled to the winch reel 5725. In one example, the winch reel 5725 is a one-way winch reel. When the adjustable mosquito net 5720 is rotated down to cover the top, open side of the outer shell 5715 containing the sleeping surface, the winch reel 5725 can be rotated in a first direction, which causes the wires 5730C-D to be wound up on the take-up of the winch reel 5725, and the tension in each of the wires 5730C-D pulls the perimeter of the bottom perimeter edge of the adjustable mosquito net 5720 closed around the exterior of the outer shell 5715. As the winch reel 5725 is rotated in a second direction or popped out to release the take-up of the winch reel 5725, a user can pull the bottom perimeter edge of the adjustable mosquito net 5720 to loosen the adjustable mosquito net 5720 from the outer shell 5715 and rotate the adjustable mosquito net 5720 back to the open position. It should be further noted that the adjustable mosquito net 5720 may be partially rotated. In one embodiment, the bottom perimeter edge of the adjustable mosquito net is 5730A, and the winch reel 5725 is located at 5725A. In another embodiment, the bottom perimeter edge of the adjustable mosquito net is 5730B, and the winch reel 5725 is located at 5720B. When the adjustable mosquito net is fully closed, the bottom perimeter edge of the adjustable mosquito net 5720 is 5730C-D, and the winch reel 5725 is located at 5720C-D.

Figure 58A:
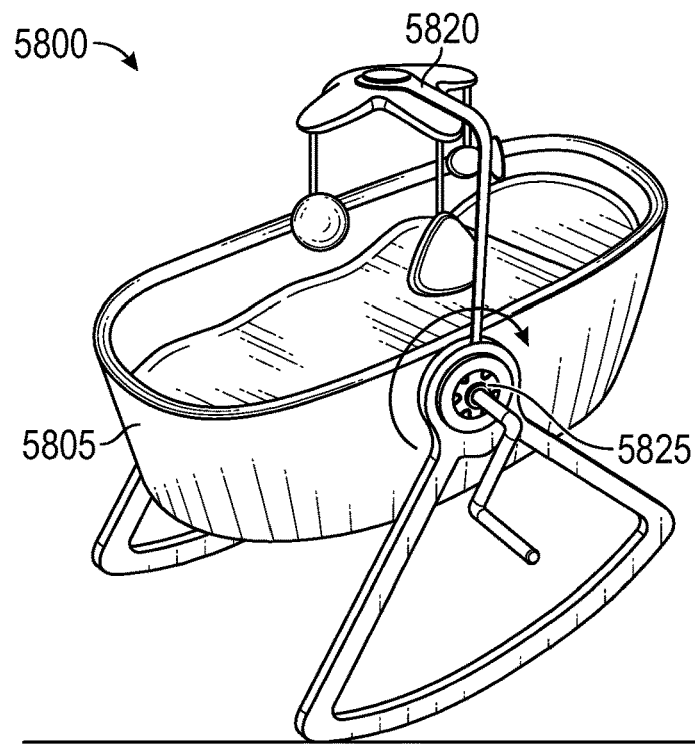
FIGS. 58A and 58B are perspective views of an infant rocker with a winch reel system for adjusting the tension in a mobile for the rocker seat in accordance with one example embodiment of the disclosure.
Figure 58B:
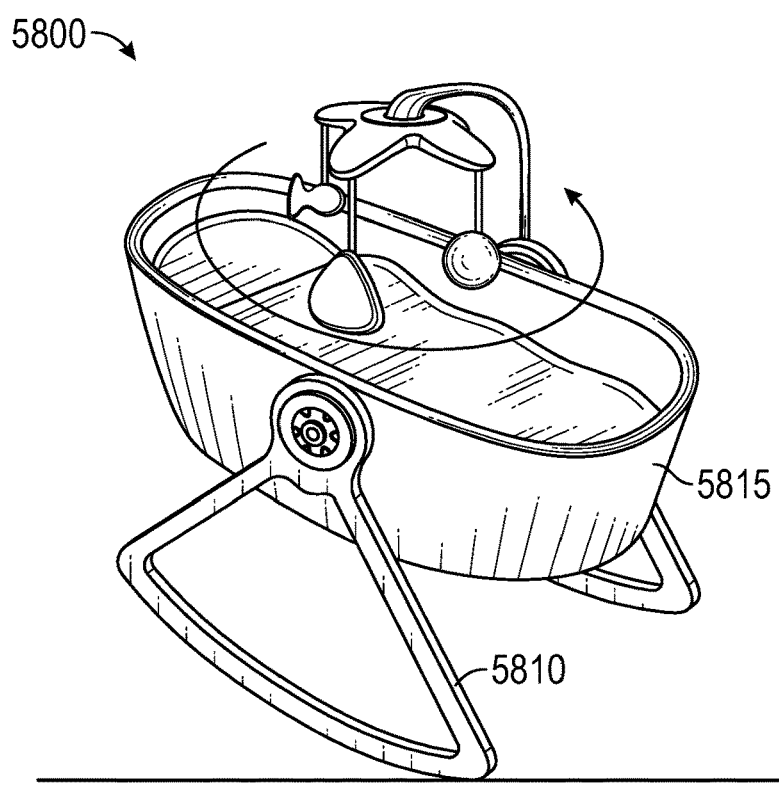

FIGS. 58A and 58B are perspective views of an infant rocker with a winch reel system for adjusting the tension in a mobile for the rocker seat in accordance with one example embodiment of the disclosure. Any one or more of the winch reel systems and features of FIGS. 1A-7 can be used as the winch reels described herein. In addition, the features described in FIGS. 58A and 58B may be provided separately or in addition to any of the features described in FIGS. 50A-57B. The rocker 5800 can include a rocker frame 5810 that supports a crib 5805. The crib 5805 can include an outer shell 5815 that surrounds or substantially surrounds a sleeping surface. In one example, the outer shell 5815 can be made of plastic. In certain examples, although not depicted in FIGS. 58A-58B, the rocker 5800 can include a pedestal support that extends vertically or substantially vertically upward from the rocker frame 5810 to the crib 5805. The rocker 5800 can also include soft goods that cover all or a portion of the sleeping surface. The rocker 5800 can also include a mobile 5820 coupled to the crib 5805. The mobile 5820 can be configured to generate any one or more of lights, motion, and sound to entertain a child within the crib 5805. The mobile 5820 can include a wind-up motor. The rocker 5800 can also include a winch reel 5825 coupled or removably coupled to the wind-up motor of the mobile 5820 to allow a user to use the winch reel 5825 to wind up the wind-up motor to activate the mobile 5820.

Figure 59B:
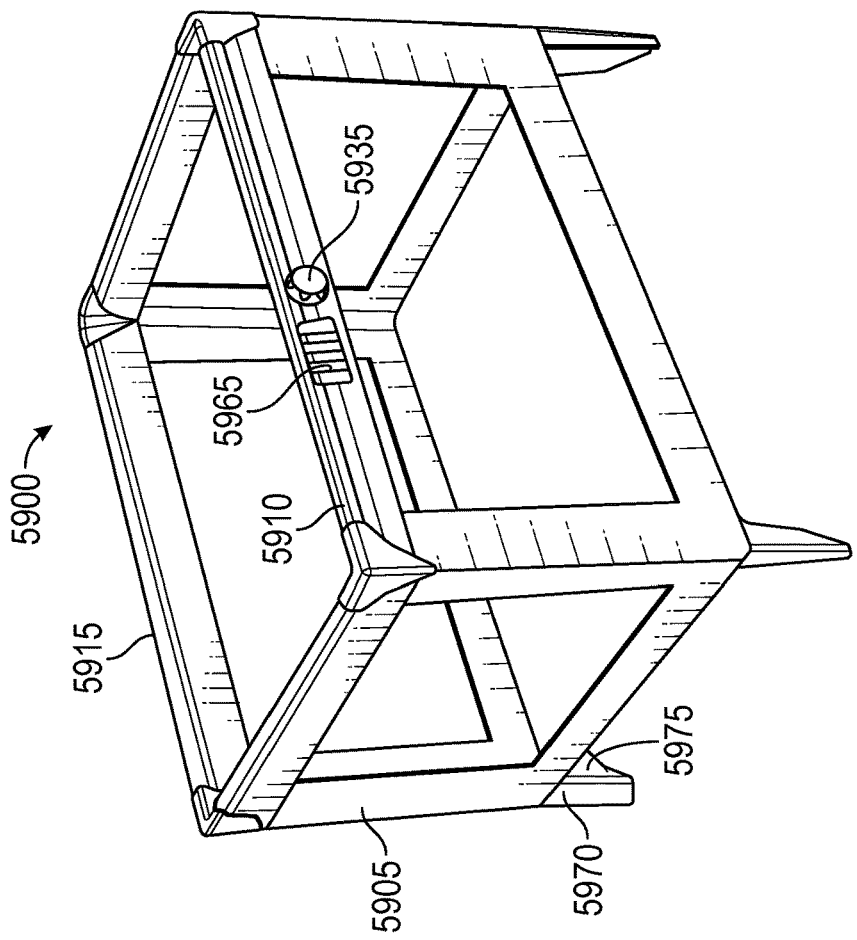
FIGS. 59A and 59B are perspective views of a playard with a winch reel system for adjusting the tension in the upper rail members of the playard in accordance with one example embodiment of the disclosure.
Figure 59A:
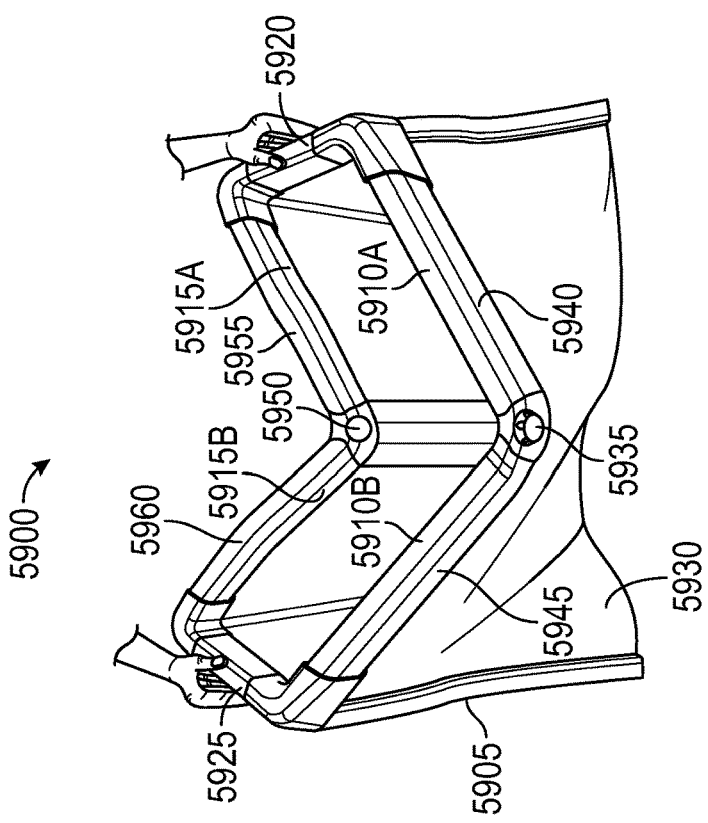

FIGS. 59A and 59B are perspective views of a playard with a winch reel system for adjusting the tension in the upper rail members of the playard in accordance with one example embodiment of the disclosure. Any one or more of the winch reel systems and features of FIGS. 1A-7 can be used as the winch reels described herein. The playard 5900 can include one or more vertical support posts 5905. In one example, four vertical support posts 5905 can be positioned at each corner of the playard 5900. However, in other embodiments, more or less than four vertical support posts can be provided. Each vertical support post 5905 can include a foot member 5970 that includes a bottom end 5975 configured to rest on a floor surface. The playard 5900 can also include top support rails. The number of top support rails can depend on the number of sides of the playard as well as the number of support rails that are divided into multiple rail portions for folding and storage of the playard 5900. In one example, the playard can include a first top side rail 5910, a second top side rail 5915, a first top end rail 5920, and a second top end rail 5925. Each end rail (or combined portions of an end rail) can extend from a first vertical support post 5905 to a second vertical support post 5905. One or more side panels 5930 can extend down from each of the first top side rail 5910, the second top side rail 5915, the first top end rail 5920, and the second top end rail 5925. While four side panels 5930 are shown, in other examples the number of side panels 5930 can be greater or lesser than four. The side panels 5930 can be constructed of soft goods, such as, a see-through mesh material. The one or more side panels 5930 along with a floor panel can define a contained area for a child to be placed in.

In one example, the first top side rail 5910 can be split into a first top side rail portion 5910A and a second top side rail portion 5910B, and the second top side rail 5915 can be split into a third top side rail portion 5915A and a fourth top side rail portion 5915B, thus allowing the first top side rail 5910 and the second top side rail 5915 to "break" near their respective midpoints for folding the playard 5900. The playard 5900 can also include a first winch reel 5935 positioned along the first top side rail 5910, substantially between the first top side rail portion 5910A and the second top side rail portion 5910B, and a second winch reel 5950 positioned along the second top side rail 5915, substantially between the third top side rail portion 5915A and the fourth top side rail portion 5915B. The first winch reel 5935 and the second winch reel 5950 can be configured to help assemble the playard 5900 from a folded configuration to a use configuration by tightening and respectively straightening the first top side rail 5915 and the second top side rail 5920. For example, the playard 5900 can also include a first wire 5940 coupled at a first end to the first winch reel 5935 and at a distal second end, directly or indirectly, to the first top side rail portion 5910A or a vertical support post 5905. The playard 5900 can also include a second wire 5945 coupled at a first end to the first winch reel 5935 and at a distal second end, directly or indirectly, to the second top side rail portion 5910B or another vertical support post 5905. The playard 5900 can also include a third wire 5955 coupled at a first end to the second winch reel 5950 and at a distal second end, directly or indirectly, to the third top side rail portion 5915A or another vertical support post 5905. The playard 5900 can also include a fourth wire 5960 coupled at a first end to the second winch reel 5950 and at a distal second end, directly or indirectly, to the fourth top side rail portion 5915B or another vertical support post 5905.

In one example, each of the first winch reel 5935 and the second winch reel 5950 are one-way winch reels. As the first winch reel 5935 is rotated in a first direction, the first wire 5940 and the second wire 5945 are wound up on the take-up of the first winch reel 5935, which raises and straightens the first top side rail portion 5910A and the second top side rail portion 5910B with respect to each other until they form a horizontal or substantially horizontal first top side rail 5910, as shown in FIG. 59B, to adjust the playard 5900 from a folded configuration to a use configuration. Similarly, as the second winch reel 5950 is rotated in a first direction, the third wire 5955 and the fourth wire 5960 are wound up on the take-up of the second winch reel 5950, which raises and straightens each of the third top side rail portion 5915A and the fourth top side rail portion 5915B with respect to each other until they form a horizontal or substantially horizontal second top side rail 5915, as shown in FIG. 59B, to adjust the playard 5900 from a folded configuration to a use configuration. As each of the first winch reel 5935 and the second winch reel 5950 is rotated in a second direction or popped out to release the take-up of the respective first winch reel 5935 and the second winch reel 5950, a user can push on one or both of the first top side rail portion 5910 and the second top side rail portion 5910B, or the third top side rail portion 5915A and the fourth top side rail portion 5915B respectively to unwind each of the first wire 5940, the second wire 5945, the third wire 5955, and the fourth wire 5960. Alternatively, the weight of each of the first top side rail portion 5910A, the second top side rail portion 5910B, the third top side rail portion 5915A, and the fourth top side rail portion 5915B can automatically unwind each of the first wire 5940, the second wire 5945, the third wire 5955, and the fourth wire 5960 respectively from the take-up of the first winch reel 5935 and the second winch reel 5960. The unwinding allows the first top side rail 5910 and the second top side rail 5915 to loosen and begin moving from the use configuration towards the folded configuration, as shown in FIG. 59A. In certain examples, one or more of the top side rail portions 5910A, 5910B, 5915A, and 5915B can include tension indicators 5965, as shown in FIG. 59B. The tension indicators 5965 can operate as described in FIG. 7 above and can provide a visual indication to a caregiver when sufficient tension is created in each of the first top side rail 5910 and the second top side rail 5915 through rotation of the first winch reel 5935 and the second winch reel 5950 respectively in the first direction.

FIGS. 60A and 60B are perspective and side elevation views of a playard with a winch reel system for adjusting the tension in the upper and lower rail members of the playard in accordance with one example embodiment of the disclosure. Any one or more of the winch reel systems and features of FIGS. 1A-7 can be used as the winch reels described herein. In addition, the features described in FIGS. 60A and 60B may be provided separately or in addition to any of the features described in FIGS. 59A and 59B. The playard 6000 can include a playard frame 6005. The playard frame 6005 can include one or more vertical support posts 6010A-D. In one example, four vertical support posts 6010A-D can be positioned at each corner of the playard 6000. However, in other embodiments, more or less than four vertical support posts can be provided. Each vertical support post 6010A-D can include a foot member that includes a bottom end configured to rest on a floor surface. The playard frame 6005 can also include top support rails. The number of top support rails can depend on the number of sides of the playard as well as the number of support rails that are divided into multiple rail portions for folding and storage of the playard 6000. In one example, the playard frame 6005 can include a first top end rail 6015A, a second top end rail 6015B, a first top side rail 6015C, and a second top side rail 6015D. Each top rail (or combined portions of top rail) can extend from one of the vertical support posts 6010A-D to another of the vertical support posts 6010A-D (for example, as depicted in FIG. 60A, the first top end rail 6015A extends from the first vertical support post 6010A to the second vertical support post 6010B). The playard frame 6005 can also include a first bottom end rail, a second bottom end rail, a first bottom side rail 6020, and a second bottom side rail 6025. Each bottom rail (or combined portions of bottom rail) can extend from one of the vertical support posts 6010A-D to another of the vertical support posts 6010A-D (for example, the first bottom side rail 6020 extends from the first vertical support post 6010A to the third vertical support post 6010C). In certain embodiments, each bottom rail includes a plastic or metallic support member. In other examples, each bottom rail includes a soft goods edge and, in certain cases, a tunnel along the soft goods edge for receiving wires therein. One or more side panels can extend between each respective top rail and bottom rail. While four side panels are shown, this is for example purposes only, as the number of side panels could alternatively be greater or lesser than four. The side panels can be constructed of soft goods, such as, a see-through mesh material. The one or more side panels along with a floor panel can define a contained area for a child to be placed in.

The playard 6000 can also include a winch reel 6035 positioned along an end side panel of the playard. Alternatively, the winch reel 6035 can be positioned along any other portion of the playard 6000. The winch reel 6035 can be configured to help disassemble and compress the playard 6000 from a use configuration, as shown in FIG. 60A, to a folded configuration, as shown in FIG. 60B. For example, the playard 6000 can also include a first wire 6030A coupled at a first end to the winch reel 6035, extending through all or a portion of the first top side rail 6015C, and directly or indirectly coupled at a second end to the first top side rail 6015C or the third vertical support post 6010C. The playard 6000 can also include a second wire 6030B coupled at a first end to the winch reel 6035, extending through all or a portion of the second top side rail 6015D, and directly or indirectly coupled at a second end to the second top side rail 6015D or the fourth vertical support post 6010D. The playard 6000 can also include a third wire 6030C coupled at a first end to the winch reel 6035, extending through all or a portion of the first bottom side rail or edge 6020, and directly or indirectly coupled at a second end to the first bottom side rail 6020 or the third vertical support post 6010C. The playard 6000 can also include a fourth wire 6030D coupled at a first end to the winch reel 6035, extending through all or a portion of the second bottom side rail 6025, and directly or indirectly coupled at a second end to the second bottom side rail 6025 or the fourth vertical support post 6010D.

In one example, the winch reel 6035 is a one-way winch reel. As the winch reel 6035 is rotated in a first direction, each of the wires 6030A-D are wound up on the take-up of the winch reel 6035, which creates tension in each of the wires 6030A-D, thus pulling the third vertical support post 6010C in Direction A towards the first vertical support post 6010A and the fourth vertical support post 6010D in Direction A towards the second vertical support post 6010B to adjust the playard 6000 from a use configuration to a folded configuration. As the winch reel 6035 is rotated in a second direction or popped out to release the take-up of the winch reel 6035, a user can push on one of the top rails 6015A-D in Direction B to unwind each of the wires 6030A-D from the take-up of the winch reel 6035, thus adjusting the playard 6000 from the folded configuration to the use configuration.

Figure 61:
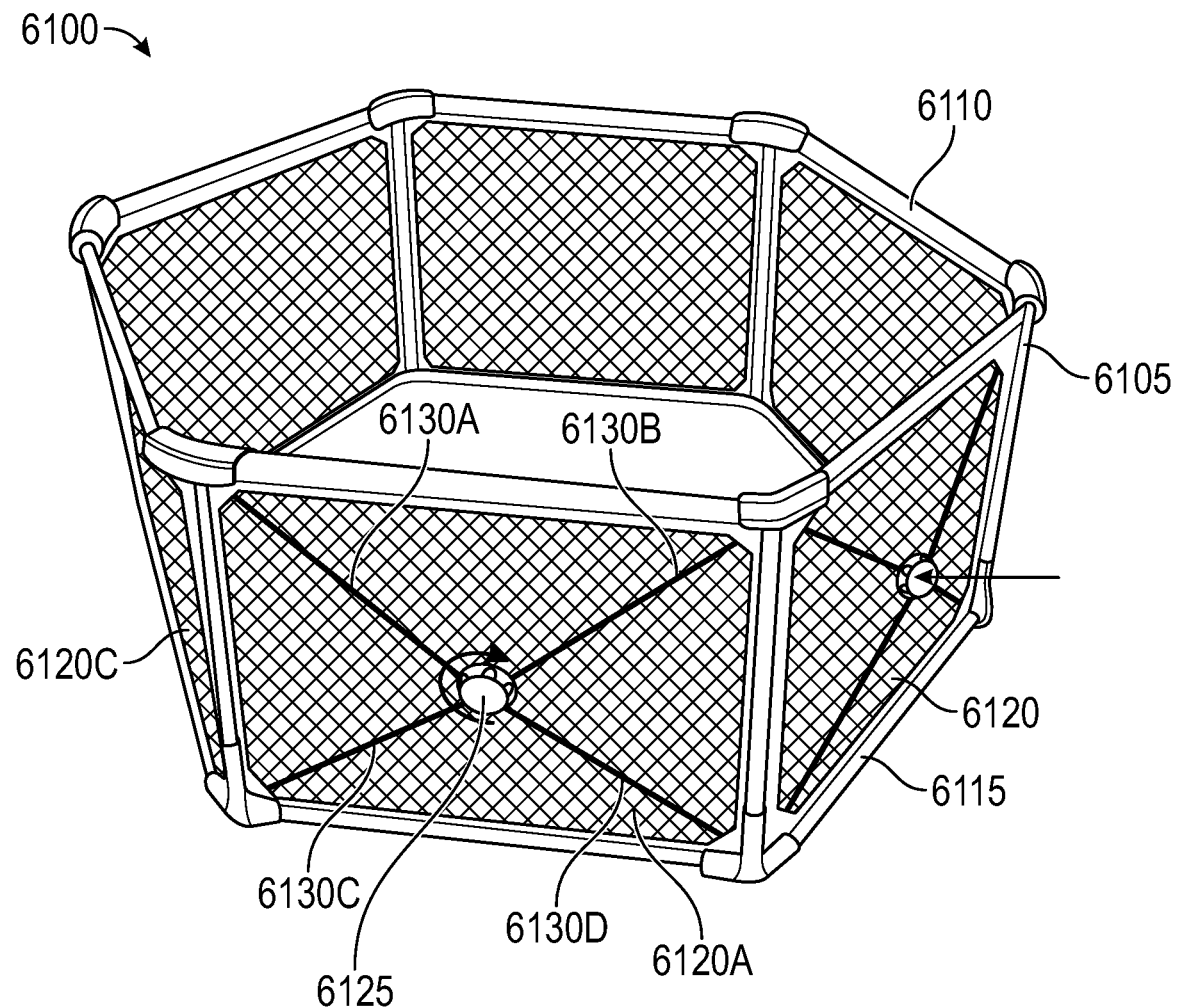
FIG. 61 is a perspective view of a playard with a winch reel system for adjusting the opacity of one or more side panels of the playard in accordance with one example embodiment of the disclosure.

FIG. 61 is a perspective view of a playard with a winch reel system for adjusting the opacity of one or more side panels of the playard in accordance with one example embodiment of the disclosure. Any one or more of the winch reel systems and features of FIGS. 1A-7 can be used as the winch reels described herein. In addition, the features described in FIG. 61 may be provided separately or in addition to any of the features described in FIGS. 59A-60B. The playard 6100 can include a playard frame. The playard frame can include one or more vertical support posts 6105. In one example, six vertical support posts 6105 can be positioned along the perimeter of the playard 6100. However, in other embodiments, more or less than six vertical support posts can be provided. Each vertical support post 6105 can include a foot member that includes a bottom end configured to rest on a floor surface. The playard frame can also include top support rails 6110. The number of top support rails 6110 can depend on the number of sides of the playard 6100 as well as the number of support rails 6110 that are divided into multiple rail portions for folding and storage of the playard 6100. In one example, the playard frame can include six top support rails 6110. Each top support rail 6110 (or combined portions of top rail) can extend from one vertical support post 6105 to a second vertical support post 6105. The playard frame can also include one or more bottom rails 6115. Each bottom rail or edge 6115 (or combined portions of bottom rail) can extend from one vertical support post 6105 to a second vertical support post 6105. In certain embodiments, each bottom rail 6115 includes a plastic or metallic support member. In other examples, each bottom rail 6115 only includes a soft goods edge. One or more side panels 6120 can extend between each respective top support rail 6110 and bottom rail or edge 6115. While six side panels are shown, this is for example purposes only, as the number of side panels 6120 could alternatively be greater or lesser than six. The one or more side panels 6120 along with a floor panel can define a contained area for a child to be placed in.

The side panels 6120 can be constructed of soft goods, such as one or multiple layers of mesh material that are able to move with respect to one another to adjust the opacity of, or ability to see through, the respective side panels 6120A-C. In a first position (as depicted in side panel 6120B), the openings in each of the mesh layers are offset from one another to prevent light from passing through the side panel 6120B. This would be useful when the child is sleeping. In a second position (as depicted in side panels 6120A and 6120C), the openings in each of the mesh layers are aligned with one another to allow light to pass through. This would allow a caregiver to see through the side panels 6120A and 6120C and allow the child to see out of the playard 6100 through the side panels 6120A and 6120C. This would be useful when the child is awake or if the caregiver wants to check on the status of the child. A winch reel 6125 can be coupled to each respective side panel 6120. One or more wires 6130A-D can be provided, each of the one or more wires 6130A-D being coupled at one end to the respective winch reel 6125 at that panel 6120 and at a distal second end to one or more of the sliding mesh layers in each respective panel 6120. In one example, each winch reel 6125 is a two-way winch reel. As each winch reel 6125 is rotated in a first direction, the wires 6130A-D are wound up on the take-up of the respective winch reel 6125, and each of the mesh layers moves with respect to another of the mesh layers from an aligned configuration to an offset configuration (as depicted in side panel 6120B), thus preventing someone from seeing through the side panel 6120B. As each winch reel 6125 is rotated in a second direction, the wires 6130A-D are unwound from the take-up of the respective winch reel 6125, and each of the mesh layers moves with respect to another of the mesh layers from an offset configuration to an aligned configuration (as shown in side panels 6120A and 6120C), thus reducing the opacity of the side panels 6120A and 6120C and allowing the child and/or the caregiver to see through the side panels 6120A and 6120C. While the opacity of each side panel 6120 is shown as being controlled by its own winch reel 6125, in other example embodiments, a single winch reel 6125 can adjust the opacity of all of the side panels 6120 of the playard 6100 at the same time.

Figure 62:
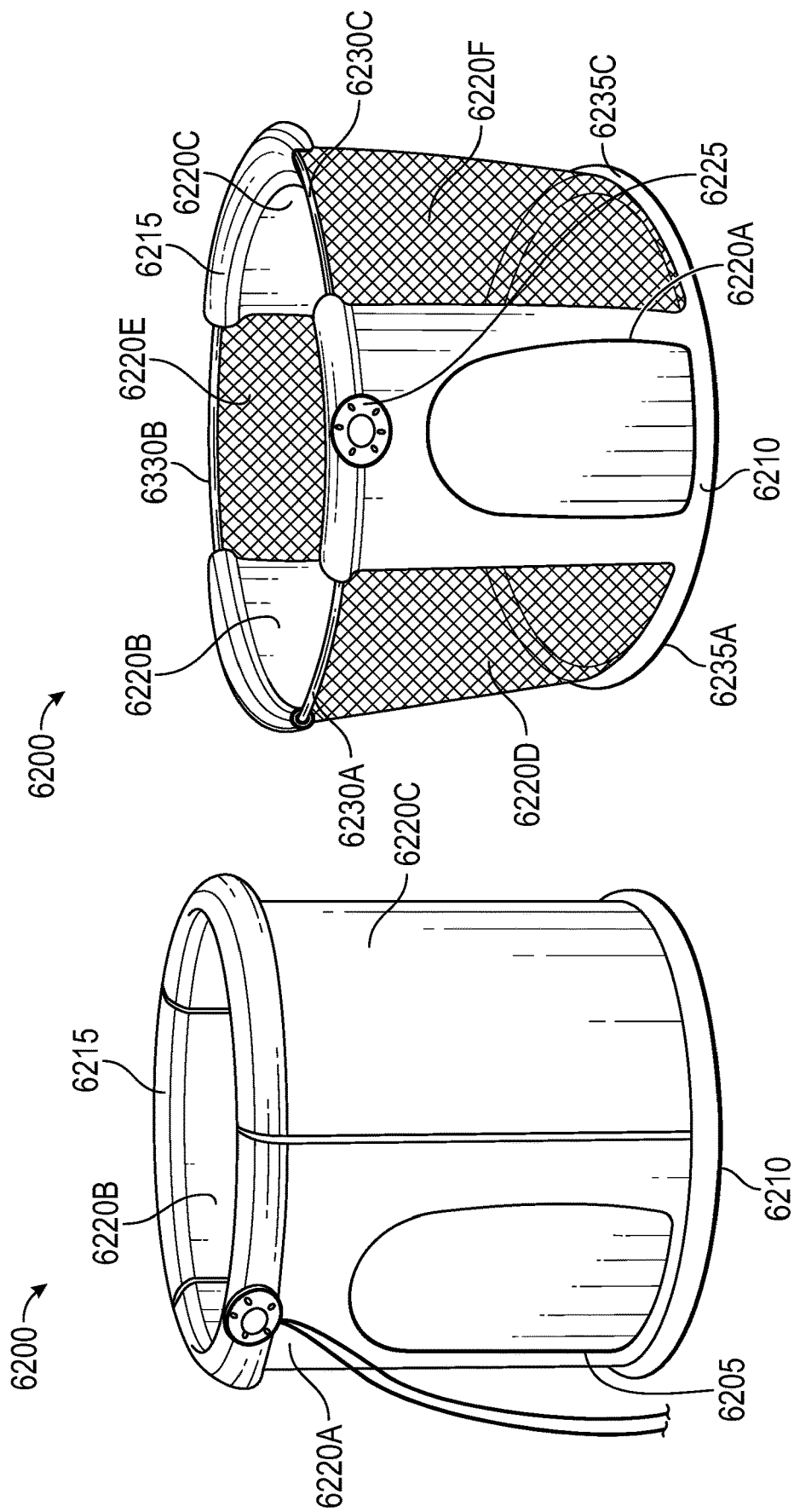
FIGS. 62A and 62B are perspective views of a playard with a winch reel system for adjusting the volume of the playard in accordance with one example embodiment of the disclosure.

FIGS. 62A and 62B are perspective views of a playard with a winch reel system for adjusting the volume of the playard in accordance with one example embodiment of the disclosure. Any one or more of the winch reel systems and features of FIGS. 1A-7 can be used as the winch reels described herein. In addition, the features described in FIGS. 62A and 62B may be provided separately or in addition to any of the features described in FIGS. 59A-61. The playard 6200 can include a playard frame. The playard frame can include one or more vertical support posts 6205 positioned along the perimeter of the playard 6200. The playard frame can also include top support rails 6215. The number of top support rails 6215 can depend on the size and/or shape of the playard 6200. In one example, the playard frame can include three expandable top support rails 6215. Each top support rail 6215 can include a hollow member with a channel configured to slidably receive an extension top rail member 6230A-C. The playard frame can also include one or more expandable bottom rails 6210. Each bottom rail 6210 can include a hollow member with a channel configured to slidably receive an extension bottom rail member 6235A-C. One or more expandable side panels 6220D-F can extend between each respective top support rail 6215 and 6230A-C and bottom rail 6210 and 6235A-C. While three side panels 6220A-C are shown in the retracted configuration (as depicted in FIG. 62A) and six side panels 6220A-F are shown in the expanded configuration (as depicted in FIG. 62B), this is for example purposes only as the number of side panels 6220 could alternatively be greater or lesser than three in the retracted configuration and six in the expanded configuration. As depicted in FIGS. 62A-B, the one or more side panels 6220A-C or the one or more side panels 6220A-F, along with a floor panel, can define a contained area for a child to be placed in.

A winch reel 6225 can be coupled to one of the side panels 6220A-F. Although not depicted in FIGS. 62A-62B, a toothed pawl can be a part of or coupled to one of the expansion top rail members 6230A-C and can engage the winch reel 6225. In one example, the winch reel 6225 is a two-way winch reel. As the winch reel 6225 is rotated in a first direction, the toothed pawl is engaged by the winch reel 6225, thus pushing each expansion top rail member 6230A-C out of the channel of the respective top rail member 6215. This also causes each of the expansion bottom rail members 6235A-C to be moved out of the channel of the respective bottom rail 6210, thus sliding the expansion side panels 6220D-F out from alongside the respective side panels 6220A-C, thereby expanding the area of the playard 6200, as shown in FIG. 62B. As the winch reel 6225 is rotated in a second direction, the toothed pawl is engaged by the winch reel 6225, thus pulling each expansion top rail member 6230A-C into the channel of the respective top rail member 6215. This also causes each of the expansion bottom rail members 6235A-C to be moved back into the channel of the respective bottom rail 6210, thus sliding the expansion side panels 6220D-F alongside the respective side panels 6220A-C, thereby contracting the area of the playard 6200, as shown in FIG. 62A. While the example playard 6200 is shown as a circular playard, the same expansion and contraction capabilities could be applied to playards having other shapes including, but not limited to, rectangular, triangular, pentagonal, hexagonal, or any other geometric shape.

Figure 63:
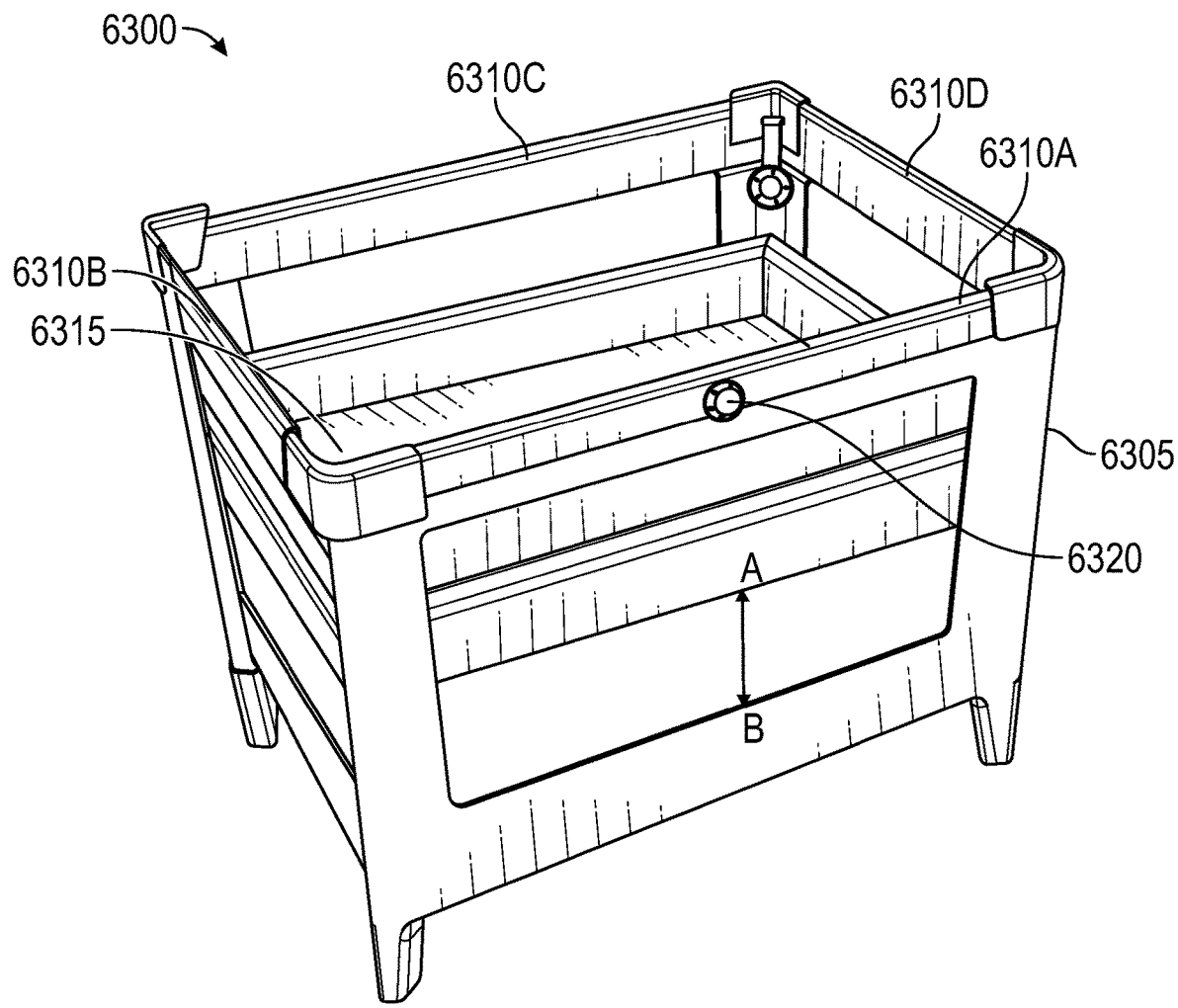
FIG. 63 is a perspective view of a playard with a winch reel system for adjusting the vertical position of the floor panel of the playard in accordance with one example embodiment of the disclosure.

FIG. 63 is a perspective view of a playard with a winch reel system for adjusting the vertical position of the floor panel of the playard in accordance with one example embodiment of the disclosure. Any one or more of the winch reel systems and features of FIGS. 1A-7 can be used as the winch reels described herein. In addition, the features described in FIG. 63 may be provided separately or in addition to any of the features described in FIGS. 59A-62B. The playard 6300 can include a playard frame. The playard frame can include one or more vertical support posts 6305 positioned along the perimeter of the playard 6300. In one example, four vertical support posts 6305 can be positioned along the perimeter of the playard 6300. However, in other embodiments, more or less than four vertical support posts can be provided. Each vertical support post 6305 can include a foot member that includes a bottom end configured to rest on a floor surface. The playard frame can also include top support rails 6310A-D. The number of top support rails 6310A-D can depend on the number of sides of the playard 6300, as well as the number of support rails 6310A-D that are divided into multiple rail portions for folding and storage of the playard 6300. In one example, the playard frame can include four top support rails 6310A-D. Each top support rail 6310A-D (or combined portions of top rail) can extend from a first vertical support post 6305 to a second vertical support post 6305. The playard frame can also include one or more bottom rails. Each bottom rail (or combined portions of bottom rail) can extend from a first vertical support post 6305 to a second vertical support post 6305. In certain embodiments, each bottom rail includes a plastic or metallic support member. In other examples, each bottom bottom rail only includes a soft goods edge. One or more side panels can extend between each respective top support rail 6310A-D and bottom rail. While four side panels are shown, this is for example purposes only, as the number of side panels could alternatively be greater or lesser than four. The one or more side panels along with a floor panel 6315 can define a contained area for a child to be placed in.

In certain examples, the floor panel 6315 can be vertically adjustable, so as to raise or lower the position of the floor panel 6315 with respect to the top support rails 6310A-D. A winch reel 6320 can be coupled to one of the side panels. Although not depicted in FIG. 63, one or more wires can be provided, each having a first end coupled to the winch reel 6320 and a distal second end coupled directly or indirectly to the floor panel 6315. In one example, the winch reel 6320 is a one-way winch reel. As the winch reel 6320 is rotated in a first direction, the wires are wound up on the take-up of the winch reel 6320, thus creating tension in each of the wires and pulling the floor panel 6315 vertically upward in Direction A towards the top support rails 6310A-D. As the winch reel 6320 is rotated in a second direction or popped out to release the take-up of the winch reel 6320, a user can push down on the floor panel 6315 in Direction B, or the weight of the floor panel 6315 alone, can cause the wires to unwind from the take-up of the winch reel 6320, thus moving the floor panel 6315 vertically downward in Direction B away from the top support rails 6310A-D.

Figure 64B:
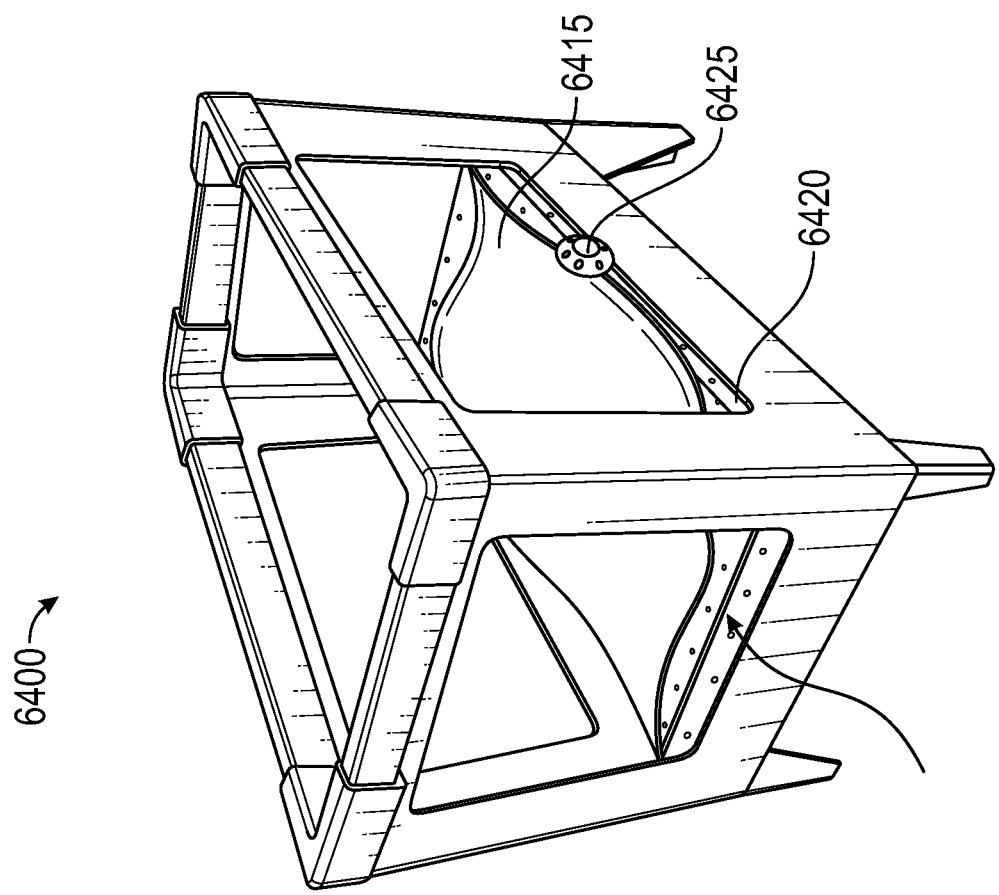
FIGS. 64A and 64B are perspective views of a playard with a winch reel system for adjusting the tension in a floor panel of the playard in accordance with one example embodiment of the disclosure.
Figure 64A:
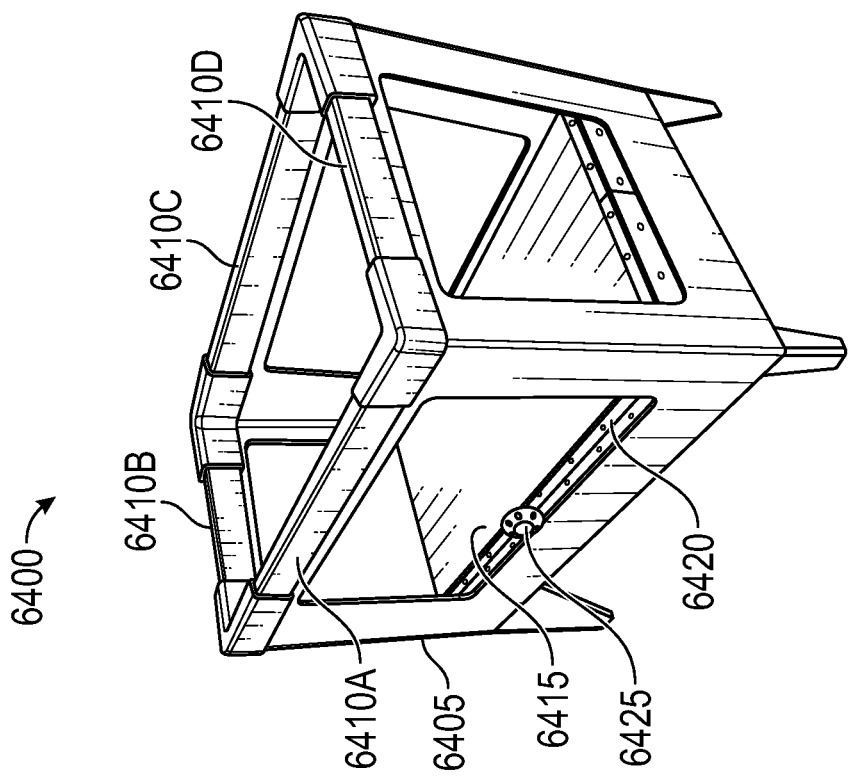

FIGS. 64A and 64B are perspective views of a playard with a winch reel system for adjusting the tension in a floor panel of the playard in accordance with one example embodiment of the disclosure. Any one or more of the winch reel systems and features of FIGS. 1A-7 can be used as the winch reels described herein. In addition, the features described in FIGS. 64A and 64B may be provided separately or in addition to any of the features described in FIGS. 59A-63. The playard 6400 can include a playard frame. The playard frame can include one or more vertical support posts 6405 positioned along the perimeter of the playard 6400. In one example, four vertical support posts 6405 can be positioned along the perimeter of the playard 6400. However, in other embodiments, more or less than four vertical support posts can be provided. Each vertical support post 6405 can include a foot member that includes a bottom end configured to rest on a floor surface. The playard frame can also include top support rails 6410A-D. The number of top support rails 6410A-D can depend on the number of sides of the playard 6400, as well as the number of support rails 6410A-D that are divided into multiple rail portions for folding and storage of the playard 6400. In one example, the playard frame can include four top support rails 6410A-D. Each top support rail 6410A-D (or combined portions of top rail) can extend from a first vertical support post 6405 to a second vertical support post 6405. The playard frame can also include one or more bottom rails. Each bottom rail (or combined portions of bottom rail) can extend from a first vertical support post 6405 to a second vertical support post 6405. In certain embodiments, each bottom rail includes a plastic or metallic support member. In other examples, each bottom rail includes a soft goods edge. One or more side panels can extend between each respective top support rail 6410A-D and bottom rail. While four side panels are shown, this is for example purposes only as the number of side panels could alternatively be greater or lesser than four. The one or more side panels along with a floor panel 6415 can define a contained area for a child to be placed in.

In certain examples, the tension in the floor panel 6415 can be adjustable, thus enabling the adjustment of the cushioning level of the floor panel 6415. The floor panel 6415 can include a cushion 6420 positioned below the floor panel 6415. When the floor panel 6415 is loose, there is low tension within the floor panel 6415, and so the floor panel 6415 is able to compress the cushion 6420 by a great amount. When the floor panel 6415 is tight, there is high tension within the floor panel 6415, and so the floor panel 6415 is less able to be pressed downward into the cushion 6420, thus resulting in a less cushioned surface. A winch reel 6425 can be coupled to one of the side panels and/or the floor panel 6415. Although not depicted in FIGS. 64A-B, one or more wires can each have a first end coupled to the winch reel 6425 and a distal second end coupled directly or indirectly to the floor panel 6415. In one example, the winch reel 6425 is a one-way winch reel. As the winch reel 6425 is rotated in a first direction, the wires are wound up on the take-up of the winch reel 6425, which creates tension in each of the wires and increases the tension in the floor panel 6415, thereby reducing the level of cushioning provided along the floor panel 6415. As the winch reel 6425 is rotated in a second direction or popped out to release the take-up of the winch reel 6425, a user can pull along the floor panel 6415 to cause the wires to unwind from the take-up of the winch reel 6425 to reduce the tension in the floor panel 6415, thus increasing the cushioning level along the floor panel 6415.

Figure 65B:
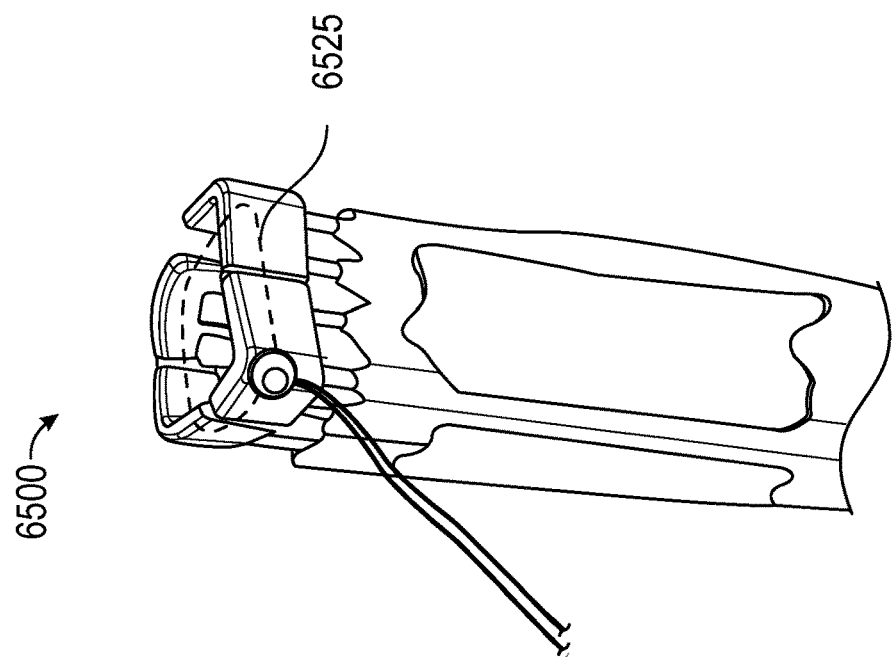
FIGS. 65A and 65B are perspective views of a playard with a winch reel system for closing the playard in accordance with one example embodiment of the disclosure.
Figure 65A:
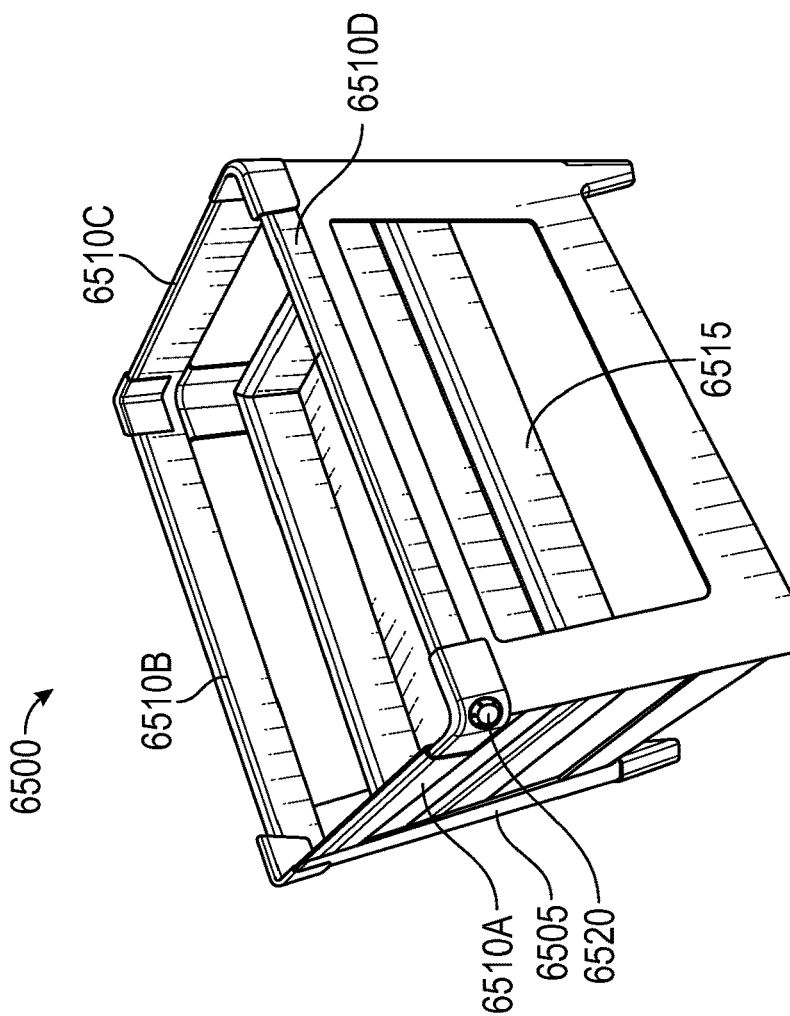

FIGS. 65A and 65B are perspective views of a playard with a winch reel system for closing the playard in accordance with one example embodiment of the disclosure. Any one or more of the winch reel systems and features of FIGS. 1A-7 can be used as the winch reels described herein. In addition, the features described in FIGS. 65A and 65B may be provided separately or in addition to any of the features described in FIGS. 59A-64. The playard 6500 can include a playard frame. The playard frame can include one or more vertical support posts 6505. In one example, four vertical support posts 6505 can be positioned at each corner of the playard 6500. However, in other embodiments, more or less than four vertical support posts can be provided. Each vertical support post 6505 can include a foot member that includes a bottom end configured to rest on a floor surface. The playard frame can also include top support rails 6510A-D. The number of top support rails 6510A-D can depend on the number of sides of the playard 6500 as well as the number of support rails that are divided into multiple rail portions for folding and storage of the playard 6500. In one example, the playard frame can include a first top end rail 6510A, a second top end rail 6510C, a first top side rail 6510B, and a second top side rail 6510D. Each top rail (or combined portions of top rail) 6510A-D can extend from a first vertical support post 6505 to a second vertical support post 6505. The playard frame can also include a first bottom end rail, a second bottom end rail, a first bottom side rail, and a second bottom side rail. Each bottom rail (or combined portions of bottom rail) can extend from a first vertical support post 6505 to a second vertical support post 6505. In certain embodiments, each bottom rail includes a plastic or metallic support member. In other examples, each bottom rail includes a soft goods edge. One or more side panels 6515 can extend between each respective top rail 6510A-D and bottom rail. While four side panels 6515 are shown, this is for example purposes only as the number of side panels 6515 could alternatively be greater or lesser than four. The side panels 6515 can be constructed of soft goods, such as a see-through mesh material. The one or more side panels 6515 along with a floor panel can define a contained area for a child to be placed in.

The playard 6500 can also include a winch reel 6520 positioned along one of the vertical support posts 6505. Alternatively, the winch reel 6520 can be positioned along any other portion of the playard 6500. The winch reel 6520 can be configured to assist in collapsing and compressing the playard 6500 from a use configuration, as shown in FIG. 65A, to a folded configuration, as shown in FIG. 65B. In one example, the winch reel 6520 is a drawstring winch reel. For example, the playard 6000 can also include a wire 6525 having a first end extending through the winch reel 6520. The wire 6525 can extend through all of the top support rails 6510A-D, and a distal second end of the wire 6525 can also extend through the winch reel 6520. Alternatively, two separate wires could be used, each passing through the winch reel 6520 with a distal second end of each wire being coupled to another vertical support post 6505 and/or one of the top support rails 6510A-D. When the playard is in the use configuration, as shown in FIG. 65A, the winch reel 6520 can be rotated from a locked to unlocked position, thereby allowing the wire 6525 to be pulled through the reel 6520. A user can then grasp the ends of the wire 6525 and pull the wire 6525 through the winch reel 6520, which creates tension in the wire 6525, thus pulling each of the vertical support posts 6505 and each of the side rails 6510A-D towards the winch reel 6520 and adjusting the playard 6500 from the use configuration to the folded configuration. While the winch reel 6520 is still in the unlocked position, the user can pull on each of the vertical support posts 6505 and/or each of the top support rails 6510A-D to unfold the playard 6500 from the folded configuration to the use configuration.

Figure 66B:
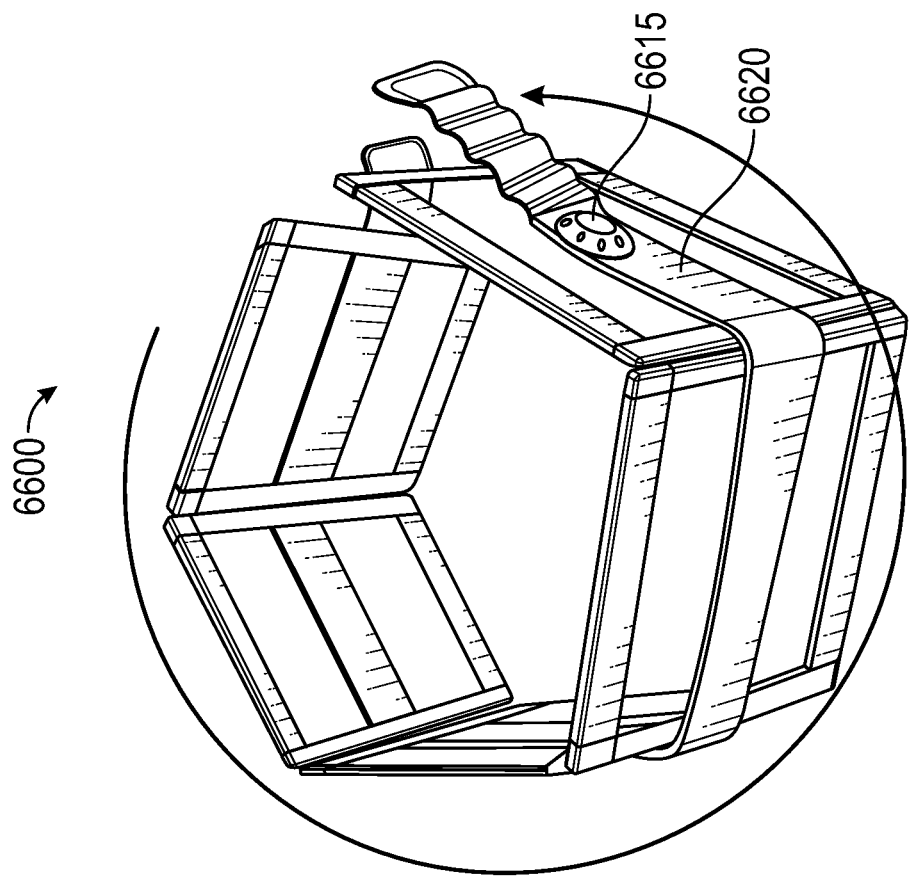
FIGS. 66A and 66B are perspective views of a playard with a winch reel system for adjusting the tension in a perimeter band positioned around side panels of the playard in accordance with one example embodiment of the disclosure.
Figure 66A:
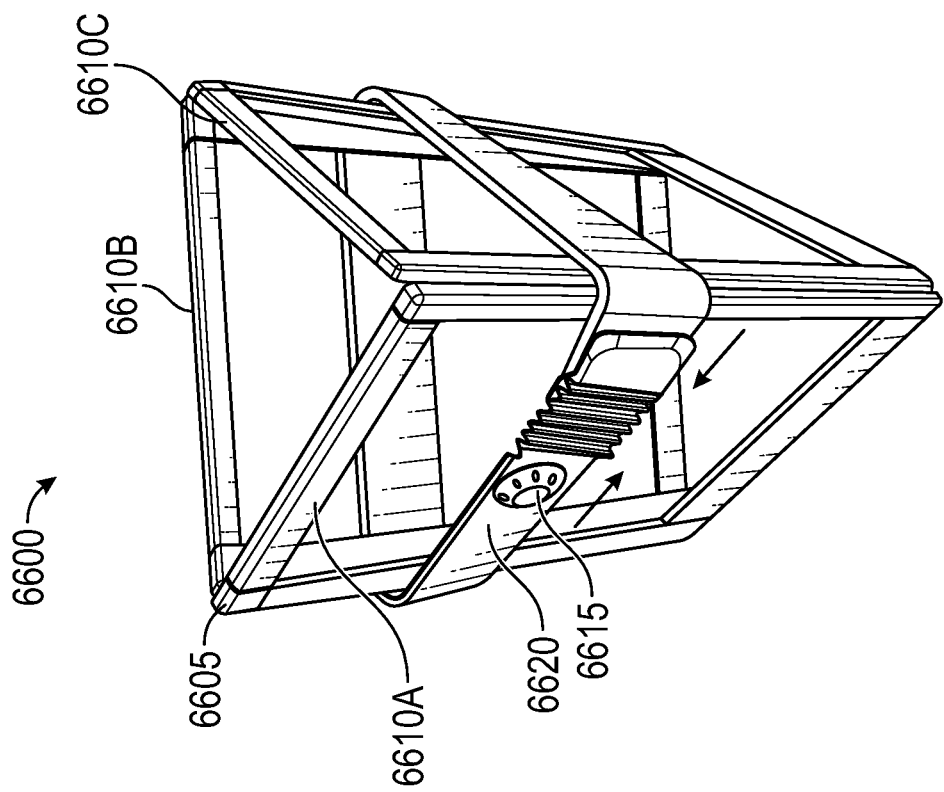

FIGS. 66A and 66B are perspective views of a playard with a winch reel system for adjusting the tension in a perimeter band positioned around side panels of the playard in accordance with one example embodiment of the disclosure. Any one or more of the winch reel systems and features of FIGS. 1A-7 can be used as the winch reels described herein. In addition, the features described in FIGS. 66A and 66B may be provided separately or in addition to any of the features described in FIGS. 59A-65B. The playard 6600 can include multiple side panels 6610. The number of side panels 6610 that make up a frame 6605 of the playard 6600 can be adjustable depending on the size and space desired by a caregiver. For example, three side panels 6610A-C are provided in the embodiment of FIG. 66A, while five side panels are provided in the embodiment of FIG. 66B. Each side panel 6610 can be configured to be positioned adjacent to another side panel 6610. The playard 6600 can also include a construction band 6620 having a first end and a distal second end. Each of the first end and the second end of the construction band 6620 can include Velcro, buttons, snaps, a zipper, or another coupling means for coupling the first end to the second end. The construction band 6620 can also include a winch reel 6615 and a wire having a first end coupled to the winch reel 6615 and a distal second end extending along all or a portion of the construction band 6620. In one example embodiment, the winch reel 6615 can be a one-way winch reel.

In use, the side panels 6610 can be placed adjacent to one another to create an enclosed space on a floor surface. The construction band 6620 can be placed around the perimeter of the side panels 6610, and the first end of the construction band 6620 can be removably coupled to the second end of the construction band 6620 in order to hold the side panels 6610 in place. The winch reel 6615 can be rotated in a first direction, thus creating tension in the wire and further tightening the construction band 6620 around the perimeter of the side panels 6610. As the winch reel 6615 is rotated in a second direction or popped out to release the take-up of the winch reel 6615, a user can pull the construction band 6620 to unwind the wire from the winch reel 6615 and reduce the tension in the construction band 6620. The first end of the construction band 6620 can then be decoupled from the second end of the construction band 6620, and the user can then further adjust the number of side panels 6610 and/or the shape of the playard 6600.

Figure 67:
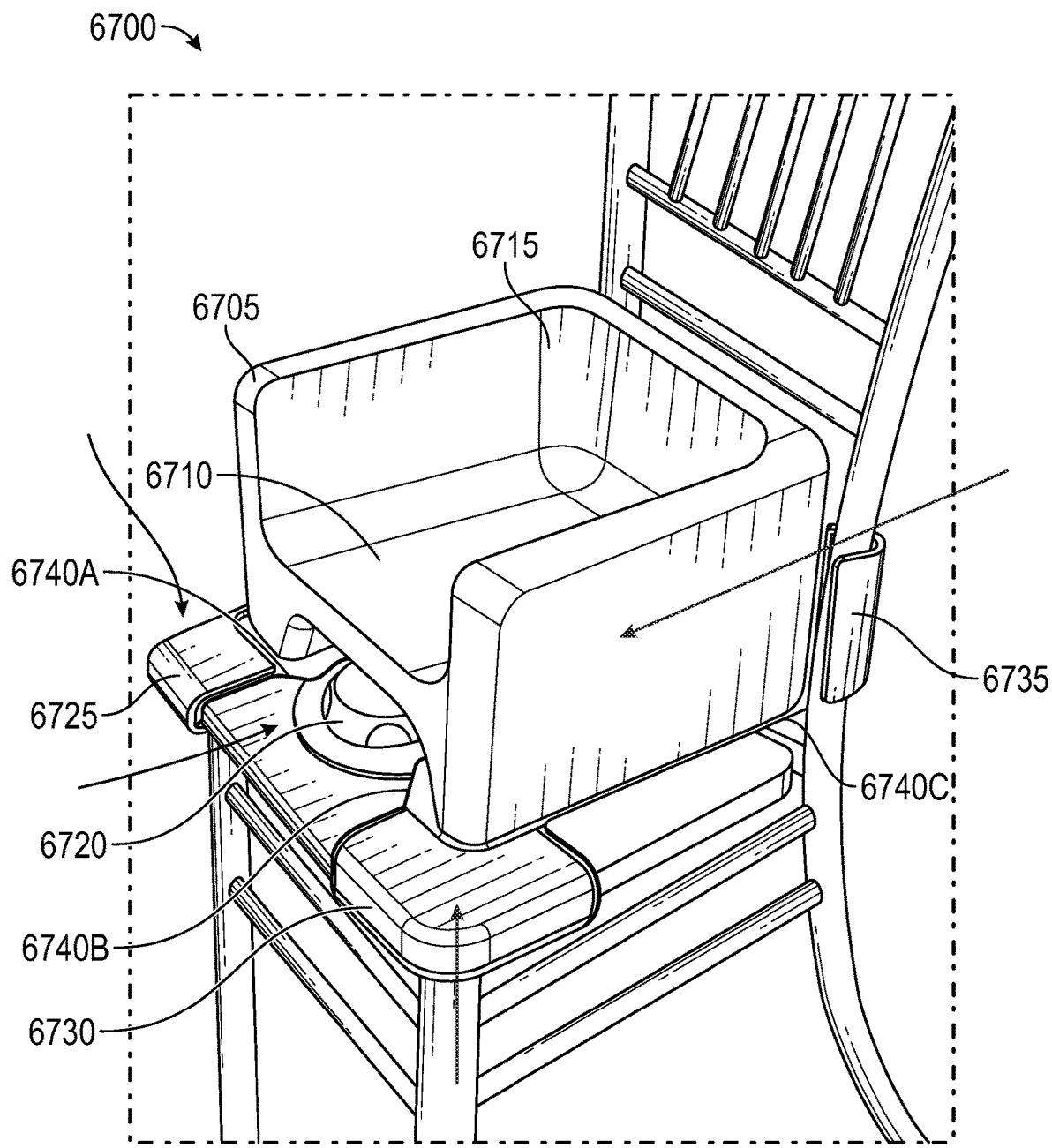
FIG. 67 is a perspective view of a booster seat with a winch reel system for adjusting the tension of coupling elements that couple the booster seat to a chair in accordance with one example embodiment of the disclosure.

FIG. 67 is a perspective view of a booster seat with a winch reel system for adjusting the tension of coupling elements that couple the booster seat to a chair in accordance with one example embodiment of the disclosure. Any one or more of the winch reel systems and features of FIGS. 1A-7 can be used as the winch reels described herein. The example booster seat 6700 can be configured to be removably coupled to a conventional chair. The booster seat 6700 can include a seat shell 6705. The seat shell 6705 can include a seat bottom 6710 and a seat back 6715 that extends upwards from the seat bottom 6710. The seat bottom 6710 and seat back 6715 can be sized and shaped to receive a child thereon. The booster seat 6700 can also include a first chair front sleeve 6725 and a second chair front sleeve 6730. Each of the first chair front sleeve 6725 and second chair front sleeve 6730 can be sized and shaped to be slidably attached to each of a front corner of a seat bottom of a conventionally sized and shaped chair. The booster seat 6700 can also include a first chair back sleeve 6735 and a second chair back sleeve, although the second chair back sleeve is not depicted in FIG. 67. Each of the first chair back sleeve 6735 and the second chair back sleeve can be sized and shaped to be slidably attached to a portion of a seat back of a conventional chair (for example, a spindle of the seat back). Further, the first chair front sleeve 6725 and the second chair front sleeve 6730 can have a different size and or shape than the first chair back sleeve 6735 and the second chair back sleeve.

The booster seat 6700 can also include a winch reel 6720. In one example, the winch reel 6720 is a one-way winch reel. The booster seat 6700 can also include one or more wires 6740A-C, each coupled at a first end to the winch reel 6720 and at a distal second end to one of the first chair front sleeve 6725, the second chair front sleeve 6730, the first chair back sleeve 6735, and the second chair back sleeve respectively, although wire 6740C is not depicted in FIG. 67. The winch reel 6720 can be rotated in a first direction, thus creating tension in the wires 6740A-C and tightening each of the first chair front sleeve 6725, the second chair front sleeve 6730, the first chair back sleeve 6735, and the second chair back sleeve respectively onto the conventional chair to more securely hold the booster seat 6700 in place on the conventional chair. As the winch reel 6720 is rotated in a second direction or popped out to release the take-up of the winch reel 6720, a user can pull on one or more of the first chair front sleeve 6725, the second chair front sleeve 6730, the first chair back sleeve 6735, and the second chair back sleeve respectively to unwind the wires 6740A-C from the winch reel 6720 in order to respectively remove each of the first chair front sleeve 6725, the second chair front sleeve 6730, the first chair back sleeve 6735, and the second chair back sleeve from the conventional chair. The booster seat 6700 can then be conveniently removed from the conventional chair.

Figure 68B:
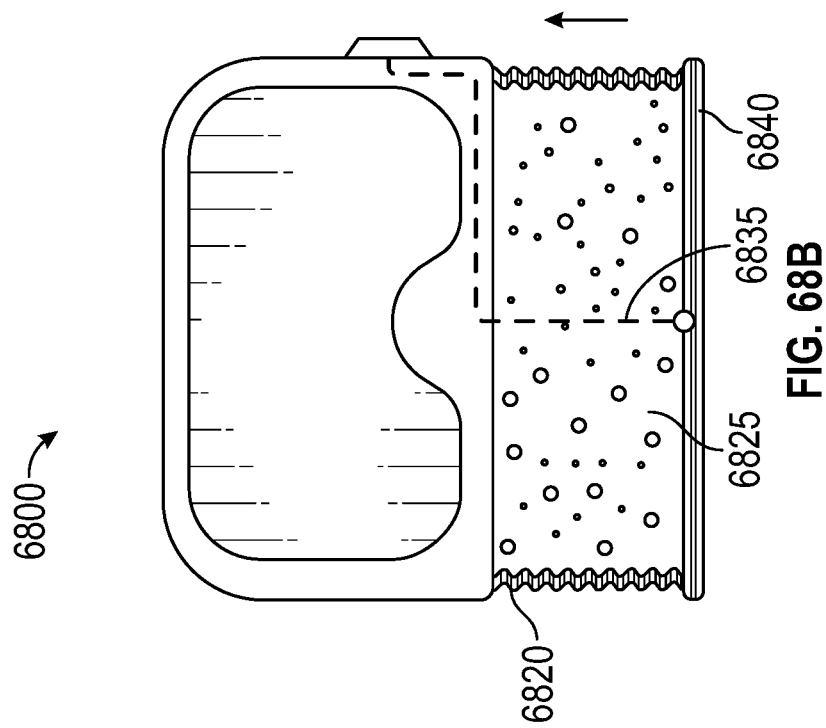
FIGS. 68A and 68B are respectively a perspective view and a front elevation view of a booster seat with a winch reel system for adjusting the height of the booster seat in accordance with one example embodiment of the disclosure.
Figure 68A:
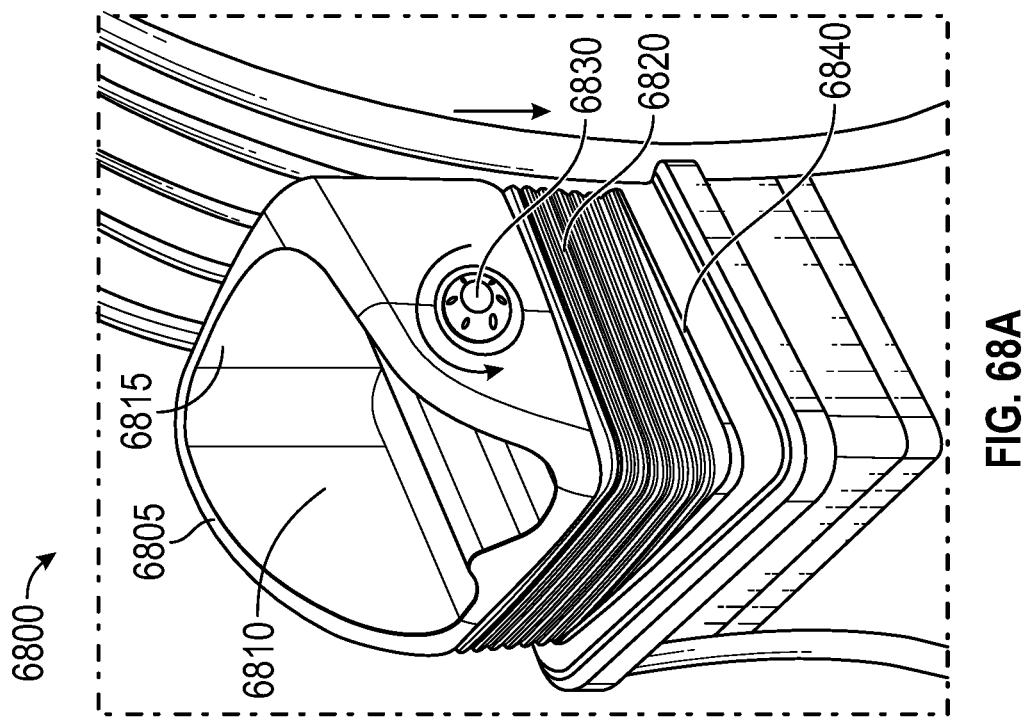

FIGS. 68A and 68B are perspective and front elevation views of a booster seat with a winch reel system for adjusting the height of the booster seat in accordance with one example embodiment of the disclosure. Any one or more of the winch reel systems and features of FIGS. 1A-7 can be used as the winch reels described herein. In addition, the features described in FIGS. 68A and 68B may be provided separately or in addition to any of the features described in FIG. 67. An example booster seat 6800 can be configured to be vertically adjusted while positioned on a conventional chair. The booster seat 6800 can include a seat shell 6805. The seat shell 6805 can include a seat bottom 6810 and a seat back 6815 that extends upwards from the seat bottom 6810. The seat bottom 6810 and seat back 6815 can be sized and shaped to receive a child thereon. The booster seat 6800 can also include a base 6840 configured to abut the seat bottom 6810 of a conventional chair and a baffle 6820 that extends from the base 6840 to the seat shell 6805 and defines a cavity between the seat shell 6805 and the base 6840. The booster seat 6800 can also include a compressible foam 6825 or other resilient material placed within the cavity between the seat shell 6805 and the base 6840. The compressible foam 6825 can be configured to provide a vertically upward force on the seat shell 6805 to raise the seat shell 6805 away from a seat bottom of the conventional chair, thereby providing an adjustable height booster seat 6800.

The booster seat 6800 can also include a winch reel 6830. The winch reel 6830 can be positioned along an outer portion of the seat shell 6805 in certain example embodiments. In one example, the winch reel 6830 is a two-way winch reel. The booster seat 6800 can also include one or more wires 6835, each coupled at a first end to the winch reel 6830 and at a distal second end to the base 6840. As the winch reel 6830 is rotated in a first direction, the one or more wires 6835 is wound up on the take-up of the winch reel 6830, thus creating tension in the wire 6835 that compresses the seat shell 6805 down on the compressible foam 6825 and moves the seat shell 6805 vertically downward, which lowers the height of the seat shell 6805 with respect to the base 6840. As the winch reel 6830 is rotated in a second direction, the one or more wires 6835 is unwound from the take-up of the winch reel 6835, thus reducing tension in the wire 6835 and allowing the compressible foam 6825 to push the seat shell 6805 vertically upward, which increases the height of the seat shell 6805 with respect to the base 6840.

Figure 69:
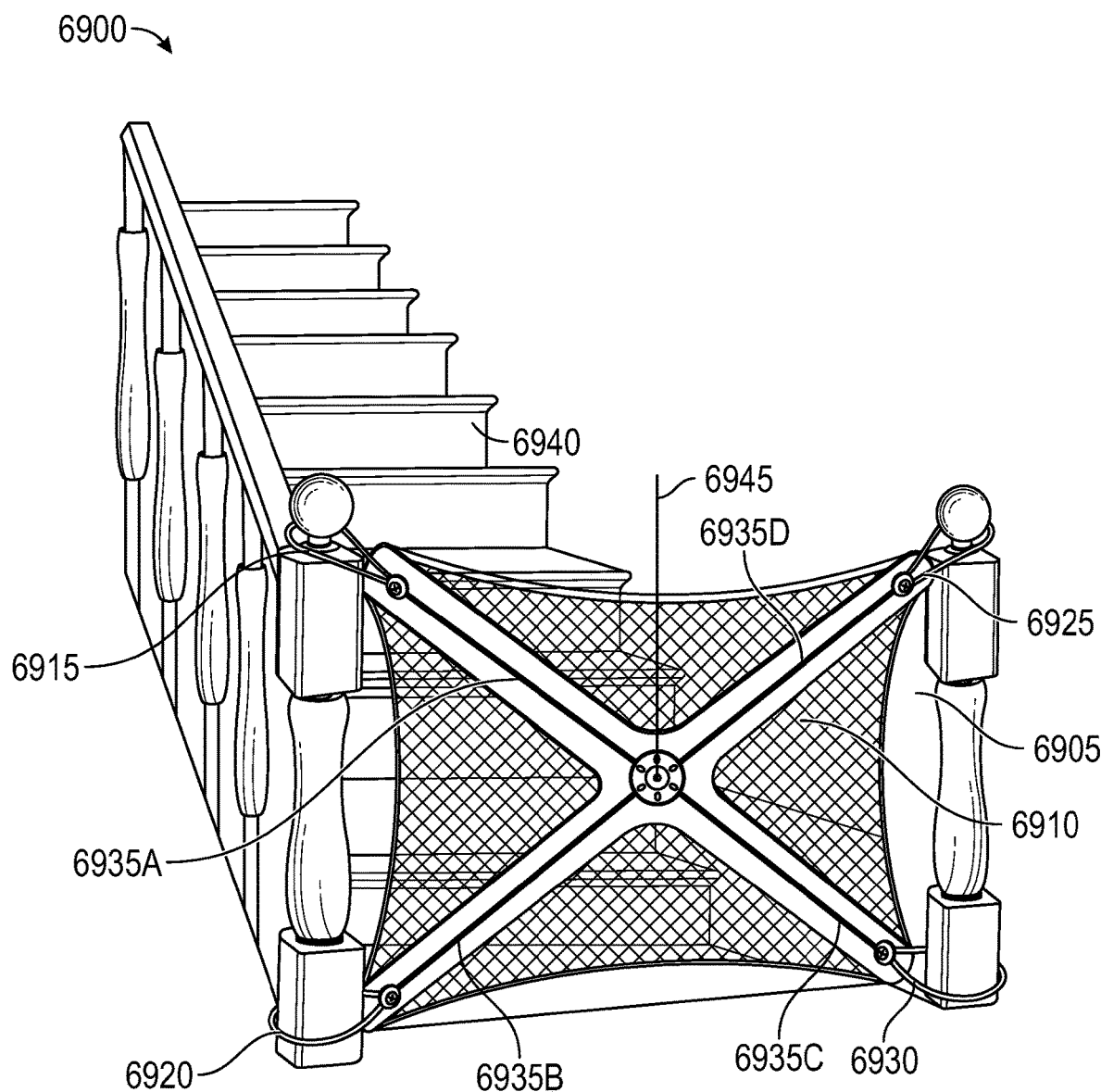
FIG. 69 is a perspective view of a baby gate with a winch reel system for adjusting the tension of coupling elements that couple the baby gate to walls or other elements in accordance with one example embodiment of the disclosure.

FIG. 69 is a perspective view of a baby gate with a winch reel system for adjusting the tension of coupling elements that couple the baby gate to walls or other elements in accordance with one example embodiment of the disclosure. Any one or more of the winch reel systems and features of FIGS. 1A-7 can be used as the winch reels described herein. A baby gate 6905 can include a soft goods panel 6910 having a width that is the same or a little less than the width of a standard stairway 6940 or doorway. In one example, the soft goods panel 6910 can include a mesh material to allow a user to see through at least a portion of the soft goods panel 6910. The baby gate 6905 can also include one or more wire loops or hooks 6915, 6920, 6925, and 6930 disposed at each corner of the soft goods panel 6910. The wire loops or hooks 6915, 6920, 6925, and 6930 can be configured to be placed around or coupled to stair posts and/or hook mounts positioned along a wall adjacent to the stairs 6940 or doorway.

The baby gate 6905 can also include a winch reel 6945. In one example, the winch reel 6945 is a one-way winch reel. The baby gate 6905 can also include one or more wires 6935A-D, each coupled at a first end to the winch reel 6945 and at a distal second end to one of the wire loops or hooks 6915, 6920, 6925, and 6930 respectively. The winch reel 6945 can be rotated in a first direction, thus creating tension in each of the wires 6935A-D and tightening each of the wire loops or hooks 6915, 6920, 6925, and 6930 respectively onto the stairway post or wall mount. This tightens the soft goods panel 6910 and more securely holds the baby gate 6905 in place. As the winch reel 6945 is rotated in a second direction or popped out to release the take-up of the winch reel 6945, a user can pull on one or more portions of the soft goods panel 6910 to unwind each of the wires 6935A-D from the winch reel 6945 in order to remove each of the wire loops or hooks 6915, 6920, 6925, and 6930 from the respective stairway post or wall mount. The baby gate 6905 can then be removed from blocking the stairs 6940 or the doorway.

Figure 70:
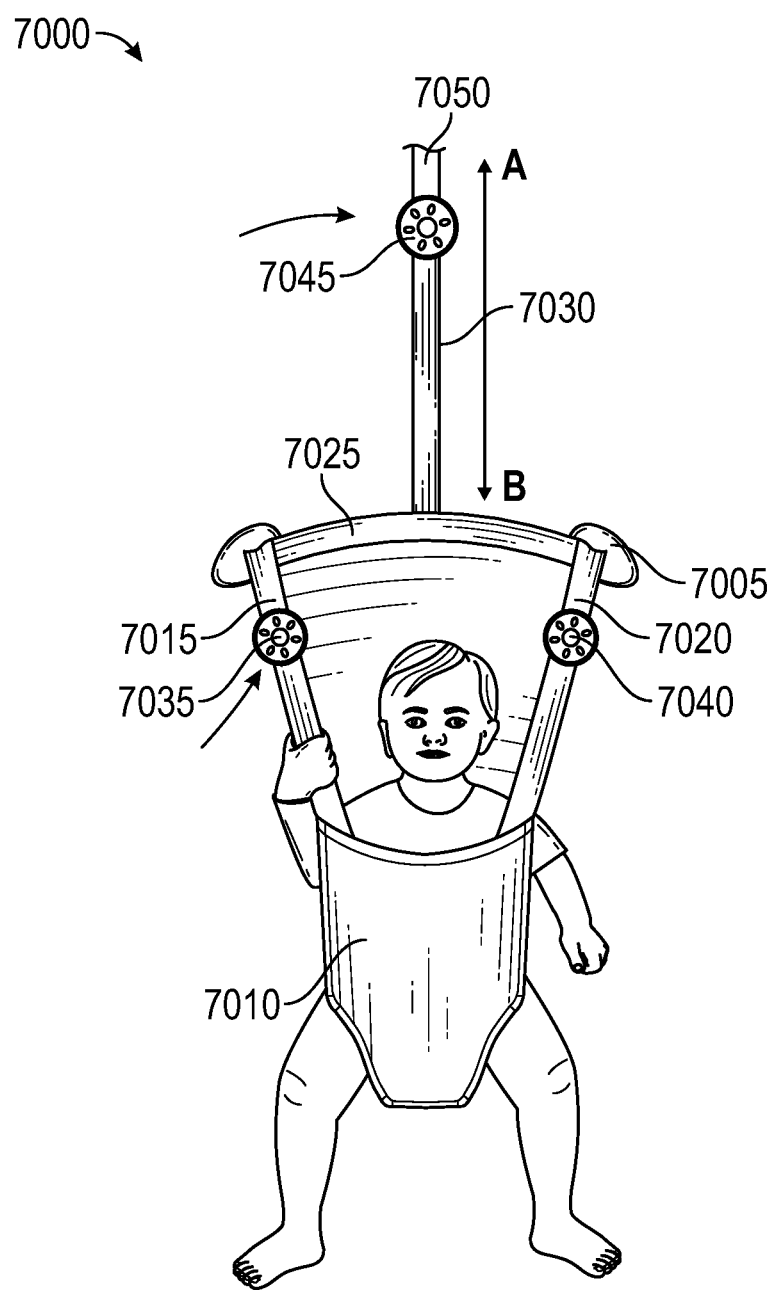
FIG. 70 is a perspective view of a bouncer with a winch reel system for adjusting the length of the bouncer straps in accordance with one example embodiment of the disclosure.

FIG. 70 is a perspective view of a bouncer with a winch reel system for adjusting the length of the bouncer straps in accordance with one example embodiment of the disclosure. Any one or more of the winch reel systems and features of FIGS. 1A-7 can be used as the winch reels described herein. In one example, the bouncer is a baby door jumper configured to be removably coupled to a door frame. The bouncer 7005 can include a seating compartment 7010 with a pair of leg holes and a seat bottom for supporting a child therein. The bouncer 7005 can also include a support bar 7025 with a first harness strap 7015 extending from the support bar 7025 to the seating compartment 7010 along a first end of the support bar 7025 and a second harness strap 7020 extending from the support bar 7025 to the seating compartment 7010 along a distal second end of the support bar 7025. In one example, the first harness strap 7015 can include a first portion and a second portion and a first winch reel 7035 coupled to the first portion and the second portion of the first harness strap 7015. The second harness strap 7020 can also include a first portion and a second portion and a second winch reel 7040 coupled to the first portion and the second portion of the second harness strap 7020. The bouncer 7005 can also include an elastic band 7030 that can extend from the support bar 7025 to a distal second end 7050 that can include a door frame coupler, which is not shown in FIG. 70, of any type known to those of ordinary skill in the art. In one example, the elastic band 7030 can include a first portion and a second portion and a third winch reel 7045 coupled to the first portion and second portion of the elastic band 7030.

In one example, each of the first winch reel 7035, the second winch reel 7040, and the third winch reel 7045 can be one-way winch reels configured to adjust the length and/or tension in the first harness strap 7015, the second harness strap 7020, or the elastic band 7030 respectively. For example, each of the first winch reel 7035, the second winch reel 7040, and the third winch reel 7045 can be rotated in a first direction, thus respectively causing the first harness strap 7015, the second harness strap 7020, or the elastic band 7030 to be wound up on a take-up of the respective winch reel 7035, 7040, and 7045. This motion serves to adjust the length of each of the first harness strap 7015, the second harness strap 7020, or the elastic band 7030 and modify the tension in each. As each of the first winch reel 7035, the second winch reel 7040, and the third winch reel 7045 is rotated in a second direction or popped out to release the take-up of the respective winch reels 7035, 7040, and 7045, a user can pull on one or more portions of the first harness strap 7015, the second harness strap 7020, or the elastic band 7030 respectively to unwind the straps or band from the respective winch reels 7035, 7040, and 7045 in order to increase the length and/or tension in each of the first harness strap 7015, the second harness strap 7020. or the elastic band 7030.

Figure 71B:
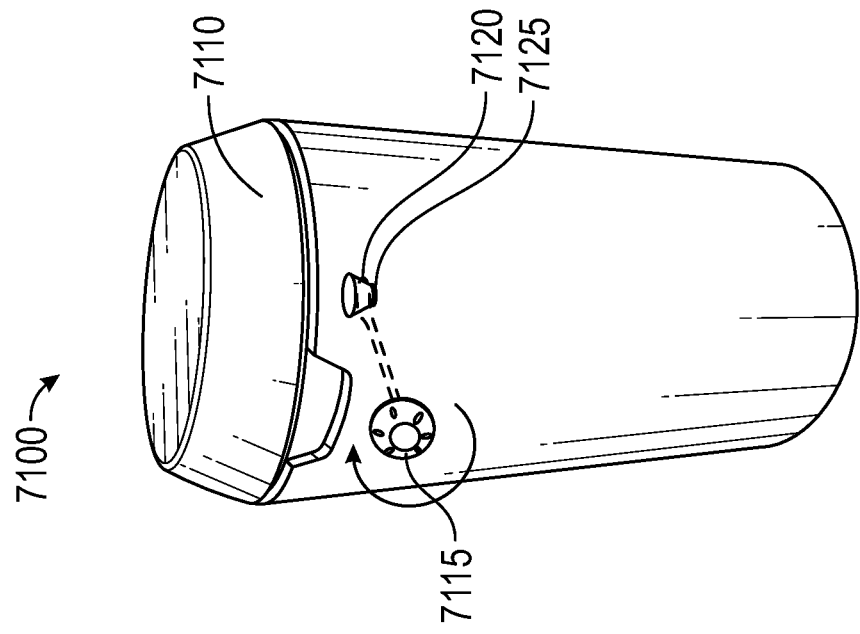
FIGS. 71A and 71B are perspective views of a disposal bin with a winch reel system for closing a disposal bag within the disposal bin in accordance with one example embodiment of the disclosure.
Figure 71A:
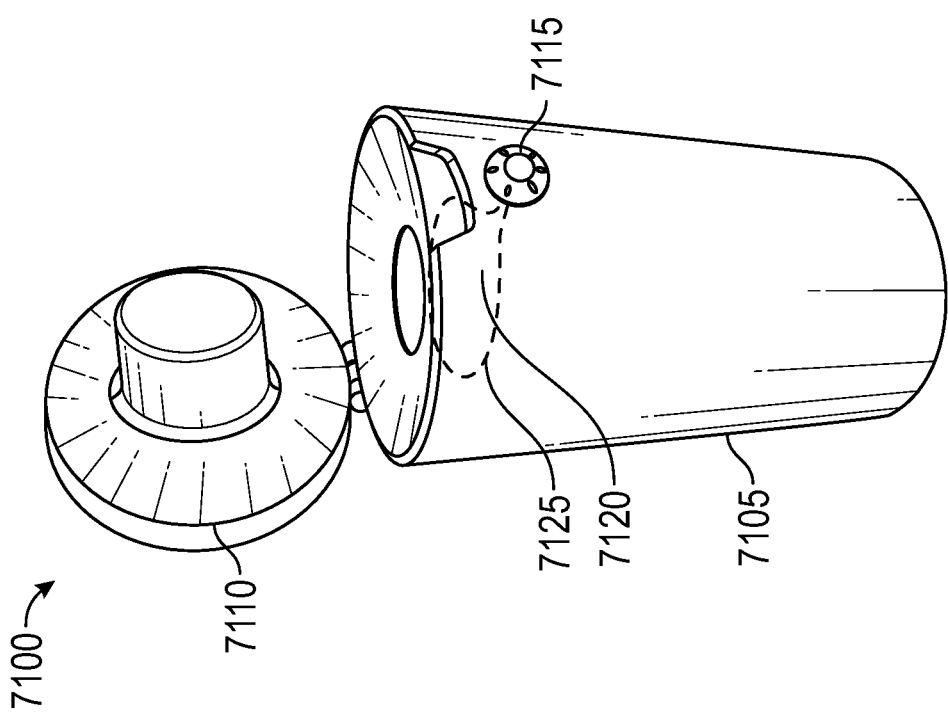
Figure 72B:
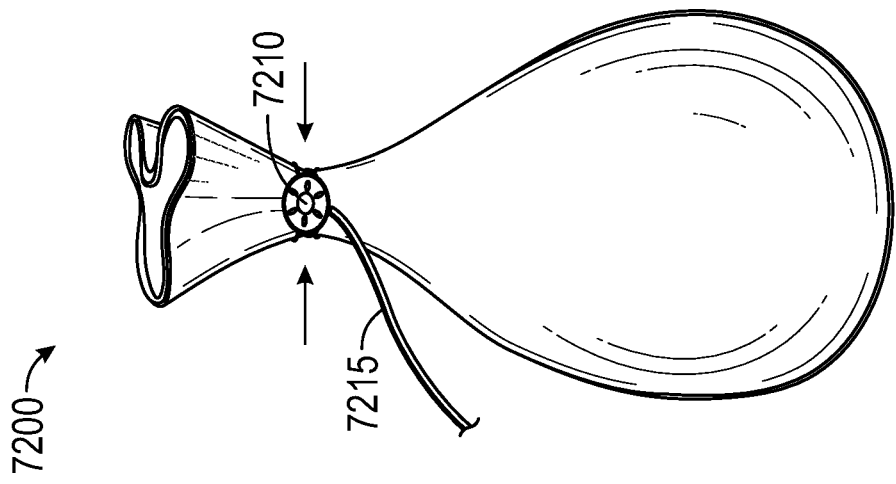
FIGS. 72A and 72B are perspective views of a mat with a winch reel system for closing the mat in accordance with one example embodiment of the disclosure.

FIGS. 71A and 72B are perspective views of a disposal bin with a winch reel system for closing a disposal bag within the disposal bin in accordance with one example embodiment of the disclosure. Any one or more of the winch reel systems and features of FIGS. 1A-7 can be used as the winch reels described herein. The disposal bin 7100 can include a container 7105 having an outer wall defining a cavity for receiving disposed material. The disposal bin 7100 can also include a lid 7110. In one example, the lid 7110 is coupled to the container 7105 and configured to rotate with respect to the container 7105 from a closed position that prevents access to the cavity from the exterior of the container 7105, to an open position, which allows access to the cavity from the exterior of the container 7105. A bag 7120 can be placed within the cavity of the container 7105 to received disposed material. The disposal bin 7100 can also include a winch reel 7115 positioned along an exterior of the container 7105. In one example, the winch reel 7115 is a one-way winch reel. The disposal bin 7100 can also include a wire 7125 configured to be disposed around a portion of an exterior of the bag 7120 near a top, open end of the bag 7120. The wire 7125 can be configured to close up the top, open end of the bag 7120. As the winch reel is rotated in a first direction, the wire 7125 is wound up on a take-up of the winch reel 7125, which adjusts the length of the wire 7125 and closes up the top, open end of the bag 7120. Closing the top, open end of the bag 7120 can aid in reducing odors escaping from the bag 7120 and/or to removing the bag 7120 from the container 7105. As the winch reel 7120 is rotated in a second direction or popped out to release the take-up of the winch reel 7120, a user can pull on the wire 7125 to unwind the wire 7125 from the winch reel 7120 in order to increase the diameter of the wire loop, which can additionally aid in inserting a bag 7120 into the container 7105.

Figure 72A:
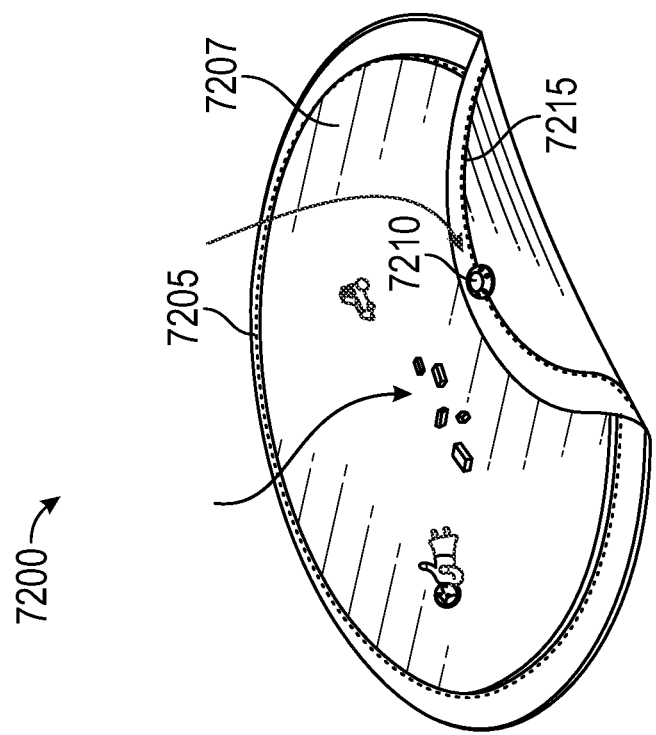

FIGS. 72A and 72B are perspective views of a mat with a winch reel system for closing the mat in accordance with one example embodiment of the disclosure. Any one or more of the winch reel systems and features of FIGS. 1A-7 can be used as the winch reels described herein. A mat 7205 can include a top play surface 7207 and an opposing bottom surface configured to abut a floor surface. The play surface 7207 can include carpet, padding, or other soft goods materials. The mat 7205 can also include a winch reel 7210 positioned along the bottom surface of the mat 7205. Alternatively, the winch reel 7210 can be positioned along any other portion of the mat 7205. The winch reel 7210 can be configured to help collapse the outer perimeter of the mat 7205, as shown in FIG. 72B. In one example, the winch reel 7210 is a drawstring winch reel. For example, the mat 7205 can also include a wire 7215 having a first end extending through the winch reel 7210. The wire 7215 can extend along the perimeter of the mat 7205, and a distal second end of the wire 7215 can also extend through the winch reel 7210. When the mat 7205 is open along a floor surface, the winch reel 7210 can be rotated from an unlocked to a locked position, thereby allowing the wire 7215 to be pulled through the reel 7210. A user can then grasp the ends of the wire 7215 and pull the wire 7215 through the winch reel 7210, which creates tension in the wire 7215 and pulls the outer perimeter of the mat 7205 together towards the winch reel 7210 to close up the mat 7205, as depicted in FIG. 72B. This can be done even with toys left on the mat 7205, which eliminates the need to put toys away prior to folding up the mat 7205. While the winch reel 7210 is still in the locked position, a user can pull on the perimeter edges of the mat 7205 to unfold the mat 7205 and place it on a floor surface, with the toys still on the top surface 7207 of the mat 7205, as depicted in FIG. 72A.

Though the disclosed examples include particular arrangements of a number of parts, components, features, and aspects, the disclosure is not limited to only those examples or arrangements shown. Any one or more of the parts, components, features, and aspects of the disclosure can be employed alone or in other arrangements of any two or more of the same.

Although certain winch system features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A stroller comprising:
   a child containment device;
   a winch reel, wherein the winch reel is configured to adjust at least one feature of the stroller, and wherein the winch reel comprises at least one of: a one-way winch reel, a two-way winch reel, a multi-cord winch reel, or a drawstring winch reel; and
   a toothed pawl, wherein the toothed pawl engages the winch reel to adjust the at least one feature of the stroller, and wherein the toothed pawl is one of a toothed pawl, a ratchet, a catch, a cog, a sprocket, pinions, fangs, tusks, a tine, a gear, or a cam.

2. The stroller of claim 1, further comprising at least one wire having a first end coupled to the winch reel and a distal second end, wherein the winch reel adjusts at least one of a length and a tension in the at least one wire.

3. The stroller of claim 2, wherein the wire is one of a line, a wire, a cable, a cord, a rope, a monofilament, an elastic, a spring, a braid, a strand, a string, a hawser, a tape, a thread, a ribbon, a twine, a yarn, a ligature, a fillis, a creance, or a strap.

4. The stroller of claim 1, wherein the child containment device is at least one of: a stroller seat, or a child car seat.

5. The stroller of claim 1, wherein the child containment device is a child car seat comprising:
   a first shoulder harness; and
   a second shoulder harness.

6. The stroller of claim 5, wherein the at least one feature adjusted by the winch reel on the child car seat is at least one of: a length of at least one of the first shoulder harness and the second shoulder harness, or a distance between the first shoulder harness and the carrier backrest.

7. The stroller of claim 1, wherein the child containment device is a child car seat comprising:
   a seat shell comprising a seat bottom and a seat back;
   soft goods covering at least a portion of the seat bottom and seat back; and
   a plurality of harness straps.

8. The stroller of claim 7, wherein the at least one feature adjusted by the winch reel on the child's car seat is at least one of: a length of the plurality of harness straps, a length of a top tether coupled to a rear side of the seat shell, a length of a stabilizer foot coupled to a front side of the child's car seat, a position of cushioning in the soft goods, a recline of the seat back, a rotation position of the seat shell with respect to a seat base coupled to the seat shell, a tension of a coupling of the soft goods to the seat shell, a plurality of vent openings in the soft goods, a vertical position of padding within the soft goods, a shape of the soft goods, a tension in an isofix coupling device disposed along a rear side of the child's car seat, a length of a harness clasp removably coupled to at least two of the plurality of harness straps, or another adjustable feature of the child's car seat.

9. The stroller of claim 1, further comprising:
   a stroller frame comprising:
      a front stroller frame;
      a rear stroller frame; and
      a handle frame;
   a seat bottom;
   a seat back;
   at least one first wheel coupled to the front stroller frame;
   at least one second wheel coupled to the rear stroller frame; and
   a plurality of harness straps.

10. The stroller of claim 9, wherein the at least one feature adjusted by the winch reel on the stroller is at least one of: a length of the plurality of harness straps, a rotation of a footrest movably coupled to the seat bottom, a position of a canopy, a height of the stroller frame, a width of the stroller frame, a recline position of the seat back, a radius of at least one of the at least one first wheel and the at least one second wheel, a position of the seat bottom, a break resistance on at least one of the at least one first wheel and the at least one second wheel, a plurality of vent openings in the seat back, a tension of a coupling of soft goods to the seat bottom and the seat back, a coupling of a mosquito net to the seat bottom, a coupling of a rain cover to the stroller frame, an opening of a shopping container disposed below the seat bottom, a position of a blanket over the seat bottom, or a folding tension of the stroller.

11. The stroller of claim 1, wherein the winch reel is a first winch reel, further comprising:
   a second winch reel.

12. The stroller of claim 1, wherein the winch reel is disposed on a rear side of the stroller.

13. The stroller of claim 1, wherein the winch reel is configured to adjust a seat recline of the stroller.

14. The stroller of claim 13, wherein the winch reel is configured to further adjust a leg rest angle of the stroller.

15. The stroller of claim 1, wherein the winch reel is configured to adjust a height of the stroller.

16. The stroller of claim 1, wherein the winch reel is configured to adjust a wheel size of wheels of the stroller.

17. The stroller of claim 1, wherein the winch reel is configured to adjust a width of the stroller.

18. The stroller of claim 1, wherein the winch reel is configured to allow the stroller to be folded.

19. The stroller of claim 1, wherein the winch reel is configured to adjust a storage space size of the stroller.

* * * * *